United States Patent
Bhatia et al.

(10) Patent No.: US 10,034,034 B2
(45) Date of Patent: *Jul. 24, 2018

(54) MOBILE REMOTE MEDIA CONTROL PLATFORM METHODS

(75) Inventors: Manish Bhatia, Cranbury, NJ (US); Michael Scott Saxon, Westfield, NJ (US); Nigel Stephen Pratt, Los Altos, CA (US); Pyeush Gurha, Mountain View, CA (US)

(73) Assignee: Symphony Advanced Media, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/341,400

(22) Filed: Dec. 30, 2011

(65) Prior Publication Data
US 2013/0014138 A1  Jan. 10, 2013

Related U.S. Application Data

(60) Provisional application No. 61/504,913, filed on Jul. 6, 2011.

(51) Int. Cl.
*G06F 3/00* (2006.01)
*G06F 13/00* (2006.01)
(Continued)

(52) U.S. Cl.
CPC ......... *H04N 21/2668* (2013.01); *G06Q 30/02* (2013.01); *G06Q 30/0201* (2013.01);
(Continued)

(58) Field of Classification Search
CPC ........... H04N 21/4532; H04N 5/44543; H04N 21/44222; H04N 7/163; H04N 21/482
(Continued)

(56) References Cited

U.S. PATENT DOCUMENTS

| 4,697,209 A | 9/1987 | Kiewit et al. |
| 5,621,454 A | 4/1997 | Ellis et al. |

(Continued)

FOREIGN PATENT DOCUMENTS

| EP | 0412335 | 2/1991 |
| EP | 2093706 | 8/2009 |

(Continued)

OTHER PUBLICATIONS

"ABC app eavesdrops on your TV to synchronize interactive content using Nielsen tech" Sep. 18, 2010(http://www.engadget.com/2010/09/18/abc-app-eavesdrops-on-your-tv-to-synchronize-interactive-content/).

(Continued)

*Primary Examiner* — Jason Salce
(74) *Attorney, Agent, or Firm* — Hanchuk Kheit LLP; Walter G. Hanchuk

(57) ABSTRACT

The MOBILE REMOTE MEDIA CONTROL PLATFORM METHODS ("MR-Control") transforms TV program schedule listing information and user channel selection via MR-Control components, into TV audience viewing data and ad effects data. A method is disclosed, comprising: obtaining TV program schedule listing data; providing the obtained TV program schedule listing data to a user mobile device; receiving an indication of user channel selection; determining a media program associated with the received indication of user channel selection; determining an ad associated with the determined media program; providing a survey question related to the determined ad to the user mobile device; and receiving a user response to the survey question.

21 Claims, 65 Drawing Sheets

(51) Int. Cl.
| | |
|---|---|
| *H04N 5/445* | (2011.01) |
| *H04N 21/2668* | (2011.01) |
| *H04N 21/258* | (2011.01) |
| *H04N 21/422* | (2011.01) |
| *H04N 21/442* | (2011.01) |
| *H04N 21/437* | (2011.01) |
| *H04N 21/482* | (2011.01) |
| *G06Q 30/02* | (2012.01) |
| *H04N 21/25* | (2011.01) |
| *H04N 21/475* | (2011.01) |
| *H04N 21/81* | (2011.01) |
| *H04N 21/41* | (2011.01) |
| *H04N 21/478* | (2011.01) |
| *H04N 21/8545* | (2011.01) |
| *H04N 21/858* | (2011.01) |
| *H04N 21/254* | (2011.01) |
| *H04N 21/4788* | (2011.01) |
| *H04N 21/6334* | (2011.01) |

(52) U.S. Cl.
CPC ..... *G06Q 30/0241* (2013.01); *G06Q 30/0245* (2013.01); *G06Q 30/0267* (2013.01); *H04N 21/251* (2013.01); *H04N 21/252* (2013.01); *H04N 21/2541* (2013.01); *H04N 21/25808* (2013.01); *H04N 21/25891* (2013.01); *H04N 21/4126* (2013.01); *H04N 21/4222* (2013.01); *H04N 21/42203* (2013.01); *H04N 21/42204* (2013.01); *H04N 21/42221* (2013.01); *H04N 21/437* (2013.01); *H04N 21/44204* (2013.01); *H04N 21/44218* (2013.01); *H04N 21/44222* (2013.01); *H04N 21/4758* (2013.01); *H04N 21/4788* (2013.01); *H04N 21/47815* (2013.01); *H04N 21/482* (2013.01); *H04N 21/4821* (2013.01); *H04N 21/4826* (2013.01); *H04N 21/6334* (2013.01); *H04N 21/812* (2013.01); *H04N 21/8545* (2013.01); *H04N 21/8586* (2013.01)

(58) Field of Classification Search
USPC ................ 725/22, 24, 44–46, 133, 141, 153
See application file for complete search history.

(56) References Cited

U.S. PATENT DOCUMENTS

| | | | |
|---|---|---|---|
| 6,130,726 A * | 10/2000 | Darbee et al. | ................ 348/734 |
| 6,370,543 B2 | 4/2002 | Hoffert | |
| 6,567,984 B1 * | 5/2003 | Allport | ................ 725/110 |
| 6,615,408 B1 | 9/2003 | Kaiser et al. | |
| 6,637,029 B1 * | 10/2003 | Maissel et al. | ................ 725/46 |
| 6,694,316 B1 | 2/2004 | Langseth | |
| 6,862,741 B1 * | 3/2005 | Grooters | ................ 725/39 |
| 7,039,599 B2 | 5/2006 | Merriman | |
| 7,085,682 B1 | 8/2006 | Heller | |
| 7,181,412 B1 | 2/2007 | Fulgoni | |
| 7,185,065 B1 | 2/2007 | Holtzman | |
| 7,188,078 B2 | 3/2007 | Arnett | |
| 7,188,079 B2 | 3/2007 | Arnett | |
| 7,197,470 B1 | 3/2007 | Arnett | |
| 7,222,071 B2 | 5/2007 | Neuhauser | |
| 7,316,025 B1 | 1/2008 | Aijala | |
| 7,349,827 B1 | 3/2008 | Heller | |
| 7,363,243 B2 | 4/2008 | Arnett | |
| 7,408,460 B2 | 8/2008 | Crystal | |
| 7,471,987 B2 | 12/2008 | Crystal | |
| 7,483,835 B2 | 1/2009 | Neuhauser | |
| 7,487,435 B2 | 2/2009 | Aviv | |
| 7,523,085 B2 | 4/2009 | Nigam | |
| 7,584,484 B2 | 9/2009 | Headley | |
| 7,587,728 B2 | 9/2009 | Wheeler | |
| 7,587,732 B2 | 9/2009 | Wright | |
| 7,590,568 B2 | 9/2009 | Blumenau | |
| 7,607,147 B1 | 10/2009 | Lu | |
| 7,609,853 B2 | 10/2009 | Ramaswamy | |
| 7,613,635 B2 | 11/2009 | Blumenau | |
| 7,623,823 B2 | 11/2009 | Zito | |
| 7,627,872 B2 | 12/2009 | Hebeler | |
| 7,640,141 B2 | 12/2009 | Kolessar | |
| 7,644,156 B2 | 1/2010 | Blumenau | |
| 7,647,604 B2 | 1/2010 | Ramaswamy | |
| 7,650,407 B2 | 1/2010 | Blumenau | |
| 7,650,616 B2 | 1/2010 | Lee | |
| 7,650,793 B2 | 1/2010 | Jensen | |
| 7,653,724 B2 | 1/2010 | Blumenau | |
| 7,739,705 B2 | 1/2010 | Lee | |
| 7,712,114 B2 | 5/2010 | Ramaswamy | |
| 7,716,326 B2 | 5/2010 | Blumenau | |
| 7,720,963 B2 | 5/2010 | Blumenau | |
| 7,720,964 B2 | 5/2010 | Blumenau | |
| 7,752,042 B2 | 7/2010 | Srinivasan | |
| 7,756,974 B2 | 7/2010 | Blumenau | |
| 7,757,248 B2 | 7/2010 | Harkness | |
| 7,793,316 B2 | 9/2010 | Mears | |
| 7,793,318 B2 | 9/2010 | Deng | |
| 7,844,484 B2 | 11/2010 | Arnett | |
| 7,844,488 B2 | 11/2010 | Merriman | |
| 7,873,988 B1 | 1/2011 | Issa et al. | |
| 7,876,997 B2 | 1/2011 | Yabuta | |
| 7,904,069 B2 | 3/2011 | Rye et al. | |
| 7,992,171 B2 | 8/2011 | Amidon et al. | |
| 8,006,259 B2 | 8/2011 | Drake et al. | |
| 8,060,390 B1 | 11/2011 | Overstreet | |
| 8,090,822 B2 | 1/2012 | Lee | |
| 8,176,057 B2 | 5/2012 | Kim et al. | |
| 8,196,162 B2 | 6/2012 | Van de Klashorst | |
| 8,296,380 B1 | 10/2012 | Kelly et al. | |
| 8,320,746 B2 | 11/2012 | Barrett et al. | |
| 8,769,557 B1 * | 7/2014 | Terrazas | ........... H04N 21/44218 725/12 |
| 2001/0052133 A1 | 12/2001 | Pack et al. | |
| 2002/0019768 A1 | 2/2002 | Fredrickson et al. | |
| 2002/0107726 A1 | 8/2002 | Torrance et al. | |
| 2002/0174425 A1 * | 11/2002 | Markel et al. | .................. 725/13 |
| 2003/0033197 A1 | 2/2003 | Saga et al. | |
| 2003/0033600 A1 * | 2/2003 | Cliff et al. | ....................... 725/12 |
| 2003/0040964 A1 | 2/2003 | Lacek | |
| 2004/0078809 A1 | 4/2004 | Drazin | |
| 2004/0205810 A1 | 10/2004 | Matheny et al. | |
| 2004/0230989 A1 | 11/2004 | Macey et al. | |
| 2004/0237114 A1 | 11/2004 | Drazin | |
| 2005/0038814 A1 | 2/2005 | Lyengar | |
| 2005/0144632 A1 | 6/2005 | Mears et al. | |
| 2005/0149965 A1 | 7/2005 | Neogi | |
| 2005/0172311 A1 * | 8/2005 | Hjelt et al. | ....................... 725/10 |
| 2005/0235310 A1 | 10/2005 | Bies | |
| 2005/0283395 A1 | 12/2005 | Lesandrini et al. | |
| 2006/0041480 A1 | 2/2006 | Briggs | |
| 2006/0067320 A1 * | 3/2006 | Wahl et al. | .................. 370/392 |
| 2006/0129457 A1 | 6/2006 | Nyhan et al. | |
| 2006/0129458 A1 | 6/2006 | Maggio | |
| 2006/0179450 A1 * | 8/2006 | Trappeniers et al. | ............. 725/9 |
| 2006/0195866 A1 | 8/2006 | Thukral | |
| 2006/0230415 A1 | 10/2006 | Roeding | |
| 2006/0253874 A1 | 11/2006 | Stark | |
| 2006/0286530 A1 | 12/2006 | Forrest et al. | |
| 2007/0011040 A1 | 1/2007 | Wright et al. | |
| 2007/0174295 A1 | 1/2007 | Abraham | |
| 2007/0217769 A1 | 4/2007 | Super | |
| 2007/0107008 A1 | 5/2007 | Dybus | |
| 2007/0130580 A1 | 6/2007 | Covell et al. | |
| 2007/0192166 A1 | 8/2007 | Van Luchene | |
| 2007/0208619 A1 | 9/2007 | Branam et al. | |
| 2008/0059285 A1 | 3/2008 | Hamoui | |
| 2008/0059299 A1 | 3/2008 | Hamoui | |
| 2008/0059300 A1 | 3/2008 | Hamoui | |
| 2008/0081640 A1 * | 4/2008 | Tran | ................... H04N 5/44543 455/456.3 |
| 2008/0126198 A1 | 5/2008 | Ullah | |
| 2008/0139182 A1 | 6/2008 | Levy et al. | |

(56) References Cited

U.S. PATENT DOCUMENTS

| | | | |
|---|---|---|---|
| 2008/0155637 A1 | 6/2008 | Du Breuil | |
| 2008/0172504 A1* | 7/2008 | Kimura et al. | 710/63 |
| 2008/0196060 A1 | 8/2008 | Varghese | |
| 2008/0214157 A1 | 9/2008 | Ramer et al. | |
| 2008/0244097 A1* | 10/2008 | Candelore et al. | 710/5 |
| 2008/0297371 A1* | 12/2008 | Ida | 340/825.52 |
| 2008/0301737 A1 | 12/2008 | Almas | |
| 2009/0015433 A1* | 1/2009 | James et al. | 340/825.69 |
| 2009/0017805 A1 | 1/2009 | Sarukkai et al. | |
| 2009/0018893 A1 | 1/2009 | Aviv | |
| 2009/0037279 A1 | 2/2009 | Chockalingam et al. | |
| 2009/0083134 A1 | 3/2009 | Burckart | |
| 2009/0111320 A1 | 4/2009 | Johansson et al. | |
| 2009/0150217 A1 | 6/2009 | Luff | |
| 2009/0150919 A1 | 6/2009 | Lee et al. | |
| 2009/0171767 A1 | 7/2009 | Kolessar | |
| 2009/0204476 A1 | 8/2009 | Abraham | |
| 2009/0216621 A1 | 8/2009 | Anderson et al. | |
| 2009/0276805 A1 | 11/2009 | Andrews, II et al. | |
| 2009/0292587 A1 | 11/2009 | Fitzgerald | |
| 2009/0298535 A1 | 12/2009 | Klein et al. | |
| 2010/0036912 A1* | 2/2010 | Rao | H04L 12/5865 709/204 |
| 2010/0070987 A1* | 3/2010 | Amento et al. | 725/10 |
| 2010/0088364 A1 | 4/2010 | Carter et al. | |
| 2010/0089996 A1 | 4/2010 | Koplar | |
| 2010/0100445 A1 | 4/2010 | Flood | |
| 2010/0131356 A1 | 5/2010 | Stevens et al. | |
| 2010/0153983 A1 | 6/2010 | Philmon | |
| 2010/0162285 A1 | 6/2010 | Cohen | |
| 2010/0229195 A1 | 9/2010 | Kueh | |
| 2010/0257023 A1 | 10/2010 | Kendall | |
| 2010/0324990 A1 | 12/2010 | Agarwal | |
| 2011/0004922 A1 | 1/2011 | Bono et al. | |
| 2011/0066507 A1 | 3/2011 | Iyer | |
| 2011/0072461 A1 | 3/2011 | Moon et al. | |
| 2011/0083101 A1 | 4/2011 | Sharon et al. | |
| 2011/0087780 A1 | 4/2011 | McCann | |
| 2011/0106631 A1 | 5/2011 | Lieberman et al. | |
| 2011/0162002 A1 | 6/2011 | Jones et al. | |
| 2011/0219403 A1 | 9/2011 | Nesamoney et al. | |
| 2011/0238826 A1 | 9/2011 | Carre et al. | |
| 2011/0239243 A1* | 9/2011 | Dierks et al. | 725/14 |
| 2012/0026726 A1* | 2/2012 | Recker et al. | 362/157 |
| 2012/0047529 A1* | 2/2012 | Schultz et al. | 725/34 |
| 2012/0066331 A1 | 3/2012 | Smith et al. | |
| 2012/0079518 A1 | 3/2012 | Wan et al. | |
| 2012/0089996 A1 | 4/2012 | Ramer | |
| 2012/0197705 A1 | 8/2012 | Mesaros | |
| 2012/0225645 A1* | 9/2012 | Sivan | 455/418 |
| 2012/0272287 A1 | 10/2012 | Kuhlke et al. | |
| 2013/0160036 A1* | 6/2013 | Narasimhan | H04N 21/44218 725/9 |

FOREIGN PATENT DOCUMENTS

| | | |
|---|---|---|
| EP | 2204766 | 7/2010 |
| WO | WO/1998/058334 | 12/1998 |
| WO | WO/2000/008802 | 2/2000 |
| WO | WO/2001/071620 | 9/2001 |
| WO | WO/2005/020578 | 3/2005 |
| WO | WO/2005/039080 | 4/2005 |
| WO | WO/2007/065069 | 6/2007 |
| WO | WO/2008/030358 | 3/2008 |
| WO | WO/2008/042923 | 4/2008 |
| WO | WO/2008/058193 | 5/2008 |
| WO | WO/2008/109743 | 9/2008 |
| WO | WO/2008/156912 | 12/2008 |
| WO | WO/2009/097569 | 8/2009 |
| WO | WO/2009/120220 | 10/2009 |
| WO | WO/2009/126152 | 10/2009 |
| WO | WO/2009/126169 | 10/2009 |
| WO | WO/2009/023842 | 12/2009 |
| WO | WO/2010/098890 | 9/2010 |
| WO | WO/2010/121178 | 10/2010 |
| WO | WO/2011/031973 | 3/2011 |
| WO | WO/2011/035298 | 3/2011 |
| WO | WO/2011/055365 | 5/2011 |

OTHER PUBLICATIONS

"Identify That Song . . . or TV Program" Apr. 20, 2011 (http://www.practicalistuff.com/2011/04/identify-that-songor-tv-program.html).

Study: In-Game Video Advertising Trumps TV Advertising in Effectiveness Mar. 24, 2009 (http://techcrunch.com/2009/03/24/study-in-game-video-advertising-trumps-tv-advertising-in-effectiveness/).

"TV remote control on your mobile phone," Jan. 5, 2008 (http:www.ilocus.com/2008/01/tv_remote_control_on_your_mobi.html).

"TV Remote Controller (ARM/XScale) for Windows Mobile" Sep. 25, 2007 (http://download.cnet.com/TV-Remote-Controller-ARM-XScale/3000-2064_4-10075364.html).

"Use your cellphone as a remote" Mar. 7, 2007 (http://www.msnbc.msn.com/id/17506526/ns/technology_and_science-wireless/t/use-your-cell-phone-remote/).

13 Ways to Monitor Your Brand on Social Media: Do You Know What Is Being Said About Your Company Online? Sep. 6, 2009 (http://www.jeffbullas.com/2009/09/06/13-ways-to-monitor-conversations-about-your-brand-on-social-media-do-you-know-what-is-being-said-about-your-company-online/).

A Brief Look At In-Game Advertising May 26, 2010 (http://socialtimes.com/a-brief-look-at-in-game-advertising_b13631).

Apple Gets a Big Slice of Product-Placement Pie Apr. 16, 2006 (http://www.washingtonpost.com/wp-dyn/content/article/2006/04/14/AR2006041401670.html).

Connect with your friends around the shows you love Apr. 29, 2011 (http://www.intonow.com/ci).

ICrossing launches social media monitoring app, Oct. 14, 2009 (http://www.mobilemarketer.com/cms/news/social-networks/4401.html).

Product Placement Jun. 26, 2011, (http://en.wikipedia.org/wiki/Product_placement).

Social Media Marketing Aug. 25, 2009 (http://www.advmediaproductions.com/newsletter/NL_Social-Media-Campaign-Monitoring.html).

This New Dashboard Lets You Monitor Social Media Conversations About Your Brand Everywhere May 8, 2011 (http://www.businessinsider.com/synthesio-unity-2011-5).

XBMC—the best iPhone/iPad app for sharing media content Jan. 22, 2011 (http://surfpk.com/xbmc-best-iphone-app-for-sharing-media-content-jailbreak-app/-0346).

International Search Report and Written Opinion of PCT/IL2010/000918 dated Mar. 15, 2011.

* cited by examiner

FIGURE 1D
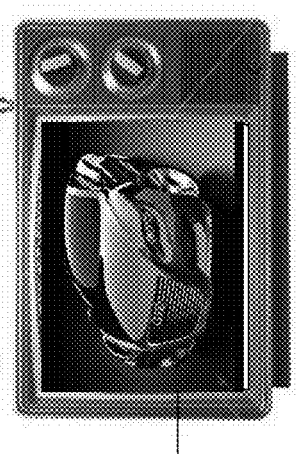
Advertisement 1 45
Home TV 1 30
Pop-up Questionnaire 1 23
Personal Mobile Device 1 15
"The advertisement on CBS is effective! 1 55"
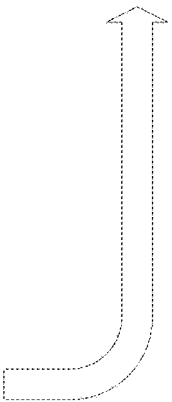
Merchant 1 50
MR-Control Example: Intelligent Mobile Questionnaire

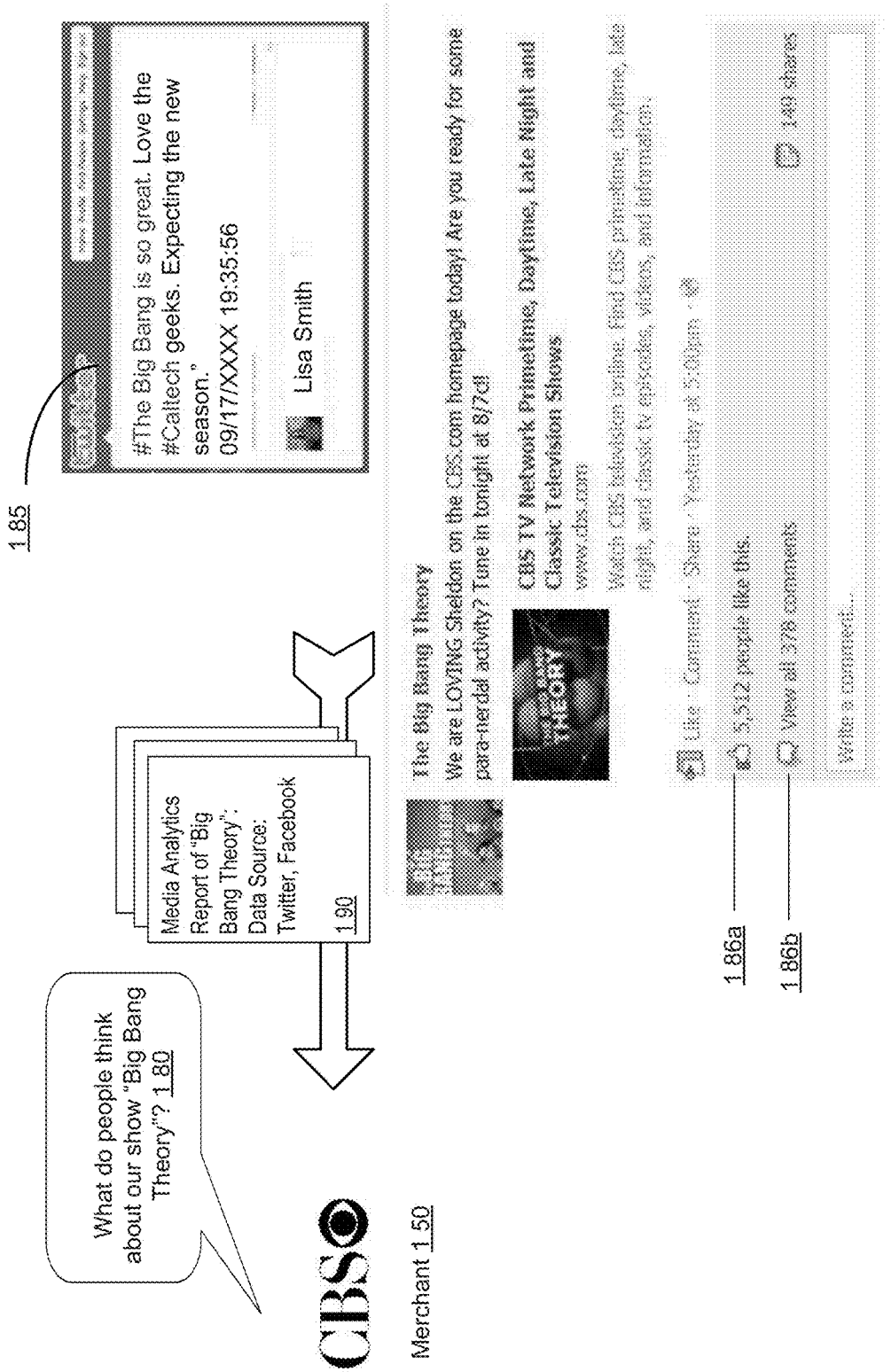

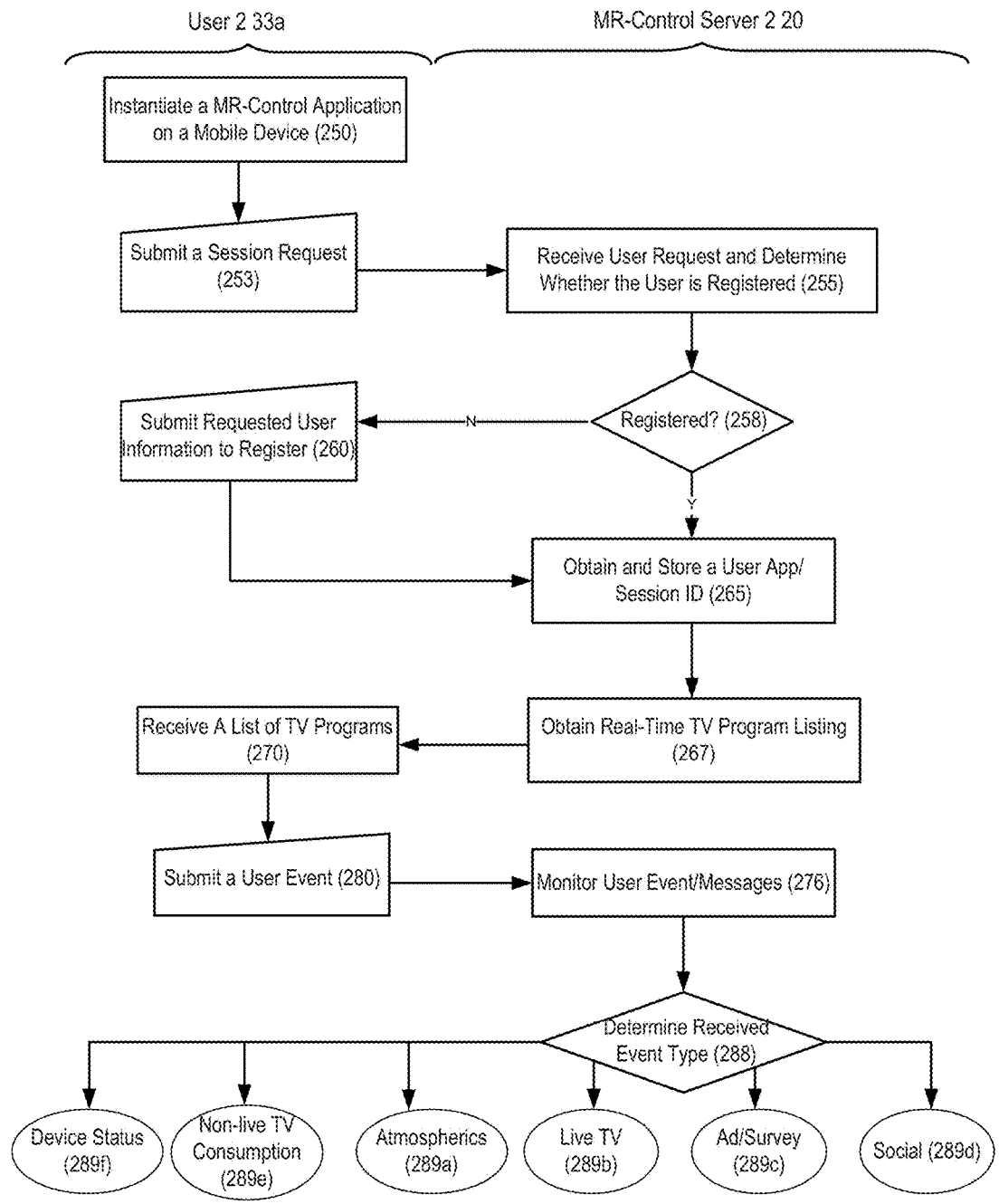

MR-Control Example Logic Flow: Mobile Meter

MR-Control Example Logic Flow: Audience Monitoring

MR-Control Example Logic Flow: Audience Monitoring

MR-Control Example Logic Flow: Atmospherics Scoring

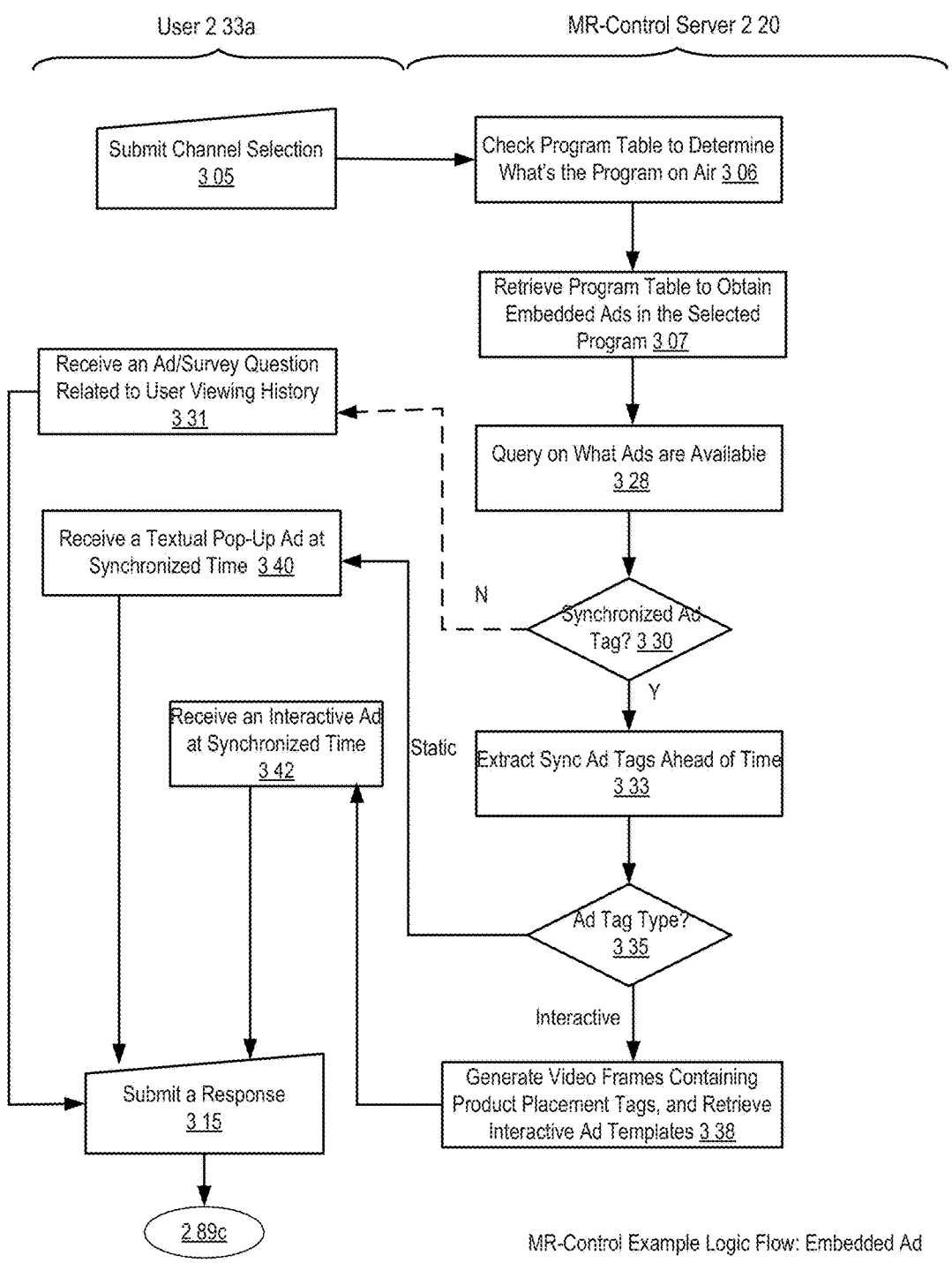

MR-Control Example Logic Flow: Event Analysis

MR-Control Example Client Mobile App Block View

MR-Control Example: Data Download From Social Media

MR-Control Example: Data Download From Social Media

MR-Control Example: Social Media Data

MR-Control Example: Social Media Data

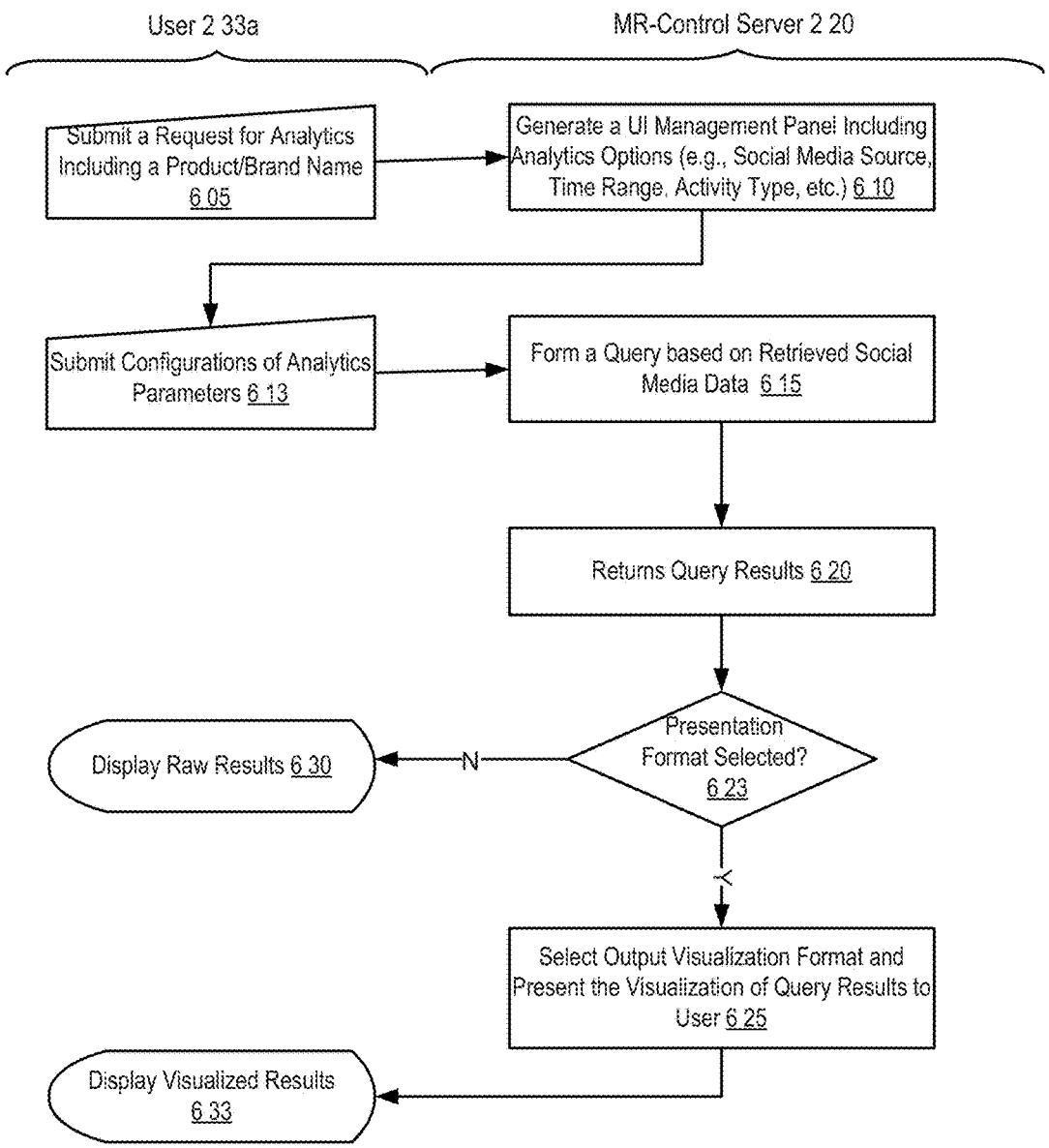

MR-Control Example: Taxonomy Logic Tree For TV Shows

MR-Control Example: Taxonomy Logic Tree for Brand Products

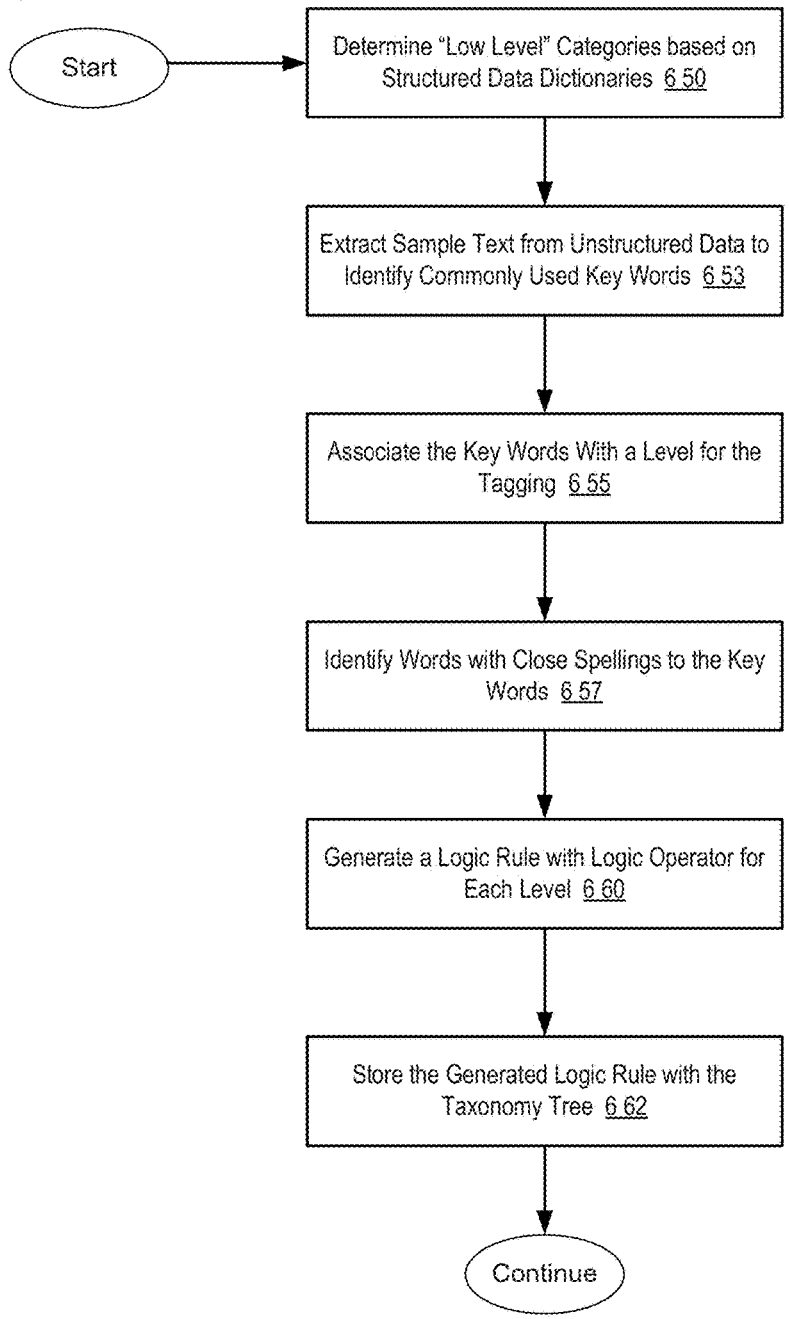

MR-Control Example: Taxonomy Tagging Logic Flow(1)

MR-Control Example: Taxonomy Tagging Logic Flow(2)

MR-Control Example Structure: Ad Recognition

FIGURE 8H
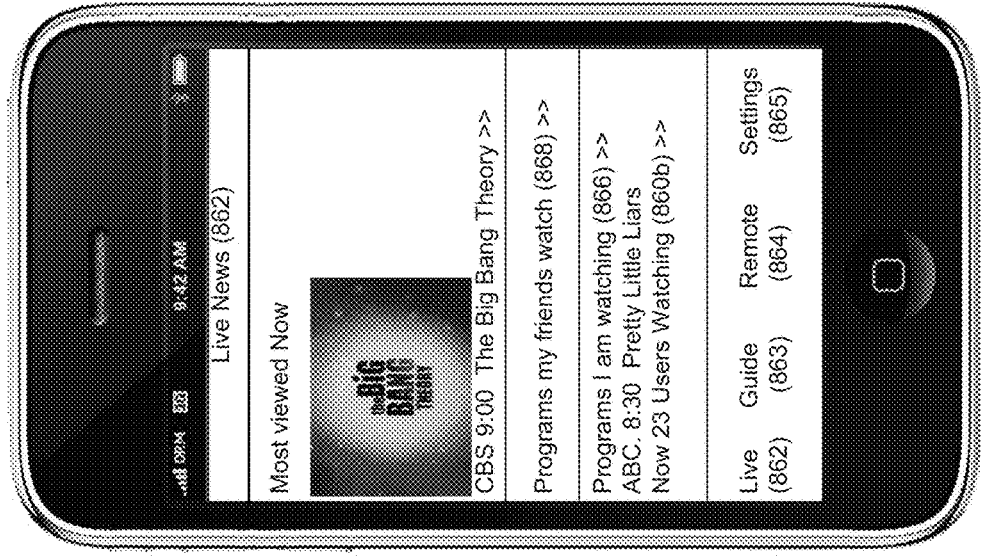
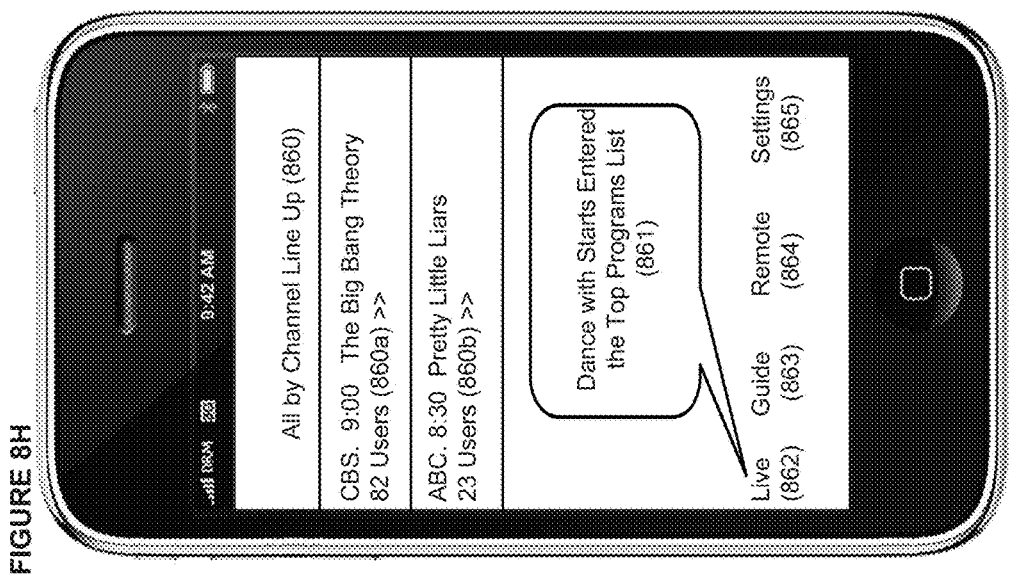

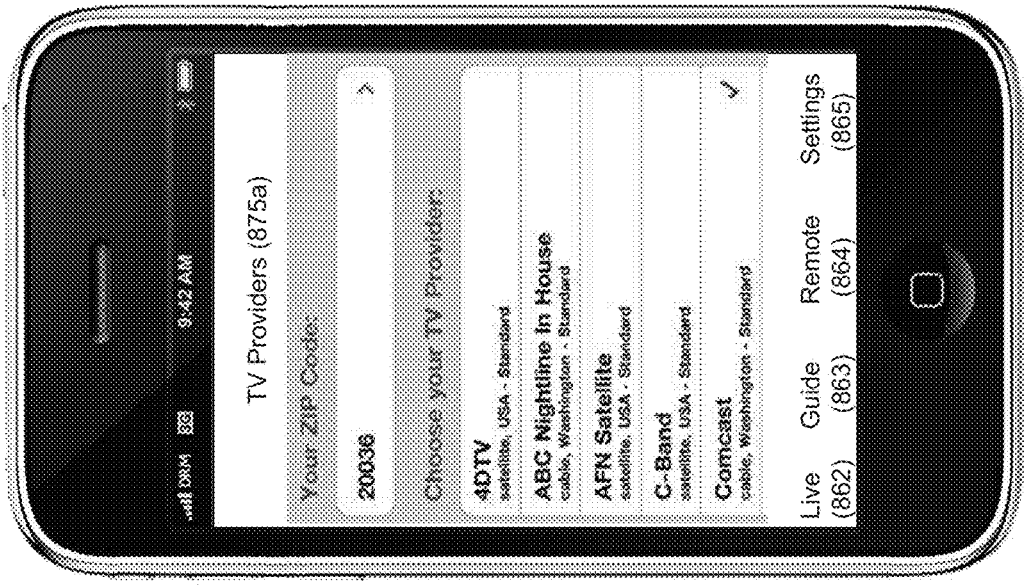
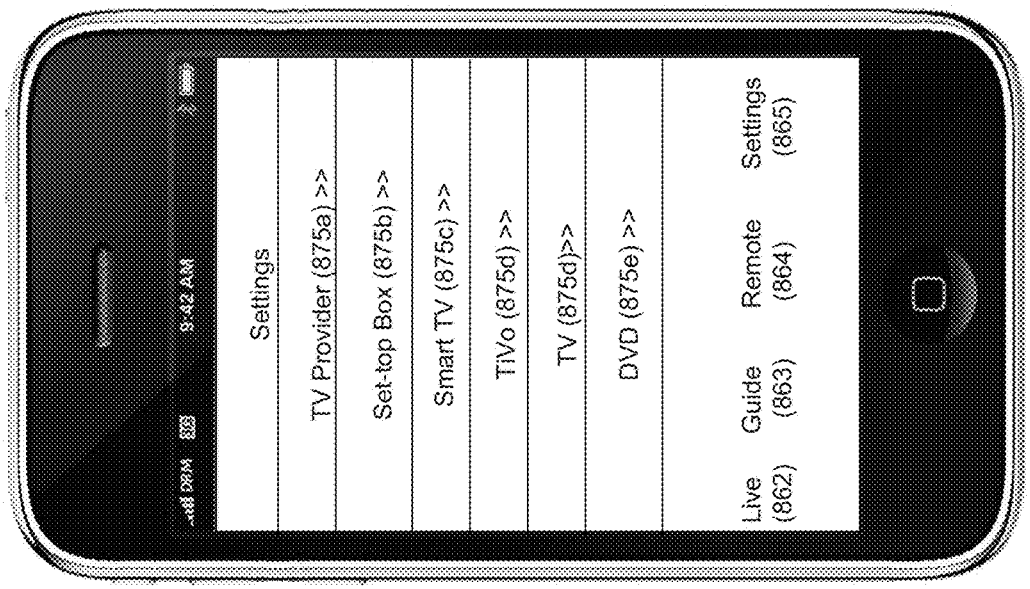
FIGURE 8J

FIGURE 9C

FIGURE 9D http://www.MR-Control.com/client/media_analytics.html

Home > Project > Media Analytics Reports (840)

| People 841 | TV Shows 842 | Brands 843 | Products 844 | Media Source 844 |

What do people say about:

Please select a TV network: CBS (845a)

Please select a Genre: Comedy (845b)

Please select Show Name: Big Bang Theory (845c)

OR, please specify: _____ (845d)

See more <<

- Amanda Morse Season 2 is definitely a huge thumb up!! — 850a
  27 minutes ago via Facebook iPhone App
- Julian Smith Penny sucks -- she just can't read the lines!
  27 minutes ago via Facebook iPad App
- Lily Doyle I think Big Bang is the best production of CBS ever.
  25 minutes ago via Facebook
- Tom McDonald The theme song is pretty interesting -- "the whole universe started with a big bang..." Aha
  25 minutes ago via Facebook Android App I would like to view: (848)

Comments from:
☑ Facebook   ☑ Twitter
☐ Tumblr     ☐ Google +
See more <<

Since: 09/01/XXXX (849)

☑ All comments texts (850)
☐ Feedback Summary in (855)
  ☐ Plain Format (855a)
  ☐ Chart/Plots (855b)
  ☐ Table (855c)
See more <<

"The Big Bang Theory is so awesome. Even I can understand string theory now! Love Sheldon and Leonard. Expecting the new season."
09/17/XXXX 19:35:56

Lisa Smith
— 850b

See more <<

MR-Control Example Web UI: Media Analytics

MR-Control Example UI: Audience Report by Day of Week 1015d

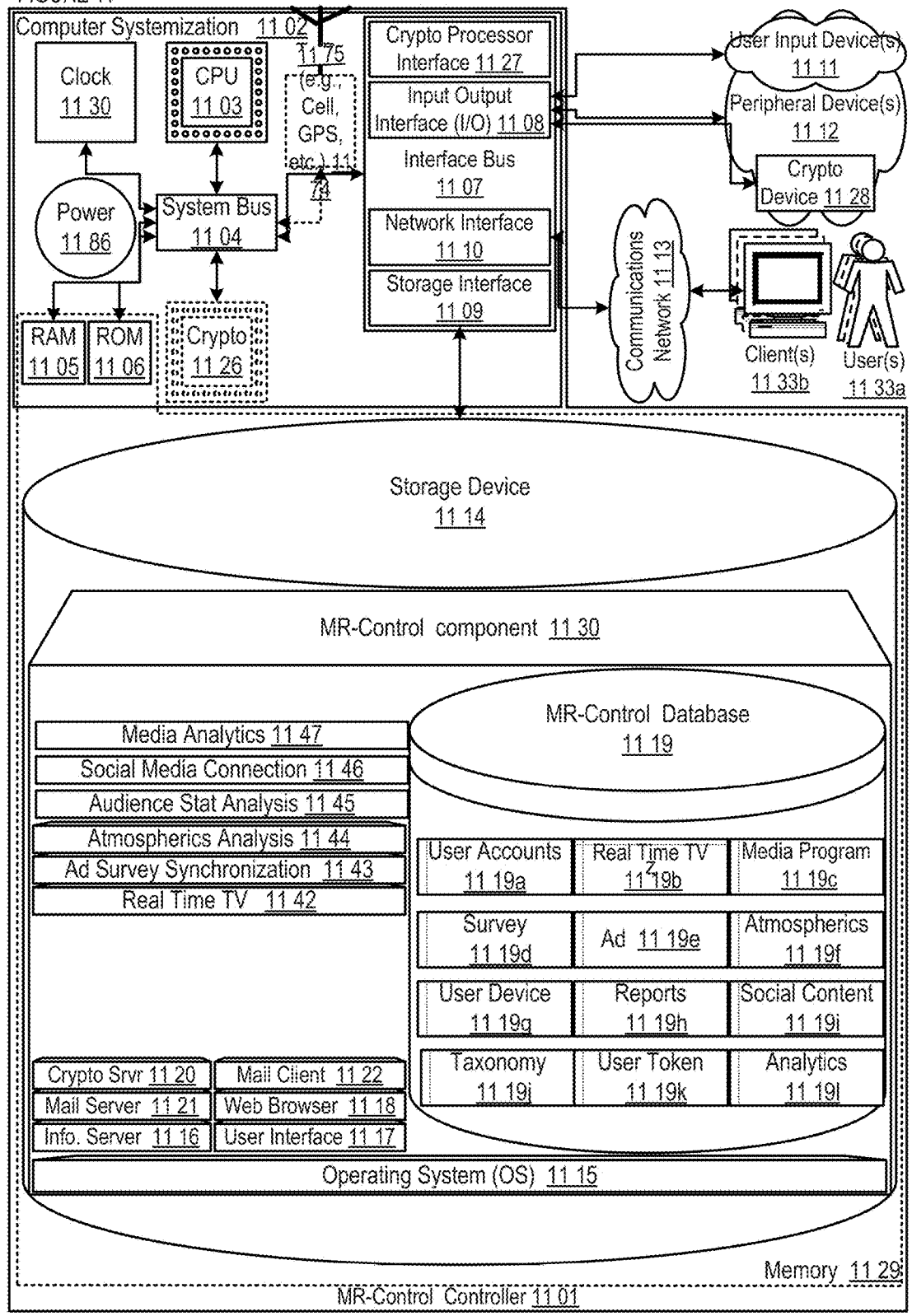

US 10,034,034 B2

MOBILE REMOTE MEDIA CONTROL PLATFORM METHODS

RELATED APPLICATION

Applicant hereby claims priority under 35 USC § 119 for U.S. provisional patent application Ser. No. 61/504,913, filed Jul. 6, 2011, entitled "Mobile Remote Media Control Platform Apparatuses, Methods And Systems."

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The instant application is related to PCT international application no. PCT/IL2010/000918, publication no. WO/2011/055365, filed Nov. 7, 2010, entitled "System And Method For Mobile Computing Transmission On A Network Of Data Associated With A Television Display."

The instant application is further related to U.S. application Ser. No. 13/340,857, filed Dec. 30, 2011, entitled "Mobile Remote Media Control Platform Apparatuses and Systems"; U.S. application Ser. No. 13/340,933, filed Dec. 30, 2011, entitled "Audience Atmospherics Monitoring Platform Methods"; U.S. application Ser. No. 13/340,953, filed Dec. 30, 2011, entitled "Audience Atmospherics Monitoring Platform Apparatuses and Systems"; U.S. application Ser. No. 13,341/036, filed Dec. 30, 2011, entitled "Media Content Based Advertising Survey Platform Methods"; U.S. application Ser. No. 13/341,076, filed Dec. 30, 2011, entitled "Media Content Based Advertising Survey Platform Apparatuses and Systems"; U.S. application Ser. No. 13/341,096, filed Dec. 30, 2011, entitled "Media Content Synchronized Advertising Platform Methods"; U.S. application Ser. No. 13/341,118, filed Dec. 30, 2011, entitled "Media Content Synchronized Advertising Platform Apparatuses and Systems"; U.S. application Ser. No. 13/341,137, filed Dec. 30, 2011, entitled "Social Content Monitoring Platform Methods"; U.S. application Ser. No. 13/341,165, filed Dec. 30, 2011, entitled "Social Content Monitoring Platform Apparatuses and Systems"; U.S. application Ser. No. 13/341,183, filed Dec. 30, 2011, entitled "User Impression Media Analytics Platform Methods"; U.S. application Ser. No. 13/341,199, filed Dec. 30, 2011, entitled "User Impression Media Analytics Platform Apparatuses and Systems"; U.S. application Ser. No. 13/341,217, filed Dec. 30, 2011, entitled "Mobile Content Tracking Platform Methods"; and U.S. application Ser. No. 13/341,254, filed Dec. 30, 2011, entitled "Mobile Content Tracking Platform Apparatuses and Systems."

The entire contents of the aforementioned applications are herein expressly incorporated by reference.

FIELD

The present innovations are directed generally to media control, and more particularly, to MOBILE REMOTE MEDIA CONTROL PLATFORM METHODS.

BACKGROUND

A home TV user may view TV programs from a plurality of channels. The user may operate a handheld remote TV controller sold with the TV set to select TV channels. For example, the user may push buttons on the remote controller to switch channels, turn up/down audio volume, power on/off the TV. Merchants advertise their products to attract consumers. Thus the TV audiences may interact with the TV and select a desired channel without physically touching it via operating the remote TV controller.

BRIEF DESCRIPTION OF THE DRAWINGS

The accompanying appendices and/or drawings illustrate various non-limiting, example, innovative aspects in accordance with the present descriptions:

FIGS. 1A-1E show block diagrams illustrating example embodiments of MR-Control;

FIGS. 2C-2I provide logic flow diagrams illustrating logic flows of TV remote monitoring within embodiments of MR-Control;

FIGS. 3B-3E provide logic flow diagrams illustrating media content based advertising within embodiments of MR-Control;

FIGS. 6A-6F provide logic flow diagrams illustrating social media content taxonomy within embodiments of MR-Control;

FIGS. 8A-8K provide screen shots illustrating user interfaces of a mobile client component within embodiments of MR-Control;

FIGS. 9A-9E provide example screen shots illustrating user interfaces of media analytics within embodiments of MR-Control;

FIG. 11 shows a block diagram illustrating embodiments of a MR-Control controller;

Figure 1A:
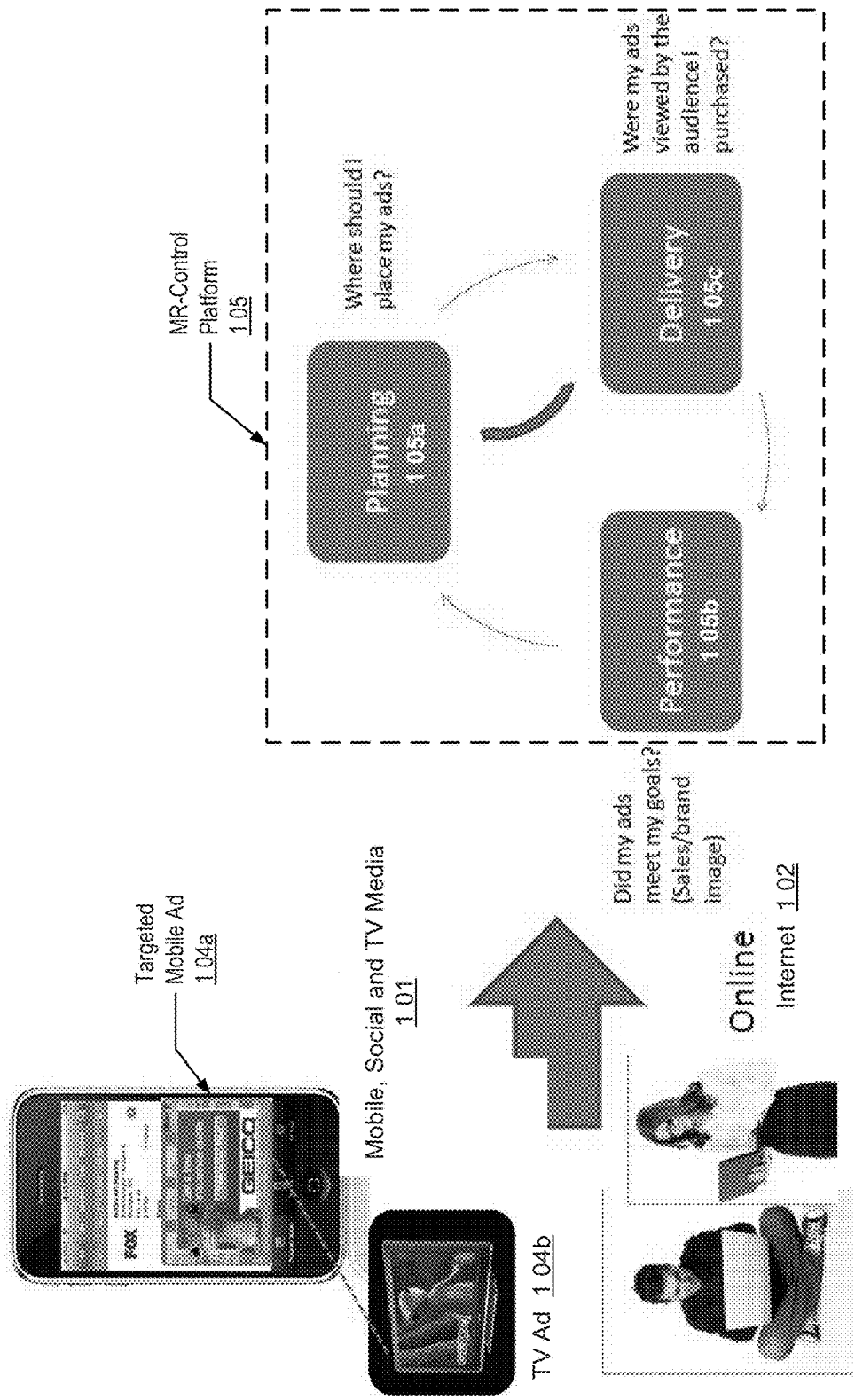

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The MOBILE REMOTE MEDIA CONTROL PLATFORM METHODS provides a client-server interactive platform whereby a user may operate a general purpose personal mobile device (e.g., a smart phone, etc.) to receive a list of TV programs schedules and submit a selection of TV channel via the personal mobile device. In one implementation, the user may operate the personal mobile device as a TV remote controller. In one implementation, the MR-Control may receive the user's selection of a channel and determine what media contents the user has elected to watch. In one implementation, the user's channel selection and viewing status may be populated to a social media platform, and the MR-Control may obtain user response with regard to a TV program from the social media to perform analytics for TV program feedback review.

For example, in one implementation, a user may plug a MR-Control accessory (e.g., 120 in FIG. 1) into his mobile device, such as a smartphone (e.g., an Apple iPhone, BlackBerry, Google Android, Palm, HTC Evo, Samsung Galaxy, etc.), laptop, personal digital assistant (PDA), tablet computer (e.g., Apple iTouch, iPad, etc.), and/or the like, to facilitate communication between the mobile device and a home TV set. In an alternative implementation, the MR-Control accessory may be a standalone table top unit which may not need to be attached to a user mobile device. For example, the table top unit may communicate with a desktop computer, a laptop computer, a cell phone or mobile device and/or the like via wired or wireless connection (e.g., Bluetooth, WiFi, etc.). In further implementations, the table top unit may monitor audience activities as further illustrated in FIGS. 1C, 2E-2H. Further implementations of the table top unit are illustrated in FIG. 4C. Within implementations, a MR-Control server may obtain real-time TV program listing, including the TV program schedule, advertisement schedule, and/or the like, from a TV network. The user may then obtain the list of TV program schedules from the MR-Control, e.g., as shown at 115 in FIG. The user may then submit a channel selection, e.g., tap on the touch screen of the mobile device as shown at 105 in FIG. 1. In one implementation, upon receiving the user channel selection, the MR-Control server may retrieve data record from a media content database and check program table to determine what's the TV program on air. For example, if the user selects the channel "CBS," the MR-Control may ascertain "CBS" has "The Big Bang Theory" on air based on the timestamp when the user submits the selection. In one implementation, the MR-Control may further retrieve a program table to obtain information with regard to the advertisement streamed during the intervals of the TV play "The Big Bang Theory" and/or the product placement advertisements tagged in the TV play "The Big Bang Theory" on "CBS."

In another implementation, the MR-Control may parse commercial ad information retrieved at and generate prompt questions, surveys, and/or the like 408. For example, if the MR-Control determines the user is supposed to watch a series of "Audi" commercial during the show "The Big Bang Theory," the MR-Control may prompt a survey including questions with regard to automobile purchasing. In another implementation, the MR-Control may keep a record of advertisements that has played on channels the user has recently selected (e.g., for a period of past 2 weeks, etc.), and generate prompt questions based on such advertisements. In one implementation, the user may submit responses to such questions.

In a further implementation, when a user is provided a question with regard to an embedded advertisement in the TV show (e.g., "are you interested in the red bag the character is carrying?" etc.), the user may submit a request to learn more and/or purchase the product. In that case, the MR-Control may provide a merchant URL to the user and/or redirect the user to the merchant site.

In one implementation, MR-Control may monitor whether the user is "actually" attending and watching the selected TV channel. For example, the user's mobile device may capture, aggregate and packetize atmospherics data (e.g., taking photos of the user, recoding audio clips, obtaining GPS information, etc.) and submit to the MR-Control, which may in turn decode the atmospherics data to analyze ad effect and audience perception, as further illustrated in FIGS. 2E-2G.

MR-Control

FIG. 1A shows a block diagram flow chart illustrating work flows of MR-Control within embodiments of the MR-Control. Within embodiments, the MR-Control platform 105 may facilitate clients, such as merchants, brand name manufacturers, media producers, and/or the like to plan 105a advertisement campaign program, track advertisement targets to determine ad delivery 105c (e.g., whether the ads are viewed by the audience, etc.) and performance 105b (e.g., whether the advertisements meet a sales/brand image goal, etc.).

Within implementations, the MR-Control platform 105 may interact with user mobile devices, .e.g., PDAs, smart phones, etc., for targeted mobile advertisement delivery 104. For example, in one implementation, MR-Control platform may obtain a TV viewing status information from a user's mobile device, and determine the TV program content the user is/has been watching based on TV schedules, as further discussed in FIG. 1B. When MR-Control determines the user selected channel contains a TV ad of "Geico" 104b, MR-Control may deliver promotions, rewards, coupons, questionnaires, etc., related to "Geico" as a targeted ad 104a to the user mobile device.

In one implementation, MR-Control platform 105 may obtain data related to user interactive activities with regard to mobile ads, TV viewing, Internet 102 (including online browsing, purchasing, etc.), social media, and/or the like to analyze ad effects, TV rating so that to determine delivery 105c and performance 105b of an advertisement campaign. Within implementations, the ad campaign planning 105a, ad performance 105b and ad delivery 105c, may be separately executed by the MR-Control platform 105 for each media type, e.g., TV, print, Internet, social media, etc.

Figure 1B:
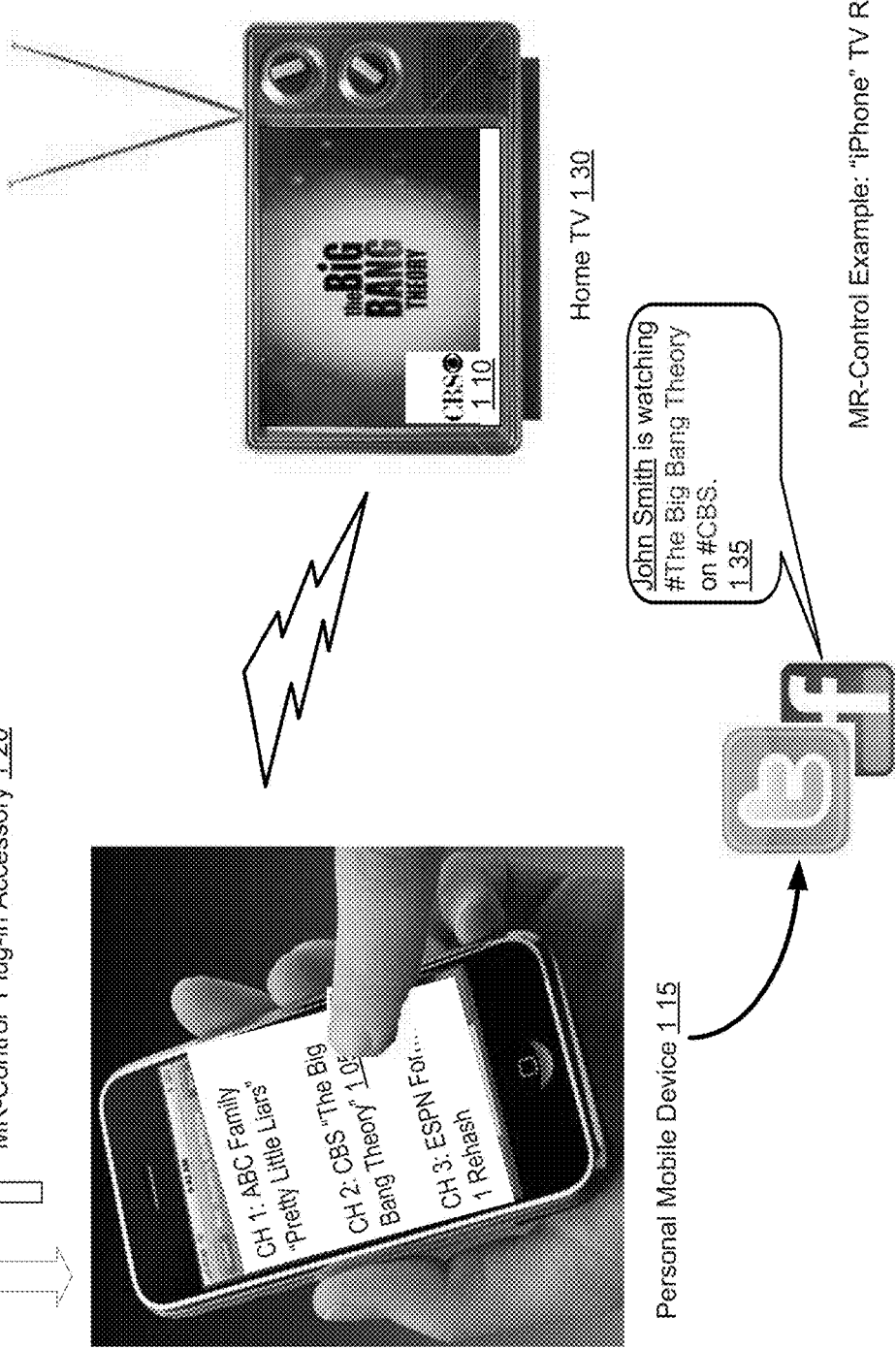

FIG. 1B shows a block diagram illustrating a user engaging a personal mobile device as a TV remote control within embodiments of MR-Control. In one embodiment, a user may download a MR-Control client component for instantiation on his general purpose personal mobile device 115. For example, the user may obtain a MR-Control application from the iTunes Store and download it to his Apple® iPhone, iTouch, iPad, and/or the like. In one implementation, the user may plug-in a MR-Control accessory 120 to the mobile device 115 so that the mobile device may communicate with a home TV set 130 as a remote controller.

In one implementation, upon instantiating the downloaded MR-Control client component, the user may receive a schedule listing of TV programs, and may select a channel that the user is interested. For example, the user may tap on the listed item to select "CH2: CBS The Big Bang Theory 105." In one implementation, the MR-Control plug-in accessory 120 may receive the indication of user channel selection and transmit such indication to the home TV set 130, and the TV 130 may switch to the channel "CBS 110" accordingly.

In a further implementation, the user's selection of channel "CBS 105" may be transmitted to a MR-Control, which may in turn automatically populate a message on social media, e.g., a Facebook status update showing the user "is watching The Big Bang Theory on CBS 135." In an alternative implementation, the user may elect to manually enter and populate the social media feeds via the MR-Control client component instantiated on his personal mobile device.

For another example, the social message, e.g., a Tweet message, may contextually tag the text on key terms to indicate what the user is watching, e.g., the Tweet hashtags "#The Big Bang Theory," "#CBS," etc. In one implementation, the hashtags may link to profile information of a TV show, including its scheduled airing time, crew information, description, and/or the like. In further implementations, the Tweet hashtags may be employed for social content data taxonomy engine, as further illustrated in FIGS. 6B-6E.

FIG. 1B shows a block diagram illustrating an example embodiment of audience attendance monitoring within embodiments of the MR-Control. Within implementations, MR-Control may monitor the audience attendance of selected TV program. For example, upon a user selecting a TV channel at his personal mobile device 115 (e.g., by tapping on the channel listing as shown at 105 in FIG. 1A), the user may or may not be present watching the TV program broadcasting on the channel, e.g., the user may step away, may engage in other activities distracting him from the TV, may invite one or more other audience watching the selected TV channel, etc. In such scenarios, MR-Control may constantly, periodically and/or intermittently "monitor" the audience status to obtain knowledge of the audience viewing data.

As shown in one example in FIG. 1B, the personal mobile device 115 may automatically snap a photo and/or a video clip of the audience scene including the audience 118 watching the TV program 110. For example, the MR-Control may be configured to snap a photo or video clip periodically (e.g., every 10 minutes, etc.). The MR-Control may then packetize the obtained photo/video clip as audience atmospherics data 125 for audience attendance analysis.

In further implementations, MR-Control may include various data into the atmospherics data packets. For example, MR-Control may "listen" and record an audio clip of the audience scene. For another example, MR-Control may prompt the user to indicate how many audience are present to watch the on-going TV program. For another example, MR-Control may monitor whether the user is engaging in other application activities on the personal mobile device 115, e.g., email(s), Facebook, browser activities, gaming applications, etc. For another example, MR-Control may include GPS information of the personal mobile device 115 into the atmospherics data.

In one implementation, MR-Control may be configured to automatically create photo/video/audio captures. In another implementation, MR-Control may prompt the user to manually enter desired information, such as how many individuals are present to watch the TV program, and/or request the user position the built-in camera of the mobile device to snap photos/video clips. In one implementation, MR-Control may provide promotion incentives for the user to cooperate with such requests, e.g., lottery opportunities, etc.

In one implementation, MR-Control may analyze the obtained audience atmospherics data 125. For example, as shown in FIG. 1B, MR-Control may identify the number of audience 138 at an associated timestamp from an audience scene photo/video 135 via face recognition software, e.g., Apple iPhoto face recognition, etc.

Figure 1C:
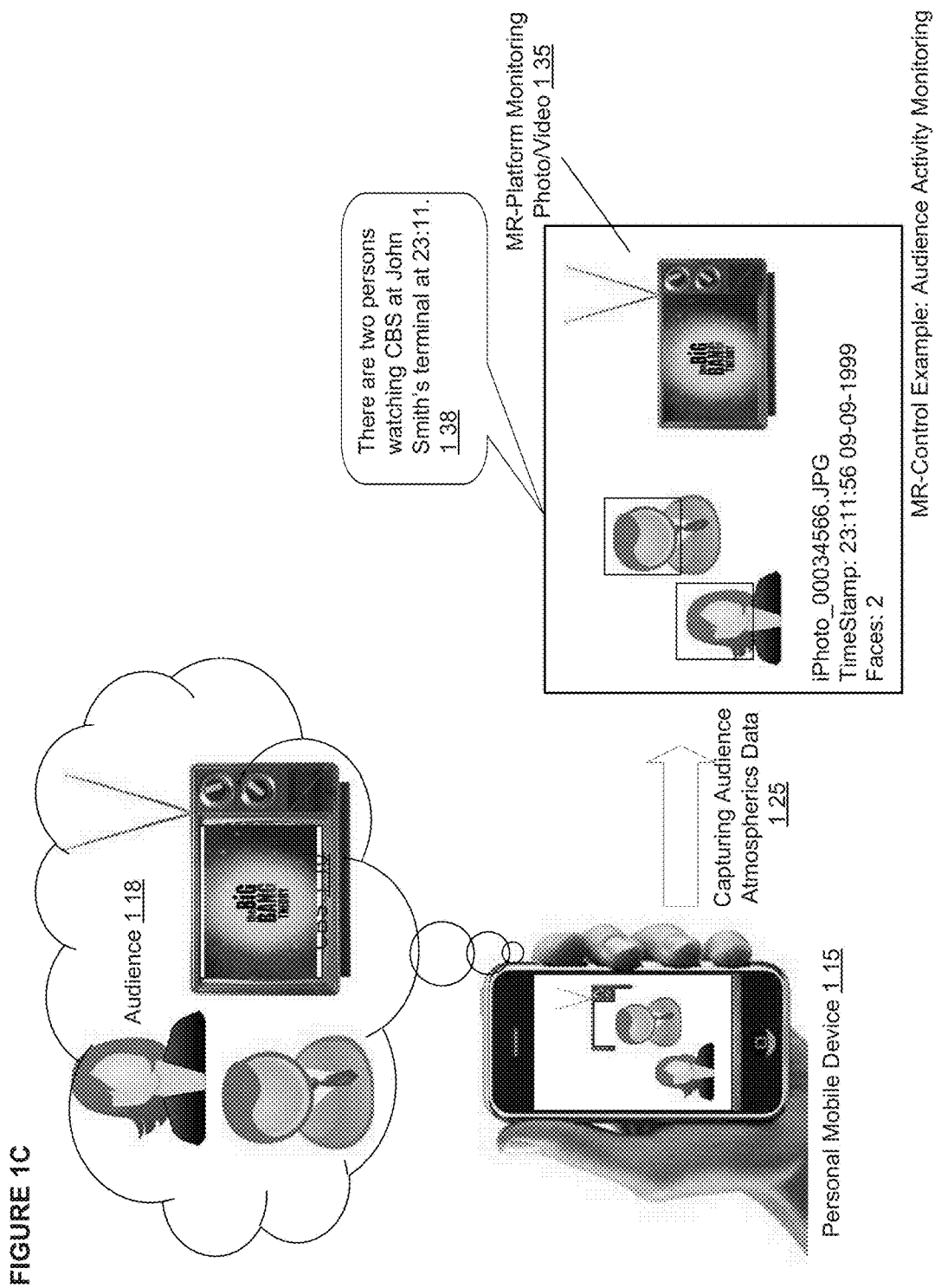

FIG. 1C shows an example of intelligent mobile questionnaire within implementations of the MR-Control. In one implementation, MR-Control may send synchronized questionnaire to a user's personal mobile device 115 based on the media program on-air at the user's selected TV channel. For example, if the user's selected TV channel 130 includes an advertisement 145 of Audi automobiles, MR-Control may generate a question 123 to inquire the user's desired automobile brand. Such inquiry results may be collected by MR-Control and fed to the advertising brand merchant 150 (e.g., Audi, etc.) to determine performance of the advertisement 145. For example, if the user selects "Audi" when inquired about his desired automobile brand after watching the Audi advertisement channel, it may show effectiveness of the advertisement 155 over the TV channel. In further implementations, MR-Control may include product placement advertisements, and/or the like in the pop-up questionnaire 123, as further discussed in FIGS. 2 and 7B.

FIG. 1D shows an example of media analytics within embodiments of the MR-Control. In one implementation, a MR-Control client may desire to know public opinions of their products, e.g., brand name products, TV programs, and/or the like. For example, as shown in FIG. 1D, the producer "CBS," e.g., merchant 150, may want to know audience's reaction about the production "The Big Bang Theory" 180. In one implementation, the MR-Control may collect data from social media platforms, such as, but not limited to Twitter, Facebook, and/or the like, user comments and activities with regard to the show "The Big Bang Theory." For example, MR-Control may obtain Tweets about users' comments on "The Big Bang Theory" 185. For another example, MR-Control may obtain Facebook user comments, activities (e.g., user "like" of the "The Big Bang Theory" page, news feed, etc.) from Facebook. Further implementations of obtaining data from social media platforms are discussed in FIGS. 5A-5F.

In one implementation, MR-Control may generate a media analytics report 190 based on the obtained social media user comments to reflect audience reaction to the show "The Big Bang Theory." For example, in one implementation, the report may comprise statistical data with regard to audience age, demographics, occupation, etc. Further examples of media analytics report are discussed in FIG. 8C.

Figure 2A:
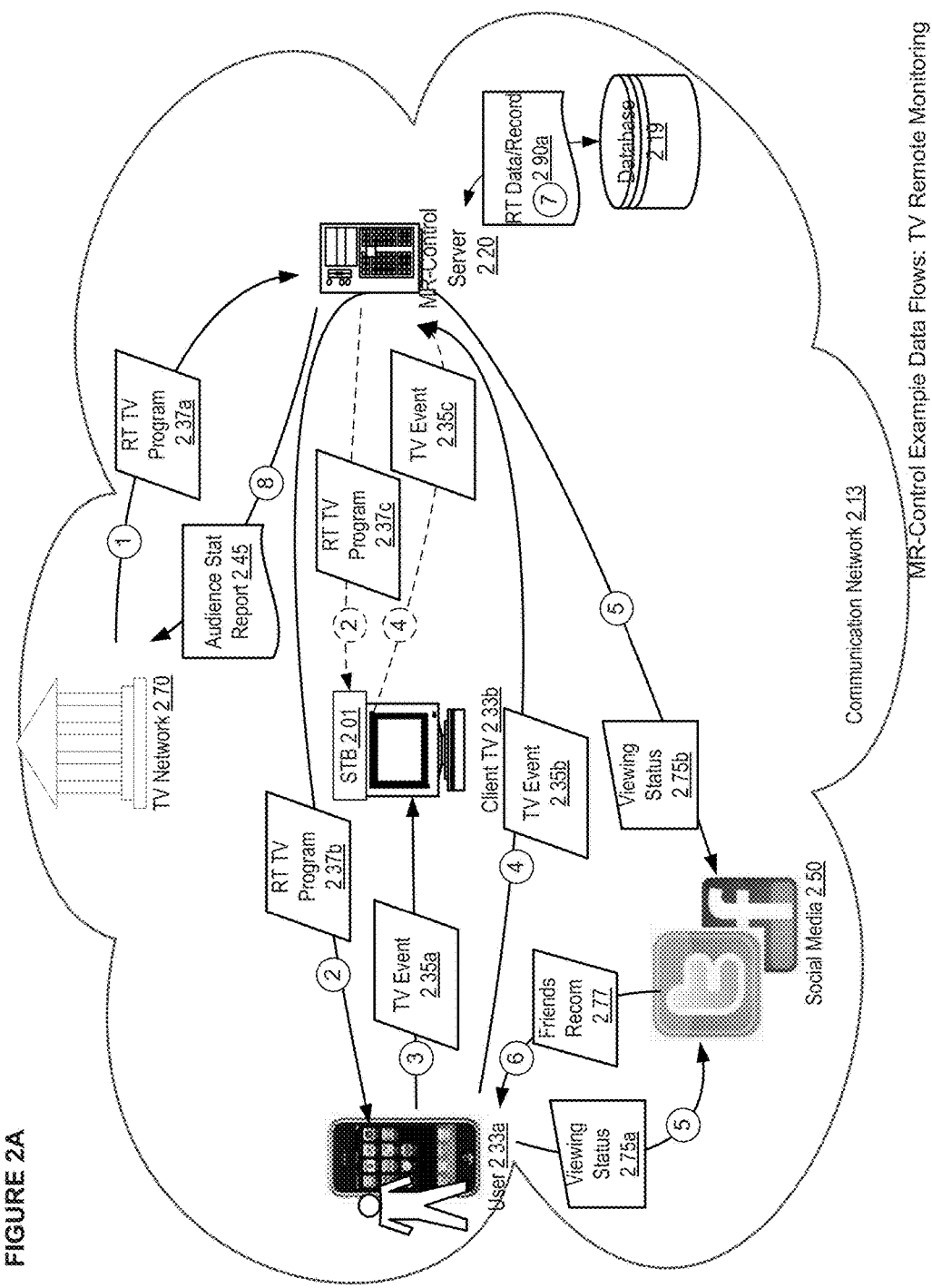
FIGS. 2A-2B provide data flow diagrams illustrating data flows of TV remote monitoring within embodiments of MR-Control.

FIG. 2A shows a block diagram illustrating data flows between NR-Control server and affiliated entities within various embodiments of the MR-Control. Within various embodiments, one or more users 233a, MR-Control server 220, social media 250, TV network 270, MR-Control database(s) 219, merchant 280, and/or social media 250 are shown to interact via various communication network 213.

In one embodiment, the MR-Control may receive a list of real time TV program 237a. For example, in one implementation, the TV program 237 data may comprise information such as channel information, media program information of each channel, program schedule information, and/or the like. For example, the TV network 270 may provide a (Secure) Hypertext Transfer Protocol ("HTTP(S)") PUT message including the TV schedule data 237a in the form of data formatted according to the eXtensible Markup Language ("XML"). Below is an example HTTP(S) PUT message including an XML-formatted TV schedule for the MR-Control server:

```
PUT /TVschedule.php HTTP/1.1
Host: www.TV.com
Content-Type: Application/XML
Content-Length: 718
<?XML version = "1.0" encoding = "UTF-8"?>
<TVSchedule>
        <Date> 09-09-2000 </Date>
        <Channel1>
            <ChannelID> CH001 </ChannelID>
            <ChannelName> CBS </ChannelName>
            <Program1>
                <StartTime> 9:00:00 </StartTime>
                <MediaID> 1234456 </MediaID>
                <EndTime> 9:45:00 </EndTime>
            </Program1>
            <Program2> ... </Program2>
            ...
        </Channel1>
        <Channel2> ... </Channel2>
        ...
</TVSchedule>
```

The media program may further comprise information such as media air time, media length, advertisement tag timestamp, ad name, ad product information, and/or the like. The media program may further comprise a sub-table comprising embedded advertisement tags (e.g., see 343a in FIG. 3A).

In further implementations, the TV schedule 237 may comprise sub-tables including information with regard to the media programs. For example, an exemplary XML-formatted TV program table takes a form similar to the following:

```
<TVProgram>
        <ID> 00001 </ID>
        <Name> The Big Bang Theory </Name>
        <Genre> Comedy </Genre>
        <Networks> CBS </Networks>
        <Actors>
            <Actor1> Jim Parsons </Actor1>
            ...
        </Actors>
        <FirstRun> 08-2008 </FirstRun>
        <AiringTime>
                <StartTime> 9:00:00 </StartTime>
                <EndTime> 9:45:00 </EndTime>
                <Weekday> Thursday </Weekday>
                <Frequency> Weekly </Frequency>
            ...
        </AiringTime>
        <KeyWords>
            <KeyWord1> Geeks </Keyword1>
            <KeyWord2> Physicists </Keyword2>
            ...
        </KeyWords>
        <Characters>
            <Character1> Sheldon Cooper </Character1>
            <Character2> Penny </Character2>
            ...
        </Characters>
        ...
</TVProgram>
```

In one embodiment, the user 233a may operate a client mobile device, which may receive a list of real time TV programs 237b. In one embodiment, upon reviewing the received channel schedule 237b, the user may submit a channel selection by tapping on a selected channel (e.g., see 105 in FIG. 1B). In one implementation, the user mobile device may be enabled with an infrared remote control component (e.g., a plug-in accessory 120 in FIG. 1B), and may send the channel submission indication 235a to a client TV 233b (e.g., a home TV set) via an infrared communication channel, which may result in a channel switch on TV. In another embodiment, when the user selects the channel from his mobile device (e.g., an Apple iPhone, etc.), the channel selection message 235b may be transmitted to the MR-Control server 220 in real time.

In another implementation, the MR-Control server 220 may provide the TV program schedule data to a TV set-top box (STB) 201, e.g., via a cable network, wherein the STB may receive user TV event messages 235a and forward such information 235c to the MR-Control server 220. In another implementation, the STB 201 may directly communicate with a MR-Control infrared component (e.g., 120 in FIG. 1B), a table unit, and/or the like. In one implementation, the TV event 235a/b/c may comprise a variety of TV events, such as, but not limited to TV on/off, STB on/off, channel switch, and/or the like. In further implementations, when the user has registered non-live media facility (e.g., DVR, DVD, TiVo, etc.) with the MR-Control, the TV event 235a/b/c may comprise DVD player on/off, TiVo on/off, TiVo channel change, and/or the like. In one implementation, to operate and exchange data with the STB, the presentation layer on the user mobile device may adopt development tools, such as but not limited to Android, iOS app development tools, and/or the like. In one implementation, the TV set-up top box may similarly employ a presentation layer development tool compatible with that of the user mobile device, and may additionally employ HTML5 and web 2.0 presentation layers.

In one implementation, a TV channel selection event 235b may be logged by the MR-Control server 220 and stored as a real time data record in a MR-Control database 219. For example, in one implementation, the user device may provide a HTTPS POST message including the TV channel selection message 235b in the form of data formatted according to the XML. Below is an example HTTP(S) POST message including an XML-formatted user trigger for the MR-Control server:

```
PUT /CHsubmission.php HTTP/1.1
Host: 255.000.00.1
Content-Type: Application/XML
Content-Length: 701
<?XML version = "1.0" encoding = "UTF-8"?>
<CHSelectionEvent>
        <EventID> 1111 <EventID>
        <EventType> CH Switch </EventType>
        <Time> 19:00:00 </Time>
        <Date> 09-09-2000 </Date>
        <UserID> JDoe </USerID>
        <UserName> John Doe </UserName>
        <DeviceID> JD0001 </DeviceID>
        <IP> 255.000.00.1 </IP>
        <HardwareID> 00001 </HardwareID>
        <AppID> JDDOEMOBILE 00001 </AppID>
        <MAC> 00:00:00:00:00:00 </MAC>
        <Channel>
        <ChannelName> CBS </ChannelName>
        <Category> Comedy </Category>
        <Program> The Big Bang Theory </Program>
        <Episode> 4-1 </Episode>
        <StartTime> 19:00:00 </StartTime>
```

-continued

```
        <EndTime> 19:29:45 </EndTime>
        <Duration> 29'45" </Duration>
    </Channel>
    ...
</CHSelectionEvent>
```

In further implementation, the user's mobile device may send event messages. Such event messages may include channel selection message 235b, user checkin/checkout action (e.g., user signing in/out to a MR-Control mobile/web-based client portal, etc.), and/or the like. In one implementation, the events may be sent to the MR-Control server 220 via Https Post web based API, which may comprise a type identifier and a set of parameters of the event data, e.g., channel selection, user response, etc. In one implementation, MR-Control server 220 may save such event data at CSV format. For example, the following Tables I and II provide an exemplary data structure of an event message:

TABLE 1

Watching Event Data Structure

| User Action | Event Type | Parameters |
|---|---|---|
| MR-Control App Started | 1 | EventID, UserID |
| Pulse Event (keep alive ping, sent every 10 min) | 2 | EventID, userID, zipcode, SourceID, time-zone, isSocial, tmsID, timestamp |
| Change change | 3 | Same as Type 2 |
| Check in | 10 | Same as Type 2 |
| Check out | 11 | Same as Type 2 |

TABLE 2

Event Data Parameters

| Parameter | Type | Details |
|---|---|---|
| EventID | INT | Unique identifier that is generated for each event that is added to the DB |
| UserID | String | Unique identifier for a MR-Control user. The client app may send the device UDID. |
| Zipcode | INT | Zipcode as entered by the user at the client app |
| SourceID | INT | An ID in a media service program that identifies a channel |
| Time-zone | INT | The offset from GMT |
| tmsID | String | Unique identifier of a program (an episode or a program with a single occurrence). Using the tms data, these can be mapped also to the show/series |
| isSocial | INT | A boolean that is used to filter social event data from being shared with friends (e.g., see 275a) |

In one embodiment, upon submitting a channel selection, the user 233a may populate social media feeds of his viewing status 275a to the social media network 250, wherein the user's friends may view his status, knowing what the user is watching, electing to "like," "dislike," and/or comment on his status, and/or the like. For example, in one implementation, a MR-Control client app may comprise a social feature (e.g., see in FIG. 7A) so that a user may input a social media message (e.g., 715b/c in FIG. 7A). In another implementation, the MR-Control may automatically generate a social message based on a pre-populated message format (e.g., a Tweet format with hashtags, etc.) send a message indicating the user's viewing status 275b to the social media 250, which may automatically populate a social media status update. In such cases, the social media platform 250 may request user authorization for MR-Control server 220 to access, e.g., download social data or send social data to social media, etc. The MR-Control may obtain a user token for authorization to access the user's social media profile, content, and/or the like. The user authorization may be further discussed in FIGS. 5A-5c.

For example, in one implementation, the MR-Control may provide a HTTPS POST message including a social message 275b in the form of data formatted according to the XML. Below is an example HTTP(S) POST message including an XML-formatted user viewing status 275a/b for the MR-Control server:

```
PUT /UserSocial.php HTTP/1.1
Host: www.MR-Control.com
Destination: www.Facebook.com
Content-Type: Application/XML
Content-Length: 701
<?XML version = "1.0" encoding = "UTF-8"?>
<SocialMessage>
    <MsgID> Facebook1111 <MsgID>
    <Time> 19:00:00 </Time>
    <Date> 09-09-2000 </Date>
    <UserID> JDoe </USerID>
    <UserName> John Doe </UserName>
    <UserTokenID> 12324 </UserTokenID>
    <AppID> MR0001 </AppID>
    <Action>
        <ActionType> Status Update </ActionType>
        <Content> "is watching The Big Bang Theory on CBS"
        </Content>
        <Rating> N/A </Rating>
        ...
    </Action>
    <Tags>
        <Tag1> Big Bang Theory </Tag1>
        <Tag2> CBS </Tag2>
        ...
    </Tags>
    ...
</SocialMessage>
```

In the above example, the MR-Control server 220 may automatically populate a social message to the user's Facebook page, showing a status update "John Doe is watching The Big Bang Theory on CBS."

Figure 7A:
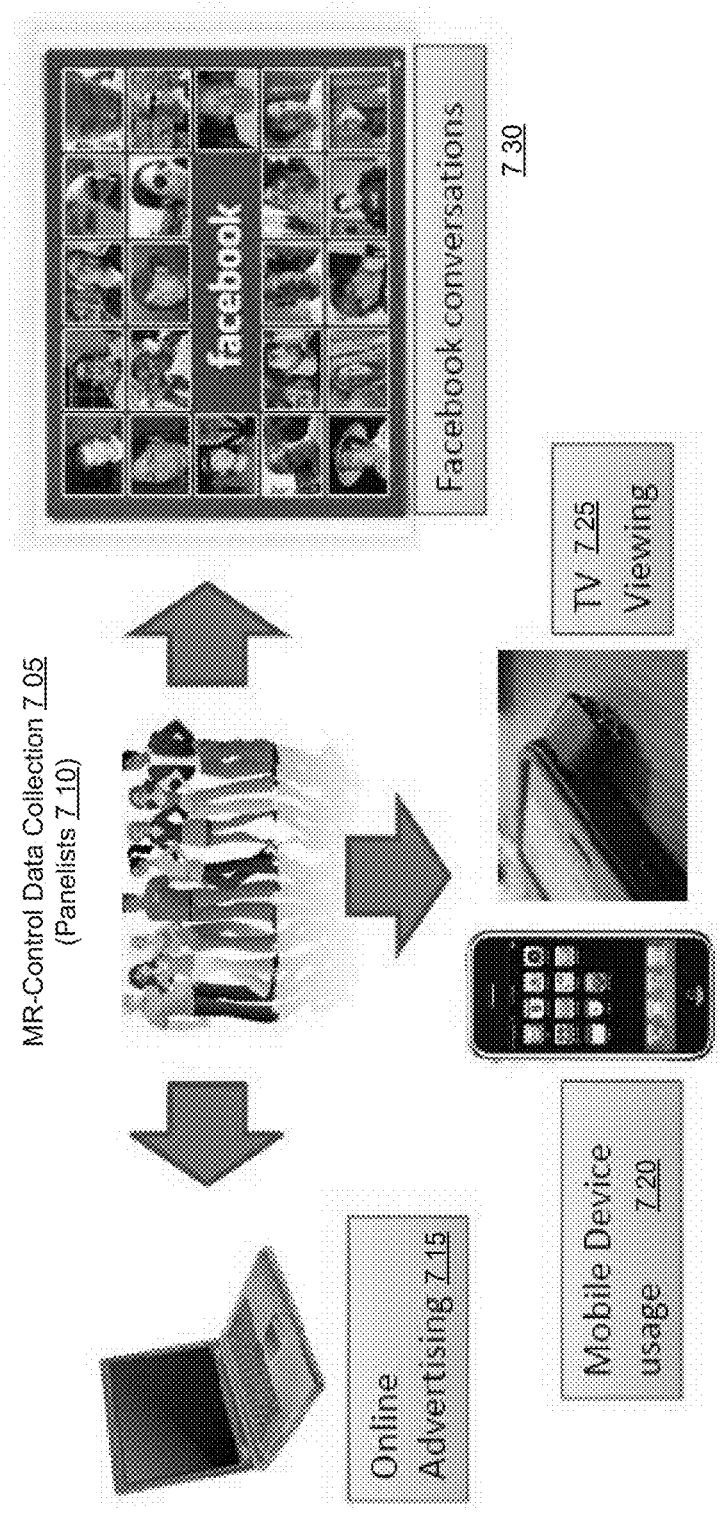
FIGS. 7A-7F provide example data flow and logic flow diagrams illustrating cross-channel data collection of media analytics within embodiments of MR-Control.

In a further implementation, the user 233a may receive friends' recommendations 277 of TV programs from the social media 250 (e.g., see 705 in FIG. 7A). For example, the user may view a scroll-down list of friends' recommendations from a user interface via the user's mobile device.

In further embodiments, MR-Control may load data 278 from the social media platform 250, e.g., user profile information, user comments/activity data related to an advertisement/a TV program, and/or the like. Further implementations and example data structures of the social media data 278 are discussed in FIG. 5F.

Figure 2B:
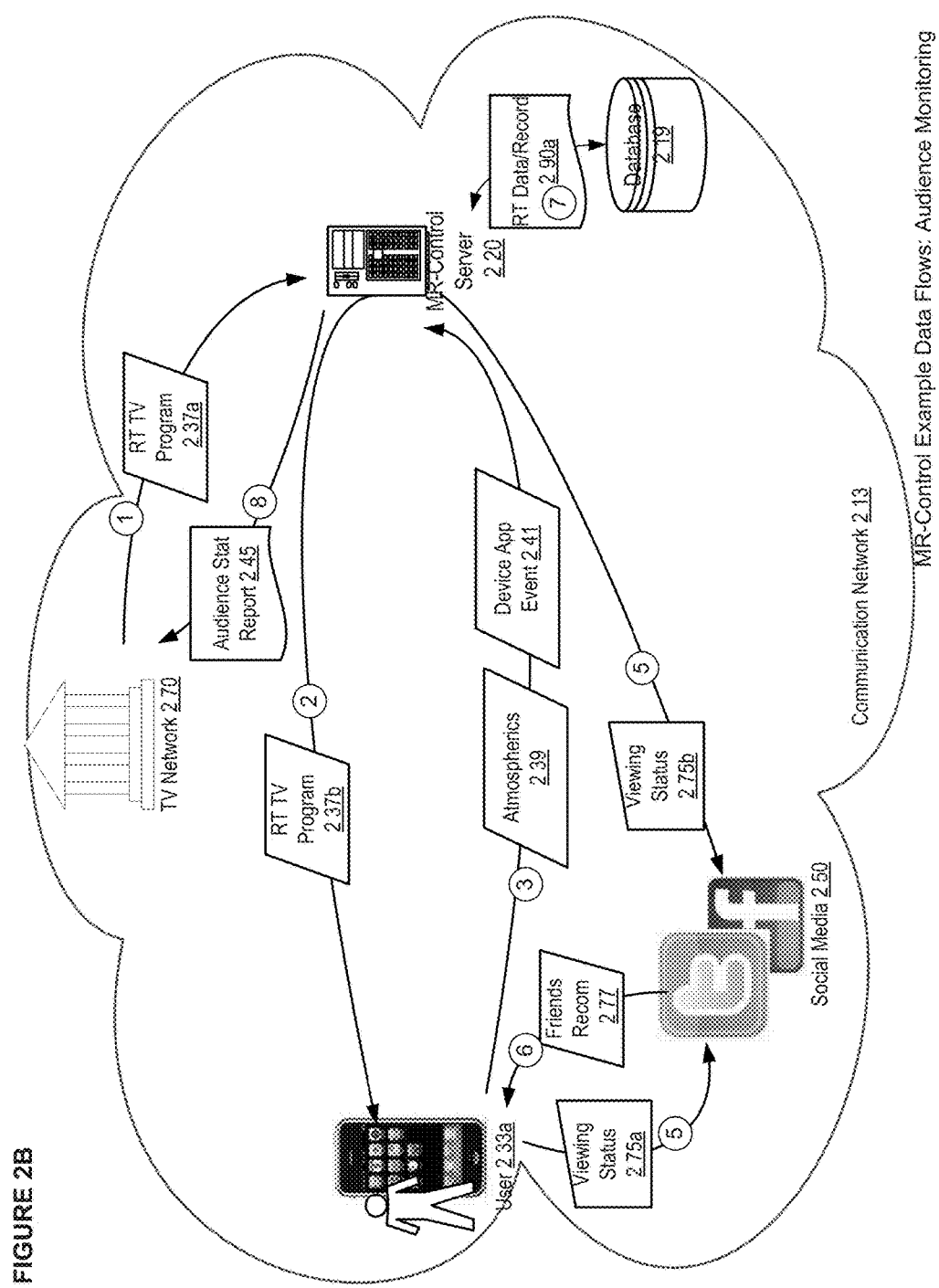

FIG. 2B shows a block diagram illustrating data flows between MR-Control entities within alternative embodiments of the MR-Control. Within implementations, user mobile device 233a may perform "ambient listening" on the user. For example, when a user has submitted a channel selection, it is not guaranteed whether the user is indeed watching the TV program selected, e.g., the user may walk away, engaging in other activities such as playing video games, chatting with others, etc. As such, the user's mobile device 233a may "listen-in" the user's behavior, e.g., by capturing live video of the surroundings of the user, by recording audio clips, by capturing a picture, and/or the like, to capture information as to whether and/or what the user is watching the TV. In one implementation, such "listen-in" data (e.g., video clips, audio clips, pictures, device application status, GPS coordinates, etc.) may be aggregated and packetized as atmospherics data 239 and transmitted to the MR-Control server 220, which may analyze such atmospherics data to determine whether the user is watching, and integrate the atmospherics analytics in an audience statistics report 245. In one implementation, the MR-Control may provide the audience statistics report 245 to the TV network 270 for TV program audience feedbacks.

For another example, in one implementation, the user device 233a may generate an atmospherics data package as a HTTPS POST message in the form of data formatted according to the XML. Below is an example HTTP(S) POST message including an XML-formatted atmospherics data 239 to provide to the MR-Control server 220:

```
PUT /Listen-in.php HTTP/1.1
Host: 255.000.00.1
Content-Type: Application/XML
Content-Length: 701
<?XML version = "1.0" encoding = "UTF-8"?>
<Atmospherics>
    <AtmosID> AT0003 </AtmosID>
    <AtmosType> Listen-in </AtmosType>
    ...
    <Time> 19:00:00 </Time>
    <Date> 09-09-2000 </Date>
    <UserID> JDoe </USerID>
    <UserName> John Doe </UserName>
    <DeviceID> JD0001 </DeviceID>
    <IP> 255.000.00.1 </IP>
    <HardwareID> 00001 </HardwareID>
    <AppID> JDDOEMOBILE 00001 </AppID>
    <MAC> 00:00:00:00:00:00 </MAC>
    <Data1>
        <Type> audio </Type>
        <FileFormat> MP3 </FileFormat>
        <FileName> MyRecord </FileName>
        <Length> 10s </Length>
        <Size> 567 KB </Size>
        ...
    </Data1>
    <Data2>
        <Type> Image </Type>
        <Format> JPEG </Format>
        <FileName> MyPic </FileName>
        <Exif>
            <Source> iPhone </Source>
            <Timestamp> 19:00:00 <Timestamp>
            <size> 1024 X 768 </size>
            <focus> 600/100 </focus>
            ...
        </Exif>
        ...
    <Data2>
    <Data3>
        <Type> GPS </Type>
        <Content> 45 Garden Street </GPS>
        ...
    </Data3>
    <Data4>
        <Type> Device App </Type>
        <Timestamp> 19:00:00 </Timestamp>
        <App1>
            <Name> Angry Bird </Name>
            <Type> Gaming </Type>
            <Status> Active </Status>
            ...
        </App1>
    </Data4>
...
</Atmospherics>
```

The user device may perform "ambient listening" and generate atmospherics data package constantly, intermittently, and/or periodically (e.g., every hour, etc.) to "listen-in" user's watching status, e.g., whether the user is paying attention to the selected TV program. In the above example, the generated atmospherics data package may comprise a variety of data segments, such as a "MyRecord.mp3" audio clip which may indicate whether the played audio matches a selected channel program, whether the user is chatting with friends (e.g., see 298 at FIG. 2D); a "MyPic.JPEG" photo taken by an iPhone camera, which may indicate whether the user is present with the TV set, and/or one or more individuals are present (e.g., see 297 at FIG. 2D); GPS information of the user mobile device which may indicate whether the user is present at his residential address where the home TV is located (e.g., see 299c at FIG. 2D); user mobile device application status information including an actively running gaming application (e.g., "Angry Bird"), which may indicate the user is playing the video game instead of paying attention to the TV program (e.g., see 299a at FIG. 2D). In one implementation, the atmospherics data 239a and/or analytics may be incorporated into a data record 290a and stored in the database 219.

In another implementation, the user mobile device may send a device application event 241 indicating user device application status to the MR-Control server 220. For example, the device application event 241 may comprise an actively engaged application information on the device, e.g., application ID, application name, application category, push email heart beat pulse, etc, which may suggest audience activities while watching TV, e.g., video gaming, texting, calling, checking email, browsing, playing music, editing photos, and/or the like. For example, in one implementation, the user device 233a may generate a mobile application event as a HTTPS POST message in the form of data formatted according to the XML. Below is an example HTTP(S) POST message including an XML-formatted device application status 241 to provide to the MR-Control server 220:

```
PUT /MobileApp.php HTTP/1.1
Host: 255.000.00.1
Content-Type: Application/XML
Content-Length: 701
<?XML version = "1.0" encoding = "UTF-8"?>
<MobileApp>
    <Time> 19:00:56 </Time>
    <Date> 09-09-2000 </Date>
    <UserID> JDoe </USerID>
    <UserName> John Doe </UserName>
    <DeviceID> JD0001 </DeviceID>
    <IP> 255.000.00.1 </IP>
    <HardwareID> 00001 </HardwareID>
    <AppID> JDDOEMOBILE 00001 </AppID>
    <MAC> 00:00:00:00:00:00 </MAC>
<EventType> gaming </EventType>
    <App1>
        <Name> Angry Bird </Name>
        <Type> Gaming </Type>
        <Status> Active </Status>
        <StartTime> 19:00:45 </StartTime>
        <EndTime> 19:00:56 </EndTime>
```

```
<Duration> 0'11" </Duration>
...
</App1>
```

In one implementation, the device application status 241 may comprise a list of application names that have been open and active for a minimum amount of time (e.g., 10 seconds, etc.). In another implementation, the device application status 241 may be periodically harvested to the MR-Control serer.

FIG. 2C provides a logic diagram illustrating user-server interactions within embodiments of the MR-Control. In one embodiment, a user may instantiate a MR-Control application component on a mobile device 250. The user may also plug a MR-Control accessory (e.g., 120 in FIG. 1) into his mobile device to facilitate communication between the mobile device and a home TV set.

In one implementation, the user may submit a session request 253 to the MR-Control server 220 via the mobile application, e.g., as shown in Table 1, the session request 253 may comprise a user ID and an event/session ID to indicate the MR-Control application has stared. Upon receiving a user request, the MR-Control server 220 may determine whether the user has registered with MR-Control 255. For example, in one implementation, the user may be a new user to the MR-Control application service, who may just download and install the mobile application but has not registered. If the user is not registered 258, the user may be requested to submit registration information, such as user name, phone number, email address, residential address, and/or the like for registration 260. The MR-Control may also obtain a physical address, a hardware ID of the user mobile device, etc., for registration purposes.

In one implementation, upon registration, the MR-Control server 220 may obtain and store a user application ID, and/or a session ID 265 to start the MR-Control service session. In one implementation, the MR-Control server 220 may obtain a real-time TV program listing 267, e.g., from a TV network, a TV broadcasting service, etc. In one implementation, the MR-Control server 220 may obtain the TV schedule updates on a periodical basis (e.g., daily, etc.), and store the TV schedule information at a TV schedule database. In one implementation, the user 233*a* may receive a list of TV programs 270 via the MR-Control application, e.g., see 710 in FIG. 7A.

In one implementation, the user mobile device may send a user event message 280 to the MR-Control server 220, and the MR-Control server may monitor user event messages 276 from the user device. As discussed in FIGS. 2A-2B and will be further discussed in FIGS. 3A and 5A, the received user event at 276 may comprise a variety of events/messages, such as, but not limited to user TV event (e.g., 235*b* in FIG. 2A), user device application event (e.g., 241 in FIG. 2B), atmospherics data (e.g., 239 in FIG. 2B), social content (e.g., 525*a/b* in FIG. 5A), response to ads/surveys (e.g., 339 in FIG. 3A), and/or the like. In one implementation, upon receiving the message, the MR-Control may determine a type of the message 288. In one implementation, the user event message may comprise user channel submission event 289*b*, check-in/out messages, and/or the like, e.g., see 235*a* in FIG. 2A. For another example, the user event message may comprise atmospherics data 289*a* (as further illustrated in FIG. 2E), ad/survey response 289*c* (as further illustrated in FIGS. 3B-3C), social data 289*d* (as further illustrated in FIG. 5B), non-live TV consumption message 289*e* (as illustrated in FIG. 2G. For example, in one implementation, the MR-Control may determine the message types 289*a-e* based on the data structure, e.g., a field value of a field "message type" as shown in Table 2, message type code in the header information of a received data packet, and/or the like.

Figure 2D:
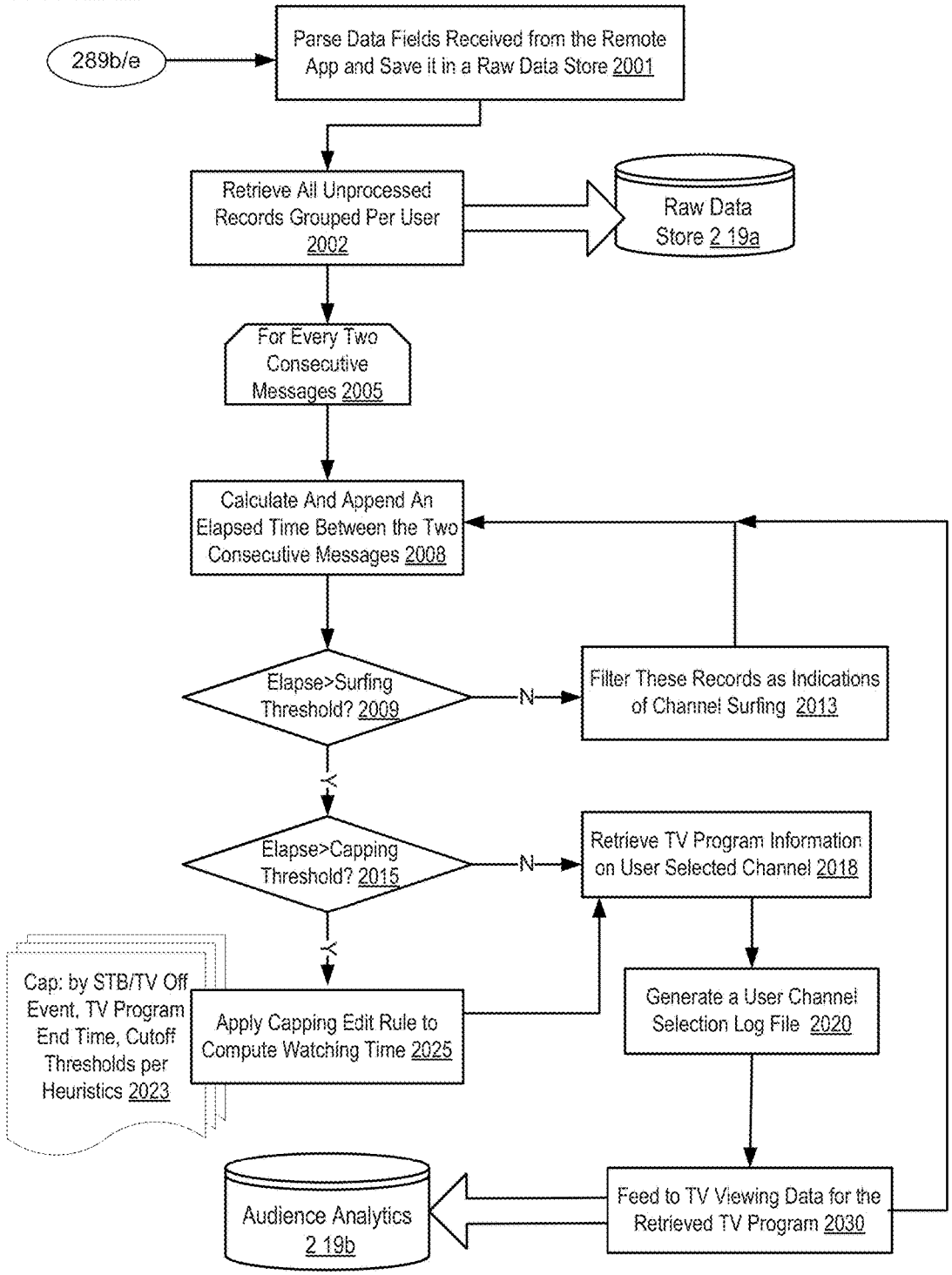

FIG. 2D provides a logic flow diagram illustrating TV channel submission (e.g., 289*b/e*) message (for live TV, and/or non-live TV program such as DVD playing, TiVo, media on demand, and/or the like) processing within implementations of the MR-Control. In one implementation, upon receiving a channel TV event message at 289*b/e*, the MR-Control server may parse the received data message 2001 and save it in a raw data message database, e.g., as XML-formatted records in 219*a*. For example, a variety of exemplary XML-formatted TV event message data structures (e.g., TV on/off, STB on/off, DVD on/off, channel change, etc.) are discussed at 235*a* in FIG. 2A.

Within implementations, the MR-Control may determine whether each received TV event message indicates a stable TV channel program selection, or a channel surfing. In one implementation, the MR-Control retrieve a list of unprocessed TV message records (e.g., grouped per user profile) 2002 from the raw data store 219*a*. For every two consecutively received messages 2005, the MR-Control may calculate the elapsed time in-between 2008, and determine whether the elapse time is greater than a pre-determined surfing threshold (e.g., 5 seconds, 10 seconds, etc.). For example, when the elapsed time is shorter than the surfing threshold, indicating the user may be frequently switching channels to browse the program, the MR-Control may not consider the channel selection message as effective TV viewing, and may filter such message records from TV viewing analysis 2013.

In another implementation, when the elapsed time is greater than the surfing threshold 2009, suggesting the user may at least spend an amount of time staying on the selected channel, the MR-Control may further determine whether the elapsed time is greater than a capping threshold 2015. For example, when the elapsed time is too long, greater than the capping threshold (e.g., 2 hours, 3 hours, etc.), it may suggest a user may just let the TV on without watching. In such cases, MR-Control may apply capping edit rules to compute a "real" watching time 2025. For example, if the elapsed time between a first TV channel switch and a second channel switch is 5 hours, the MR-Control may not log 5 hours as the watching time for the first selected channel, as the capping threshold is 2 hours. The MR-Control may in turn determine the watching time of the first selected channel as capped by a STB/TV off event (e.g., when a STB/TV off event is received during the elapsed time, the watching time may not exceed the timestamp of the STB/TV off event), TV program end time (e.g., when the playing TV program on the first selected channel ends during the elapsed time, the watching time is calculated as the time elapse between the first TV channel event and the TV program end time), and/or the like, e.g., at 2023. In further implementations, the MR-Control may apply cutoff thresholds based on historical heuristics via statistical analysis 2023. For example, the MR-Control may determine the watching time based on individual habits, e.g., a user has been observed to stay on the same channel for at most hour, etc. For another example, the cut-off threshold may be analyzed by channel, e.g., hour on CBS, 2 hours on ABC family, and/or the like.

In one implementation, when the elapsed time does not exceed a capping threshold at 2015, and/or when the watching time has been re-calculated based on capping rules at

2025, the MR-Control may retrieve TV program information on the user selected channel 2018, and generate a user channel selection log file 2020. For example, the log file may comprise fields such as user ID, channel ID, channel selection time, user watching time, channel program name, channel program ID, and/or the like. Such generated log files may be fed to a user TV viewing data engine 2030 for audience analytics 219b. For example, the audience analytics database 219b may be utilized to analyze TV viewing rates of a TV program, product/brand impression of advertised products during the user watching time, and/or the like. Exemplary audience analytics reports are discussed at FIG. 10A-10H.

the MR-Control server 220 may retrieve TV program information to determine the TV program played on the user selected channel 292. For example, the MR-Control may query on a TV program table (e.g., obtained at 267 at FIG. 2C) based on an instant timestamp and the user selected channel. The MR-Control may log the user channel selection with the timestamp 292 in a database, e.g., at 290a in FIG. 2A.

In one implementation, MR-Control may generate TV viewing data for the retrieve TV program 293. In one implementation, MR-Control may associate the user selection to the TV viewing rate of the retrieved TV program, and may refine the TV viewing rate with atmospherics analytics at 306. For example, in one implementation, the MR-Control may monitor groups of audience's channel selection, wherein the audience groups may be defined based on age, geography, and/or the like. In one implementation, the MR-Control may generate an audience summary via a dashboard, e.g., see FIG. 8H.

Figure 2E:
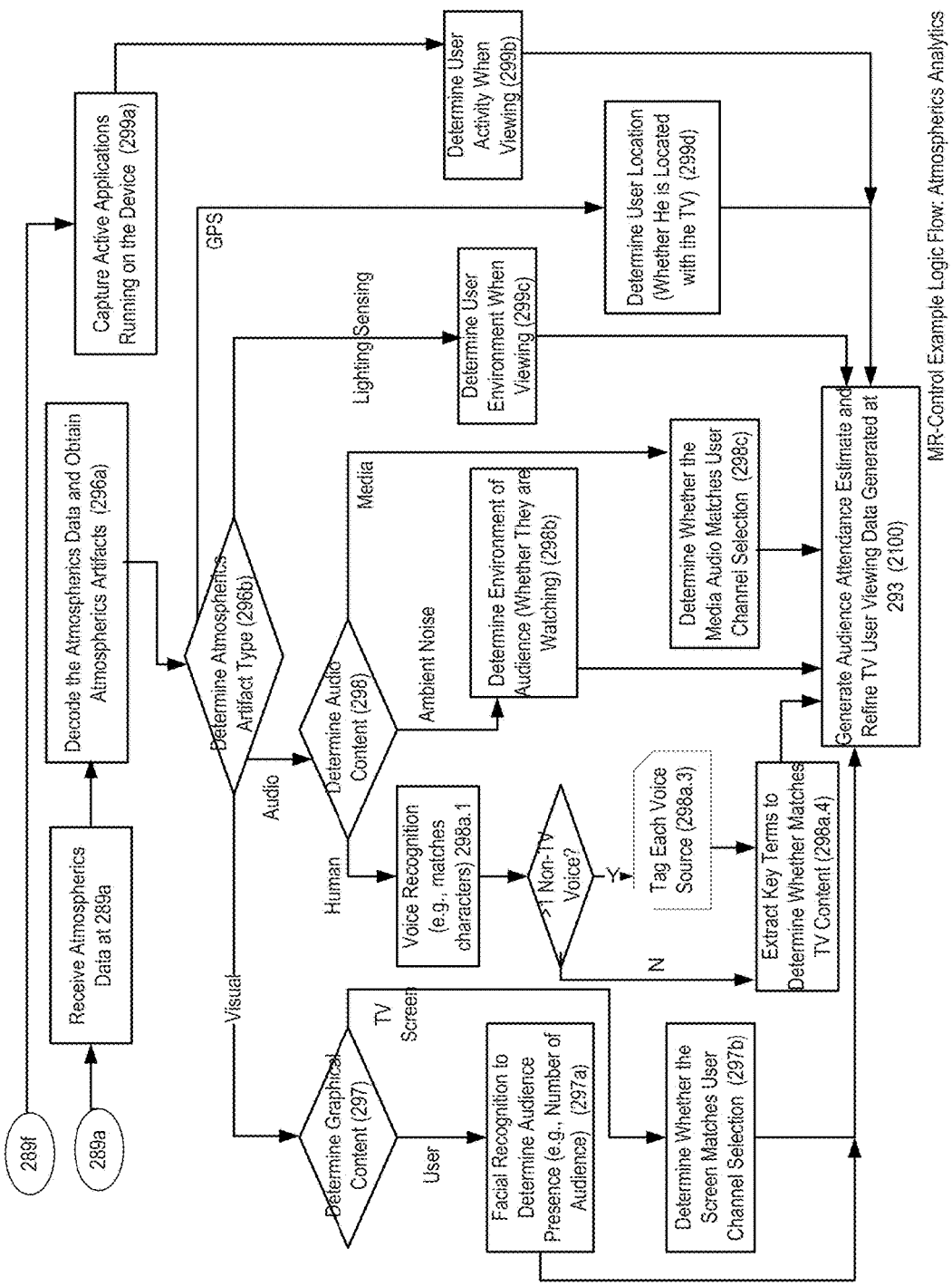

FIG. 2E provides a logic flow diagram illustrating atmospherics data (e.g., 289a) analytics within implementations of the MR-Control. In one implementation, upon receiving an atmospherics data message 289a, the MR-Control server may decode the atmospherics data and obtain atmospherics artifacts 296a, e.g., a photo, an audio clip, and/or the like. In one implementation, for each decoded artifact, the MR-Control may determine the artifact type 296b, e.g., based on the file name, file extension, etc.

In another implementation, the MR-Control may incorporate the received device application status (e.g., 289f) for user activity analytics. For example, the MR-Control may capture active application s running on the device 299a from the received device application data, and determine user activities when viewing 299b, e.g., emailing, browsing Internet content, texting, video gaming, and/or the like. Such indicated user activity data may be incorporated into audience attendance estimation 2100.

In one implementation, the artifact may comprise a visual data file 297, such as a video file (e.g., "wmv," "mp4," "avi," "rm," etc.), an image file (e.g., "JPEG," "bmp," "tiff," "gif," etc.), and/or the like. In one implementation, the MR-Control may determine graphical content 297 of the visual file. For example, the MR-Control may perform image analysis to determine whether the photo image, and/or video frames comprise a scene of audience, and/or a TV screen. In one implementation, a mobile application at the user mobile device, e.g., iPhone, etc., may perform face recognition at a photo taken at an iPhone, and integrate such data in the atmospherics data package, e.g., an iPhoto including two faces, etc. In another implementation, the MR-Control server may perform facial recognition to determine audience presence 297a. In other implementations, the MR-Control server may perform image analysis to determine user activities in the photo image, e.g., reading a book, doing housework, and/or the like. In further implementations, a MR-Control panelist may review the photo image and determine audience status.

In another implementation, the MR-Control may determine whether a TV screen image matches the TV program associated with the user channel selection 297b, e.g., the user may switch to watch recorded program (e.g., TiVo, DVD player, etc.) instead of live TV program on the channel, and in such cases, the MR-Control may not receive an indication of such change. For example, in one implementation, MR-Control may perform image analysis to determine whether the received image photo (and/or a video frame grab) contains a TV screen shot 297b, e.g., by detecting edges of a rectangular shaped object on the image, etc. For another example, the MR-Control may store a plurality of sample screen shots from the TV program played at the user submitted channel, and may compare the received image photo with each of the stored sample screen shots. In further implementations, a MR-Control panelist may assist in reviewing and determining whether the user TV screen matches the played TV program. In one implementation, if the MR-Control determines the user is absent from a TV set, or engaging in other activities from the graphic analysis, MR-Control may generate negative heuristics with regard to TV viewing data of the TV program on air.

In another implementation, if the received atmospherics data comprises an audio artifact (e.g., with a file extension of "way," "mp3," "ape," "m4a," etc.), the MR-Control may perform audio analysis to determine a content of the audio 298. For example, the MR-Control may analyze the frequency range of the audio content to determine the sound source, e.g., whether it is human voice, ambient noise, media broadcasting, and/or the like.

In one implementation, if the audio content comprises human voice (e.g., within the frequency range 60~7000 Hz), the MR-Control may determine whether the human voice is from the audience or broadcasting media. For example, the MR-Control may perform voice recognition to determine whether the human voice matches with any of the characters in the TV program on air on the user submitted channel, e.g., at 298a.1. If not, the MR-Control may determine such human voices may indicate audience presence 298a, e.g., whether more than one user is present with the TV set.

In further implementations, if the audio file comprises human voice, the MR-Control may extract verbal content from the audio file to determine whether an audience conversation, or a human conversation from media playing, is related to the TV program on air on the user submitted channel 298a.2. For example, the MR-Control may adopt speech recognition software (e.g., Nuance, IBM WebSphere Voice, etc.) to extract key terms from the conversation, and compare whether the key terms are related to key words stored with the TV program in the database. For example, if MR-Control extracts key terms "quantum mechanics," "physics," "big bang," etc., from the human conversation in the received atmospherics audio artifact, and the user submitted channel CBS is playing "The Big Bang Theory," MR-Control may determine the audience is watching the show on air. In such cases, the MR-Control may not need to distinguish whether the human conversation in the audio file is from the audience or TV, but focus on mining the content of the conversation.

In another implementation, if the MR-Control determines the audio artifact comprises ambient noise, MR-Control may determine an environment of the audience 298b. For example, if the background is overly noisy, the user may not be watching the TV program.

In another implementation, if the MR-Control determines the audio artifact comprises media sound (e.g., music, etc.), the MR-Control may determine whether the audio media content matches the TV program on air on the user submitted channel 298c via a media recognition software (e.g., a Shazam alike music recognition kit, etc.). For example, if the user selected channel CBS has "The Big Bang Theory" scheduled at the moment, but the MR-Control determines a Lady Gaga song in the received audio atmospherics, this may indicate the user is not watching the TV program. In one implementation, if the MR-Control determines the user is distracted from the TV program based on the audio content, MR-Control may generate negative heuristics with regard to TV viewing data of the TV program on air.

In an alternative implementation, the MR-Control client component, which may be instantiated on a user mobile device (e.g., a downloadable application such as, but not limited to an iPhone application, an Android application, etc.) and/or a table top standalone unit, may obtain atmospherics data to determine the program the user is watching without user indication of the channel. For example, the MR-Control component may obtain audio recording, video recording, signatures image captures, and/or the like of the audience watching environment, and submit the obtained data to MR-Control server. In one implementation, the MR-Control server may analyze the obtained data to determine what the audience is watching in a similar manner as illustrated at 297, 298 in FIG. 2E, but without the user's channel selection indication.

In one implementation, the MR-Control may perform an audio/video recognition procedure to identify a TV program, e.g., via digital signatures embedded in the program, and/or the like. In another implementation, the MR-Control may extract key terms from the audio/video captures, and form a query on a database of TV programs to find a match. For example, in one implementation, the MR-Control may extract textual terms from the obtained audio media program excerpts, such as "big bang," "quantum physics," "Sheldon," etc., and may form a query in a database of TV programs which may return a result indicating the obtained audio media program excerpt may be related to the TV show "Big Bang Theory."

In an alternative implementation, rather than uploading sampling and/or the entirety of the captured audio/video median content, the MR-Control may analyze the recorded audio/video content to generate a unique signature and/or a unique hash, which may be used for further matching. For example, the unique signature/hash may take a form similar to a sequence of 0-1 representation of a sampling of the recorded media content. In one implementation, the signature/hash generation may be performed at a user device (e.g., the user's mobile phone, the table top unit, etc.), which may upload the generated signature/hash sequence to the MR-Control server. In another implementation, the user device may upload media content sampling, clips or the captured entirety to the MR-Control server, which may then perform the signature generation. Within implementations, software tools/components such as, but not limited to i-brainz, and/or the like may be adopted to generate audio signature/hash.

In further implementations, such "listen-in" activities may be performed on a standalone table unit, which may communicate with a user computer via a wireless network, and/or transmit the "listen-in" results to the MR-Control server.

In further implementations, lighting sensor data 299c may indicate the lighting condition of the user environment to determine the viewing status. GPS information contained in the atmospherics data may indicate whether the user is located with the home TV 299d, e.g., by comparing the instant GPS location with a registered user residential address, etc.

In one implementation, MR-Control may analyze the variety of atmospherics data to determine whether the user should be accorded as a "viewer" of the real-time TV program on air. In one implementation, as shown in FIG. 2H, the MR-Control server may adopt a procedure to generate a progressive weighted sum of atmospherics scores to determine whether the user is "watching" or "not watching." When the weighted sum of different atmospherics scores exceeds a predetermined threshold, the user may be considered "not watching," and the MR-Control may not need to proceed with further atmospherics analysis to improve efficiency of the atmospherics analytics.

Figure 2F:
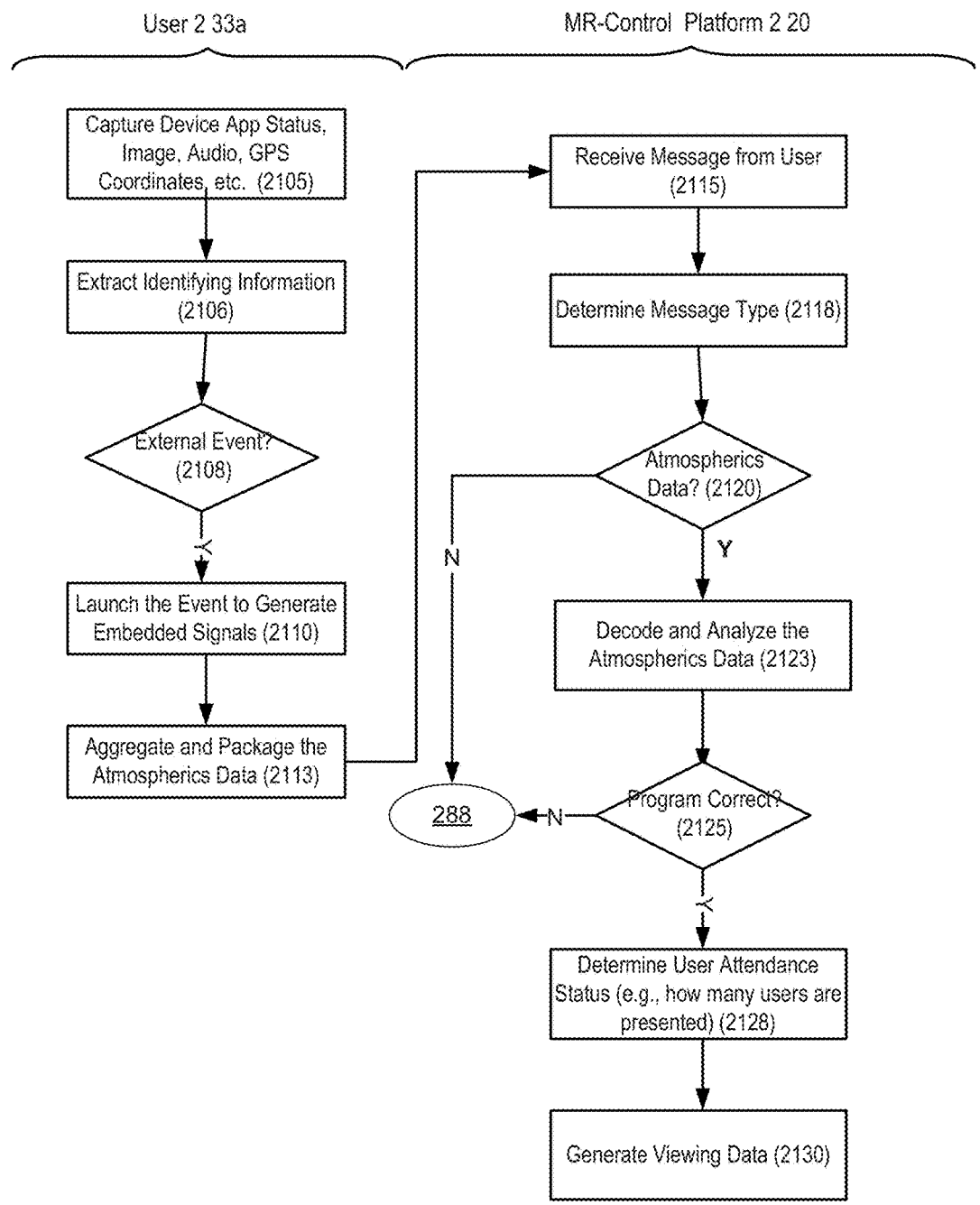
Figure 2G:
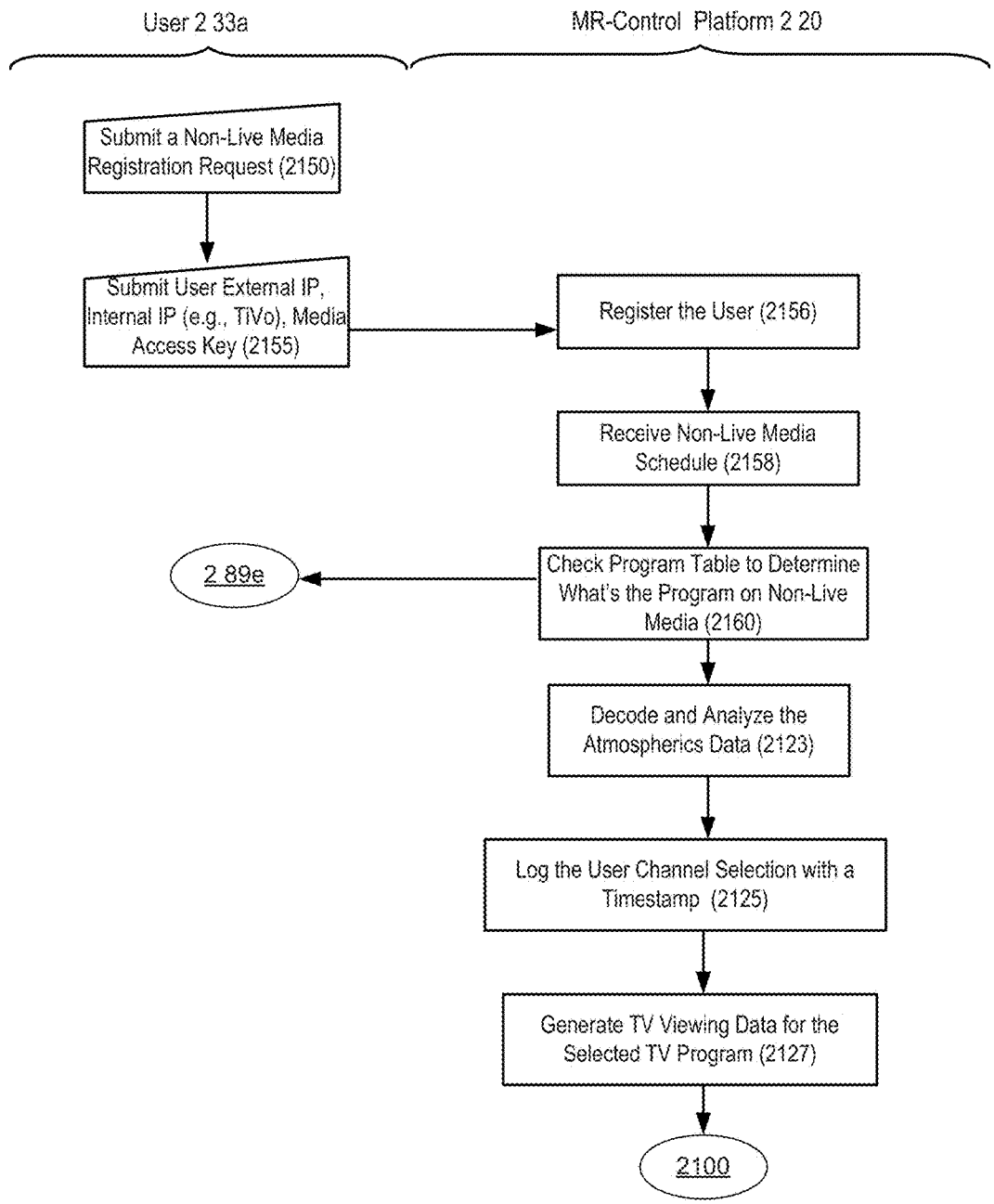
Figure 2H:
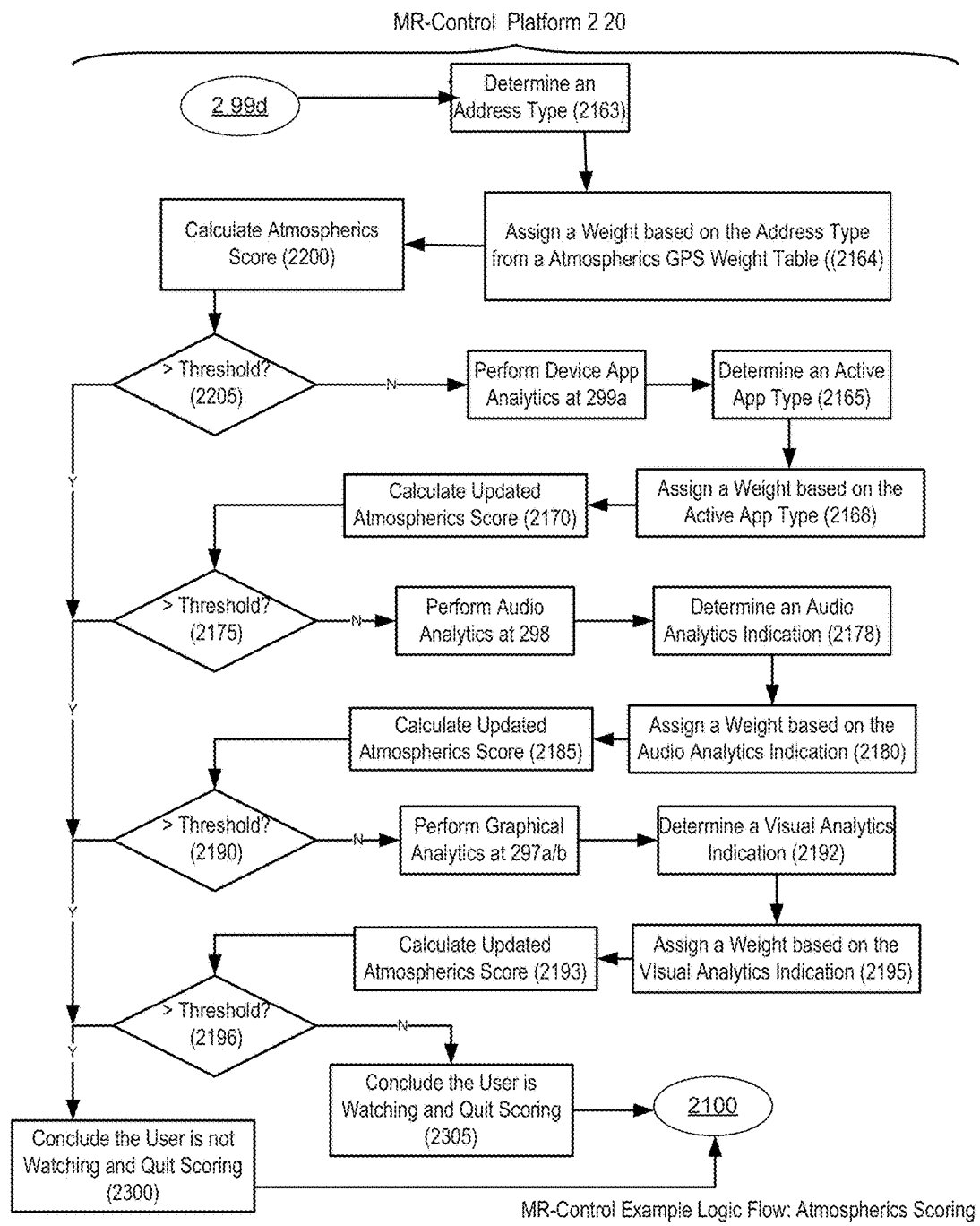

For example, at 299d in FIG. 2H (e.g., comparing received user GPS information with the user's registered residential address in FIG. 2D), the MR-Control may determine an address type 2163, and may assign a weight to the GPS atmospherics factor based on the address type from an atmospherics GPS weight table For example, the atmospherics GPS weight table may assign 0.1 to a residential address, 0.2 to a Starbucks store, 1.0 to an outdoor address (e.g., a national park, etc.), and/or the like. In one example, the MR-Control may assign a GPS factor weighing score similar to the following table:

TABLE 3

GPS Information Weighing Scores

| GPS Address Type | | Weighing Score |
|---|---|---|
| Residential address | | 0.1 |
| Commercial Address | Coffee Shop, Restaurants | 0.5 |
| | Hotel | 0.1 |
| | ... | ... |
| | Shopping Site | 0.5 |
| Outdoor Address | Highway | 1 |
| | National Parks | 0.8 |
| | ... | ... |

In one implementation, the MR-Control may calculate the atmospherics score 2200, which may be the assigned GPS weight at this stage, and determine whether the score is greater than a predetermined threshold (e.g., 1, etc.) 2205. If so, the MR-Control may conclude the user is not watching the TV and quit scoring 2300. Otherwise, the MR-Control may proceed with analyzing device app analytics data at 299a, and repeat the process of updating atmospherics score to determine whether a threshold has been met to suggest the user is not watching.

At 2165, the MR-Control may determine an active application type 2165, and assign a weight based on the application type 2168. For example, an active gaming application may be accorded 0.7; an active email application may be accorded 0.5; an active internet browser may be accorded 0.5, and/or the like:

TABLE 4

Device Application Activity Weighing Scores

| Active Application Type | | Weighing Score |
|---|---|---|
| Gaming Application | | 0.7 |
| Email Application | New Email Window | 0.4 |
| | Inbox | 0.1 |
| | ... | ... |
| Internet Browser | Opening New Link | 0.4 |
| | Scrolling Down | 0.4 |
| | ... | ... |
| P2P | Chatting Messenger | 0.4 |
| | Dialing Software | 0.5 |
| | ... | ... |
| Office Application | Text Editor | 0.2 |
| ... | ... | ... |

In one implementation, the MR-Control may calculate an updated atmospherics score 2170 and determine whether it exceeds the threshold 2175. If it has not exceeded the threshold, the MR-Control may proceed with audio analytics results from 298, provided such audio analytics is available from the atmospherics data. In one implementation, the MR-Control may retrieve and/or determine audio analytics indications 2178, e.g., ambient noise level, media music which does not match the TV program on air, human voice chatting on irrelevant topics, etc. In one example, the MR-Control may assign a weight based on audio analytics indications 2180 similar to the following table:

TABLE 5

Audio Heuristics Weighing Scores

| Audio Heuristics Type | | Weighing Score |
|---|---|---|
| Ambient Noise Level | Loud | 0.5 |
| | Medium | 0.2 |
| | Minor | 0.02 |
| | ... | ... |
| Human Voice | Key Terms Matches TV program | 0 |
| | Key Term not Match | 0.3 |
| | ... | ... |
| Media Sound | Matches TV program | 0 |
| | Not match | 0.3 |
| | ... | ... |

In one implementation, the MR-Control may update the atmospherics score 2185 by adding the audio scores to determine whether it exceeds the threshold 2190. Otherwise, MR-Control may proceed to perform graphical analytics at 297a/b given such visual data is available. In one implementation, the MR-Control may retrieve and/or determine visual analytics indications 2192, e.g., user activity, user presence, number of individuals, TV screenshot, etc. In one example, the MR-Control may assign a weight based on visual analytics indications 2195 similar to the following table:

TABLE 6

Visual Heuristics Weighing Scores

| Visual Heuristics Type | | Weighing Score |
|---|---|---|
| Audience Presence | None | 0.5 |
| | More than 1 | 0 (count 2 viewers) |
| | ... | ... |
| Audience Activity | Reading etc. | 0.4 |
| | Housework | 0.3 |
| | Working | 0.5 |
| TV Screen Shot | Matches the TV program | 0 |
| | Does not Match | 0.3 |
| | ... | ... |

In one implementation, if the updated score 2193 does not exceed the threshold, the MR-Control may conclude the user is watching the TV program 2305, and feed such indication to 2100 for studying TV viewing rates. Otherwise, the MR-Control may conclude the user is not watching 2300, and may not count the user as a "viewer" of the TV program.

Figure 2I:
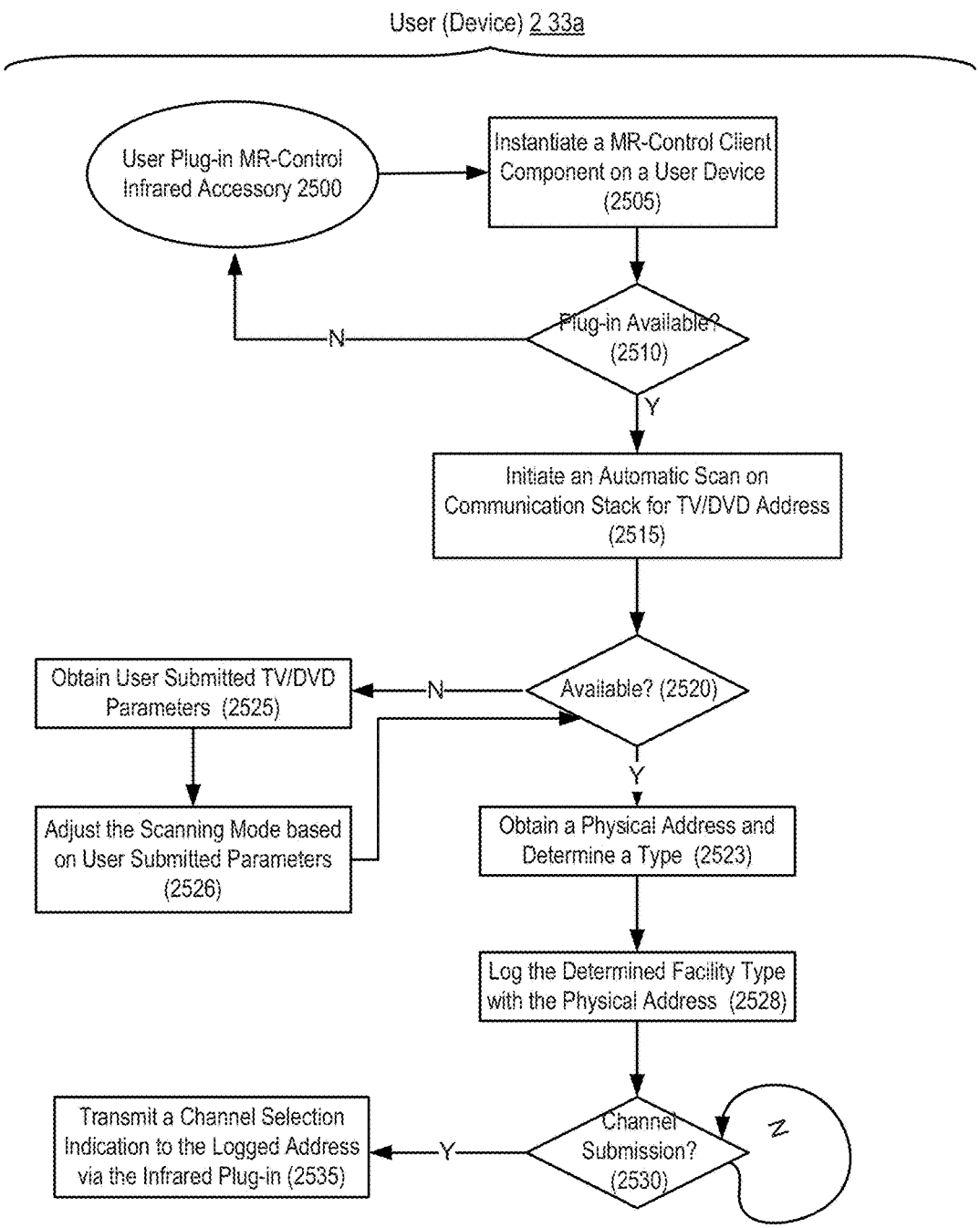

In one implementation, the MR-Control may process the decoded atmospherics data based on a progressive mechanism, to reduce processing complexity. For example, as shown in FIG. 2I, the MR-Control may start with a less complicated analysis of GPS information, device application status, and progressively proceed with visual data processing with a higher complexity.

FIG. 2F shows a logic diagram illustrating user-server interactions of "listen-in" within alternative embodiments of the MR-Control. In one embodiment, the MR-Control may instantiate "listen-in" when a user has submitted a channel selection to determine whether the user is watching the selected channel. In another implementation, the MR-Control may periodically check the listen-in data (e.g., every 30 minutes, etc.).

Within embodiments, the user's mobile device may capture image, audio data, video data, GPS coordinates and/or the like 2105. In one implementation, the MR-Control client component may automatically configure the user device to capture atmospherics data, e.g., obtaining GPS coordinates, capturing audio data, capturing device application status data, etc. In another implementation, the MR-Control client component may prompt a request for the user to hold up the mobile device to position the camera for image/video capturing of the TV screen, the audience scene, and/or the like.

In one implementation, the MR-Control may extract identifying information from the captured monitoring data 2106, such as a hardware ID, MAC address, and/or the like. The MR-Control may determine whether there is any external event 2108, e.g., the user is sending a response to survey question, submitting a channel selection, etc. If there is such external event 2108, the MR-Control may launch the event and embed the atmospherics information into the user responses 2110 for transmission. For example, in one implementation, the embedded atmospherics data may have the same timestamp as the original user response data payload.

In another implementation, the MR-Control may aggregate, and packetize different atmospherics data 2113 in a compliant data format for transmission to the MR-Control server (e.g., see 239 in FIG. 2B).

In one implementation, upon receiving a message from the user device 2115, the MR-Control server may determine the message type 2118. In one implementation, if the message is an atmospherics data packet 2120, the MR-Control server may decode and analyze the atmospherics data packet 2123 to extract information as to the user's viewing status. For example, the MR-Control server may perform an optical character recognition (OCR) procedure on a photographic frame extracted from the received atmospherics data to determine whether the TV program played on TV matches the program schedule associated with the user's selected channel, e.g., whether the program is "correct" 2125. For example, if the user has submitted a selection of channel "CBS," the MR-Control may query on a program table to determine that "The Big Bang Theory" shall be on air at the timestamp when the atmospherics data is received. The MR-Control may then ascertain whether the received photo of the user's TV set indicates the show on TV is "The Big Bang Theory."

In a further implementation, the MR-Control may determine whether the user is watching 2128. For example, the MR-Control may perform OCR on the received graphic data (e.g., photos, video clips, etc.) to determine whether the user is present in front of the TV. For another example, the MR-Control may determine how many users are watching the TV program by being present. For another example, the MR-Control may determine whether the user is present in front of his home TV by analyzing the received GPS coordinates, e.g., when the user's GPS coordinates reflects he has migrated from his home address to a second address, it may indicate the user is no longer watching the TV program after submitting channel selection.

In a further implementation, the MR-Control may generate viewing data 2130 to determine audience rating of a TV program, wherein analysis of the atmospherics data may contribute to the viewing statistics.

FIG. 2G provides a logic flow diagram illustrating non-live media consumption message (e.g., 289e) analytics within implementations of the MR-Control. In one implementation, a user may submit a non-live media registration request 2150 to the MR-Control, e.g., the user may register TiVo, etc. so that MR-Control may fold the viewing data of non-live media into TV viewing data analytics. In another implementation, the user may select a channel that comprises on-demand video service. In one implementation, upon sending a request, the user device may submit the user external IP (e.g., the IP address of the user mobile device, etc.), internal IP address (e.g., the IP address of the TiVo facility, a set-top box, etc.) to the MR-Control for registration 2155. The user device may further provide a media access key to MR-Control as authorization credentials for remote monitoring of the user's non-live media facility. In further implementations, the user may configure parameters of the facility (e.g., a set-top box, etc) as shown in FIGS. 7I-J.

In one implementation, MR-Control may register the user's non-live media facility 2156, and may establish a secure communication channel with the non-live media facility. In one implementation, the MR-Control may receive a non-live media schedule 2158, which may be automatically downloaded from the user's non-live media (e.g., media on-demand, Internet TV streaming service such as ABC episodes, Hulu.com, etc.), and/or provided by the user (e.g., a list of recorded programs for replay).

In one implementation, upon receiving an indication of non-live media selection 289e, the MR-Control platform may check the program table to determine the TV program on the non-live media 2160, and log the user channel selection of an associated TV program with a timestamp 2125. The MR-Control may also obtain and analyze atmospherics data 2123, e.g., in a similar manner as discussed in FIG. 2D, to generate TV viewing data for the selected TV program 2127.

FIG. 2I provides a logic flow diagram illustrating user mobile device as a TV remote (e.g., 235a in FIG. 2A) within implementations of the MR-Control. In one implementation, a user may plug a MR-Control infrared accessory (e.g., 120 in FIG. 1B) into a user mobile device 2500. The user mobile device may be a general purpose personal device (e.g., as opposed to a dedicated TV remote facility, etc.), such as, but not limited to an Apple iPhone, iTouch, iPod, iPad, BlackBerry, Palm, HTC Evo, Google Android, Samsung Galaxy, and/or the like. The user may instantiate a MR-Control client component on the user device 2505 (e.g., see FIGS. 7A-7L, etc.), wherein the MR-Control client component may determine whether an infrared plug-in is available 2510. If so, the user device may initiate an automatic scan on its communication stack for TVs/DVDs 2515. If the query returns a TV/DVD is available 2520, the user device may obtain a physical address of the scanned facility, and determine a type of the facility 2523, wherein such information may be logged into a communication stack 2528. In another implementation, if no results come out of the automatic scan at 2520, the user device may obtain user submitted TV/DVD parameters 2525 (e.g., TV/DVD brand, type, etc.), and adjust the scanning mode based on the user submitted parameters 2526.

Upon establishing communication with a TV/DVD set, the user device may monitor on user's channel submission 2530. When a channel selection is obtained, the user device may transmit a channel selection indication to the logged TV/DVD address via the infrared plug-in accessory 2535. In this manner, the user may operate a general purpose mobile device as a TV/DVD remote.

Figure 3A:
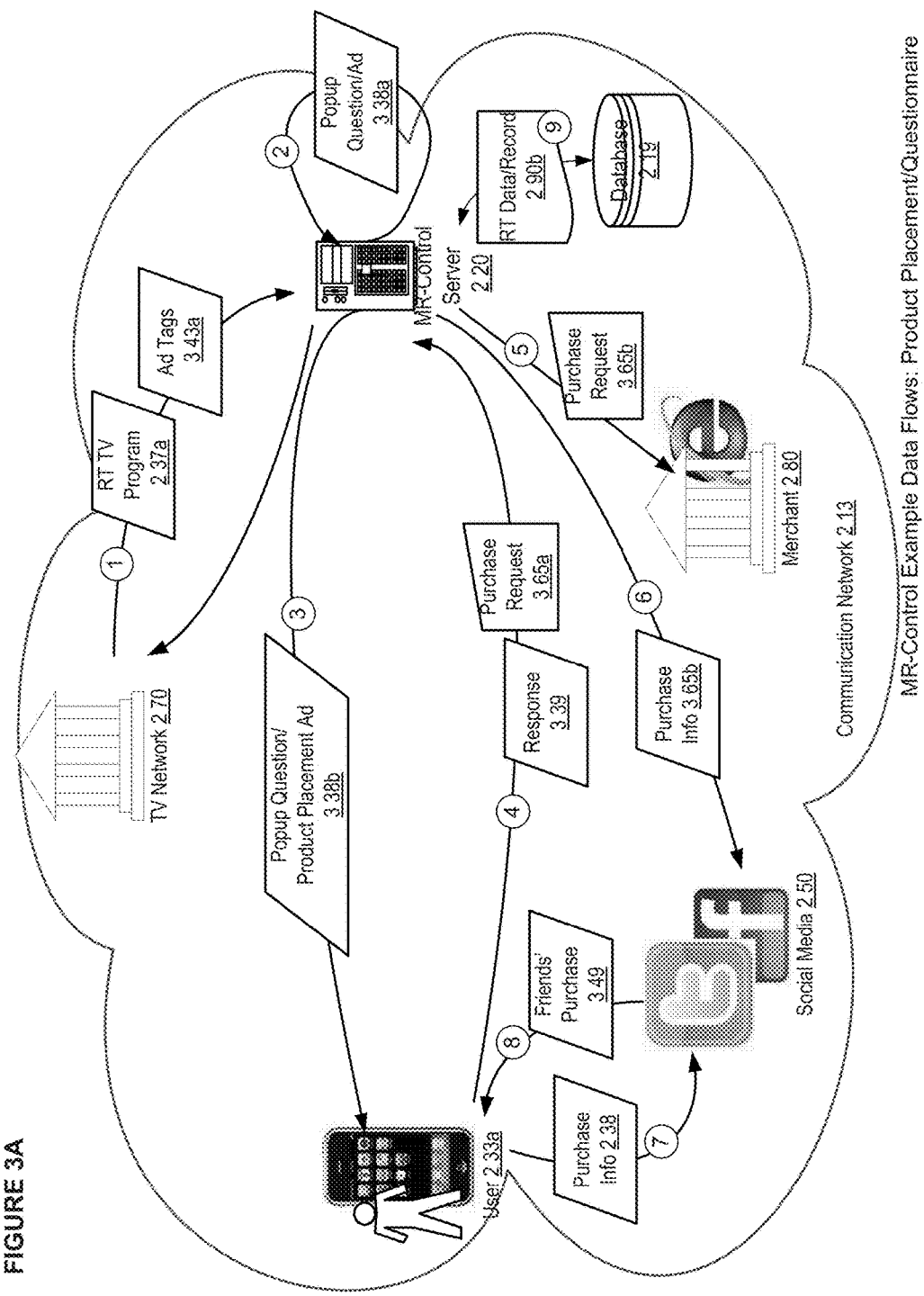
FIG. 3A provides a data flow diagram illustrating data flows of media content based advertising within embodiments of MR-Control.

FIG. 3A shows a block diagram illustrating data flows between MR-Control entities within alternative embodiments of the MR-Control. Continuing on from FIGS. 2A and 2B, in one embodiment, the MR-Control may receive a list of real time TV program 237a from the TV network 270, and a list of advertisement tags 243a associated with the TV programs 237a. For example, for each TV media program, which may comprise both segments of TV programs (e.g., a TV play) and a plurality of advertisements (e.g., interleaved during the TV play broadcasting). For another example, the advertisement tags 243a may label embedded advertisement in a scene of the TV play, e.g., a pair of sunglasses carried by a character in the TV show "The Big Bang Theory" may comprise a product placement advertisement tag. In a further implementation, for product placements, the ad tags 343a may comprise video frame grabs with embedded graphic indications of the placed products in the scene, e.g., see FIG. 7G.

For example, in one implementation, the TV media program table 237a (e.g., see also 237a in FIGS. 2A-2B) may comprise a sub-table comprising embedded advertisement tags. For example, in one implementation, an exemplary XML record of a media program data structure with ad tags 343a may take a form similar to the following:

PUT /AdTag.php HTTP/1.1
Host: www.TV.com
Content-Type: Application/XML
Content-Length: 718
<?XML version = "1.0" encoding = "UTF-8"?>
<Media>
　　<MediaID> 123456789 </MediaID>

-continued

```
<MediaName> The Big Bang Theory </MediaName>
<Content>
    <Season> 3 </Season>
    <Episode> 2 </Season>
    <MediaLength> 68'34" </MediaLength>
    <KeyWords> Vampire, Blood, South, </Keywords>
    ...
</Content>
<MediaChannel> CBS </MediaChannel>
<MediaAirTime> 9 pm 09/09/2000 </MediaAirTime>
<MediaSource> XXX Production </MediaSource>
<MediaGenre> Comedy </MediaGenre>
...
<AdTag1>
    <AdID> M0008 </AdID>
    <AdType> Regular </AdType>
    <AdStartTimeStamp> 20'34" </AdStartTimeStamp>
    <AdEndTime> 22'45" </AdEndTime>
    <AdSponsor> Audi </AdSponsor>
    <AdProductInfo>
        <ProductName> Audi R8 </ProductName>
        ...
    </AdProductInfo>
    ...
</AdTag1>
<AdTag2>
    <AdID> M0009 </AdID>
    <AdType> Product Placement </AdType>
    <AdStartTimeStamp> 25'54" </AdStartTimeStamp>
    <AdEndTime> 28'45" </AdEndTime>
    <AdSponsor> XYZ-Designer </AdSponsor>
    <AdProductInfo>
        <ProductName> French Style Sunglasses </ProductName>
        ...
    </AdProductInfo>
    <AdPrompt>
    "Do you want to learn more about the red bag in the scene?"
    </AdPrompt>
    <AdRedirect>
    www.buythings.com/XYZ/spring2000
    </AdRedirect>
    <AdInteractive> ScreenShot.gif </AdInteractive>
    ...
</AdTag2>
...
</Media>
```

The above XML example shows a media program "The Big Bang Theory season 3, episode 2" which is scheduled to be on air on CBS at 9 pm on Sep. 9, 2000. The example media program comprise an ad tag which may be a regular advertisement (e.g., non-product placement or embedded in the scene) of Audi automobile, and another ad tag which may be an embedded product placement, e.g., a "pair of XYZ-designer sunglasses" as shown in a scene during the TV program (e.g., see FIG. 7G). In a further implementation, the MR-Control may redirect the user to a URL "www.buy-bags.com/XYZ/spring2000" if the user clicks to learn more about the product. In one implementation, the MR-Control may generate synchronized advertisement to a user based on the ad tag by providing a pop-up static ad 338b, e.g., "Do you like Penny's sunglasses?" (e.g., see 720b in FIG. 7F). In another implementation, the MR-Control may generate an interactive ad 338b including a tagged screenshot of the TV program containing the placed product (e.g., see 750c in FIG. 7G).

In another embodiment, the MR-Control server 220 may generate questions 338b synchronized and/or related to the TV program ads 343a, which may be devised by the MR-Control based on the media content the user has viewed, the advertisement the user has viewed, and/or the like. For example, if the channel the user has been watching recently has played advertisement of "Audi," the MR-Control may prompt a question to the user such as "which brand automobile would you prefer?" to determine the advertisement effects. In another example, the user 233a may receive real-time information synchronized with a product placement embedded in the TV program. For example, when a user is watching a TV show, he may receive a prompt question 338b related to an embedded advertisement in a scene of the TV show, e.g., "Do you want to learn more about Penny's sunglasses?" In a further implementation, the MR-Control may redirect the user to a URL "www.buythings.com/XYZ-designer/spring2000" if the user clicks to learn more about the product.

For example, in one implementation, the MR-Control server 220 may provide a HTTPS PUT message including the questionnaire 338b in the form of data formatted according to the XML. Below is an example HTTP(S) PUT message including an XML-formatted questions 338b to provide to the user 233a:

```
PUT /question.php HTTP/1.1
Host: www.TV.com
Content-Type: Application/XML
Content-Length: 718
<?XML version = "1.0" encoding = "UTF-8"?>
<Question>
    <QuestionID> Q000123456789 </QuestionID>
    <QuestionName> Automobile Inquiry </QuestionName>
    <TemplateType> static </TemplateType>
    <TemplateID> TD0001 </TemplateID>
    <QuestionDescription>
        <body>
        "What automobile brand would you like?"
        </body>
        <Option1> A. BMW <Option1>
        <Ooption2> B. Audi </Option2>
        ...
    </QuestionDescription>
    <QuestionChannel> CBS </QuestionChannel>
    <QuestionMediaID> 123456789 </QuestionMediaID>
    <QuestionGenre> Product Ad </QuestionGenre>
    <QuestionPromptTime> 50'56" </QuestionPromptTime>
    ...
</Question>
```

In one embodiment, upon receiving questions and/or ads at the mobile device, the user may submit a response 339 to the MR-Control server, e.g., an answer to the question, a click on the provided ad URL, and/or the like. In another implementation, upon viewing an embedded advertisement while watching a TV program, the user 233a may desire to learn more or purchase the product, and submit a request of purchase 365a (e.g., by clicking on "Buy it Now" 750c in FIG. 7G) to the MR-Control server 220. The MR-Control 220 may forward the purchase request 365b to a merchant website 280, and redirect the user to view the merchant site to obtain more information of the interested product. In one implementation, the MR-Control may log the user question responses, indication of interests, purchase transaction, and/or the like at the database 219 to indicate ad effects.

For example, in one implementation, the MR-Control server 220 may provide a HTTPS PUT message including the questionnaire response 339b, purchase request 365a in the form of data formatted according to the XML. Below is an example HTTP(S) PUT message including an XML-formatted questions responses/purchasing request to provide to the database 219:

```
PUT /responses.php HTTP/1.1
Host: www.MR-Control.com
Content-Type: Application/XML
Content-Length: 718
<?XML version = "1.0" encoding = "UTF-8"?>
<Response>
    <ResponseID> R000123456789 </ResponseID>
    <Timestamp> 19:00:00 </Timestamp>
    <Date> 09-09-xxxx </Date>
    <QuestionID> Q000123456789 </QuestionID>
    <QuestionName> Automobile Inquiry </QuestionName>
    <QuestionDescription>
        <body>
        "What automobile brand would you like?"
        </body>
        <Option1> A. BMW <Option1>
        <Ooption2> B. Audi </Option2>
        ...
    </QuestionDescription>
    ...
    <QuestionResponse>
        <UserID> JS001 <UserID>
        <UserName> John Smith </UserName
        <DeviceID> JSiPhone0002 </DeviceID>
        ...
        <Response> B </Response>
    </QuestionResponse>
    ...
</Response>
```

In further implementations, the MR-Control may populate social media feeds of the user's questionnaire responses/purchase information 365b to a social media platform 250. In another implementation, the user may share purchase information 238 to the social media 250. For example, the user's Facebook news feeds may comprise a message "XXX participated in a survey. See her response" (e.g., see 731c in FIG. 7C). The user may also obtain his friends' MR-Control activities, including participation in surveys, purchases 349, etc., from social media news feed.

Figure 3B:
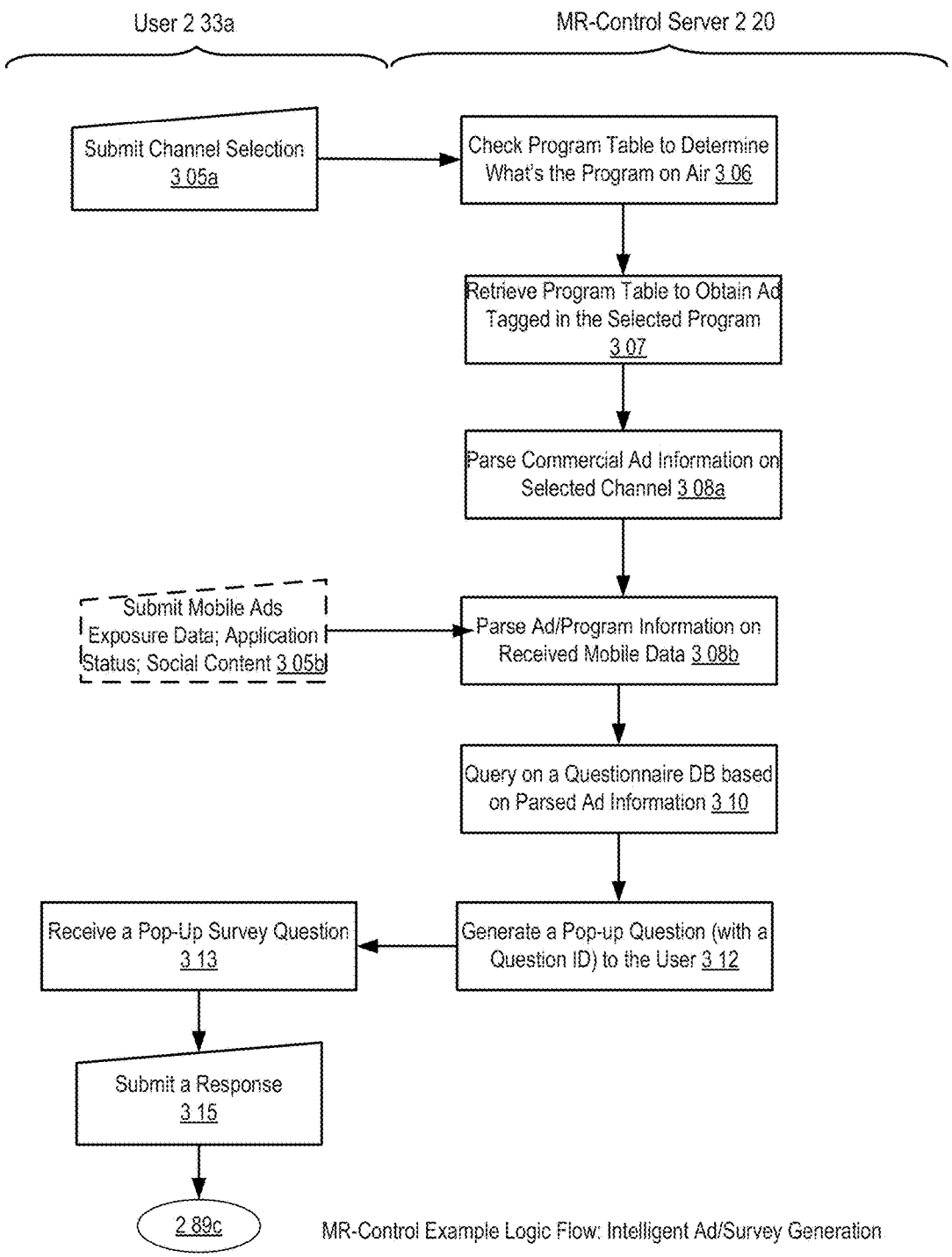

FIG. 3B provides a logic flow diagram illustrating generating a survey question within embodiments of the MR-Control. Within embodiments, upon user submitting a channel selection 305, the MR-Control server may check program table to determine what's on air on the selected channel 306, and retrieve a program table to obtain ads tagged in the selected TV program 307.

In one implementation, the MR-Control may parse commercial ad information on the selected channel 308a, to extract key terms. For example, in one implementation, the MR-Control may retrieve the advertised product brand name, product name, category, etc. In one implementation, the MR-Control may query on a questionnaire database based on the parsed ad key terms 310. For example, for an "Audi" commercial, the MR-Control may parse key terms as "Audi," "car," "automobile," and select and generate pop-up questions related to such key terms to the user 312.

In another implementation, the MR-Control may incorporate a variety of user media content exposure data to generate media content based survey questions 308b. For example, MR-Control may incorporate mobile ads exposure data (e.g., user web visits, MR-Control generated mobile ads, etc.), user application status (e.g., browsing history, Internet gaming content, etc.), social content (e.g., social pages, social ads, friends' recommendations, user' likes, etc.) 305b, and/or the like. In one implementation, the MR-Control may receive the various user content exposure data from a MR-Control client component instantiated on the user mobile device, e.g., an iPhone app, etc. In another implementation, the MR-Control may receive mobile data from a mobile meter, a proxy server, a TV metering system, and/or the like.

In one implementation, the MR-Control may generate synchronized pop-up survey questions to the user. For example, in one implementation, the MR-Control may analyze the ad tags prior to the TV program on air, and prepare pop-up questions associated with each ad tag. The generated pop-up questions may be sent to the user according to the timetable of the ad tags. In another implementation, the MR-Control may retrieve the user's viewing history, e.g., the TV programs the user has recently watched, etc., and determine the ads associated with the TV programs the user has watched to generate non-synchronized pop-up survey questions.

Upon receiving the pop-up survey question 313, the user may elect to submit a response 315, which may indicate ad effects. In further implementations, the survey questions may be generated based on advertisement the user has exposed to (e.g., via cross-channel ad measurement, as further illustrated in FIG. 7E), social media contents, and/or the like.

FIG. 3C provides a logic flow diagram illustrating generating product placement ads within embodiments of the MR-Control. In one implementation, continuing on with retrieving ad tags in the TV program on air on the user selected channel 307, the MR-Control server may query on what ads are available 328 in an ad database. For example, the MR-Control may obtain a list of ad tags and it associated types, whether a screen shot for product placement is available, etc. In one implementation, if there is a synchronized ad tag 330, the MR-Control may prepare synchronized ad generation prior to the timestamp of the ad tag 333. In one implementation, MR-Control may determine an ad type 335, e.g., whether it is static ad or interactive ad. In one implementation, if it is a static ad, the MR-Control may select a static ad template and populate the product information into the template, and provide a textual pop-up ad at a synchronized time 340 to the user. In another implementation, if the ad tag indicates an interactive ad is available, MR-Control may retrieve a tagged screenshot associated with the interactive ad tag. For another implementation, the MR-Control may generate a video frame grab comprising the product placement tags 338 via video frame grabbing software (e.g., Windows Media Player, Quicktime Player, etc.). In one implementation, the MR-Control may retrieve an interactive ad template and populate the video frame into the template to provide the interactive ad (e.g., see FIG. 7G) at a synchronized time 342 to the user.

In one implementation, if the TV program at the user submitted channel contains no synchronized ad tags 330, the MR-Control may elect not to send ads/questions to the user. In another implementation, the MR-Control may retrieve user's recent viewing history (e.g., the past week, etc.), and generate a non-synchronized ad/survey question to the user based on the user's recently viewed TV programs. In further implementations, the MR-Control may re-send ads that were synchronized with one of user's recently viewed TV programs to the user.

In further implementations, the synchronized product placement ads may be applied to in-game ads in a similar manner. For example, the MR-Control may determine a user is engaging in a gaming application via the received device application event (e.g., 241 in FIG. 2B), and deliver an interactive advertisement of related virtual goods, e.g., gaming points, widget, etc., to the user mobile device.

Figure 3D:
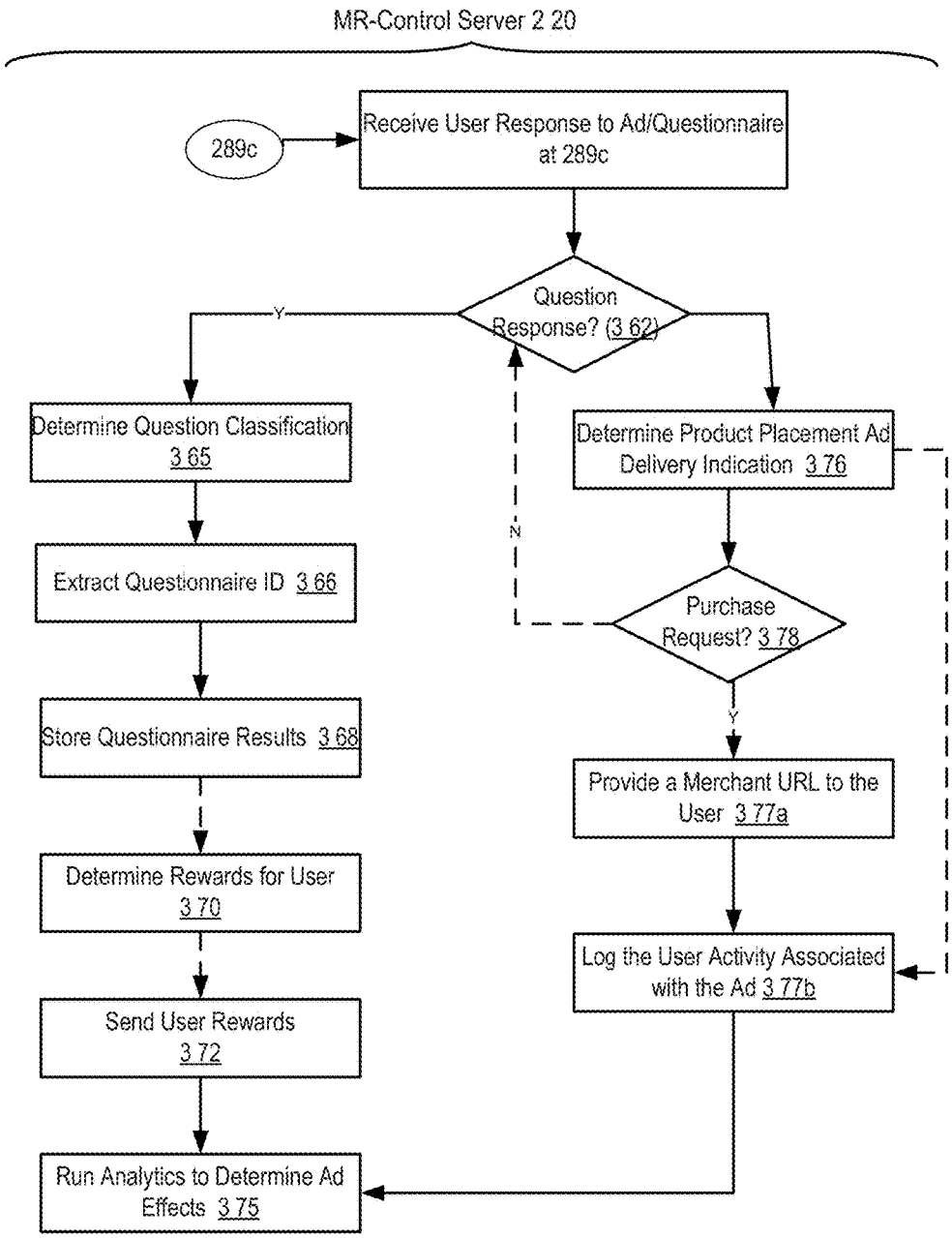

FIG. 3D shows a logic flow diagram illustrating ad synchronization question message processing (e.g., 289c) within embodiments of the MR-Control. Within embodiments, upon receiving a message from a user and determining the type of the message as an ad/question response 289c, the MR-Control may determine whether the received message comprise a response to a survey question 362.

In another implementation, if the received message comprises responses to prompt questions 362, the MR-Control may determine a classification of the question 365, e.g., a response to survey, a response to embedded advertisement, and/or the like. In another implementation, the question responses may be classified by the products, e.g., automobiles, apparels, electronics, and/or the like. In one implementation, the MR-Control may extract a questionnaire ID and/or a survey ID 366 from the received user response, and store the questionnaire results 368 associated matched with the questionnaire based on an ID query.

In a further implementation, the user who responds to questionnaires may be credited for a reward. For example, after obtaining and storing questionnaire results, the MR-Control may determine rewards for the user 370, e.g., five MR-Control points for each question answered, etc., and credit the points to the user's MR-Control account 372. In another implementations, the rewards may comprise virtual currency (e.g., store points, gaming points, etc.), coupons, discounts, and/or the like, sponsored by an advertising merchant.

In another implementation, when the MR-Control determines the response does not comprise a response to a survey question at 362, the MR-Control may determine whether it comprises an interactive activity indication 376. For example, a user may submit a rating of the product with the interactive ad, click on the interactive ad, and/or the like. In one implementation, if the user submits a purchase request 378, the MR-Control may provide a merchant URL, and/or direct the user to a merchant page to proceed with purchase transaction 377a. The MR-Control may log user activities associated with the product placement advertisement 377b, e.g., with an ad ID, etc.

Figure 3E:
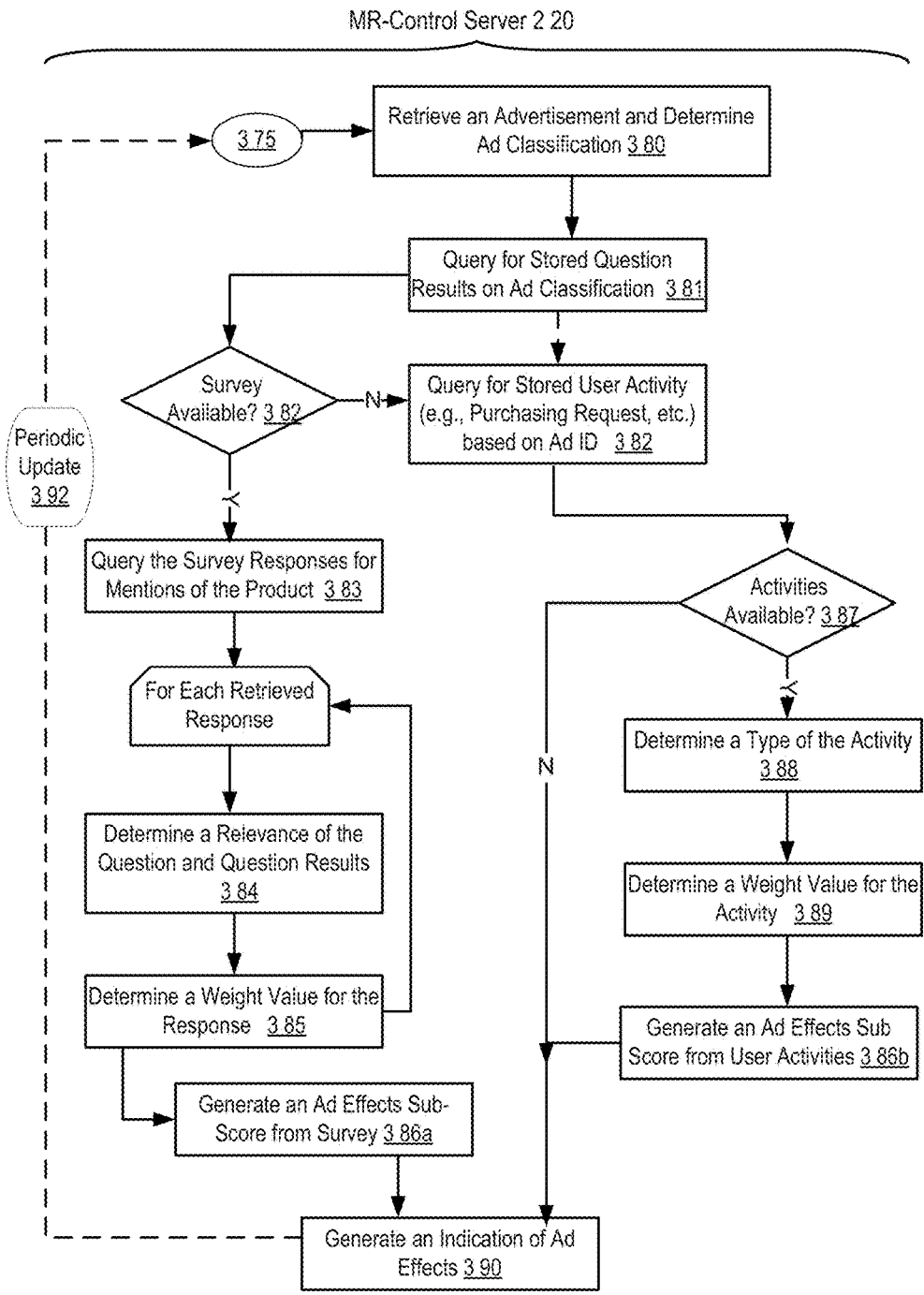

In one implementation, the MR-Control may aggregate data analysis results from all different types of messages received from the user and run aggregate analytics 375 for ad effects. FIG. 3E provides a logic flow diagram illustrating ad delivery/effects analysis within embodiments of the MR-Control. For example, in one implementation, MR-Control may obtain a correlation of an advertisement and user perception of the product, based on responses to the survey question (e.g., if a user selects "Audi" in an automobile survey, after viewing an "Audi" advertisement, etc.). In further implementation, MR-Control may generate an ad effect score for each advertisement.

In one implementation, MR-Control may retrieve an advertisement and determine an ad classification 380, e.g., a category of the advertised product (e.g., apparel, accessories, automobile, electronics, etc.). For example, for an "Audi" advertisement, the MR-Control may query for stored questions (e.g., 368 in FIG. 3D) results with the ad classification "automobile" 381. If such survey responses are available 382, the MR-Control may query the retrieved survey responses for mentions of the product 383, e.g., on a brand name "Audi," on a make and model of the "Audi" automobile, etc. For each response, the MR-Control may determine a relevance of the question and question results 382. For example, the MR-Control may retrieve the corresponding question with the question results based on a question ID (e.g., stored at 366 in FIG. 3E), and perform text analytics to determine a relevance level of the question to the brand name product "Audi" automobile (e.g., based on whether the question contains key terms such as "preference," "car purchase," etc.). In one implementation, the MR-Control may determine an ad effect weight value for the response 385. For example, the MR-Control may perform text analytics of the question and questions results, and if the textual question/question results contain key terms such as "car purchase" and "Audi," such response may be accorded with a high weight value. In one implementation, the weighting value determination at 385 may be based on a pre-stored weight evaluation table, e.g., 0.5 for submitting a response of "Audi," 0.8 for clicking on a merchant site, 50.0 for transacting a sale on an "Audi" automobile," etc., and calculate an impact score of the advertisement based on a group of users (e.g., see 1019I at FIG. 10). The MR-Control may generate an ad effect sub-score based on analytics of user survey responses 386a, e.g., taking a weighted sum, etc.

In another implementation, the MR-Control may query for stored user activities (e.g., stored at 377b in FIG. 3D) in response to an ad (e.g., purchasing request, click for more information, etc.) base on an ad ID 382. If such activities are available 387, the MR-Control may determine a type of the activity 388, e.g., clicks on the ad for more information, clicks on a provided merchant URL, user rating of the advertised product, clicks on "Buy It Now," closing the ad without browsing, and/or the like. Based on the activity type, the MR-Control may associate a weight value for the activity 389, and generate an ad effect sub-score based on analytics of user activities 386b, e.g., taking a weighted sum, etc. For example, a click on a merchant URL may be accorded with a high positive weight value; and a prompt window close of the ad may be accorded with a low or zero weight value, and/or the like. In one implementation, the MR-Control may generate an indication of ad effects 390 based on an integrated ad effects score (e.g., taking a sum of the subscores from 386a and 387b, etc.).

In one implementation, MR-Control may compare the ad effects score of the same ad on different media channel, to determine efficiency of the ad placement. For example, if the same "Audi" ad has a higher impact score on channel "ESPN" than "Disney," it may provide heuristics to the merchant that such advertisement is more efficient on "ESPN." In further implementations, MR-Control may determine efficiency of the time and the TV program to place the advertisement based on the ad effects score.

Figure 4A:
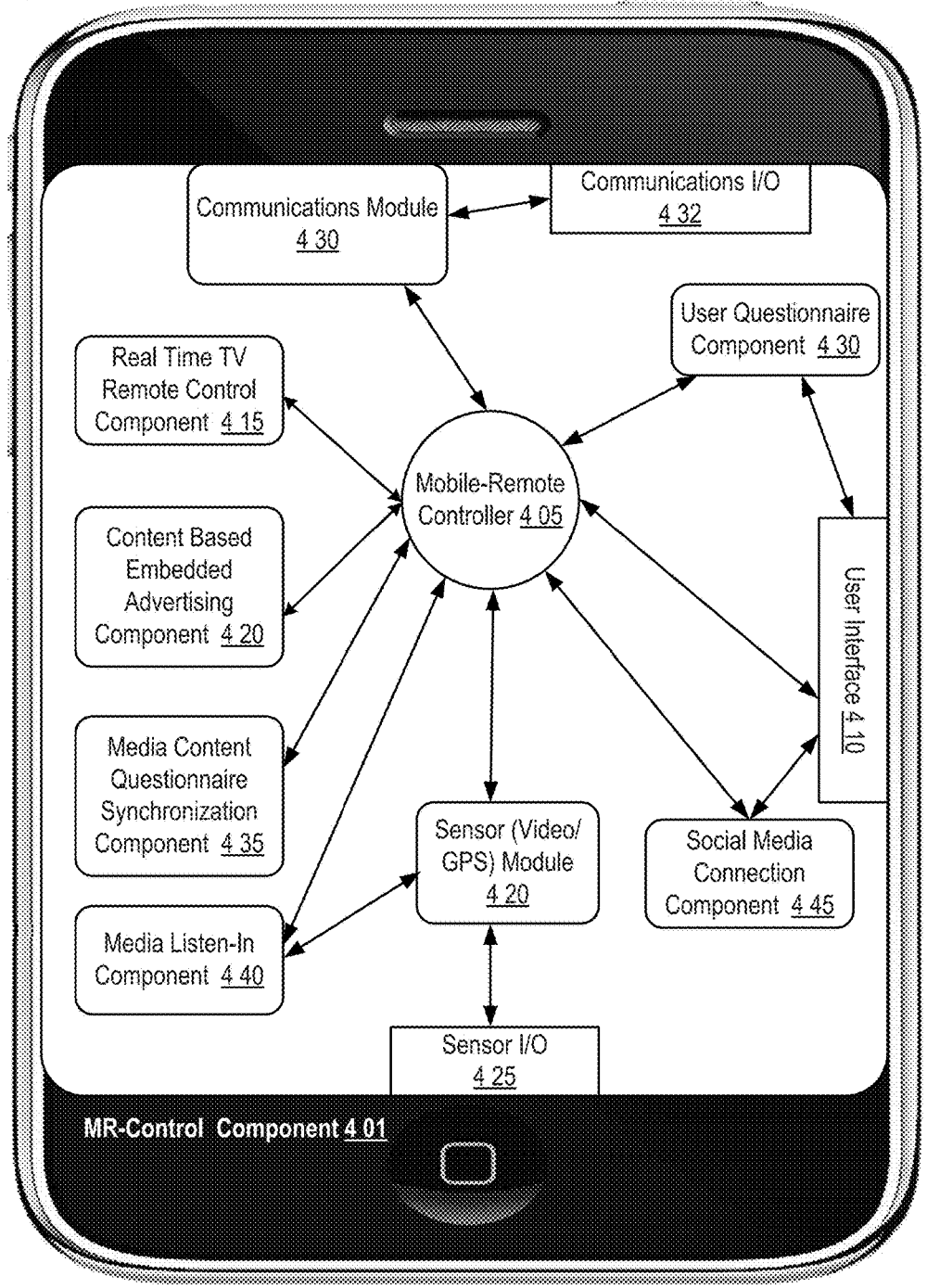
FIG. 4A provides a block diagram illustrating a client mobile component within embodiments of MR-Control.

FIG. 4A provides a block diagram illustrating a MR-Control client component 401 within embodiments of the MR-Control. Within embodiments, a MR-Control component 401 may contain a number of sub-components and/or data stores. A MR-Control client controller 405 may serve a central role in some embodiments of MR-Control operation, serving to orchestrate the reception, generation, and distribution of data and/or instructions to, from and between client mobile device(s) and/or the server via MR-Control components and in some instances mediating communications with external entities and systems.

In one embodiment, the MR-Control controller 405 and/or the different components may be instantiated on a user mobile device, e.g., an Apple iPhone, etc. In an alternative embodiment, the controller may be housed separately from other components and/or databases within the MR-Control system, while in another embodiment, some or all of the other modules and/or databases may be housed within and/or configured as part of the MR-Control controller. Further detail regarding implementations of MR-Control controller operations, modules, and databases is provided below.

In one embodiment, the MR-Control controller 405 may be coupled to one or more interface components and/or modules. In one embodiment, the MR-Control Controller may be coupled to a user interface (UI) 410. The user interface 410 may be configured to receive user inputs and display application states and/or other outputs. The UI may, for example, allow a user to adjust MR-Control system settings, select communication methods and/or protocols, manually enter texts, engage mobile device application features, and/or the like. In one implementation, the user interface 410 may include, but not limited to devices such as, keyboard(s), mouse, stylus(es), touch screen(s), digital display(s), and/or the like. In another implementation, the user questionnaire component 430 may provide user survey questions and receive user responses via the user interface 410.

In one implementation, the MR-Control Controller 405 may further be coupled to a sensor module 420, configured to interface with and/or process signals from sensor input/output (I/O) components 425. The sensor I/O components 425 may be configured to obtain information of environmental conditions, and/or the like to generate atmospherics data that may be received and/or processed by other MR-Control components. A wide variety of different sensors may be compatible with MR-Control operation and may be integrated with sensor I/O components 425, such as but not limited to a camera, an audio recorder, a GPS component, and/or the like, configured to capture video clips/photos of what is playing on the TV and/or whether the user is watching the program, audio recording clips indicative of what is playing on the TV, GPS information indicative of the user's location, and/or the like. In one implementation, the Media Listen-In Component 440 may configure, aggregate and packetize atmospherics data captured by the sensor module component 420 in a data format suitable for data transmission via the sensor I/O 425. In a further implementation, the Media Listen-In Component 440 may process and analyze the obtained atmospherics data, e.g., a photo captured by the mobile device, etc., to identify whether the user is watching, and/or how many individuals are watching from the photo, via image processing. For example, in one embodiment, the iPhone SDK toolkit and/or runtime libraries may be installed and/or used to perform such image processing.

In one embodiment, the MR-Control Controller 405 may further be coupled to a communications module 430, configured to interface with and/or process data transmission from communications I/O components 435. The communications I/O components 435 may comprise components facilitating transmission of electronic communications via a variety of different communication protocols and/or formats as coordinated with and/or by the communications module 430. Communication I/O components 440 may, for example, contain ports, slots, antennas, amplifiers, and/or the like to facilitate transmission of TV program listing information, user submission of channel selection, user responses to survey questions, and/or the like, via any of the aforementioned methods. Communication protocols and/or formats for which the communications module 230 and/or communications I/O components 435 may be compatible may include, but are not limited to, GSM, GPRS, W-CDMA, CDMA, CDMA2000, HSDPA, Ethernet, WiFi, Bluetooth, USB, and/or the like. In various implementations, the communication I/O 435 may, for example, serve to configure data into application, transport, network, media access control, and/or physical layer formats in accordance with a network transmission protocol, such as, but not limited to FTP, TCP/IP, SMTP, Short Message Peer-to-Peer (SMPP) and/or the like. The communications module 430 and communications I/O 435 may further be configurable to implement and/or translate Wireless Application Protocol (WAP), VoIP and/or the like data formats and/or protocols. The communications I/O 435 may further house one or more ports, jacks, antennas, and/or the like to facilitate wired and/or wireless communications with and/or within the MR-Control system. For example, the communication I/O 432 may be extended by a plug-in accessory as shown at 120 in FIG. 1.

Numerous data transfer protocols may also be employed as MR-Control connections, for example, TCP/IP and/or higher protocols such as HTTP post, FTP put commands, and/or the like. In one implementation, the communications module 430 may comprise web server software equipped to configure application state data for publication on the World Wide Web. Published application state data may, in one implementation, be represented as an integrated video, animation, rich internet application, and/or the like configured in accordance with a multimedia plug-in such as Adobe Flash. In another implementation, the communications module 430 may comprise remote access software, such as Citrix, Virtual Network Computing (VNC), and/or the like equipped to configure user application (e.g., a user mobile device). In another implementation, the communications module 430 may transmit TV program listing information to the real time TV remote control component 415, which may in turn receives user channel selection form the user interface 410.

In further implementations, the MR-Control 405 may be configured to communicate with a content based embedded advertising component 420, media content questionnaire synchronization component 435, and/or the like (as further discussed in FIGS. 3B and 3C).

Figure 4B:
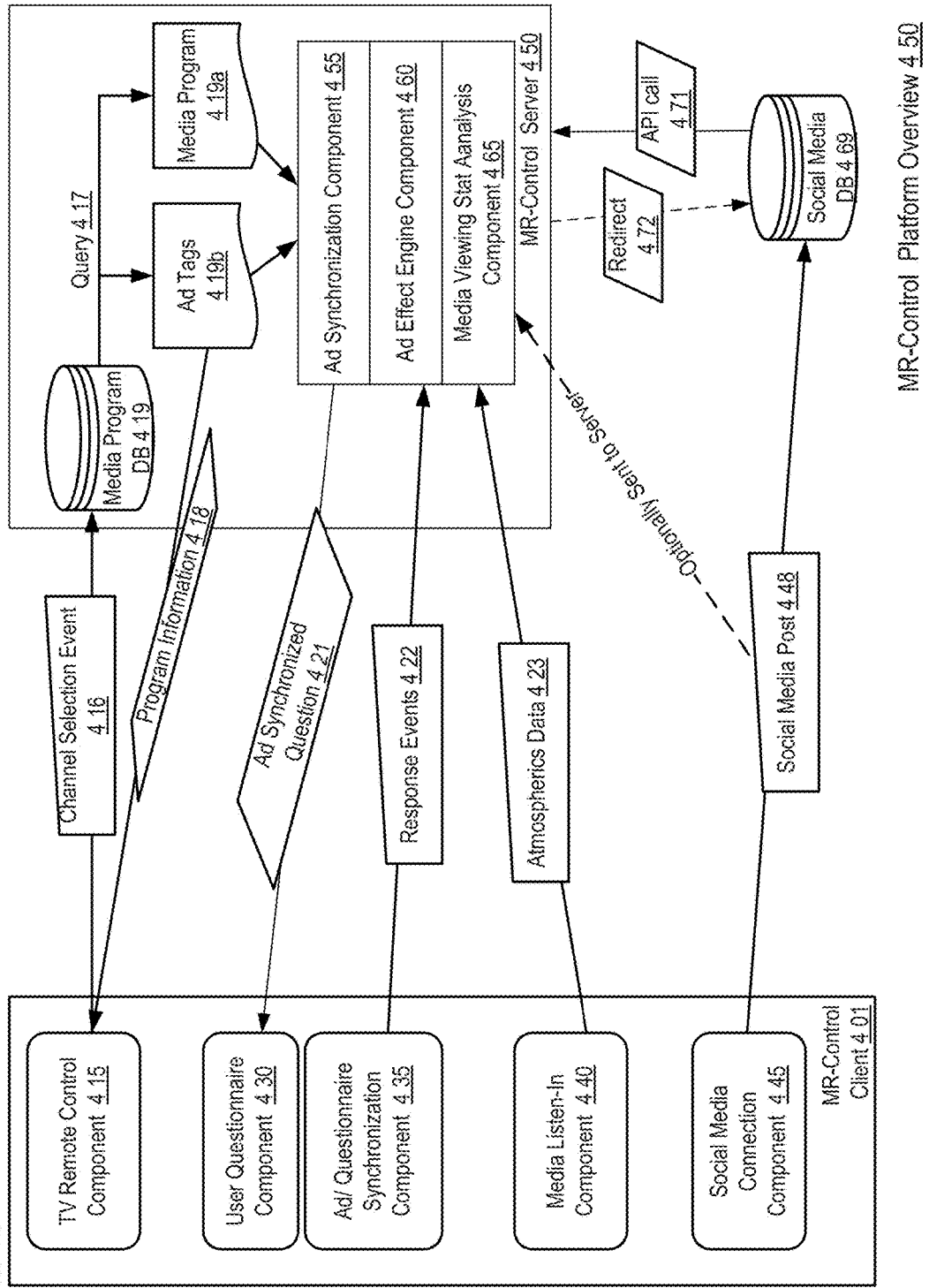
FIG. 4B provides a combined data flow and logic flow diagram illustrating client-server interaction within embodiments of MR-Control.
Figure 4C:
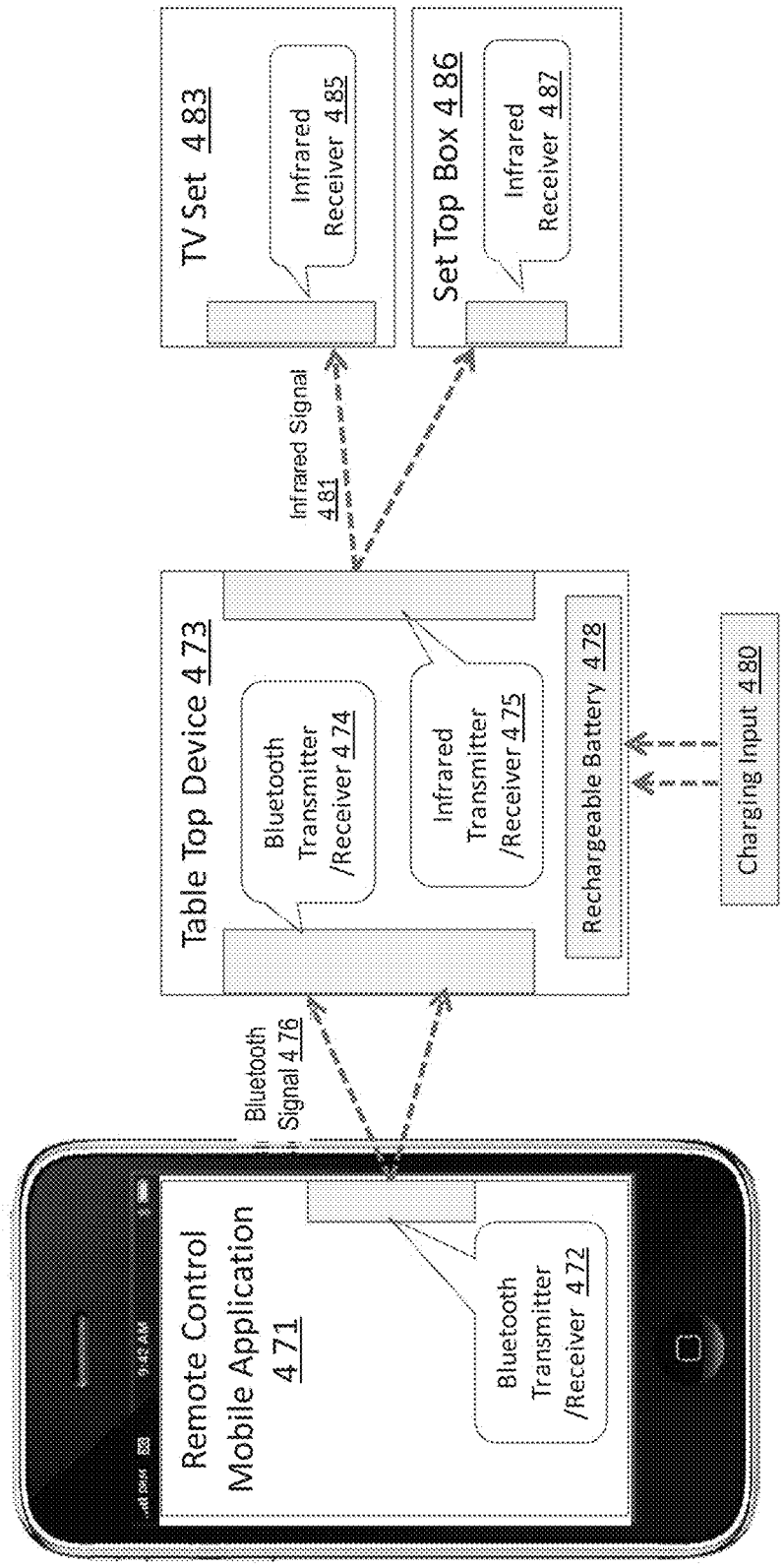
FIG. 4C provides a block diagram illustrating MR-Control table top unit infrastructure within embodiments of MR-Control.

FIG. 4B provides a combined logic and data flow diagram illustrating MR-Control client and server interactions within embodiment of the MR-Control. In one embodiment, the TV remote control component 415 may submit a channel selection event 416 to the MR-Control server 450, which may in turn query a media program database 419 for TV program information. For example, in one implementation, the MR-Control server 450 may form a first query 417 on a media program table 419a based on the user's channel selection, to determine the TV program the user is watching and send such program information 418 back to the user; and a second query on an Ad Tags table 419b to determine what advertisement and embedded product placement advertisement the user may received during the TV program streaming. The queried results, including the program information and ad information, may be fed into an Ad synchronization component 455 at the MR-Control server 450, which may generate ad synchronization popup questions 421 based on the ad the user may be watching.

In one implementation, the generated ad synchronization questions 421 may be received and provided to the user via a user interface generated by the user questionnaire component 430 on the user's mobile device, which may in turn provide user's response events 422 to an Ad effect engine component 460 at the MR-PLATOFRM server 450 to analyze advertisement effects.

In one embodiment, the media listen-in component 440 may collect and aggregate atmospherics data 423, e.g., video recording clips, audio recording clips, photo streams, GPS information, and/or the like, to a media viewing statistics analysis component 465, which may analyze the media viewing data, and determine the audience reception rate of a TV program and/or advertisement.

In a further implementation, the social media connection component 445 may generate and transmit social media post 448 indicating the user's viewing status to a social media database 469, and may optionally send the social media post to the MR-Control 450 as well. In one implementation, the MR-Control server 450 may obtain the user's social media status updates information, including friends' recommendations, comments, and/or the like via an API call 471 to the social media database 469. In another implementation, the MR-Control server 450 may redirect a user to the social media website 472 from the user's instantiated MR-Control client component to engage in social media activities. For example, the user may click on a social media link via the MR-Control client component user interface and be redirected to the social media page.

FIG. 4C provides a block diagram illustrating an example infrastructure of a MR-Control table top unit component within implementations of the MR-Control. Within implementations, the table top device 473 may be a standalone device that may be placed on a desk, wherein the user may be requested to place it to face the screen of a TV set or the TV STB. In one implementation, the table top device 473 may communicate with a user mobile device, a laptop computer, a desktop computer, and/or the like, via a Bluetooth transmitter/receiver interface 472-474. In one implementation via Bluetooth connection 476. a user may download and install a remote control mobile application 471. In another implementation, the table top device 473 may communicate with a TV set 483, a set top box 486, DVR equipment, and/or the like, via infrared transmitter/receiver interfaces 475, 485/487 via infrared connection 481. In one implementation, the table top device 473 may comprise a rechargeable battery 478 for power supplies from charging inputs 480.

The table top device 473 may facilitate mobile remote control to operate in a similar manner as the MR-Control accessory 1120 in FIG. 1B. Instead of being plugged into a user mobile device, the table top device 473 may communicate with a user device running the remote mobile application 471 via wireless connections. For example, the table top device may be operated for remote TV channel control, collecting atmospherics data for audience monitoring, and/or the like. In further implementations, the table top device may be positioned so that the table top device may capture images from the screen of the TV set.

In one implementation, the table top device may be configured to periodically monitor audio contents, video contents, etc., in the atmosphere, with or without having user input of a channel selection. For example, the table top device may record an audio/video clip of media program being played, and send such audio/video clip (or generate a signature/hash based on sampling of the recorded audio/video media content) to the MR-Control server, which may in turn determine what the user is watching. Further implementations are discussed in FIG. 2E.

Figure 5A:
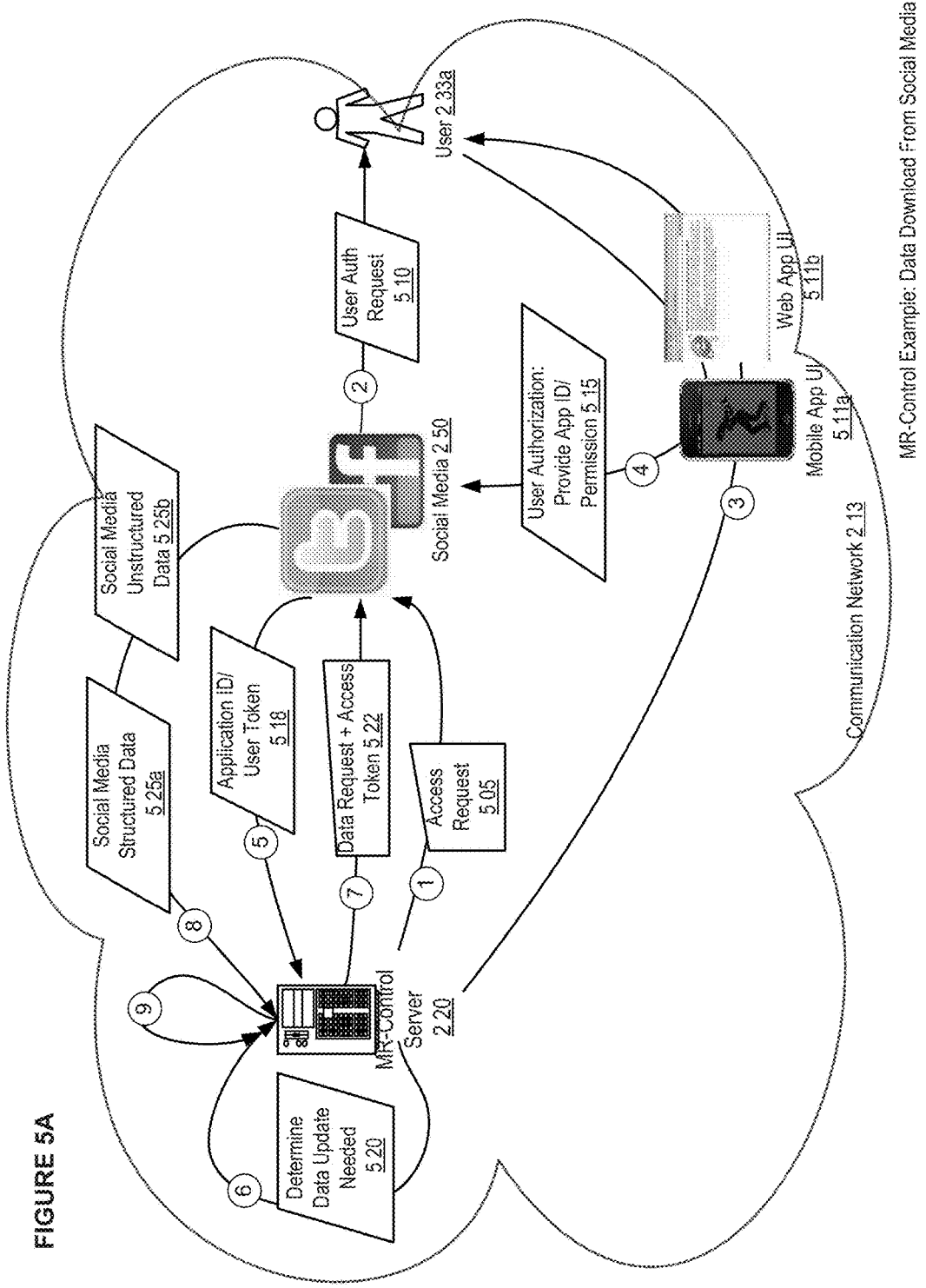
FIG. 5A provides a data flow diagram illustrating data downloading from social media within embodiments of MR-Control.
Figure 5B:
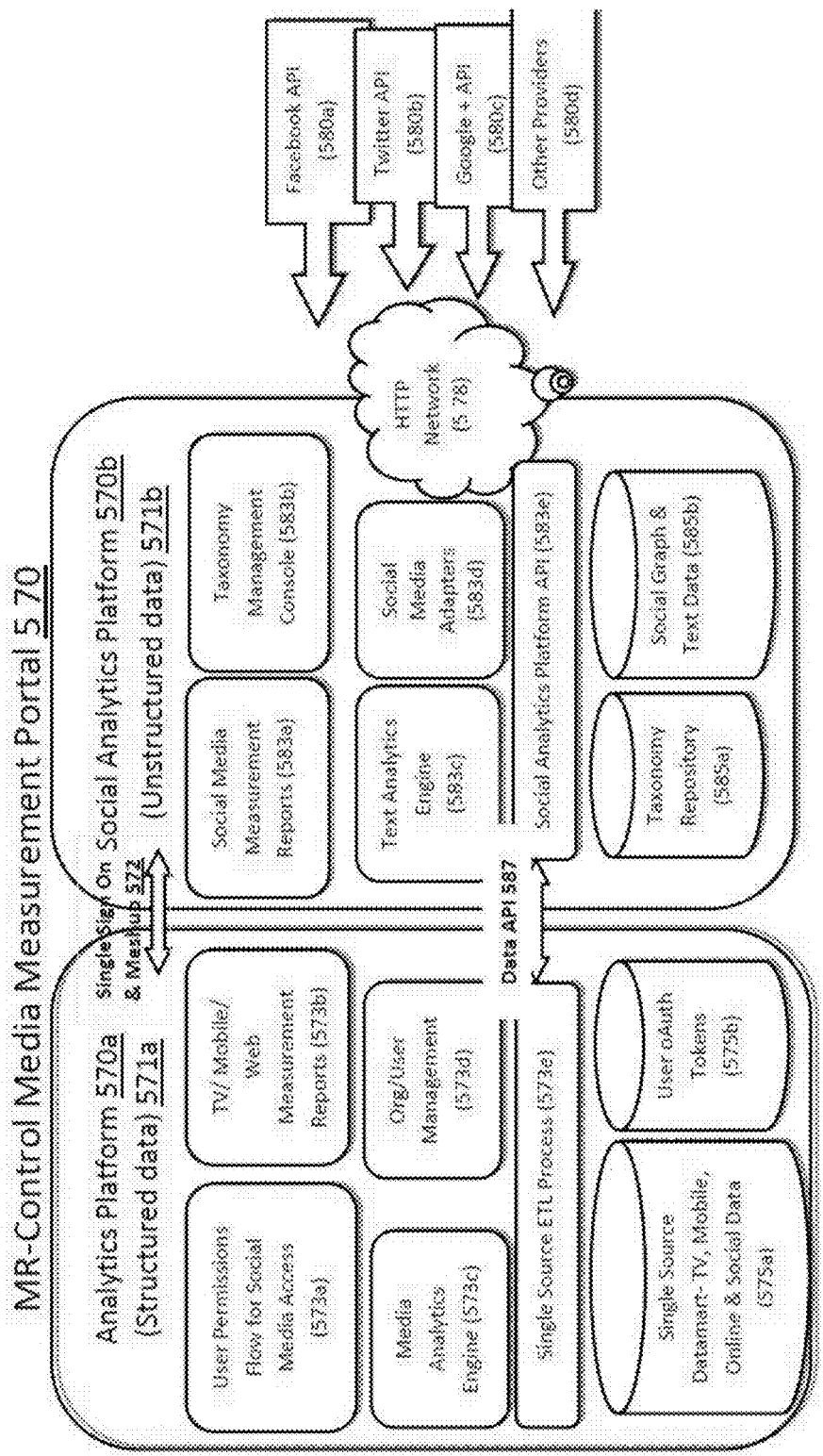
FIG. 5B provides a block diagram illustrating infrastructure of a media measurement portal within embodiments of MR-Control.

FIGS. 5A-5B provide combined data flow and logic flow diagrams illustrating data downloads from social media platforms within implementations of the MR-Control. Within implementations, MR-Control may obtain social media data to measure, and/or influence consumer consumption of media and advertising. For example, MR-Control may track social media discussion to obtain comments, mentions, responses related to an object under evaluation (e.g., a brand name product, a TV show, etc.). In one implementation, a user may befriend with panelists to "Friend" on Facebook, and/or allow a panelist on Twitter, wherein the panelist may be a MR-Control personnel, and/or an avatar, etc. The MR-Control may then obtain users' conversations, wall posts, pages of brands/products the user follows, products/content the user "like", social advertising the user has been exposed to, clicks on pages, etc., to obtain social media exposure data. In one implementation, the MR-Control may incorporate comments of representative panelists, identification of friends across panel, social activities profiling of panel, and/or the like.

In a further implementation, the MR-Control may track social media content (e.g., Facebook and Twitter, etc.) of MR-Control consumers, e.g., users who has authorized MR-Control to access their social media content. In one implementation, the MR-Control may link demographic, behavioral, and attitudinal data from the user's profile information with social media behavior. The social media data downloading may be obtained via API calls, as discussed in FIGS. 5A-5B.

In a further implementation, the MR-Control may recruit consumers (e.g., Facebook, Twitter users who have allow MR-Control to access their social content) as MR-Control panelists, e.g., by providing incentive rewards to the users, etc. In one implementation, the MR-Control may track how social media messages propagate throughout a network of social media users (e.g., the recruited panelists, etc.), based on the profiles of the individuals. Such measures of connectivity may be analyzed to measure propagation of marketing communications.

In another implementation, each panelist may be associated with a social media specific profile so that their social media activities may be tracked to determine whether they are influencers in certain categories, disseminators of information, information consumers, and/or the like. For example, in one implementation, a panelist may be labeled as a "The Big Bang Theory Fan Wiki," so that users interested in the show "The Big Bang Theory" may follow the panelist to obtain information of the show via the panelist's posts, comments, and/or the like, related to "The Big Bang Theory."

In one implementation, individual social media profiles may be incorporated to assess advertising targeting performance, enable advertisers to plan social media campaigns by targeting product influencers, and/or the like.

As shown in FIG. 5A, MR-Control server 220 may send an access request to a social media platform (e.g., Facebook, Twitter, Google+, etc.) for access to a user's profile information and social media content, e.g., news feeds, posted photos, Tweets, comments, activities ("Likes," "Dislikes," etc.).

Figure 8A:
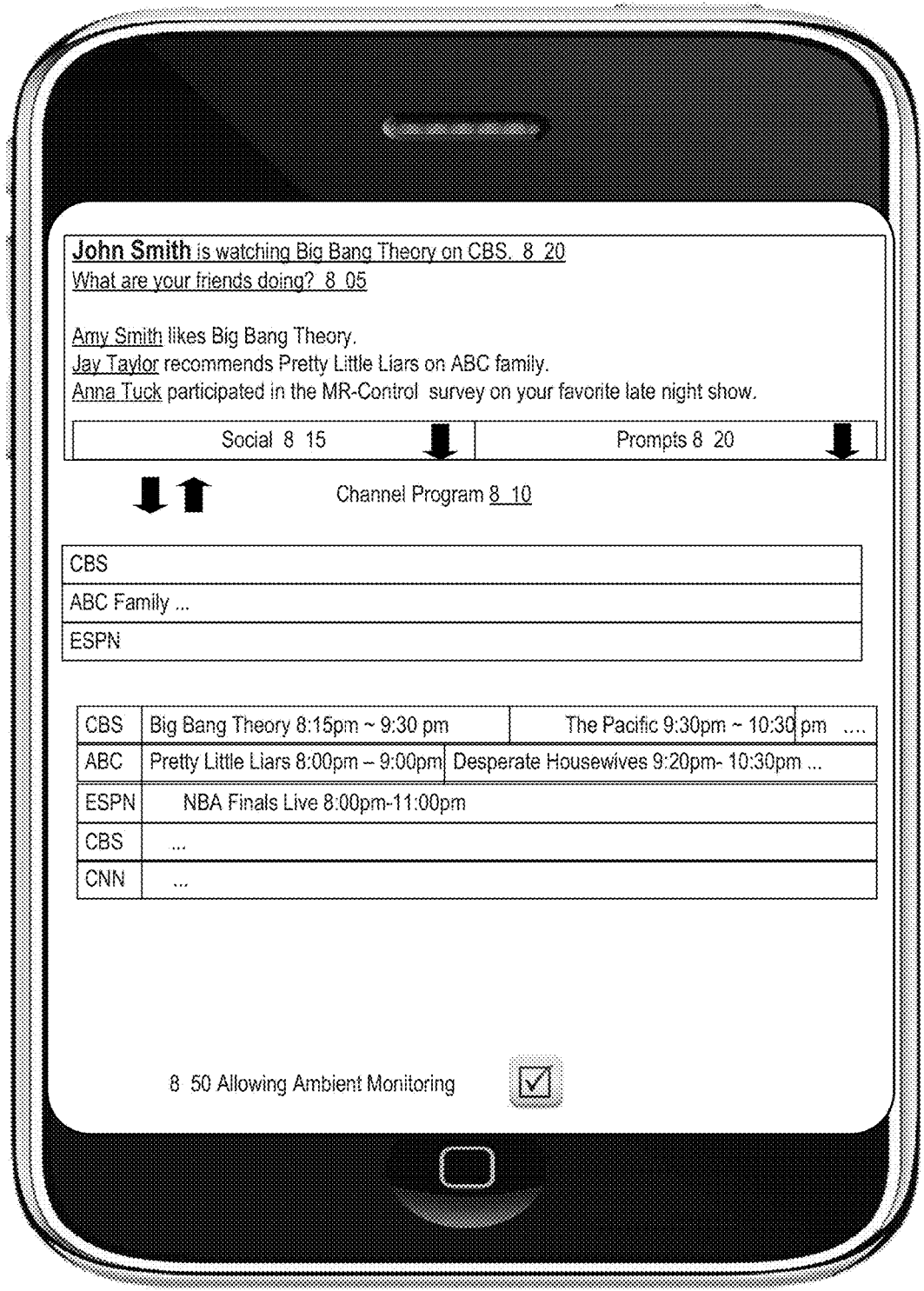

In one implementation, upon receiving the access request 505, the social media 250 may generate and send a user authorization request 510 to the user 233a. For example, Facebook and/or Twitter may send an email to the user 233a, wherein the email may comprise an authorization link directing the user to a MR-Control authorization page (e.g., as included in the access request 505). In one implementation, the user 233a may be access the included authorization link via a mobile application UI 511a (e.g., see FIG. 8A), and/or a web based application UI 511b (e.g., see FIG. 8B). As shown in FIG. 8A, the user may click "Allow" to grant permission of MR-Control to access the user's social media content. In further implementation, as shown at 827 in FIG. 8C, the user may configure a scope of information the MR-Control may be allowed to access.

For example, in one implementation, the user's mobile application and/or a web-based application may generate a (Secure) HTTPS PUT authorization message including an application ID and permission indication for the social media platform in the form of data formatted according to the XML. Below is an example HTTP(S) PUT message including the XML-formatted access authorization message provide to Facebook:

```
PUT /AccessRequest.php HTTP/1.1
Host: 172.16.244.1
Destination: www.Faceobook.com
Content-Type: Application/XML
Content-Length: 518
<?XML version = "1.0" encoding = "UTF-8"?>
<Authorization>
    <AuthID> 00001 </AuthID>
    <Time> 0:00:00 >/Time>
    <Date> 1-12-XXXX </Date>
    <UserID> JDOE <UserID>
    <AppID> Mobile0001 </AppID>
    <Permission> Yes </Permission>
    <scope> /* Name of Permission elements like User Age, Friends,
Messages, Likes etc that MR-Control application may have access to*/
        <UserProfile>
            <UserName> Yes </UserName>
            <UserAge> Yes <UserAge>
            <UserDOB> Yes </UserDOB>
            <Work> Yes </Work>
            <Education> Yes </Education>
            <Pages> Yes <Pages>
            <Network> Yes </Network>
            ...
        </UserProfile>
        <Friends>
            <Number> Yes </Number>
            <FriendsList> No </FriendsList>
            ...
        </Friends>
        <Activities>
            <PostsonWallSelf> Yes <PostsonWallSelf>
            <PostsonFriedsWall> No <PostsonFriendsWall>
            <OthersWallComments> No <OthersWallComments>
            ...
        </Activities>
        ...
    </scope>
..
</Authorization>
```

In the above example, the authorization message to Facebook may comprise information as to the scope of information access, e.g., the user may permit MR-Control to access the user "JDOE's" Facebook profile including his name, age, date of birth, work an education information, interested pages, network, and/or the like; a number of friends of "JDOE," but may not access an exact friends list. The user may allow MR-Control to obtain "JDOE's" posts on his own wall, but may not permit access to his posts on his friends' wall or friends' comments on his wall, and/or the like.

In one implementation, the social media 250 may pass on the application ID from the user's mobile or web application and generate a user token 518 to MR-Control for confirmation of access permission. In one implementation, the MR-Control may determine when data update is needed 520, e.g., the data update from social media may be performed on a periodic basis (e.g., daily, weekly, etc.). The MR-Control server 220 may generate a data request 522 together with the received user authorization token (e.g., 518) and transmit to the social media platform.

In one implementation, the data request 522 may be sent to the social media platform via a user oAuth protocol, and comprise a MR-Control application ID, and/or a user social media ID, and/or the like. For example, in one implementation, the MR-Control server 220 may provide a (Secure) HTTPS PUT message including a data request 522 for Facebook in the form of data formatted according to the XML. Below is an example HTTP(S) PUT message including the XML-formatted access request provide to Facebook:

```
PUT /AccessRequest.php HTTP/1.1
Host: www.MR-Control.com
Destination: www.Faceobook.com
Content-Type: Application/XML
Content-Length: 518
<?XML version = "1.0" encoding = "UTF-8"?>
<Request>
    <RequestID> 000001 </RequestID>
    <TimeStamp> 00:00:00 </TimeStamp>
    <Destination>www.Facebook.com </Destination>
    <UserID> JDOE </UserID>
    <ClientID> cccccccc </ClientID> /* MR-Control Mobile Remote
Application Id or web-based MR-Control Panel management App Id
obtained after
registering the application with Facebook*/
    <RedirectURL> www.MR-Control.com/user?8989898988.com
    </RedirectURL>
    /* MR-Control application URL where the user may be redirected
    after
authorization*/
    <Content> /* Name of Permission elements like User Age, Friends,
Messages, Likes etc that MR-Control application may have access to*/
        <UserProfile>
            <UserName> Yes </UserName>
            <UserAge> Yes <UserAge>
            <UserDOB> Yes </UserDOB>
            <Work> Yes </Work>
            <Education> Yes </Education>
            <Pages> Yes <Pages>
            <Network> Yes </Network>
            ...
        </UserProfile>
        <Friends>
            <Number> Yes </Number>
            <FriendsList> No </FriendsList>
            ...
        </Friends>
        <Activities>
            <PostsonWallSelf> Yes <PostsonWallSelf>
            <PostsonFriedsWall> No <PostsonFriendsWall>
            <OthersWallComments> No <OthersWallComments>
            ...
        </Activities>
        ...
    </Content>
    ...
</Request>
```

In the above example, the data request generated by MR-Control to Facebook may comprise a user ID "JDOE" indicating the request is directed to Facebook information of the user "JDOE"; a client ID indicating the application (e.g., the MR-Control mobile application ID, etc.) indicating a source of the request; and a URL link which may be provided to the user for authorization, e.g., a link that requests the user to click a "OK" or "Cancel" button on the page to authorize or deny MR-Control to gain access to the user's Facebook content. The access request may further comprise information as to the scope of information access, e.g., MR-Control may request to access the user "JDOE's" Facebook profile including his name, age, date of birth, work an education information, interested pages, network, and/or the like. The MR-Control may also request to obtain information of a number of friends of "JDOE," but may not request to access an exact friends list. The MR-Control may further request to obtain "JDOE's" posts on his own wall, but may not request to obtain his posts on his friends' wall or friends' comments on his wall, and/or the like.

For another example, in one implementation, the MR-Control server 220 may provide a (Secure) HTTPS PUT message including a data request 522 for Twitter server in the form of data formatted according to the XML. Below is an example HTTP(S) PUT message including the XML-formatted access request provide to Twitter:

```
PUT /AccessRequest.php HTTP/1.1
Host: www.MR-Control.com
Destination: www.twitter.com
Content-Type: Application/XML
Content-Length: 518
<?XML version = "1.0" encoding = "UTF-8"?>
<Request>
    <RequestID> 000002 </RequestID>
    <TimeStamp> 00:00:01 </TimeStamp>
    <Destination> www.Twitter.com </Destination>
    <UserID> JDOE </UserID>
    <oauth_consumer_key> /* The Consumer Key for MR-Control
    Remote
Application and/or MR-Control panel management obtained after
registering the
application with twitter*/
        NNNNNNN
    </oauth_consumer_key>
    <oauth_signature_method> /*The signature method that the
    consumer
used to sign the request*/
        email
    </oauth_signature_method>
    <oauth_signature> /*The signature as defined in twitter signing
requests>
    electronic
    </oauth_signature>
    <oauth_timestamp> /*Time stamp of authoroization*/
        00:00:02
    </oauth_timestamp>
    <oauth_nonce> /* Unique string to identify each request*/
    .8888ddddd
    </oauth_nonce>
    ...
</Request>
```

In the above example of data request to Twitter, the request may comprise a user signature request. For example, a user may provide electronic signature by clicking on a link (e.g., at 515, etc.) noting "I hereby provide my signature by pressing this button to allow MR-Control access my Twitter content," etc.

In one implementation, upon verification of the data request by Facebook/Twitter/other social media platform, MR-Control server 220 may download social media structured data 525a and unstructured data 525b (e.g., see 571a-b in FIG. 5B) for media analytics.

FIG. 5B shows a block diagram illustrating an example infrastructure map of MR-Control media analytics within embodiments of the MR-Control. In one implementation, MR-Control may provide a media analytics and reporting platform portal 570 for analyzing TV, Internet, mobile and social media data upon client request, e.g., analyzing public feedbacks and comments on a brand name products, TV shows, and/or the like. In one implementation, the media measurement and analytics portal platform 570 may provide class visualization, self service administration with seamless integration between the different architectural components, e.g., 570a and 570b, etc.

In one embodiment, the MR-Control media measurement portal 570 may load data from social networks via a HTTP network 578 via API calls, e.g., Facebook APPI 580a, Twitter API 580b, Google+API 580c, and other social data providers 580d. The media measurement portal 570 may process the loaded data within different analytics platforms 570a/b based on loaded data types, e.g., structured data 571a or unstructured data 571b.

For example, in one implementation, structured data 571a may be already stored in a structured format when loaded from the data source, such as, but not limited to user TV channel selection indication with timestamp, web displaying content with timestamp, social media user profile information, a number of user's social connections (time stamped), a posted photo on social media platform with timestamp, and/or the like. For example, an exemplary XML record of structured Facebook user profile data 571a downloaded from Facebook may take a form similar to the following:

```
PUT /userprofile.php HTTP/1.1
Host: www.MR-Control.com
Content-Type: Application/XML
Content-Length: 718
<?XML version = "1.0" encoding = "UTF-8"?>
<User>
    <UserID> JDoe </UserID>
    <UserFirstName> John <//UserFirstName>
    <UserMI> Null </UserMI>
    <UserLastName> Doe </UserLastName>
    <UserProfilePhoto> Me.JPG </UserProfilePhoto>
    <WorkandEducation>
        <Employers1>
            <EmployerName> Data Inc.<EmpoyerName>
            <StartTime> 2006 </StartTime>
            <EndTime> present </EndTime>
        ...
    </Employers>
    <College> Good University </College>
    <Classyear> 2000 </ClassYear>
    ...
    </WorkandEducation>
    ...
    <Interests>
        <Interests1> Graduate Program </Interests1>
        <Interests2> Cool Cars </Interests2>
    </Interests>
    ...
    <Friends>
        <Number> 82 </Number>
        <List> Lisa Smith; .... </List>
        ...
    </Friends>
    ...
<User>
```

In one implementation, the analytics platform for processing structured data may store the structured data, such as TV channel selection, mobile/web content data, social network user profile data, etc. in a database 575a.

For another example, unstructured data 571b may comprise raw text downloaded from social media platform, e.g., friends' comments from Facebook, original Tweets, etc. In one implementation, MR-Control social analytics platform 570b may perform data mining on unstructured data 571b to measure user feedbacks of a brand name product, TV program, etc. For example, a query may be performed on the unstructured data 571b to determine how many mentions of "The Big Bang Theory" are posted by Facebook users.

For example, in one implementation, an exemplary XML record of unstructured Facebook user message 571b downloaded from Facebook may take a form similar to the following:

```
PUT /usercomments.php HTTP/1.1
Host: www.MR-Control.com
Content-Type: Application/XML
Content-Length: 718
<?XML version = "1.0" encoding = "UTF-8"?>
<SocialMessage>
    <UserID> JDoe </UserID>
    <UserFirstName> John <//UserFirstName>
    <UserMI> Null </UserMI>
    <UserLastName> Doe </UserLastName>
    <MessageID> 00001 </MessageID>
    <Time> 19:00:45 </Time>
    <Date> 09-09-2011 </Date>
```

-continued

```
<SocialType> Like </SocialType>
<Object>
    <Type> Facebook Page </Type>
    <Name> Big Bang Theory </Name>
    <Category> TV </Category>
    <Genre> Comedy </Genre>
    ...
</Object>
<ActivityTime> 14:33:56 </ActivityTime>
<ActivityDate> 09-09-2011 </ActivityDate>
...
</User>
```

For further implementations, the unstructured data 571b may comprise a social post, a social media check-in status, social mentions, and/or the like.

In one implementation, the MR-Control structured data analytics platform comprises a variety of processing components, such as but not limited to user permission component for social media access 573a, TV/mobile/web measurement reports component 573b, media analytics engine 573c, organization/user account management component 573d, single source data extraction, transformation and load (ETL) component 573e, and/or the like. Within implementations, the user permission component may present panel users with a set of user interface screens requesting them to provide permission for MR-Control to access their social content. For example, MR-Control may provide incentives of promotional rewards, points, coupons and/or the like to users during questionnaire distribution (e.g., MR-Control mobile questionnaires 238a, etc) to allow MR-Control access to their social content.

In one implementation, if the user agrees to provide the access to their social content, the permission component 573a may get the authorization token from the respective social platforms (Facebook, twitter etc) as per the authorization protocol and persist the token in a repository 575b. The user permission component 573a may pass the user token and other application authorization details to social analytics platform so that the user's social content can be extracted at a scheduled frequency. For example, MR-Control may periodically, constantly and/or intermittently load social content data from the social media platforms via API calls once authentication is established. Further implementations of user permission flows are discussed in FIGS. 5A-5B.

In one implementation, the media analytics engine 573c may analyze the loaded structured data 573c, e.g., per user profile, per media type, etc. In one implementation, the organization/user management 573d may create and manage user accounts with the MR-Control. In further implementations, the TV/mobile/web measurement reports component 573b may generate media measurement reports (e.g., including audience ratings, ad effectiveness, etc.) based on structured media data, such as audience TV channel selections, mobile/web browsing activities, etc.

In one implementation, the MR-Control unstructured data analytics platform 570b may have a rule to define the specific fields for which the content needs to be extracted for a given user (e.g. user demographics, no of friends, no of messages in a given duration, actual text for message and comments etc). Based on the authentication token the social media analytics platform 570b may query the social platform for the content. In one implementation, the social analytics platform 570b may schedule the query tasks and persist structured and unstructured content that is extracted.

In one implementation, the MR-Control social analytics platform 570b may comprise a variety of processing components, such as but not limited to, social media measurement reports component 583a, taxonomy management console 583b, text analytics engine 583c, social media adapters 583d, social analytics platform API 583e, and/or the like. The social analytics platform API 583e may exchange data via API calls 587 with the single source ETL process component 573e, such as user authorization tokens, and/or the like.

In one implementation, the taxonomy management console 583 b may define taxonomy tags and taxonomy logic rules. For example, the taxonomy may be defined at three different levels: a standard taxonomy specific to an industry and business function as provided by the platform vendor (e.g., tagging a unstructured data record by industry, etc.); taxonomy defined by analyst and subject matter experts (e.g., MR-Control analytics defined taxonomy rules, etc.); and/or taxonomy defined by clients, and/or the like. For example, for a Tweet "Good adaption of the Southern Vampire series. Love the CBS actors/actresses. Expecting the new season" (e.g., 185 in FIG. 1D), the text analytics engine 583c may apply a taxonomy rule to tag it by a hierarchy of tags "TV show->CBS->The Big Bang Theory->Positive Feedback." For another example, the client (e.g., CBS, etc.) may desire to categorize the commented target of the Tweet, and therefore the taxonomy rule may comprise an additional sub-category "actor/actresses," and/or the like. In one implementations, such taxonomy rules may be stored in a repository 585a, and the original social text data and social graph, tagged social data may be stored at 585b. Further implementations and applications of the taxonomy rules are discussed in FIGS. 5E-5F.

In one implementation, the social media measurement reports 583a may provide a user feedback measurement report to a user via UI integration and data visualization. Within implementations, the reporting portal 583a may leverage the web based visual components (e.g. word cloud, traffic light components etc) provided by the social media analytics platform 570 for analysis that deliver insights purely on social media data. In further implementations, for insights generated on combined data set from social and other data sources (e.g., via data mesh-up 572 between the structured data analytics platform 570a and unstructured data analytics platform 570b, etc.) the taxonomy management console 583b may be integrated to an integrated reporting portal to ensure the clients have the self service capability of defining the taxonomy and building the reports. For example, single sign on and UI widget meshup 572 may be adopted between the two platforms 570a and 570b for integration of the two.

In one implementation, the MR-Control media measurement portal 570 may combine structured social media data with other data sources to generate cross media insights. The social media analytics platform 570b may have the API to extract data for predefined metrics and attributes (e.g., taxonomy logics, data tags, etc.). The metrics and attributes may be predefined in the social media analytics tool to compute from the structured and unstructured content extracted from the social media platforms.

In one implementation, the MR-Control media measurement portal 570 may use different platforms for social media reporting and structured data reporting, and have a tight integration at the data and UI layers of both the platforms. Additional implementations of the MR-Control media measurement portal 570 may comprise: out of the box connectors for social media platforms like Facebook, Twitter, Google+, etc (e.g., at 583*e*, etc.); web based taxonomy creation and management user interfaces; industry specific prebuilt taxonomies (e.g., at 583*b*, etc.); text analytics engine with sentiment analysis with learning algorithms (e.g., at 583*c*, etc.); ability to define fields for which social content needs to be extracted (e.g., at 583*c*, etc.); data API calls to extract large data set in and out of the platform in real time and/or in batch mode (e.g., at 583*d*, etc.); data API calls for UI widget integration to create mesh-up (e.g., at 572, etc.); multiple tenant support to ensure taxonomies defined at organization and department level (e.g., at 583*b*, etc.); single sign on support with active directory service interfaces (ADSI) and other light weight directory access protocol (LDAP) providers (e.g., at 572, 573*a*, etc.); components to generate insights from large historical data (e.g., over two terabytes of data); components to schedule data extraction jobs from social media sites (e.g., at 583*e*, etc.); components to support to host the service on a cloud, and/or the like.

Figure 5C:
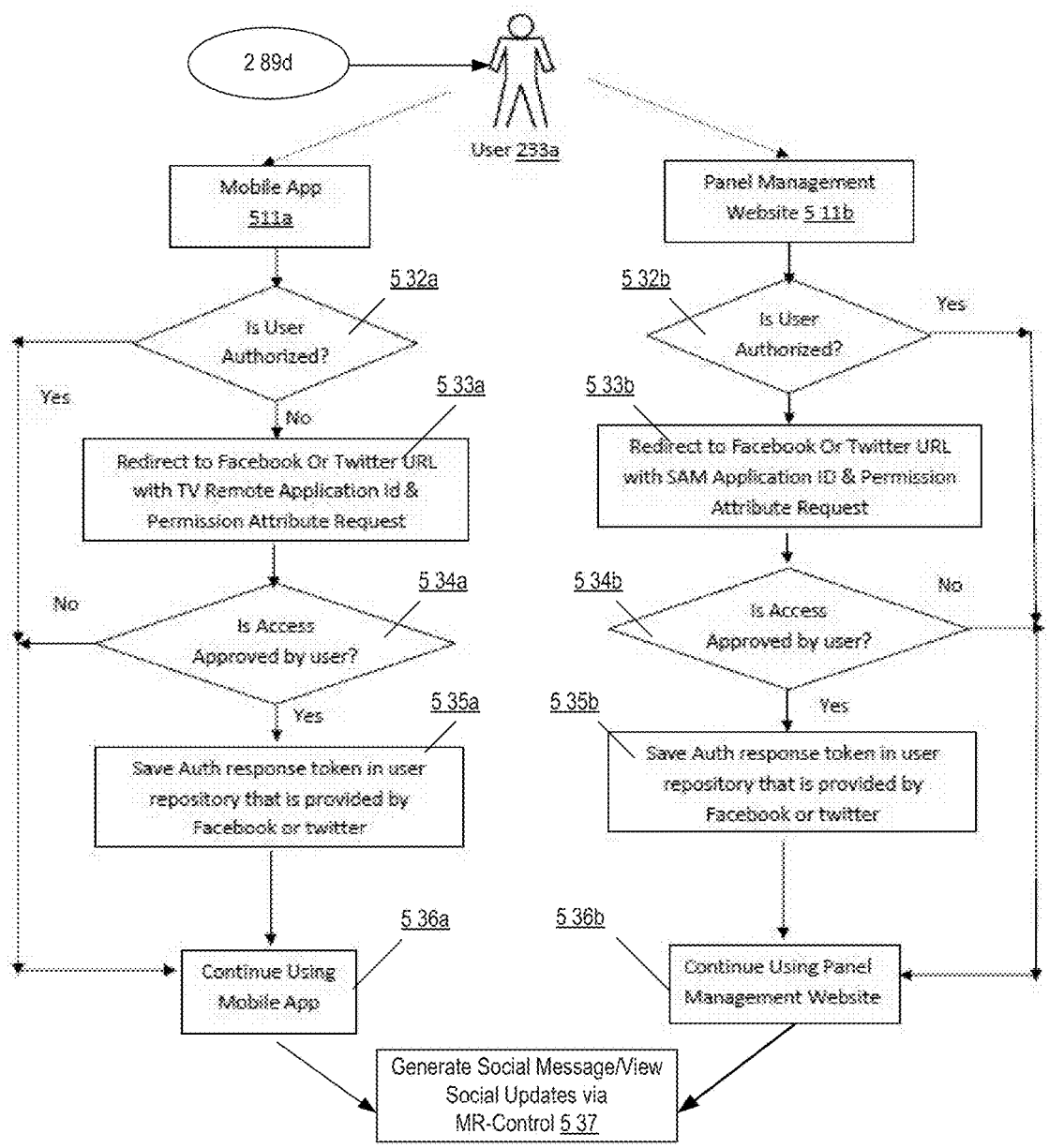
FIGS. 5C-5D provide logic flow diagrams illustrating obtaining social media content within embodiments of MR-Control.

FIG. 5C provide a logic flow diagram of user authorization for social media access and social message (e.g., 289*d* at FIG. 2C) processing within implementations of the MR-Control. In one embodiment, upon receiving a social message from a user, the MR-Control may determine whether the user, and/or the MR-Control is authorized to send social messages to the user's social media platform.

In one implementation, the user 233*a* may allow MR-Control platform to access to their social network. For example, in one implementation, the user 233*a* may sign up for MR-Control permission via a MR-Control mobile application 511*a* from a mobile device (e.g., an Apple iPhone, an Android, etc.). For another example, the user 233*a* may visit a MR-Control social data panel management website 511*b* (e.g., as illustrated in one example in FIG. 8B). In each case, MR-Control may provide a sign up link to a social media platform to the user. Upon user clicking the link, the MR-Control may verify whether the user previously authorized 532*a/b* MR-Control to access their Facebook or Twitter information on their behalf and their previous authorization token (e.g., 522 in FIG. 5A) is not expired.

In another implementation, the MR-Control may receive user attempts to log in and determine whether the user is authorized 532*a/b* to grant social media data access permission for MR-Control. For example, when a user has received an email from a social media platform (e.g., Facebook, Twitter, etc.) comprising a MR-Control link for authentication and the user clicks the link to proceed to grant permissions for MR-Control, the user may deemed authorized to configure social media permissions via MR-Control. In another implementation, when MR-Control determines the user is not authorized, MR-Control may redirect the user to a social media page 533*a/b* with a MR-Control application ID and a permission attribute request, e.g., as discussed at 515 in FIG. 5A.

In one implementation, the MR-Control may determine whether access is approved by the user, e.g., the user may select "Yes" or "Cancel" to indicate permission decision for MR-Control to access the user's social media content when the social media platform sent an email notification indicating the access request from MR-Control, e.g., at 515 in FIG. 5A.

For example, if the previous authorization is not valid or if it is a first time access then the MR-Control application may use oAuth protocol to request Facebook or Twitter to provide access to user profile and messages (e.g., sending an access request as shown in FIG. 5A). In such cases, the user may be redirected to Facebook or Twitter web site with request to log in and provide access parameters, e.g., see 515 in FIG. 5A, and 827 in FIG. 8C. Facebook or Twitter web site may present a login and permission screen with option to allow or deny requested access to MR-Control (e.g., see 810 at FIG. 8A).

In one implementation, if the user approves the access request then in the response Facebook or Twitter may provide an authentication token associated with permission to the data elements (e.g., 518 at FIG. 5A). In one implementation, the authentication tokens may be requested with constant permission to allow user data access even when the user is neither logged into MR-Control user portal (e.g., the mobile app 511*a* or the web based app 511*b*) nor any social media platform. In alternative implementations, the authentication token may request timely update and re-authentication from user on a periodic basis, e.g., weekly, monthly, etc. In further implementations, the user may revoke access of MR-Control from to their social media account if they wish to opt out.

If the user granted the permission, MR-Control may save the authorization response token provided by the social media platform in a user repository 535*a/b*. The authentication token may be used in all subsequent requests to social networking sites to access user's data elements. In another implementation, if the user did not grant permission, the user may continue with the mobile application or the web based panel management website 536*a/b*.

Upon establishing and/or confirm user authorization for social media access, MR-Control server may generate social messages to populate to social media platforms via MR-Control 537, e.g., see 275*b* in FIG. 2A, 365*b* in FIG. 3A, etc.

Figure 5D:
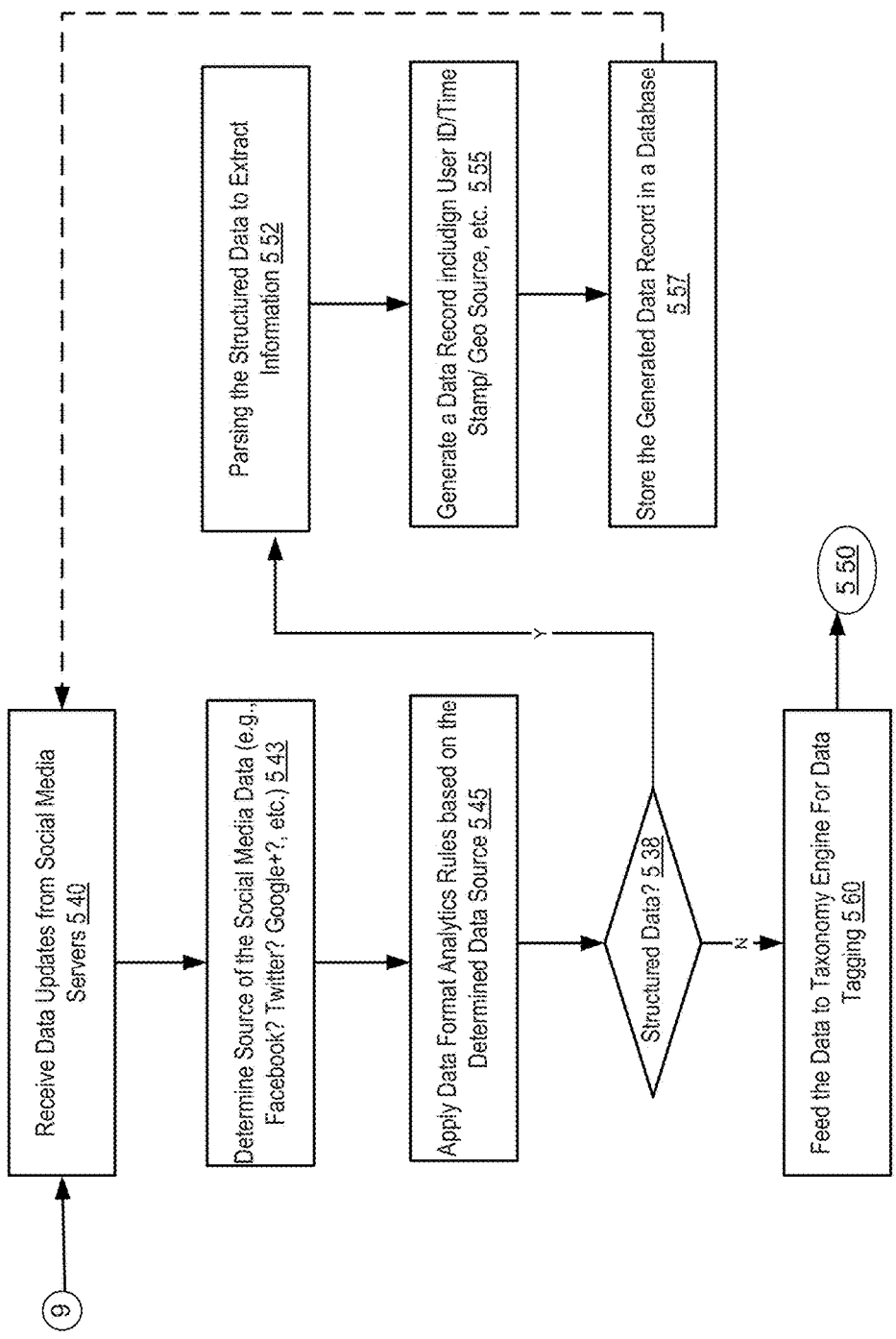

FIG. 5D provides a logic flow diagram illustrating data download from social media within implementations of the MR-Control. Continuing on with 9 at FIG. 5A, MR-Control may receive data updates from the social media servers 540. The MR-Control may determine a source of the social media data 543, e.g., Facebook, Twitter, Google+, and/or the like, and apply data format analytics rules based on the determined data source 545.

For example, if the data record is obtained from Facebook, the data format analytics may determine whether it is structured user profile information, a user posted photo, unstructured user posting on the wall, others' comments, and/or the like. For another example, if the data record is obtained from Twitter, the MR-Control may determine whether it comprises raw text of a Tweet, and/or the like.

In one implementation, if the received data is structured 538, MR-Control may parsing the structured data to extract information 552. For example, a structured user profile data record may be parsed per data field, e.g., user_id, user_name, user_DOB, user_interests, and/or the like. The MR-Control may generate a data record including user ID/timestamp/geo source, etc. 555 and store the data record for the structured data 557 at a database (e.g., see 575*a* in FIG. 5B).

Figure 6B:
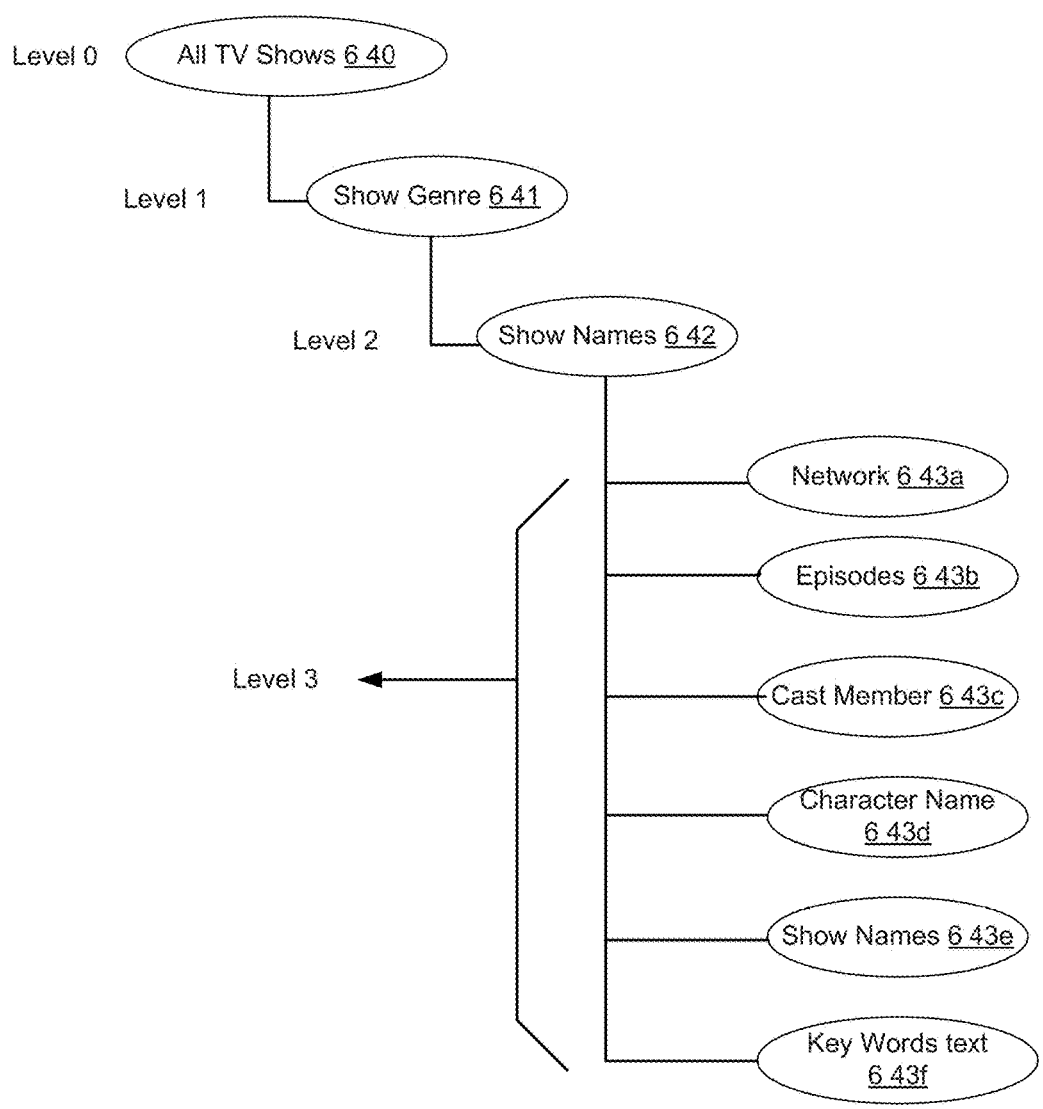
Figure 6C:
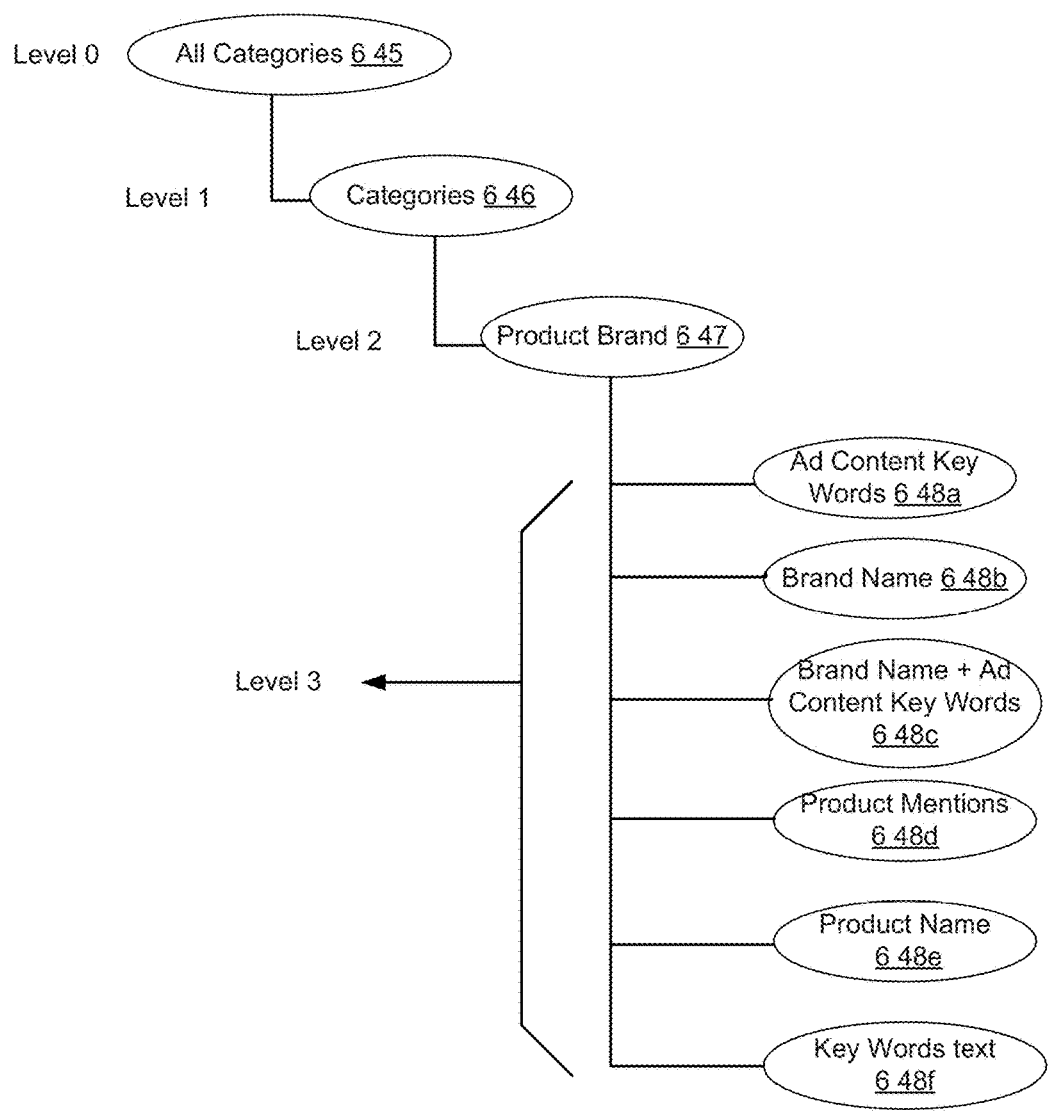

In another implementation, if the received data is unstructured 538, e.g., raw texts of Facebook comments, Tweets, etc., MR-Control may feed the data to a Taxonomy engine for data tagging 560, as further illustrated in FIGS. 6A-6C.

Figure 5E:
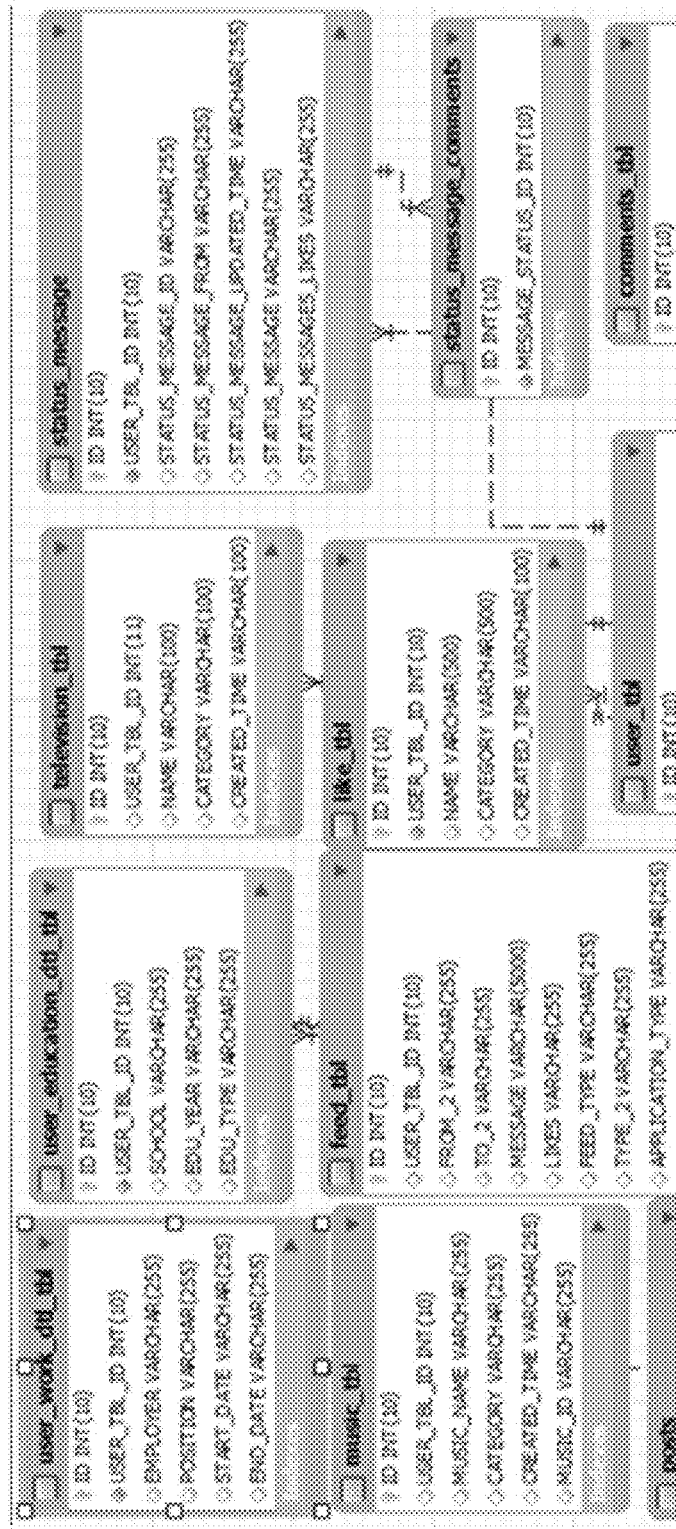
FIGS. 5E-5F provide example data records illustrating data structures of social media data within embodiments of MR-Control.
Figure 5F:
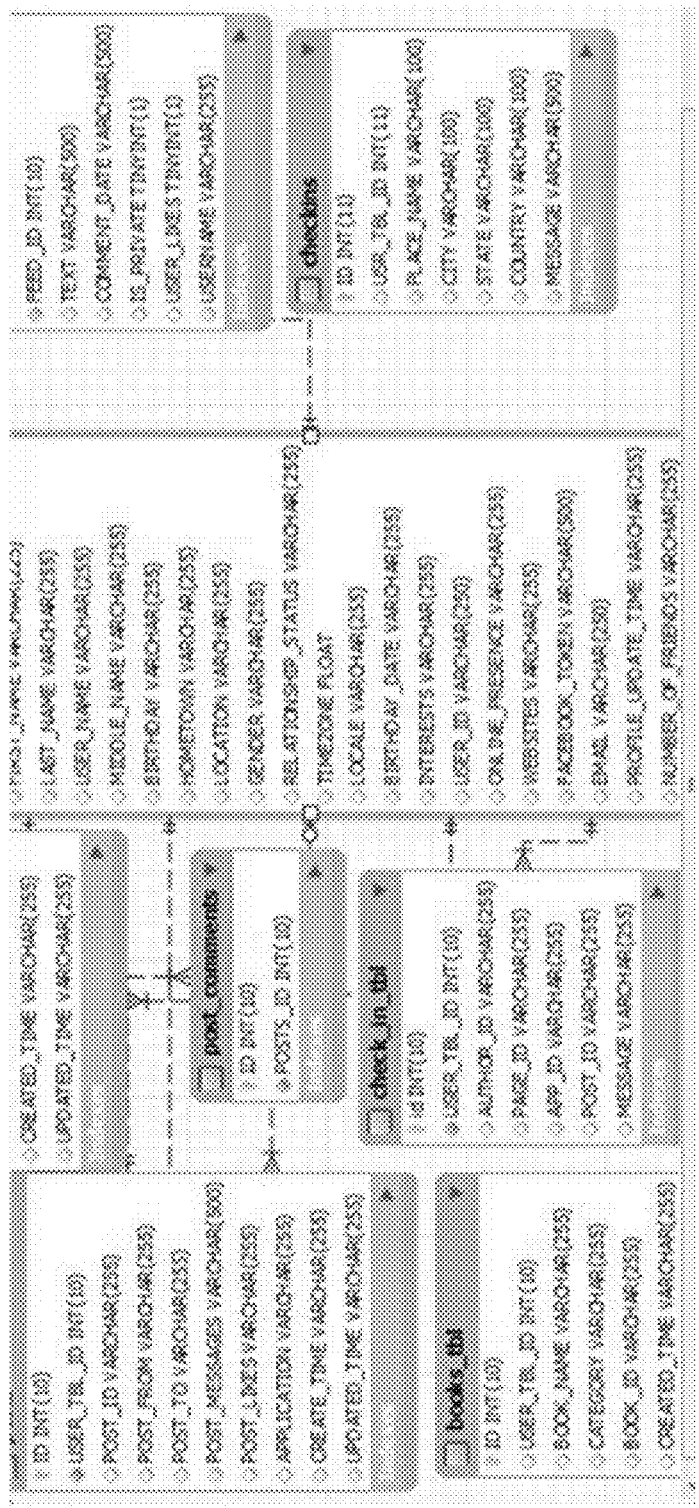

FIGS. 5E-5F provide example data structures of social media data updates within embodiments of the MR-Control. For example, the data segments in FIGS. 5E-5F show database structure of social data elements associated with a user, wherein various data fields may be linked by a user ID, e.g., "USER_TBL_ID."

Within implementations, a MR-Control analytics platform (e.g., 570 at FIG. 5C) may extract and use different sets of data elements from a user social media profile. For example, in one implementation, as shown in FIG. 5E-5F, a data record of a Facebook user profile may comprise data fields such as user work information, user education information, television viewing history, interested music, interested books, data feeds, likes, status message, comments on status message, wall posted comments, check-in history, and/or the like.

In one implementation, data elements are categorized based upon how frequently they are updated and MR-Control may accordingly determine the fetch and refresh schedules. For example, the categorization may comprise users static descriptors, such as user demographic attributes like date of birth, gender, etc., which may be relatively "constant" and "static, and thus may be determined to scheduled to update every 6 months. For another example, the categorization may comprise dynamic descriptors, such as number of friends, Likes, television viewing, books and other preferences, which may be updated by a Facebook user more frequently, and may be scheduled for updates monthly. For another example, the categorization may comprise text messages, status, comment, messages, posts, etc., and may be scheduled to update daily and/or on demand. In one implementation, MR-Control may specify the requested content in a data request accordingly, e.g., for user descriptors only, for dynamic descriptor only, for text messages only, and/or any combination of the above. (e.g., see the "RequestedContent" field in the example Facebook data request 522 in FIG. 5A).

FIG. 6A provides a logic flow diagram illustrating social media analytics within embodiments of the MR-Control. In one embodiment, a user may submit a request for media analytics 605, e.g., for a brand name product, a TV program, and/or the like. For example, a TV production company may desire to know audience comments about their TV program (e.g., see FIG. 1D). The MR-Control server 220, upon receiving the user request, may generate a media analytics management panel user interface screen including a list of analytics options (e.g., see FIG. 8C) 610, and the user may submit media analytics parameters 613. For example, as shown in FIG. 8D, the MR-Control management panel may allow a user to select social media source (e.g., Facebook, Twitter, Google+, and/or the like), a time range, feedback activity type, and/or the like.

In one implementation, MR-Control server 220 may download social media data updates (e.g., as discussed in FIGS. 5A-5C), and form a query based on the retrieved social media data 615 based on the user inquiry. For example, when the producer CBS would like to know audience feedbacks of the show "The Big Bang Theory" (e.g., see FIG. 1D), MR-Control may search for data related to "The Big Bang Theory" on the retrieved updated social media data.

For example, in one implementation, MR-Control may form a query on the structured data based on key word "The Big Bang Theory" and/or any character names and/or actors/actress names for the associated profiles, e.g., a Facebook pages, Twitter profiles, and obtain a number of followers from the structured data. In another example, MR-Control may form a query based on the key term "The Big Bang Theory" and obtain raw text comments containing the key term. In one implementation, MR-Control may perform a progressive search over the raw text (e.g., unstructured data, etc.). For example, MR-Control may search for "The Big Bang Theory," and then refine the search results by "The Big Bang Theory AND CBS," and refine the search results by "The Big Bang Theory AND CBS AND Show," and/or the like. In one implementation, MR-Control may search the unstructured data based on data tags associated therewith, as further discussed in FIGS. 6B-6C.

In one implementation, MR-Control may obtain query results 620, which may comprise a number of followers on the social media platform, a series of raw text comments from the social media, and/or the like. The MR-Control may then determine a presentation format 623 to provide the results to the user. For example, when the user elects to choose "raw texts" (e.g., see 850 in FIG. 8D), the user may view a list of raw text comments 630 (e.g. see 850*a/b* in FIG. 8D). In another implementation, MR-Control may select an output visualization format and present the visualization of query results to the user 625, and the user may view visualized results 633 (e.g., see 860*a-c* in FIG. 8E).

FIGS. 6B-6C provide logic flow diagrams illustrating example taxonomy tagging logics within embodiments of the MR-Control. In one implementation, as discussed in FIG. 5C, unstructured data (e.g., raw texts of Facebook comments, Tweets, and/or the like) may be parsed and tagged with category tags by a taxonomy engine (e.g., see 583*b*-383*c* in FIG. 5C).

In one implementation, MR-Control may apply taxonomy model logics, which may comprise any of a first logical section associated with the semantic categorization of keywords and a second logical section associated with the sentiment keywords. In one implementation, the taxonomy may assign weighted scores to the logical tagging in conjunction with the semantic text.

For example, in one implementation, the semantic categorization logic may be hierarchical and specific to a domain to maintain simplicity of in model management and run time executions, e.g. a specific taxonomy model for TV shows, a specific taxonomy model for advertisement and brand mentions, a taxonomy model for any combination of the above, and/or the like.

FIG. 6B shows an example TV shows semantic categorization model within implementations of the MR-Control. In one implementation, unstructured data related to TV shows will be tagged with "TV shows" 640 as a level o tag, and progressively be tagged with level 1, 2, 5, etc based on genre 641, show names 642, show network 643*a*, show episodes 643*b*, show cast member name 643*c*, show characters names 643*d*, show episode names 643*e*, other keyword texts in the descriptor 643*f* and/or the like. For example, the example Tweet 185 in FIG. 1D, "The Big Bang Theory is a good adaption of the Southern Vampires series. Love the CBS actors/actresses. Expecting the new season," may be tagged as "TV show"->"Soap" (genre)->"Comedy" (sub-genre)->"The Big Bang Theory" (show name), "CBS" (network), "new season" (episode), "geeks" (key words in descriptor), and/or the like.

FIG. 6C shows an example advertisement brand awareness model within implementations of the MR-Control. In one implementation, unstructured data related to an advertised and/or brand product may be tagged with "all categories" 645 as a level o tag, and progressively be tagged with level 1, 2, 5, etc based product categories 646, product brand 647, ad content key words 648*a*, brand name 648*b*, brand name+ad content key words 648*c*, product mentions 648*d*, product name/type/model 648*e*, key word text in descriptor 648*f*, and/or the like. For example, in one implementation, a Facebook wall post "the new Audi R8 commercial is so cool!" may be tagged as "Consumer Products" (all categories)->"Automobiles" (categories)->"Audi" (brand)->"R8" (product model), "commercial" (ad content), "so cool" (product mention/feedback), and/or the like.

FIG. 6D provides an example logic flow diagram illustrating taxonomy tree definition within embodiments of the MR-Control. Within embodiments, the taxonomy logic rules may be pre-defined by MR-Control panel experts using structured data dictionaries. In one implementation, the MR-Control may determine the "low level" categories based on structured data dictionaries 650. For example, in one implementation, the TV show model may be designed based on a TV program guide to ensure the reporting label and naming is followed. In this way, the taxonomy may accelerate and automate the model development process.

The MR-Control may extract sample text 653 for a TV show from social media by a text miner (e.g., the text analytics engine 583c in FIG. 5C) to identify most commonly used key words by the social media users. For example, user comments posted on the Facebook page of "The Big Bang Theory" (e.g., see 186b in FIG. 1D) may be sampled to extract key words; if words such as "Werewolf" (characters), "Bontemp" (fictional town in the story), etc., are frequently used in the comments, the taxonomy engine may adopt these words for taxonomy tags, e.g., the key word text in descriptor (see 643f in FIG. 6B). This process may enrich the dictionary and provide inputs to defining taxonomy rules. The MR-Control may be associated with the identified key words with a level for the tagging 655. For example, in one implementation, the keywords identified from sampled social media raw texts (e.g., Tweets, Facebook posts, etc.) may be associated with appropriate nodes, e.g., level 0, 1, 2, 5, etc.

In a further implementation, MR-Control may identify keywords set for each TV show/topic including words spelled differently but meant to refer the same entity 657 to expand the query scope, e.g. "COCA-COLA," "COCA-COLA'S," "COKE," "COKE'S," "COCA COLA," "COCACOLA," etc. Within implementations, a variety of logical combination of such key words may be coded as a logical rule 660 with AND, OR, Not operator, e.g.

Coke (Level 0)
[ coke + good] | [ coke + excellent] (Level 1)
[ coke + good] | [ coke + awesome] (Level 1)
[ coke in advert + too much taste to call zero] (Level2)
...

wherein the "+" is an AND operator and "|" is an OR operator. The MR-Control may establish a taxonomy tree combining the rules and store the generated logic taxonomy tree in a taxonomy database (e.g., see 585a in FIG. 5C).

Figure 6E:
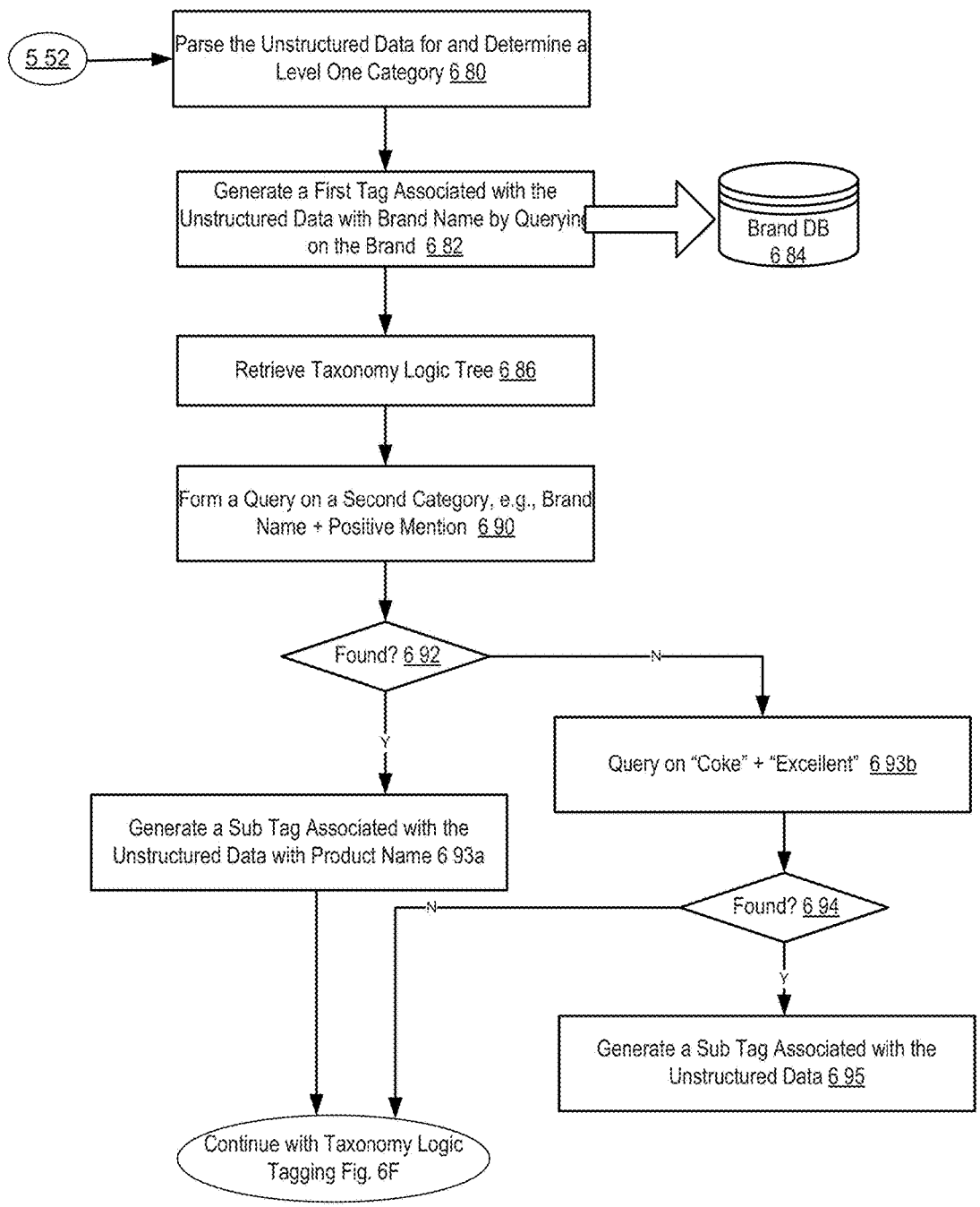
Figure 6F:
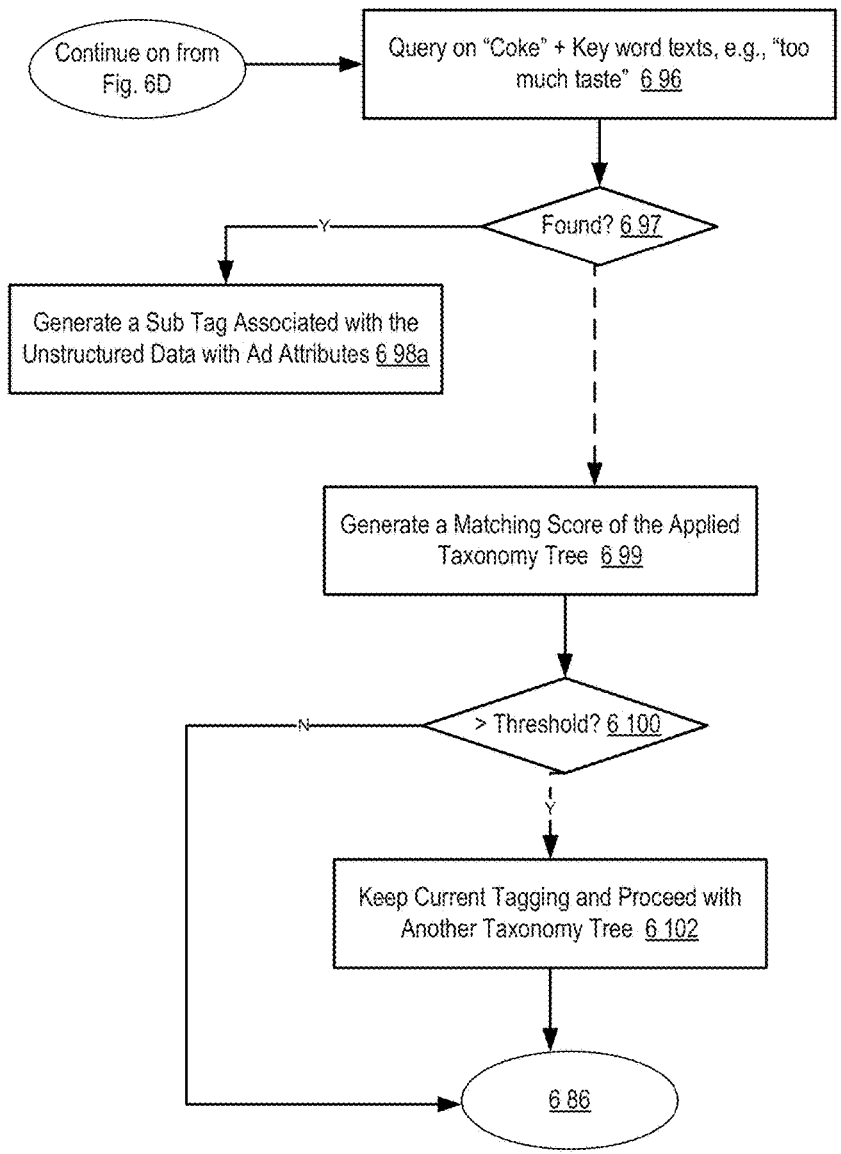

FIGS. 6E-6F provides an example logic flow illustrating taxonomy logic rule application within embodiments of the MR-Control. In one embodiment, continuing on with 552 in FIG. 5C, e.g., upon receiving unstructured data for analytics and tagging, etc., MR-Control may parse the unstructured data for a first level analytics, e.g., whether it is related to a TV show, and/or a brand product 680, and may generate a first tag associated with the unstructured data with a brand name 682 by querying on each brand in the brand database 684. The MR-Control may then retrieve a taxonomy logic tree for the brand "Coke" 686, as shown in the above example.

In one implementation, MR-Control may follow the taxonomy tree for "Coke," forming a query on a second category, e.g., brand name and positive mentions 690. In the above example, the taxonomy tree may apply a query on "Coke+Good" etc. If such text is found, MR-Control may generate a sub tag associated with the unstructured data with "Coke+good" 693a. If not, the MR-Control may apply the taxonomy for an alternative query key terms, e.g., "Coke+Excellent" 693b, and/or the like. Similarly, if that is found, MR-Control may generate a sub tag "Coke Excellent" with the unstructured data 695.

Continuing on with FIG. 6F, the taxonomy engine may progressively query on "Coke" and key word texts, e.g., "too much taste," 696, etc. If such key words are found 697, the MR-Control may generate s sub tag (e.g., level 2) with the unstructured data 698a. If not, the MR-Control may move on with the next taxonomy rule.

Within implementations, during the taxonomy rule execution process, each taxonomy rule may be executed at a leaf node and then the next higher level may be computed. Upon finishing with a taxonomy tree, the MR-Control may generate a matching score of the applied taxonomy logics 699. For example, the score may be based on a similarity percentage of the key terms in each node of the taxonomy tree and the compared unstructured data segment. To maintain efficiency, taxonomy execution models may be logically partitioned. For example, for a segment of raw text, the same unstructured text segment may be executed through different models and scores generated may be merged and aggregated. When the similarity score is greater than a threshold (e.g., 80%, etc.) 6100, the current tagging generated from 682-698a may be saved 6102. Otherwise, the MR-Control may proceed with a different taxonomy model, e.g., at 686 in FIG. 6E.

In one implementations, MR-Control may apply one or more taxonomy logics to an unstructured data segment, as the data segment (e.g., a Tweet, a Facebook post, etc.) may be related to one or more brand products, etc.

In further implementations, the taxonomy tagging mechanism may be associated with a weighting score at each "node" of the taxonomy hierarchy. For example, in the above example for "Coke," if the MR-Control receives a client request to analyze consumer impression about a new product of Coca Cola on social media analytics, the MR-Control may perform taxonomy mining upon unstructured data from the social media (e.g., consumer comments). Each "node" may be progressively associated with a weight score to determine consumer impression. For example, when the data comprises "Coke," a level 0 weight score may be assigned (e.g., 0.1, etc.); when the data comprises "Coke+good" or "Coke+excellent," a level 1 weight score may be assigned (e.g., 0.5, etc.); but when the data comprises "Coke+horrible" or "Coke" with other negatively indicative adjectives, a negative level 1 weight score may be assigned (e.g., −0.5, etc.). In one implementation, the taxonomy engine may calculate an overall score of an unstructured data record when progressively querying upon taxonomy key terms, and generate statistical results of a group of unstructured data to determine the consumer impression. For example, the MR-Control may generate statistical report as to how many consumers are positive, neutral, or negative towards "Coke," based on their calculated scores, as illustrated in one example in FIGS. 6E-6F. For another example, the MR-Control may generate popular brands, TV shows that are the mostly mentioned or positively commented from social media users, e.g., see FIG. 10H. In further implementations, the MR-Control may determine a social group to analyze their social content. For example, within the social group, the MR-Control may determine user's influence over over other members of the population, e.g., whether a user is an "influencer." For example, when a user posts comments to the CBS show "The Big Bang Theory" on Facebook, and his Facebook friends have "liked" his comments and subsequently watch the show, the user may be considered as a Facebook "influencer." In one implementation, the notion of influencer may be specific to a social media platform; a person who is an influencer on one platform may not be an influencer on another.

In one implementation, the social influencer may be determined by social media indices. For example, the MR-Control may analyze prerequisites for consideration as a social media influencer, such as whether a user has an account on a social web platform, whether the user has generated content on that platform within the past 30 days, and/or the like.

In one implementation, the MR-Control may calculate social media index of a user to determine an influencer. For each member that meets the prerequisites, a social media index is calculated using various measures. For example, the MR-Control may calculate a reach measure, e.g., over the past 30 days, the maximum size of the network, which may be measured through "friends", "followers", or other similar measures. For another example, the MR-Control may calculate a frequency measure, e.g., over the past 30 days, the total number of posts to the platform, which may be measured through things like "status updates", "tweets", or "comments", depending on the relevant content generation opportunities for the particular platform. For another example, the MR-Control may calculate a resonance measure, e.g., over the past 30 days, the total number of responses to the individual's content. Depending on the platform, these responses may take the form of "retweets", comments on "posts" or "status updates", or direct messages responses to the individual. The responses may or may not need to come from individuals within the population being measured.

In one implementation, the calculated measures are then ranked against the same measure from other individuals in his or her demographic group. The demographic measures may include, but are not limited to, age, gender, race, education, and income. The specific groupings used for age, education, and income can vary based on the population being analyzed. An individual is considered an influencer if he or she ranks in the top 20% of at least two of the variables.

In further implementation, the influencer determination may be refined by product category. Each post made by an individual may be classified as mentioning a product, or not mentioning a product, based on text analysis against a standard taxonomy of products and brands. The volume of posts in each category can be tabulated, and an individual classified as an influencer in any product category which represents at least 20% of his or her product-classified posts. In further implementation, a social influencer may be specified and/or classified with regard to a TV show category, a category of products, a category of brands, and/or the like.

FIG. 7A-7E provide exemplary data diagrams and logic flow diagrams illustrating cross-channel data collection and media measurement within implementations of the MR-Control. FIG. 7A provides a block diagram illustrating MR-Control data collection within embodiments of the MR-Control. Within embodiments, the MR-Control may adopt a variety of technologies including flash cookies, mobile applications, browser plug-ins, and/or the like, to capture media usage across different channels, e.g., TV, mobile, internet, social media, and/or the like. In one implementation, the MR-Control may analyze the media usage data to study the advertisement effects of a brand product.

In one implementation, MR-Control may track audience activities to content (planning and competitive analysis) and advertising (post analysis, ad effectiveness). In one implementation, the MR-Control may create digital footprints on usage as a bi-product of delivering content and advertising, e.g., via application session ID, cookie, etc., to create dataset that is used for tactical content and advertising decisions. For example, the MR-PLATFORM may set up a group of users (e.g., 100,000 users, etc.) to track their TV viewing, Mobile usage, Online surfing history, advertising exposure, demographic information, product ownership info for auto, location, financial services, product usage information for CPG/Pharma, and/or the like to provide survey research for ad effectiveness. In one implementation, MR-Control may recruit users with incentive rewards (e.g., the participants may be required to allow MR-Control to access their social media content as illustrated in FIGS. 5A-5B), e.g., Credit in iTunes or Google App Store account (e.g., $10/quarter=$40 a year), local coupons/offers based on zip code, etc.

As shown in FIG. 7A, the MR-Control may automatically collect data 705 from various source, e.g., online advertising usage 715, mobile device usage 720, TV viewing data 725, social media data (e.g., Facebook posts/conversations, etc.) 730 via API calls (e.g., see FIGS. 5A-5B). In another implementation, the MR-Control may employ panelists 710 to configure data downloads parameters, system maintenance, and/or the like. For example, the panelist may comprise social media users that allow MR-Control to access their social profile and content for analytics.

Figure 7B:
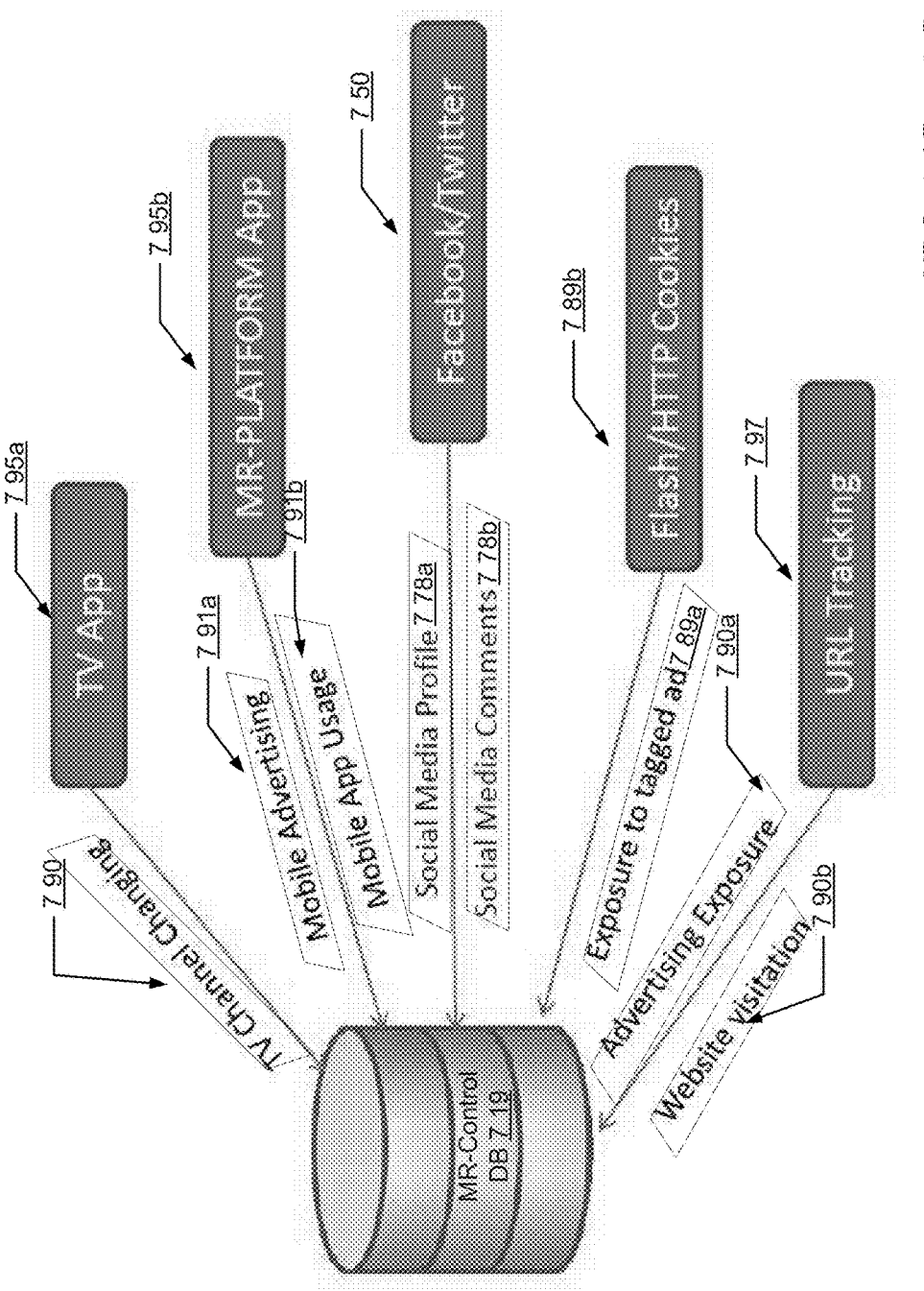
Figure 7C:
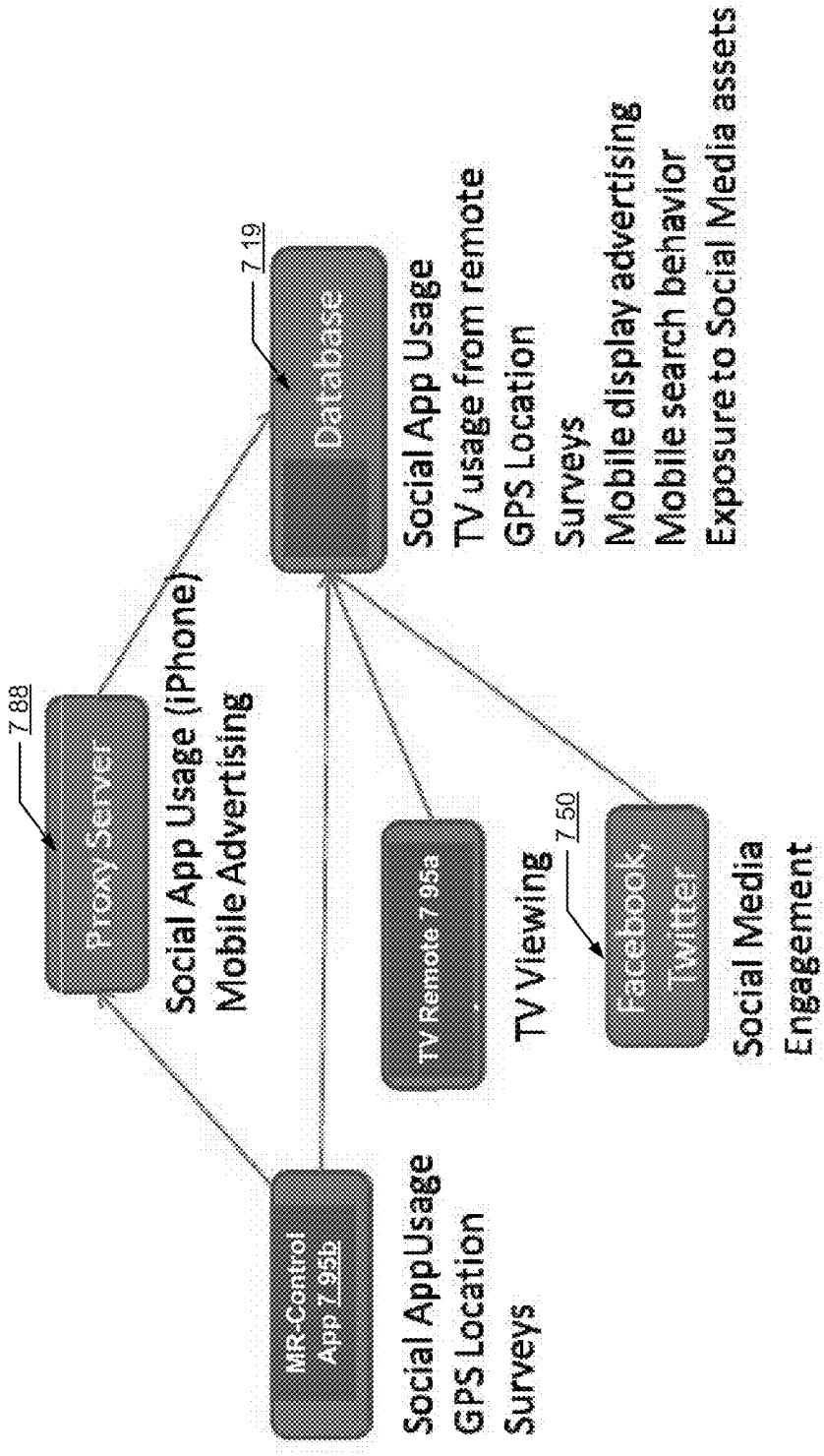

FIGS. 7B-7C provide example flow diagrams illustrating MR-Control cross-channel data collection in alternative embodiments of the MR-Control. In one embodiment, a variety of data may be obtained and stored in a MR-Control database (e.g., see 219 at FIG. 2A). In one implementation, as shown in FIG. 7B, MR-Control may obtain data from different channel for cross-channel media measurement. For example, the MR-Control may obtain TV channel changing (e.g., user submission of channel selection) 790 from a MR-Control TV client application 795a (e.g., see FIGS. 7A-7G), mobile advertising 791a and mobile application 79ab usage from a MR-Control application 795b, social media profile 778a and social media comments 778b from social media (e.g., Facebook Twitter, 750), user exposure to tagged advertisement 789a from a client flash/HTTP cookies 789b (e.g., see 375 in FIG. 3D), advertising exposure 790a (e.g., whether a user clicks on an ad) and website visits 790b from URL tracking of a user browser 797, and/or the like. In one implementation, the MR-Control may incorporate the variety of data for a cross-channel study of user feedbacks of an advertisement, a brand, a product, a TV show, and/or the like.

In a further implementation, the MR-Control may utilize the MR-Control client component installed at a user mobile device to capture TV viewing in the home, survey responses, and/or the like. In a further implementation, the MR-Control may adopt a mobile meter to measure mobile usage. In another implementation, the MR-Control may provide a client component which may provide history information from a user's personal computer when user connects his mobile device to his computer to sync up so that the MR-Control may track online Internet usage of the user, e.g., browsing history, clicks on ads, etc. In a further implementation, the MR-Control may track TV ad exposure from a variety of meter data, e.g., TNS, M+, AceMetrix, and/or the like. In further implementations, data may be collected passively via mobile phones in almost real time, and/or when phone is being charged.

Within implementations, TV distribution may be driven by an over the air broadcast and a "one-to many" cable infrastructure. Unlike other media and industries, like the Internet and the CPG/retail environment, the TV infrastructure may not create footprints on usage with content (or product) distribution. In such cases, the industry may have a panel based research to understand the size and composition of TV audiences. All decisions related to programming, ad sales, and carriage deals between multiple system operator and cable networks may be based upon panel data, which may enable research providers to realize outsized rewards for providing insights.

In one embodiment, the MR-Control may obtain TV viewing data via Return Path Data (RPD) from Digital Set Top Boxes (RDTB), which may facilitate analysis of TV viewing to provide insights on viewing to small networks and small geographies, e.g., local market measurement reflecting a local TV station or cable MSO zone. For another example, metered data from RPD may be applied to analyze a group of categorized audience (e.g., heavy Coke drinkers) with targeted ad content (e.g., a 30 second commercial on a niche, targeted network).

In further implementations, the MR-Control may study ad effects by collecting data with regard to user purchasing activities of the advertised products. For example, the MR-Control may track user clicks on a "Buy it Now" button, e.g., see 750c in FIG. 7G. In another implementation, the MR-Control may obtain data form retailers, manufactures, Internet players, and/or the like, wherein real store data, frequent shopper cards usage, and log files (Internet shopping) may be analyzed to study placement decisions, increase traffic and sales (ad visits), use the granular traffic (click-stream) data to design customized products/content/advertising to shoppers/viewers, and real time analytics to better manage ad campaigns, and/or the like. In one implementation, a weighing scoring mechanism similar to that illustrated in FIG. 2I may be employed, but expanded to a variety of cross channel tracking data, to analyze ad effects within a cross channel dataset.

In further implementations, the MR-PLATFORM may access to non-live media, such as, Charter, TiVo, Rentrak, Internet TV (e.g., Google TV, Apple TV, and/or the like, and incorporate viewing data for analysis (e.g., see FIG. 2H).

In further implementation, Internet measurement data (e.g., from ISP data, etc.) may be collected, e.g., HTTP cookies, click-stream data with demographic information, and/or the like.

In further implementations, mobile usage may be tracked via specific applications (e.g., in a similar manner to log file analysis), anonymous location based tracking of cell users, and/or the like.

FIG. 7C shows data collection via a proxy server within implementations of the MR-Control. For example, in one implementation, a MR-Control client application 795b operated on a user device may collect and send information such as social application usage, GPS location, response to surveys, etc., to a database 719. In further implementations, social application usage and mobile advertising data may be passed to a MR-Control proxy server 788 (e.g., see FIG. 7E), and/or a VPN server, which may forward it to the database 719. In one implementation, TV viewing data may be provided to the database 719 via a TV remote application 795a (and/or a TV measurement network). In another implementation, social media engagement data (e.g., user posts, comments on the social media) 750 may be sent to the database as well. In further implementations, the MR-Control may obtain mobile search behavior of a user, exposure to social media (e.g., user viewing friends' recommendations on social media, etc.), and/or the like.

Figure 7D:
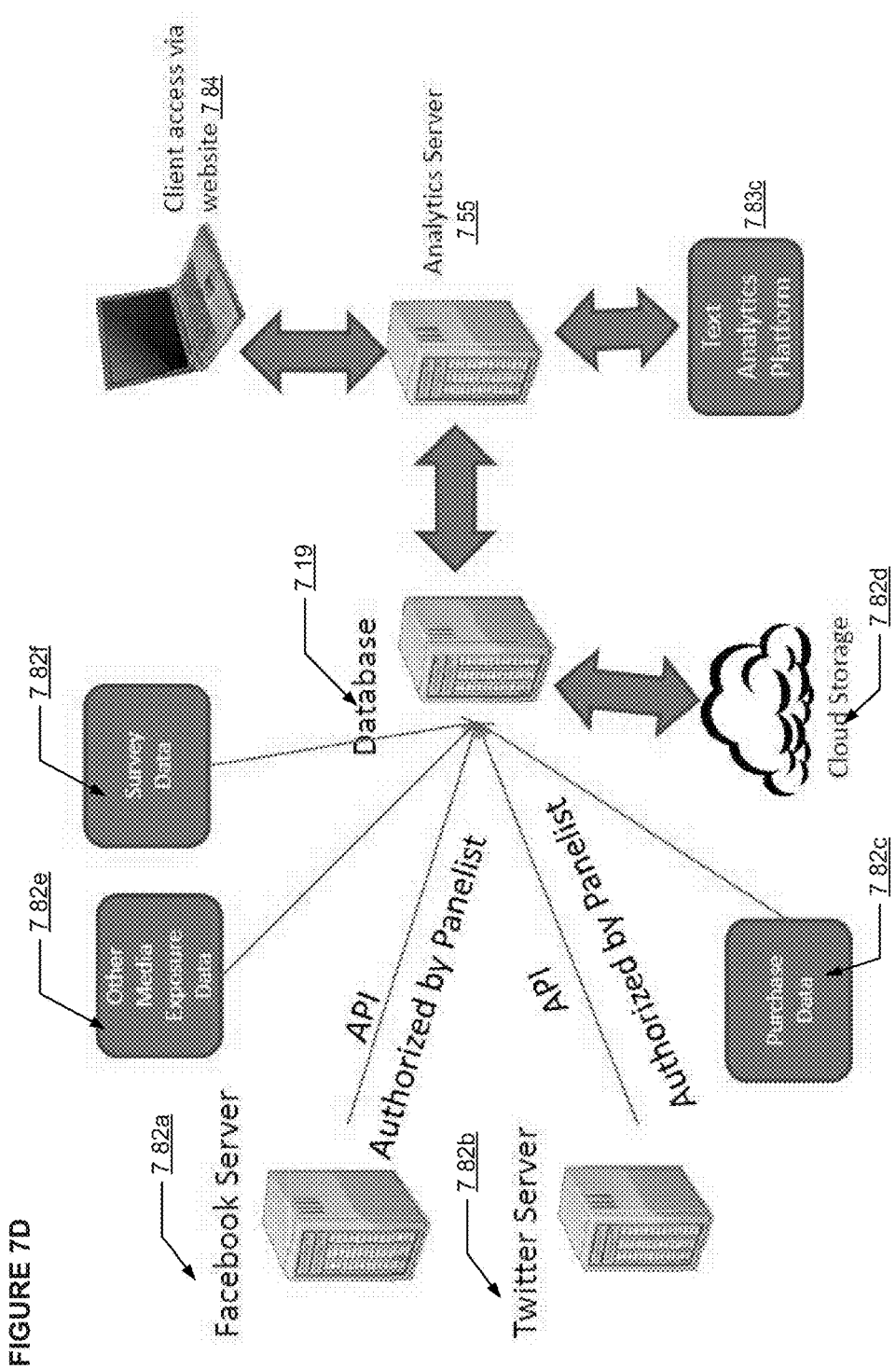

FIG. 7D provides a data flow diagram illustrating MR-Control data flow between entities within alternative embodiments of the MR-Control. Within embodiments, a MR-Control database 719 may obtain data from Facebook server 782a and Twitter server 782b via API calls (e.g., see FIGS. 5A-5C). In further implementations, the access may be validated and/or authorized by MR-Control panelists. In further implementations, other media exposure 782e (e.g., see FIG. 7B-9C), survey data 782f (e.g., from synchronized questionnaire, or other questionnaires handled by panelists, etc.), purchasing data 782c, may be provided to the database. In a further implementation, the cross-channel data may be stored with a cloud storage 782d.

In one implementation, a client (e.g., a user, a merchant for analytics report, etc.) may access the MR-Control analytics server 755 via a website 784, which may in turn operate with a text analytics platform 783c to analyze social content, cross-channel data, and/or the like.

Figure 7E:
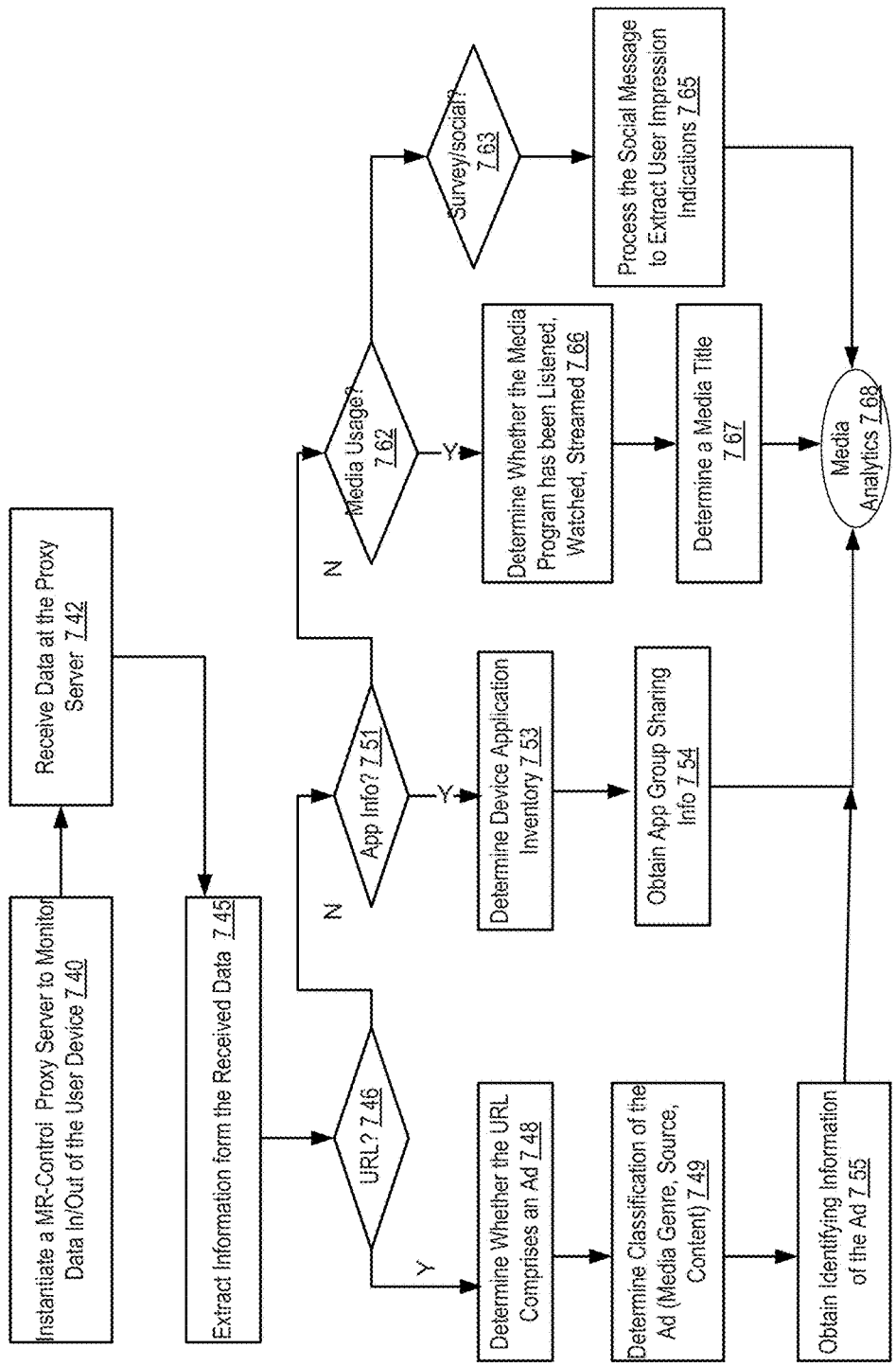

FIG. 7E shows a logic flow diagram illustrating monitoring user device data transmission across different channels within embodiments of the MR-Control. Within embodiments, the MR-Control may instantiate a proxy server to monitor data in/out of the user mobile device 740, wherein the data may be transmitted to/from different channels. In one implementation, the proxy server may receive data 742, and extract information from the received data 745 to determine a data type and monitor the user device activities which may indicate advertisement delivery/usage information. For example, if the data comprises a website URL 746, the MR-Control may determine whether the URL comprises an advertisement component 748. If yes, the MR-Control may determine characteristics of the advertisement 749, e.g., classification of the advertisement (e.g., media genre, media source, content description, etc.). In further implementations, the MR-Control may determine whether the advertisement running on the URL is an automatic advertisement, or requires user's manual trigger (e.g., user clicks for display). The MR-Control may obtain identifying information, e.g., an Ad ID, 755, to generate prompt questions, e.g., at 312 in FIG. 3B.

In further implementations, the MR-Control may identify an advertisement comprised in a URL link via advertisement image recognition. For example, the MR-Control may identify graphical contents contained in a URL link based on empirical pattern of web content format. Such empirical patterns may be classified per URL link type (e.g., a shopping site link such as Amazon.com may have an advertisement placed at the center frame of the web page; a news link such as New York Times page may have an advertisement placed at the side/bottom bar of the web page, and/or the like). For another example, the MR-Control may identify dynamic contents on the web page, such as, but not limited to flash contents, banners, applets, and/or the like, as displayed advertisements.

Within implementations, upon obtaining an image capture of an advertisement, the MR-Control may adopt software packages to identify contents of the advertisement (e.g., a featured product name, a brand name, etc.) so that it can be associated with a user's ad exposure. In one implementation, the MR-Control may generate a unique identifier indicative of visual characteristics of the captured ad graphical contents (e.g., a matrix representation of sampling of the captured ad image, etc.), and form a query on an ad database based on the unique identifier. In another implementation, the MR-Control may adopt software packages similar to, but not limited to Google image search, and/or the like. Further details of advertisement image match may be similar to that described in U.S. Pat. No. 7,565,139, entitled "Image Based Search Engine for Mobile Phone with Camera," which is herein expressly incorporated by reference.

In one implementation, the MR-Control may dissect an advertisement identification from the advertisement embedded in the web content (e.g., the URL link) to determine a product name, a brand name, and/or the like, which the user has been exposed to. In further implementations, the captured graphical advertisement contents may be tagged with metadata in compliance with formats associated with an advertisement, e.g., exif data tags (which may include unique advertising identifiers in the software tags, in the inter-operability tags, in the extension name/ID, extension description tags, and/or the like). Other graphical metadata formats may also be contemplated such as XMP, GIF, IPTC information interchange model metadata format, and/or the like.

In further implementations, the MR-Control may determine whether a user clicked a URL link comprising media program content, e.g., a Youtube link, etc. The MR-Control may extract an identifier, e.g., a web ID, etc., to determine the name of the media program. In another implementation, the MR-Control may obtain excerpts of the media program, and determine a name of the media program via an embedded digital signature. In further implementation, the MR-Control may set time stamp on the user's click on the URL link comprising a media program to record how long the user has been exposed to the media program. Further implementations of the ad identification are discussed in FIG. 7F.

In further implementations, the MR-Control may track a user's browsing history by monitoring a stream of "clicks" the user has submitted on his mobile device. For example, the MR-Control may monitor user's "clicks" to determine a type of the click, e.g., usage of media playing, visits of a different URL link, posting of social media contents, usage of an application, and/or the like. Using an app. The MR-Control may then determine advertisement exposure associated with each "click" (e.g., via ad image identification illustrated in FIG. 7F).

In another implementation, the received data may comprise application information from the user device 751. The proxy server may ascertain an application inventory list of the user device 753, and/or application group sharing information 754. For example, one or more users who are Facebook friends, may form a group to share their interested TV watch list and viewing status via MR-Control, and such information may be captured by the proxy server.

In another implementation, the received data may comprise indication of media usage 762, e.g., channel selection, atmospherics data, etc., the MR-Control may determine whether the TV program on the selected channel has been listened, watched, and/or streamed 766. The MR-Control may determine a title of the media program 767, and retrieve ad tags embedded in the media program from a media table to determine user ad exposure information, e.g., as discussed in FIGS. 3B-3C. In further implementations, the received data may comprise survey responses/social messages sent 763 to the MR-Control, as further discussed in FIGS. 5A-5E.

In one implementation, the MR-Control may generate media analytics report 768 based on the obtained media data, including information as to user impressions to a brand name product, TV shows, etc., e.g., as shown in FIGS. 10A-10H.

In one implementation, the MR-Control may provide advertisers solutions to design advertising campaigns as to which type of media to place an ad, developing media plans with the optimal mix across media, determine the impact of advertising on brand awareness, favorability measures, intent to buy and actual purchase across media (ROI). In another implementation, the MR-Control may provide advertising measurement solutions using emerging sources of data, e.g., media consumption data (TV, online, mobile, social, etc.), shopper data for key categories, and/or the like.

In one implementation, the MR-Control may provide clients with insights on campaign effectiveness and recommendations on optimal media allocation using survey questionnaires (e.g., as further discussed in FIGS. 3A-3D) based on statistical modeling and regression analysis. In further implementations, the impact of each media may be separately analyzed to make recommendation on optimal spend and predict sales based upon survey responses.

In further implementations, the MR-Control may link different type of data for cross channel analysis. In one implementation, the MR-Control may create a unified dataset that profiles audiences for TV and online media consumption, wherein each viewing source (e.g., individual TV set, household TV set, etc.) with viewing and ad exposure information for TV and online is associated with a unique identifier. For example, MR-Control may adopt direct linkage by getting TV and online data for the same household (e.g., via ISP, cable provider, etc.). For another example, MR-Control may segment TV and online data, and link using segments (e.g., segmented by program category, zip code, air time, etc.). For another example, the MR-Control may devise and distribute survey questions about TV viewing and linking with the respondents' online surfing data. In one embodiment, the MR-Control may obtain media consumption data from a variety of channels, such as, but not limited to geographically dispersed TV viewing data sets (e.g., CANOE), persons tracking with EPGs or embedded in TV software or cell phones, metering data from STB, individual smartphone (e.g., Apple iPhone, etc.) based tracking (e.g., social content, persons' watching activities, etc.), and/or the like.

Figure 7F:
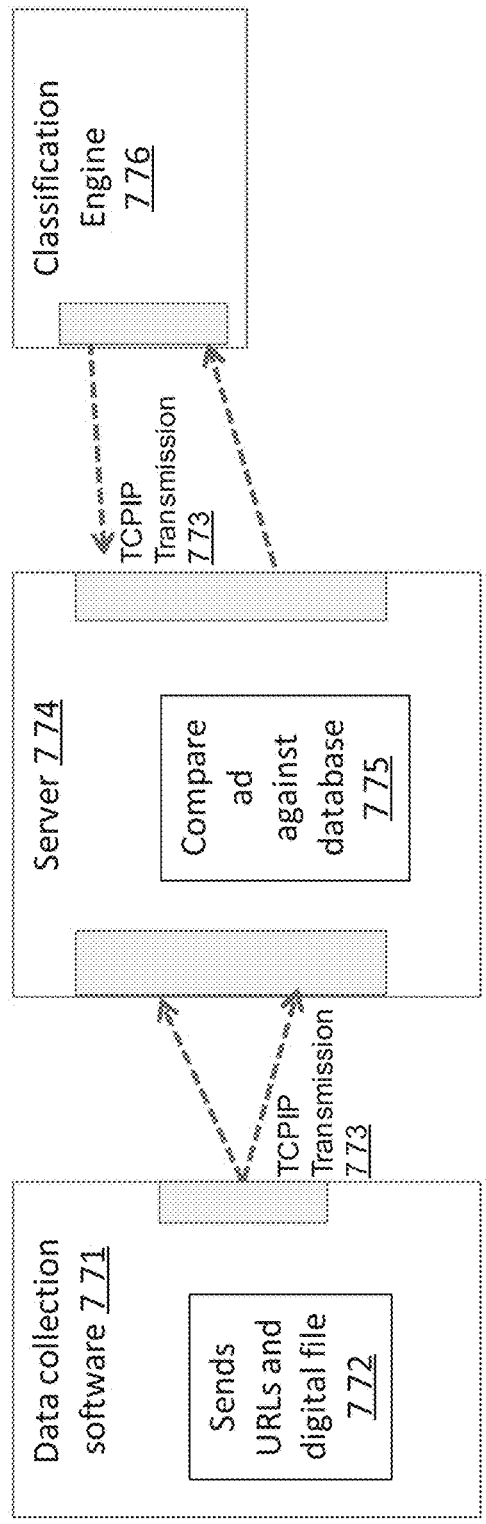

FIG. 7F provides a block diagram illustrating example infrastructure of advertisement recognition within implementations of the MR-Control. Within implementations, the MR-Control may measure which advertisement audience has been exposed to by mining the monitored data in/out of the user mobile device, user computer, and/or the like (see e.g., 740 at FIG. 7E). For example, URL links and data file may be collected and sent 772 by a data collection software 771 running at a client component instantiated on a user mobile device. In another implementation, the data collection may be performed at a proxy or VPN server.

For digital advertising (online and mobile), MR-Control may classify the advertisements via a hybrid manual/automatic process. For example, MR-Control may adopt a mobile or PC-based system (using a software meter, VPN, and/or Proxy Server, among other technologies) to pass along to a staging server the URL of the ad, along with the actual file (typically a .gif, .jpg, or .png). For example, upon receiving ad data including URLs and associated digital files (e.g., media program excerpt files, etc.) via a network connection 773, the MR-Control server 774 may compare the received advertisement data with ad profiles in a database 775. The filename, file size, and other data may be compared against an ad database, and if the ad has already been classified, then the new ad exposure event is transmitted to a classification engine 776 classified based on classification rules in the database. Classification rules may include brand and product mentions, as well as ad size and other descriptors. If a match is not found, then the ad is put in a queue for manual classification by a MR-Control representative. For example, the MR-Control representative may identify the object (e.g., a product, a brand name, etc.) that is advertised within the ad.

In one implementation, the advertisement may be identified via graphical content match, as discussed in FIG. 7E. In an alternative implementation, the ad identification may be performed via an automated system, by which ads that do not match any items in the ad database may be examined automatically by a computer program for clues as to the proper classification. For example, when an ad that mentions Acura in the ad image, the MR-Control may automatically classify the ad as an Acura advertisement. Within implementations, the MR-Control may perform character recognition procedures (e.g., optical character recognition, etc.) to obtain key terms from advertisement images for advertising exposure identification. Such ad identification may be used for advertising effectiveness measurement. Numerous OCR engines may be adopted, such as GOCR, Java OCR, OmniPage, SimpleOCR, and/or the like.

FIGS. 8A-8E provide exemplary mobile screen shots illustrating user interfaces within embodiments of the MR-Control. As shown in FIG. 8A, the MR-Control user interface may comprise a section for social media status, e.g., the Facebook user "John Smith is watching The Big Bang Theory on CBS" 820. The user may also view a list of his friends' status 805, e.g., what the friends are watching.

In one implementation, the user may view a list of channel program 810 schedules, and may elect to tap on the screen to choose one of the listed channels. In a further implementation, the user may select to allow ambient monitoring 850, so that the MR-Control may "listen-in" and submit atmospherics data to the MR-Control server, as discussed at 241 in FIG. 2B.

Figure 8B:
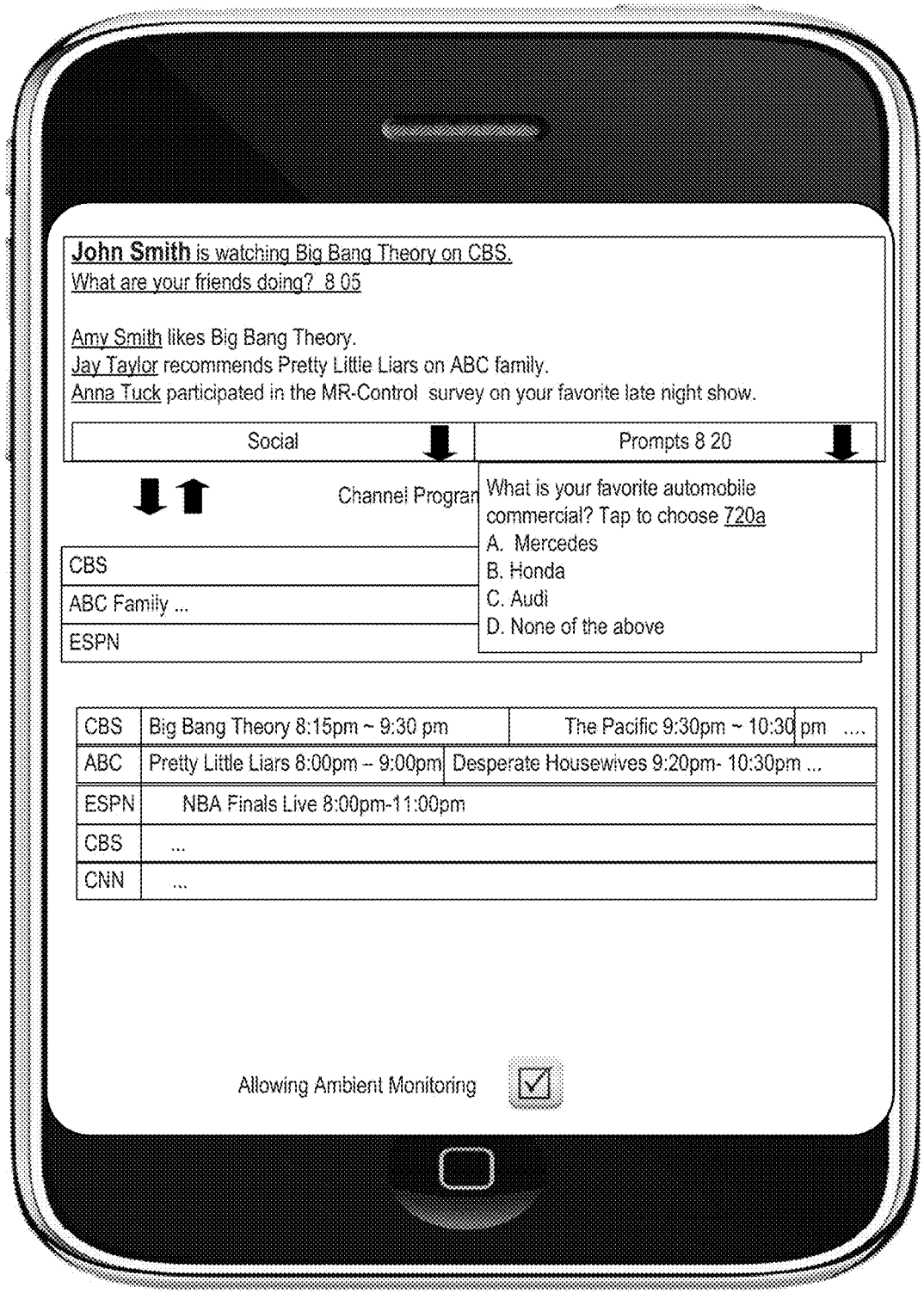
Figure 8C:
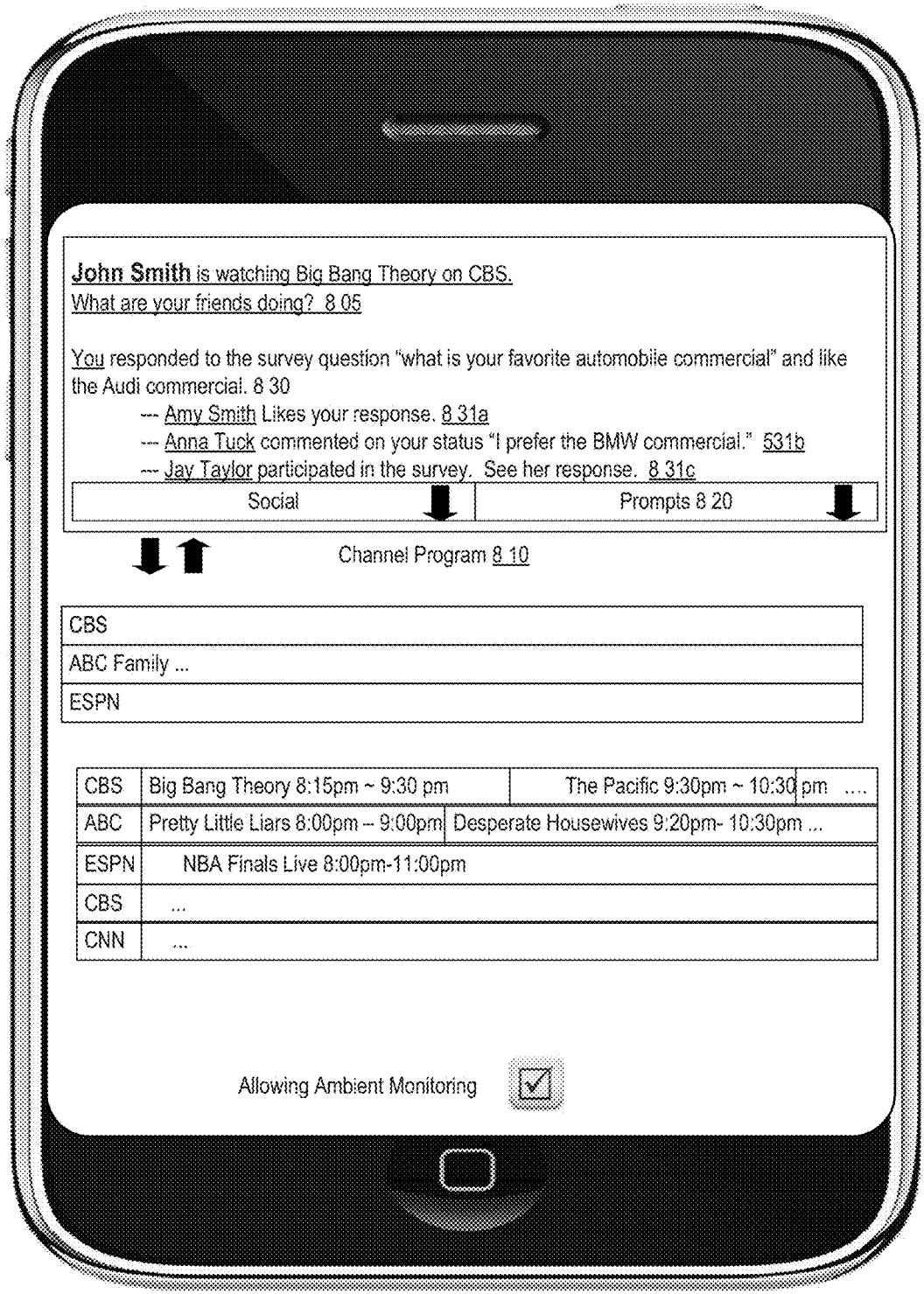
Figure 8D:
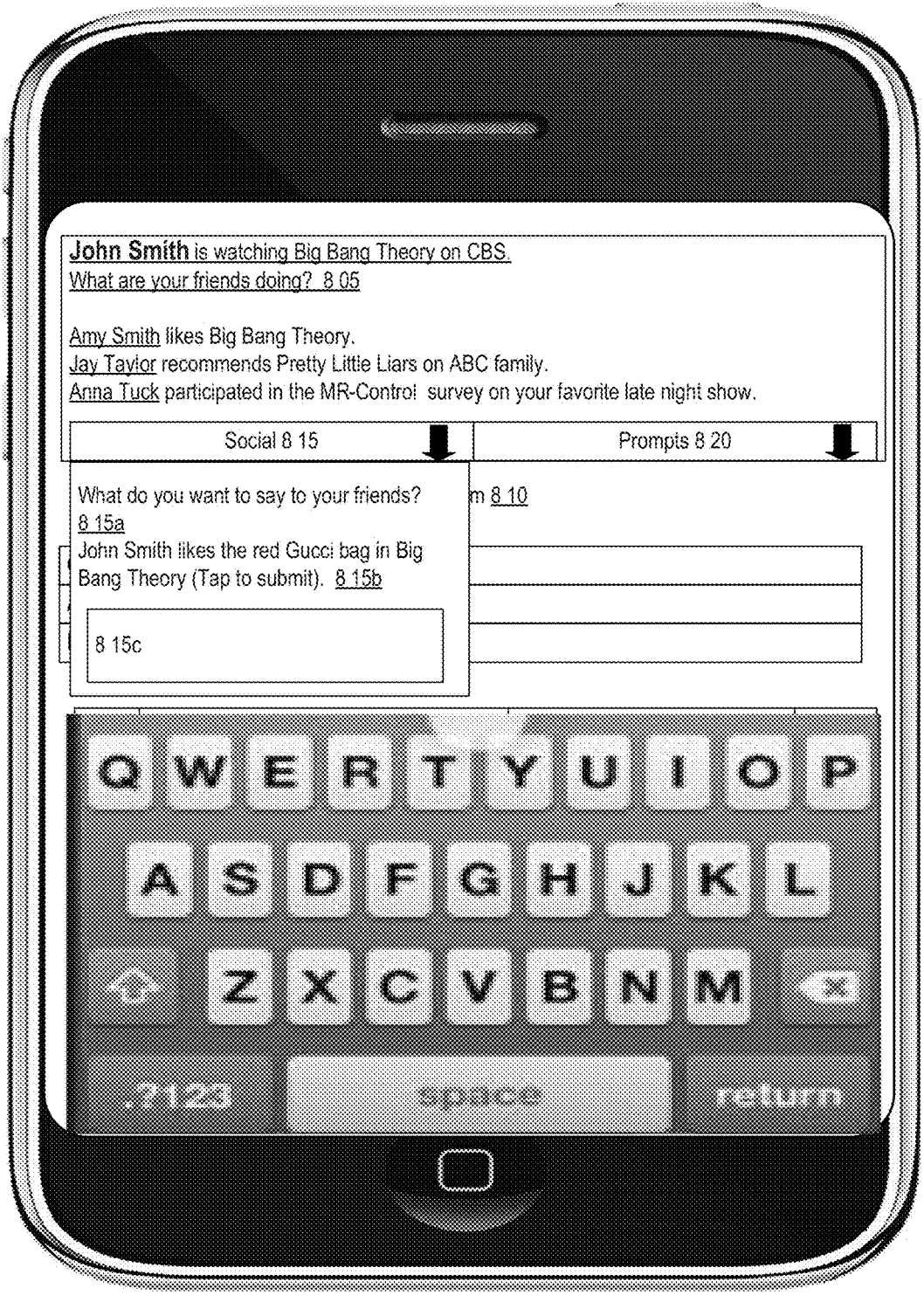

In further implementations, the user may click on the "Prompts" 820 button and view a drop down list of survey questions, e.g., as shown in FIG. 8B. The survey question may be generated based on the media content the user has been watching, as discussed in FIG. 3B. Upon the user submitting a response, as shown in FIG. 8C, the user response may be populated as a social media message 830. In one implementation, the user's friends may view the user's activity and "likes" the user's response 831*a*, commented on the response 831*b*, and/or follow the link of the survey and participate in the survey 831*c*.

In further implementations, as shown in FIG. 8D, the user may tap on the "Social" 815 button and launch a drop down panel for social media inputs 815*a*. In one implementation, the MR-Control may generate an automatic message template for the user based on the media ad tags, e.g., the user likes an embedded product placement 815*b*. For another example, the user may manually type texts to update his social media status 815*c*.

Figure 8E:
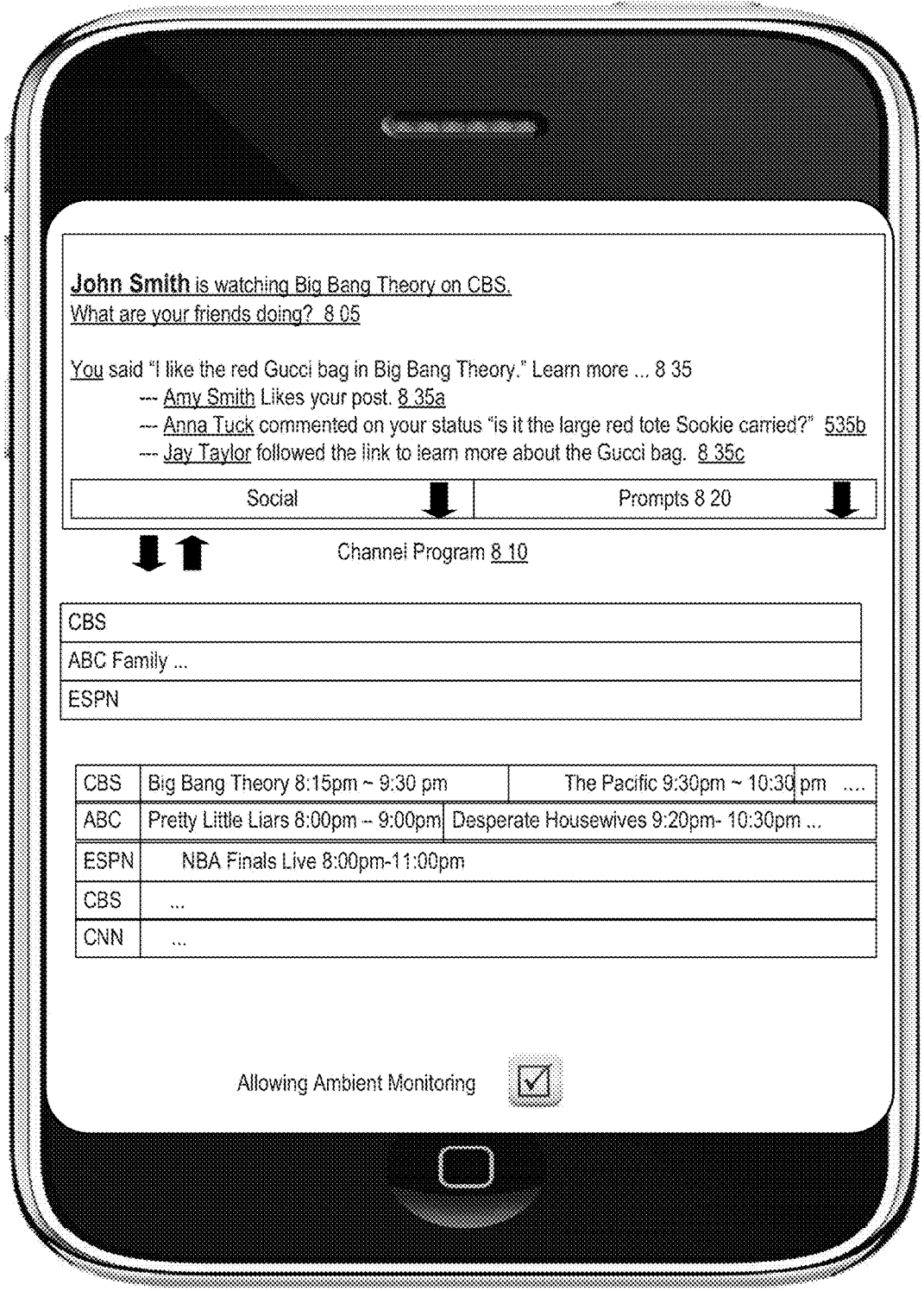

In further implementations, as shown in FIG. 8E, if the user elects to submit a message on social media indicating he likes the embedded product placement 835, the user's friends may be aware of the product. For example, the user's friends may like the post 835*a*, comment on the product 835*b*. For another example, the MR-Control may feed a link directing to a merchant site comprising the placed product along with the social media message, and the user's friend may follow the link to learn more about the placed product via the social media 835*c*.

Figure 8F:
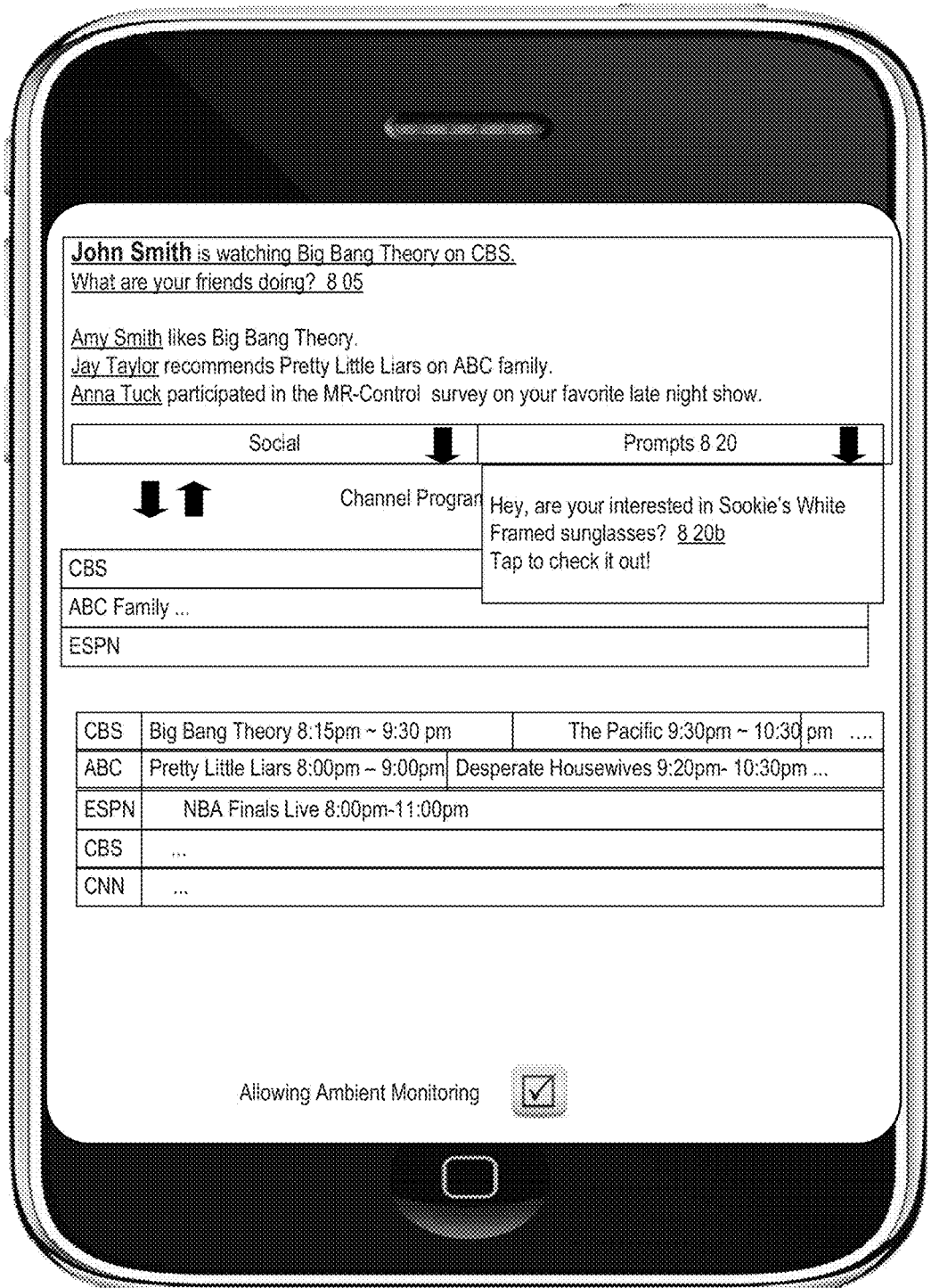
Figure 8G:
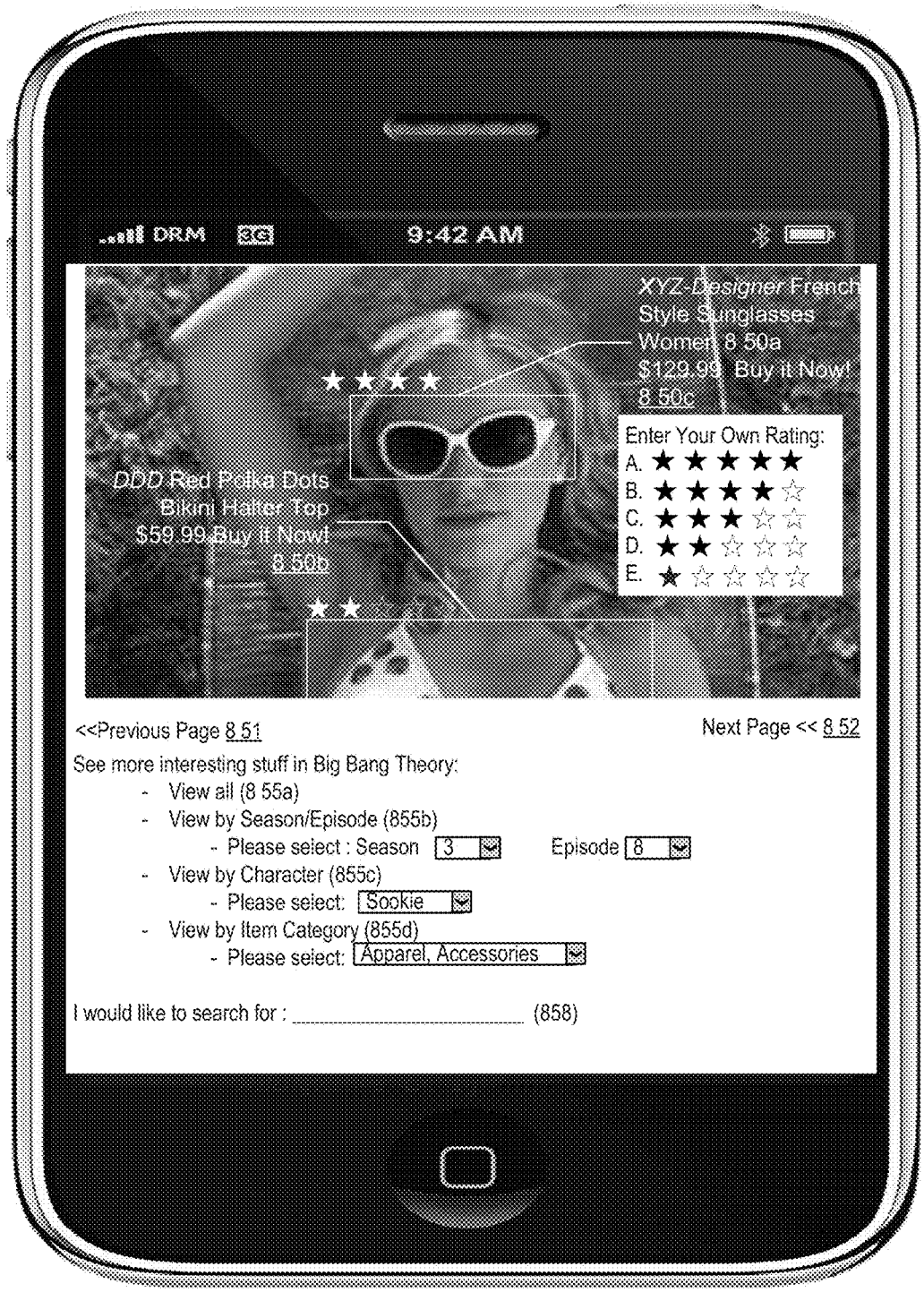
Figure 81:
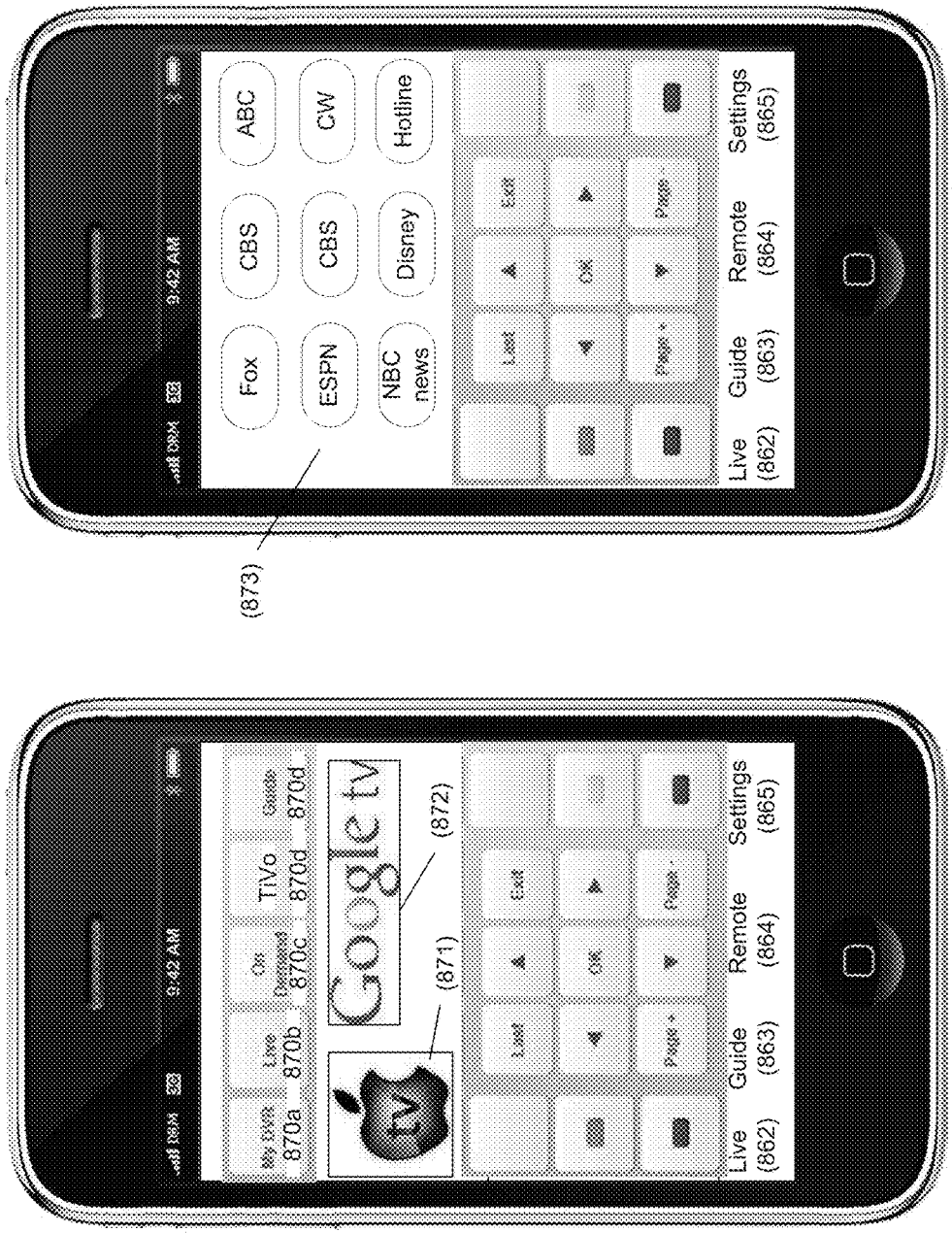

FIGS. 8F-8G provide example mobile screens illustrating synchronized ads within implementations of the MR-Control. In one implementation, MR-Control may provide a static (e.g., textual) ad 820*b* in a prompts drop-down menu 820, as shown in FIG. 8F. For example, when the user selected channel "CBS" has "The Big Bang Theory" on air, and the media content arrives at a timestamp wherein a pair of "white framed sunglasses" is tagged in the scene, MR-Control may generate a pop-up ad 820*b* and provide a link for a user to tap on to check out for more details.

FIG. 8G shows an example interactive ad. For example, the MR-Control may generate an interactive ad including a screen shot of the TV program containing the placed products. The featured products may be tagged (e.g., highlighted by white-line boxes) in the screen image, e.g., a pair of "XYZ-designer French style sunglasses" 850*a*, and "DDD Red Polka Dots Bikini Halter Top" 850*b*. A user may tap on a "Buy it Now" label 850*c* to check out more details, and/or be directed to a merchant site to transact a sale.

In a further implementation, the interactive ad may comprise a user rating of the featured product showing beneath the product. In one implementation, the user rating may be obtained from historical user rating data, social media rating, and/or the like. In one implementation, the user may enter his own rating by tapping on the box 850*d*.

In a further implementation, the user may browse the interactive ads (e.g., including screen shots from the TV program comprising product placement tags, etc.) by going to a previous page 851, and/or a next page 852. In further implementations, the user may elect to browse interactive ads associated with the TV program in a variety ways. For example, the user may elect to view a list of all ads 855*a*; may elect to view by season episode 855*b*; may elect to view by character 855*c* (e.g., products carried by, or associated with the character names in the show); may elect to view by item category 855*d* (e.g., apparel, accessories, furniture, hair products, etc.), and/or the like. In further implementations, the user may initiate a search on desired products 858. For example, if the user is interested in a red hat the character "Penny" wore in one of the scenes, the user may form a query on the embedded ads table based on key terms "Penny," "red," "hat," etc.

FIGS. 8H-8L provide example mobile screen shots illustrating a MR-Control TV remote client component within embodiments of the MR-Control. In one implementation, as shown in FIG. 8H, a user may receive TV guide (e.g., 863) as a list of channel program information 860. The user may also receive live TV information updates in a pop-up window 861 at a "live" section 862. The user may further configure parameters in a "Remotes" section 864 and "Settings" 865, as further illustrated in FIGS. 8J-8L.

When the user tap on the "live" section 862, the user may view a list of most viewed programs, e.g., ranked by registered MR-Control users. The user may also see a list of program that the user's social friends are watching 868, and a list of programs the user has selected 866.

FIG. 8I provides example screens illustrating the "Remotes" 864 at FIG. 8H within implementations of the MR-Control. For example, upon plugging an infrared accessory (e.g., see 120 in FIG. 1B) to a user mobile device, the user may turn the mobile device (e.g., an Apple iPhone, iPod, iTouch, iPad, BlackBerry, Google Android, Palm, etc.) into an infrared TV remote control. Upon tapping on "remote" 864, the user may view a virtual TV remote panel which comprises control buttons for TV program information 870 from which the user may tap to select channels, adjust volume levels, etc. The MR-Control may provide a set-top box control panel to the user for the user to control live/on-demand video playing, and/or the like. The user may also configure DVR control 870*a*, live TV 870*b*, on demand TV 870*c*, TiVo 870*d*, TV guide 870*d* and intelligent TV (e.g., Apple TV 871, Google TV 872), and/or the like. For another example, the user may view an array of fast keys for different channels 873.

Figure 8K:

FIGS. 8J-8K provides example screens illustrating the "Setting" 865 at FIG. 8H within implementations of the MR-Control. In one implementation, the user may configure TV provider 875*a*, set-top box 875*b*, Smart TV 875*c*, TiVo 875*d*, DVD 875*e* parameters for the mobile TV remote for MR-Control. In one implementation, the user may enter the zip code 876 to receive a list of TV providers available in the area, and select his own provider. In another implementation, the user may elect to choose "use TV" only, or to set-up and test a set-top box for his television set. In further implementations, the user may configure TV and DVD parameters so that the infrared plug-in accessory may query an address of the TV and DVD set. In one implementation, the user may select a TV brand 880 from a brand list, and then select a type of the TV. For example, the user may tap on a few testing buttons under each type, e.g., "Power," "Volume," "Select," etc., to test whether the remote control works for the TV.

In another implementation, the user may configure DVDs via the MR-Control. The MR-Control may initiate an automatic scan upon user selection, and/or receive an indication from the user of the DVD brand. Upon indicating the DVD brand, the user may test connection with the DVD set to select a DVD type.

In another implementation, the user may enter a zip code to configure the TV provider 875*a*, so that the MR-Control may provide a list of TV providers for the user to choose.

FIG. 8K provides an exemplary mobile screen shot illustrating social profile of a TV program within implementations of the MR-Control. In one implementation, the user may select a TV program (e.g., "Channel 5" 885) on a channel to view its social profile. In one implementation, the user may tap on "Check-in" 886 to populate a Facebook message with regard to the checked TV program, and/or "Twitter" icon 887 to share such information on Twitter. For example, to "Check-in," the user may select post onto his Facebook wall by typing a message 886*a*, and/or share the automatically generated message 886*a* by MR-Control. In another implementation, if the user chooses to "Tweet," the user may view a list of "discussion" 888 Tweets with regard to the show "The Big Bang Theory," and may generate his own Tweet.

In one implementation, the user may view a social rating 889 of the TV program "The Big Bang Theory" under its profile. For example, the rating 889 may be given by social users of MR-Control who has viewed the program, and the user may elects to submit his own rating 889*a*. In a further implementation, the user may obtain a list of "social watching" 890 to see a list of social users (e.g., social media users who has allowed MR-Control to access their social profiles, etc.) who is watching the selected TV program.

Figure 9A:

FIG. 9A provides an exemplary mobile screen shot (e.g., 511*a* in FIGS. 5A-5B) illustrating user authorization of MR-Control access to the user's Facebook content within embodiments of the MR-Control. In one implementation, a user may receive a message (e.g., a pop-up message window, an email, etc.) requesting a user to elect whether to allow MR-Control to access his Facebook content. For example, the user may tap on a link in the message, e.g., "Yes" or "Not Now" to grant or deny permission to his Facebook content.

In another implementation, as shown in FIG. 9A, a user may configure social network connection settings under the settings (e.g., see 865 at FIG. 8H) of MR-Control client mobile application. In one implementation, the MR-Control may send an access request so that a user may view a prompt from his mobile device 911, and may elect allow or disallow the MR-Control access attempt 902. The user may be directed to a Facebook login page 910, wherein Facebook may request user to provide login credentials to verify the permission authorization. For example, the user may enter his email address 913 and password 915 to login to Facebook. For another example, if the user does not have a Facebook account yet, upon tapping on "Yes," the user may be directed to create a new account. In another implementation, if the user's mobile application (e.g., an iPhone Facebook app, a mobile browser, etc.) stores user previously entered login credentials, the user mobile device may send the login credentials to the social media to proceed with access authorization, so that the user may not need to view the login page 910 to manually provide user credentials.

Upon providing Facebook login credentials and verification of Facebook, the user may receive a request for permission screen 911 to select to "Allow" 908 MR-Control to access the user's Facebook profile. In further implementations, the user may configure access parameters in a similar manner as illustrated in FIGS. 9B-8C.

Figure 9B:
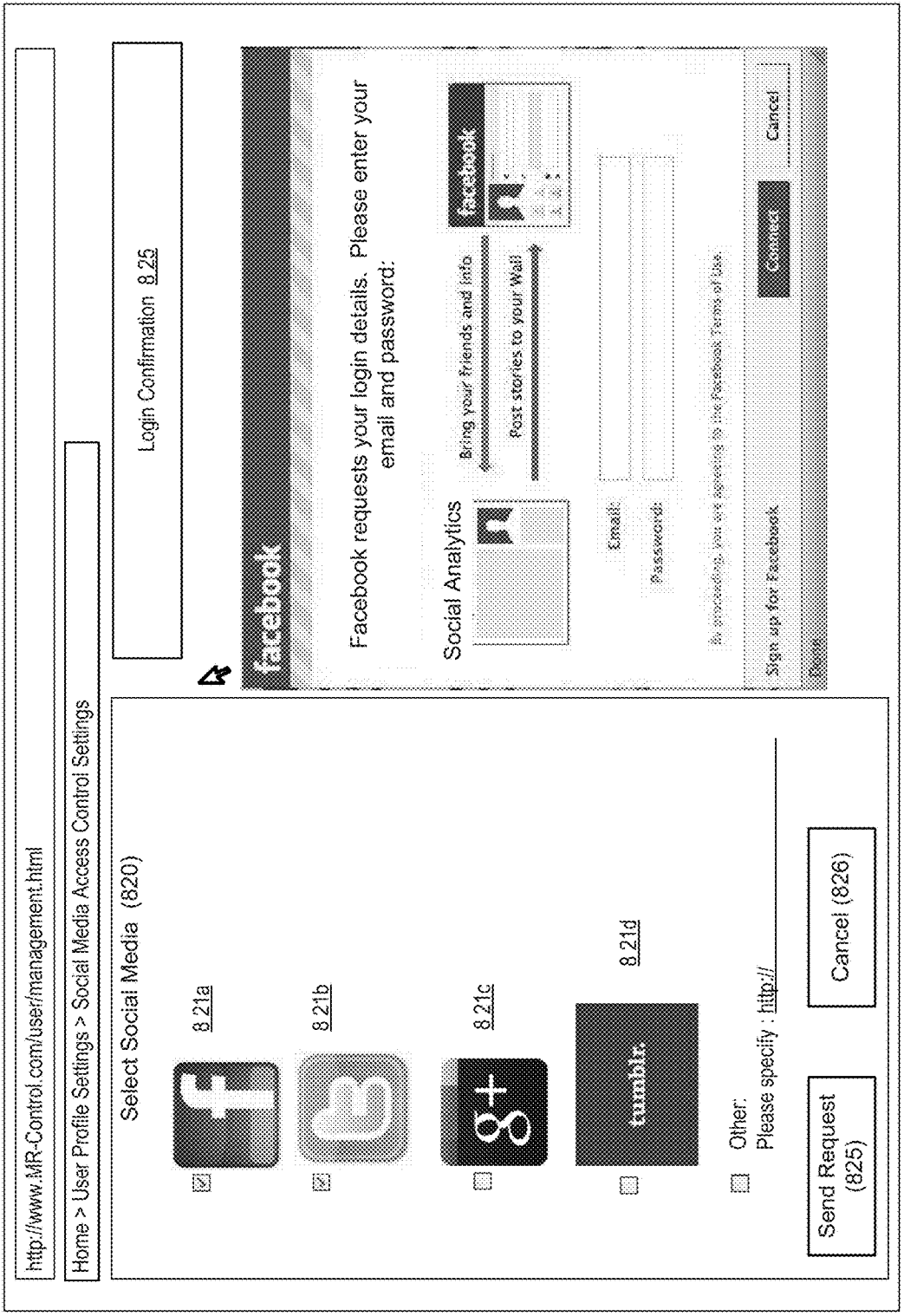

FIGS. 9B-8C provide exemplary web-based user interface (e.g., 511*b* in FIGS. 5A-5B) illustrating user authorization of MR-Control access to the user's social media content within embodiments of the MR-Control. For example, in one implementation, a user may access a web-based MR-Control configuration page via an Internet browser (e.g., Internet Explorer, Safari, Firefox, etc.) to bridge his social media accounts with MR-Control. In one implementation, the user may select a list of social media platforms 920 to join MR-Control, e.g., the user may click on checkboxes to choose Facebook 921*a*, Twitter 921*b*, Google+921*c*, Tumblr 921*d* and/or the like. In further implementations, the user may specify other social media platforms not listed by MR-Control by typing a URL address, e.g., "FourSquare," etc. Upon selecting the social media, the user may click "Send Request" 925 so that MR-Control may send a connection request to the selected social media platforms, e.g., Facebook 921*a* and Twitter 921*b* as shown in the example of FIG. 9B. In another implementation, the user may click "Cancel" 926 to abort the access control configuration.

In one implementation, upon submitting the request 925, the social media platform may request login confirmation 925. For example, the user may be redirected to the social media homepage to login. For another example, the user may be presented a pop-up window 928 for the social analytics to connect with Facebook, e.g., the user may need to provide email 926 and password 927 to login to Facebook.

Figure 9C:
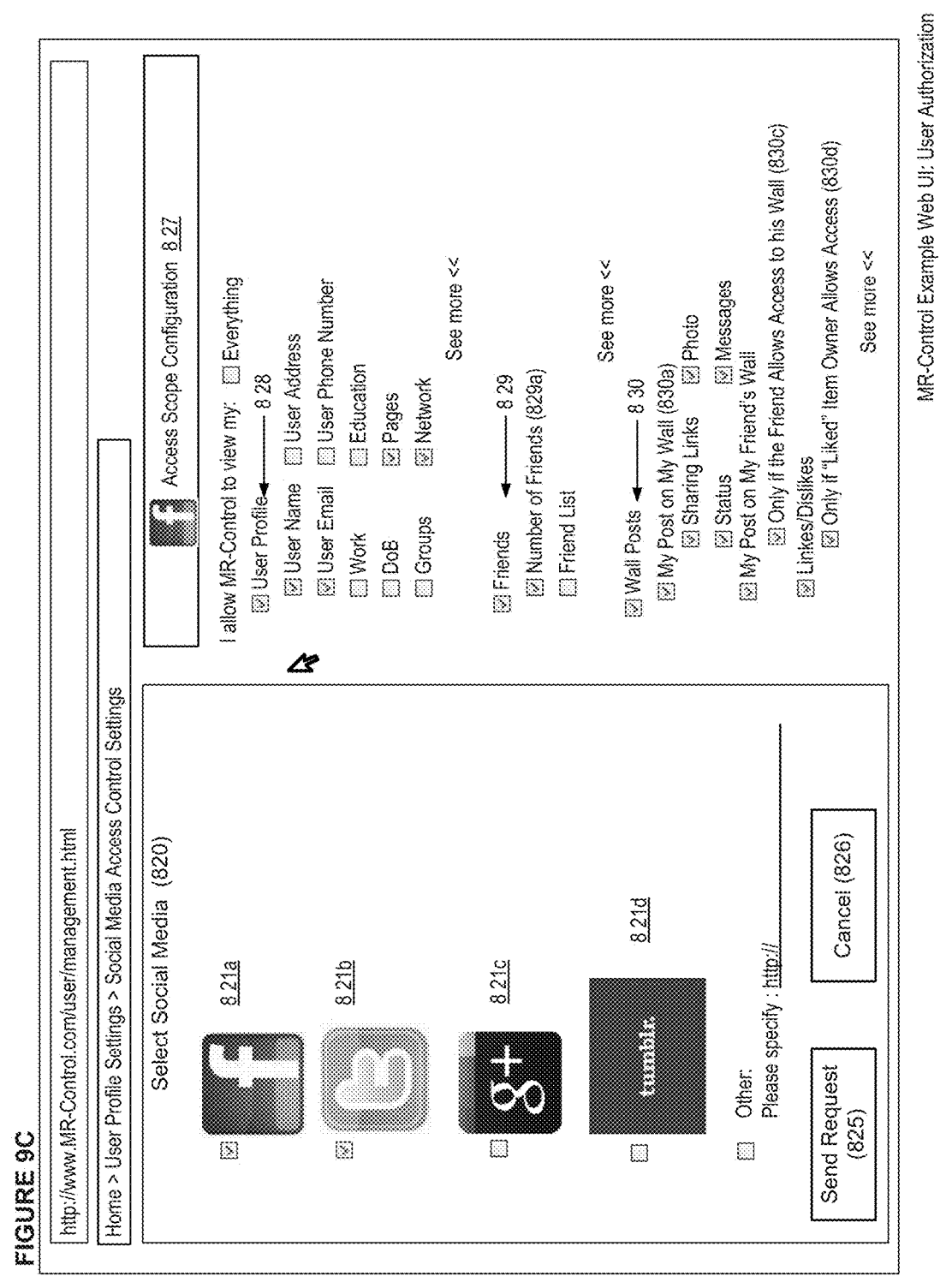

As shown in FIG. 9C, upon providing user Facebook credentials, the user may configure access scope 927 for Facebook content. For example, the user may elect to allow MR-Control to access his user profile, e.g., the user may select among a list of checkboxes for user name, user address, user email, user phone number, work information, education information, date of birth, pages, groups, networks, and/or the like. For another example, the user may configure the MR-Control may access his friends information 929, e.g., the user may allow the MR-Control to obtain a number o friends 929*a* but may not allow the MR-Control to access details of the friends list. For another example, the user may allow the MR-Control to access his wall posts 930, e.g., the user may allow the MR-Control to access his post on his own wall 930*a* (including sharing links, posted photos, status update, messages, etc.). The user may conditionally allow MR-Control to access his post on his friend's wall when the friend allows access to his wall 930*c*. Similarly, the user may conditionally allow MR-Control to access the user's likes/dislikes when the liked or disliked item owner allows MR-Control access 930*d* as well.

Figure 9E:
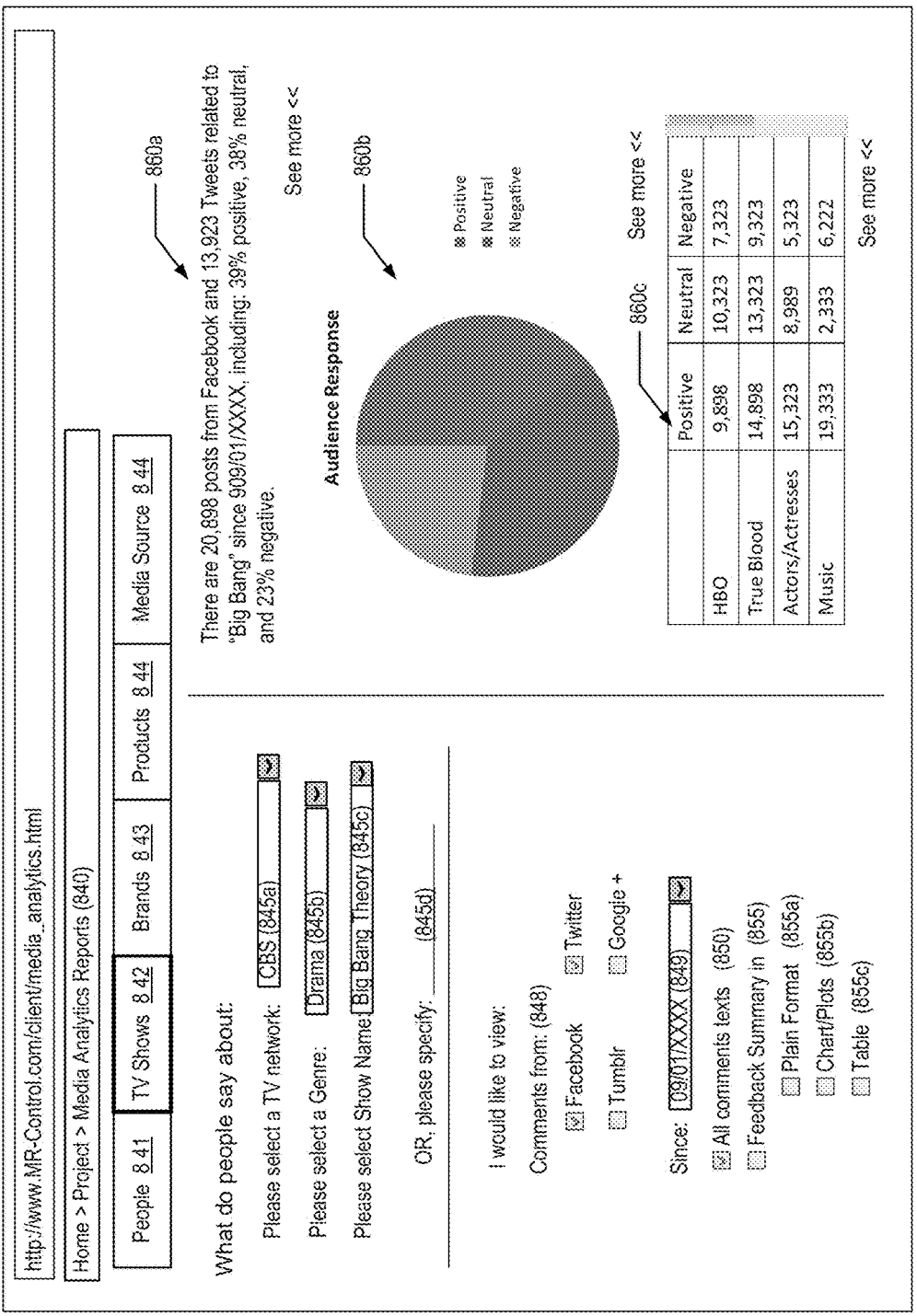

FIGS. 9D-9F provide exemplary web-based user interface illustrating media analytics within embodiments of the MR-Control. For example, as shown in FIG. 9D, a MR-Control user/client (e.g., an advertising merchant, a TV media producer, etc.) who may desire to know audience feedbacks to an ad, TV program, and/or the like, may access a media analytics reports 940 module. In one implementation, the user may select tabs for different options to view analytics of a targeted object (e.g., a TV show, an advertisement, etc.). For example, a use may elect to view comments categorized by people 941, TV shows 942, brand names 943, products 944, media sources 944, and/or the like.

In one implementation, as shown in FIG. 9D, if the user selects TV shows 942, the user may provide information of the TV show by selecting a TV network, (e.g., "CBS" at 945*a*), genre (e.g., "Comedy" at 945*b*), show name (e.g., "The Big Bang Theory" at 945*c*), from a drop down list. In another implementation, the user may manually enter a name of the TV show 945*d* to query on a TV show database at MR-Control.

In one implementation, the user may configure analytics parameters such as social content source 948 (e.g., check on "Facebook" and "Twitter"), time range 949 (e.g., between a specified time and present). The user may further select a presentation format, e.g., whether to view raw textual comments 950, or a visualized summary 955 (e.g., plain format 955*a*, chart/plots 955*b*, or table 955*c*). For example, if raw text 950 is selected, the user may view a list of Facebook comments 950*a*, and Tweets 950*b* related to the show "The Big Bang Theory."

In another implementation, as shown in FIG. 9E, if the user elects to view analytics report in a visualized format 955, the summary may be presented in a plain textual format, e.g., 960*a*, showing statistical results of the positive, neutral and/or negative comments. For another example, charts/plots 960*b*, and a table 960*c* summary may be presented. In one implementation, the analytics summary may be broken down to different categories, e.g., the comments for each category "CBS," "The Big Bang Theory," "Characters," "Music" of the show, and/or the like.

Figure 10A:
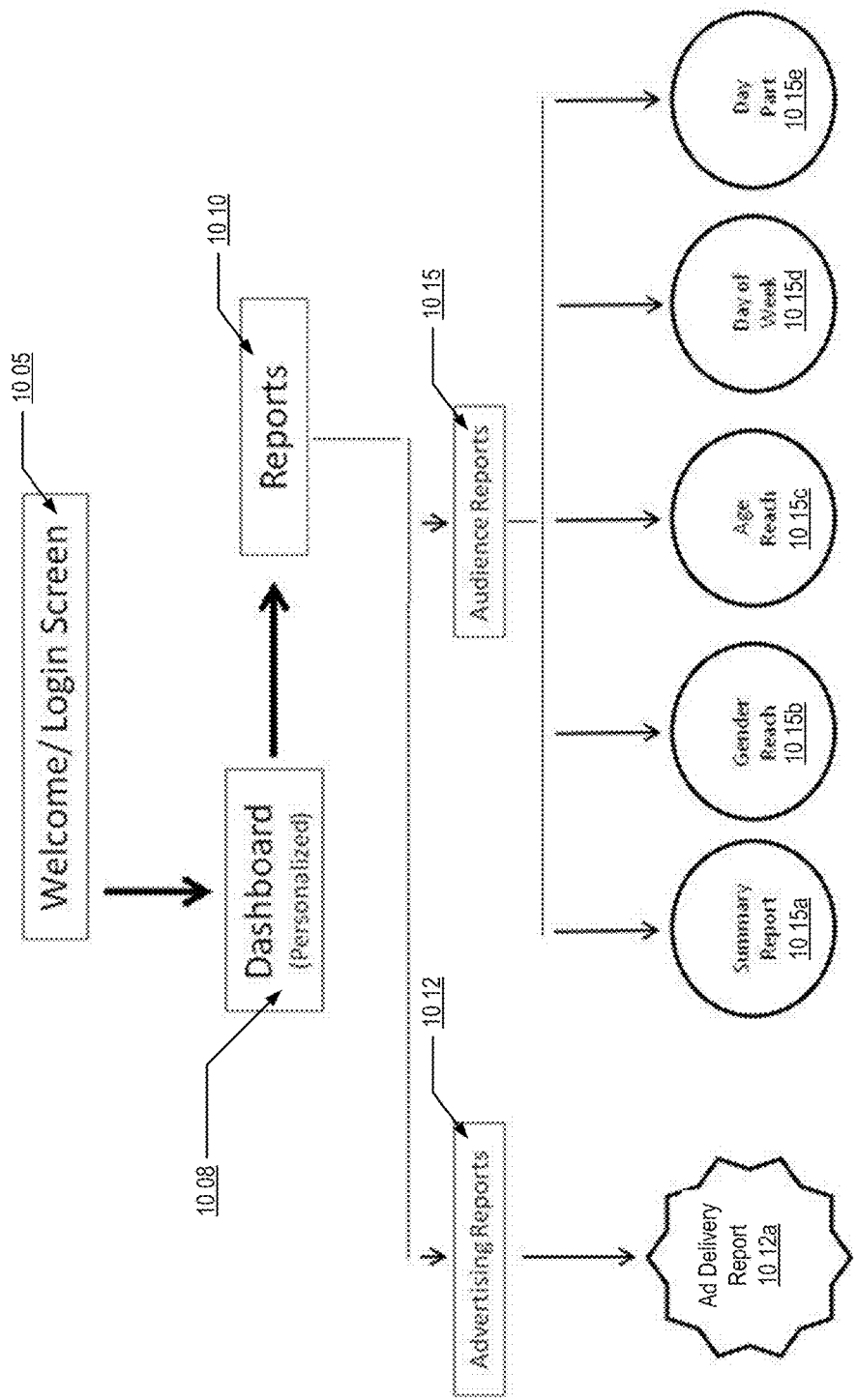
FIGS. 10A-10H provide example block diagrams and exemplary screen shots illustrating cross-channel media analytics within embodiments of MR-Control.

FIGS. 10A-10H provides exemplary user interfaces of media analytics reports within embodiments of the MR-Control. FIG. 10A provides an exemplary MR-Control media analytics UI flow. Within implementations, upon obtaining measurement data from a variety of data channels (e.g., social media, URL links, mobile metering, etc.), the MR-Control may provide web based media analytics platform for a user to access via a Internet web browser. The recorded data analytics as shown in FIGS. 10A-10F may be explored via a variety of data file formats including XML, ASC, and/or the like, through the database export mechanism. Within implementations, these exported files may be imported to analytical tools, such as SAS, etc., wherein various statistical analysis may be engaged. In one implementation, selections made from the dashboard, e.g., a genre selection, 1041 of FIG. 10H, may be used as the query filter prior to the export of the physical information, and as such, and data imported into the package will be limited to the selector (e.g., genre, name, etc.). The output from a standard statistical output from package SAS may be used in its entirety and/or parsed for the dashboard report. For example, the MR-Control may download the statistical output in a text format and present it in a dashboard user interface. In another example, the SAS output may be reported in a statistical format (e.g., comma delineated XML file), which may enhance parsing for the dashboard report generation.

For example, the MR-Control may provide a welcome/login screen to a user 1005, wherein the user may be a MR-Control client, such as a TV producer, an advertiser, a merchant, and/or the like, who may be interested to learn their TV audience statistics, brand/products impressions, and/or the like.

Figure 10B:
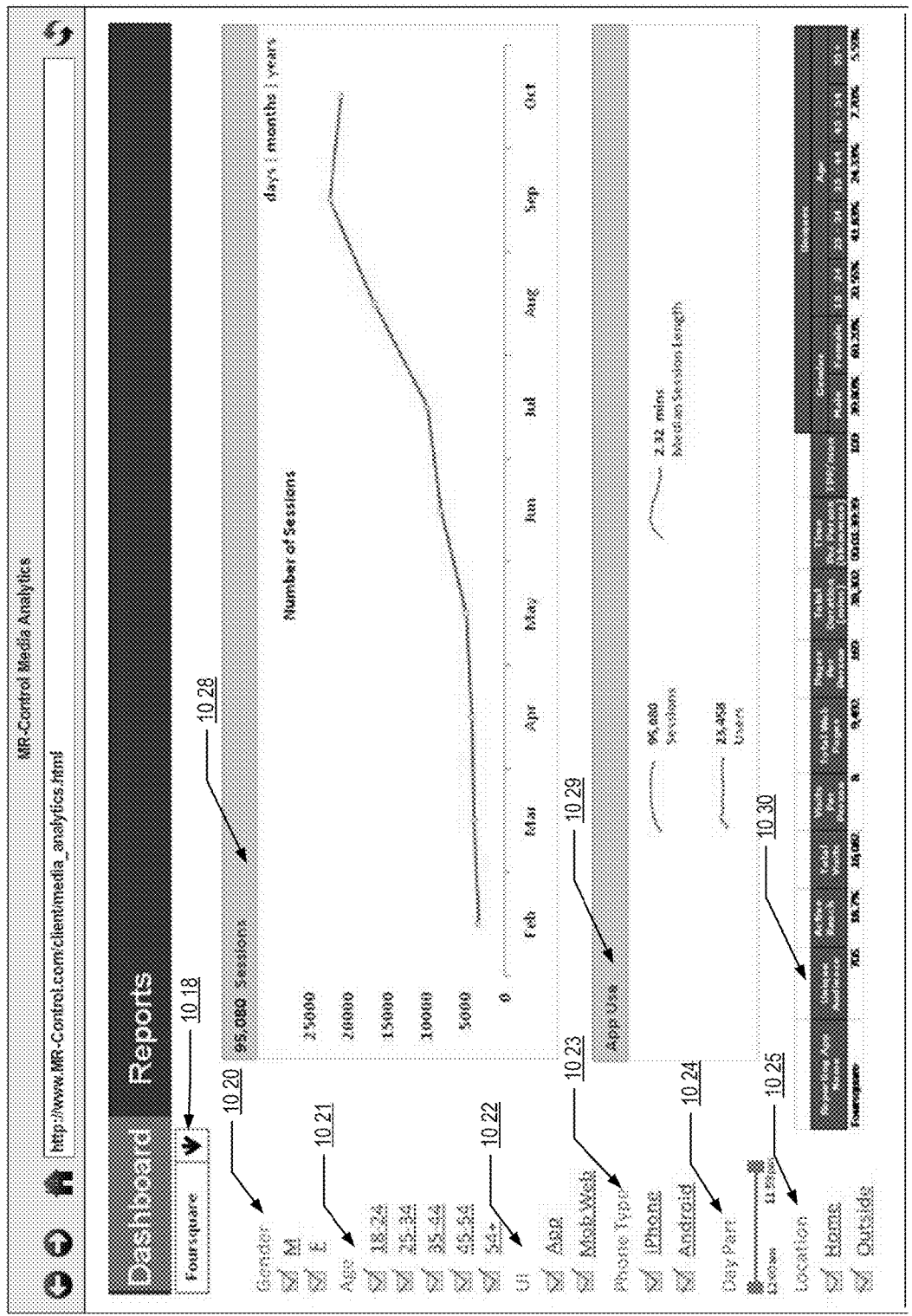

Upon user login at 1005, the MR-Control may provide a customized dashboard page 1008, e.g., as further illustrated in one implementation at FIGS. 10B/10H. The dashboard page may provide an overview of the media analytics results, such as generated report types 1010, available statistics charts/plots, and/or the like. For example, the MR-Control may perform analytics to generate advertising reports 1012 (e.g., advertisement delivery reports 1012*a*, etc.), audience reports 1015 (e.g., an audience summary report 1015*a*, audience reports by gender reach 1015*b*, by age reach 1015*c*, reports per day of week 1015*d*, reports per hour during a day part 1015*e*, etc.).

FIG. 10B provides an exemplary screen shot for media analytics dashboard 1008. In one implementation, a user may elect to configure media analytics parameters. For example, the user may select an object of the media analytics, which may be a media platform, a TV channel, an application platform, and/or the like. The dashboard board may provide a dropdown menu to allow the user to select various applications and media platforms e.g., the user may select view application usage of "Foursquare" 1018. In other implementations, the user may select targeted MR-Control social users for the study, e.g., by checking user gender 1020, age groups 1021, user interface types (e.g., MR-Control application, mobile, web, etc.), phone types 1023, day part time range 1024, user location 1025, and/or the like. In further implementations, the user configured social user group may be saved as a group for further analysis.

In one implementation, the media analytics dashboard page may provide a plot of total MR-Control user sessions 1028 based on the user configured MR-Control social user group. For example, the personal trending data statistics 1028 may further comprise plots of number of users, number of sessions, number of new users, median/mean session length, geographic regions of users, and/or the like. In another implementation, MR-Control may provide analysis of MR-Control application usage statistics 1029, such as a total number of sessions, a total number of registered users, a median session length per user, and/or the like. In another implementation, the MR-Control may provide a summary table 1030 showing the study of user selected reporting application "Foursquare," including audience active reach, total visits, visits per person, total web page views, page view per person, duration, time per person, web user gender, age, and/or the like. For example, a report on the number of users may summarize the number of users an application (e.g., "Foursquare") has had over period of tracking to indicate whether the number is growing or declining. The report may also analyze user sessions in different scenarios (e.g., whether by a single user). For example, when a mobile site has been visited for 50 times, but 30 of those times it was from the same user, versus another month the number visits from different users was 25, the number of users may not be considered as increased.

Figure 10C:
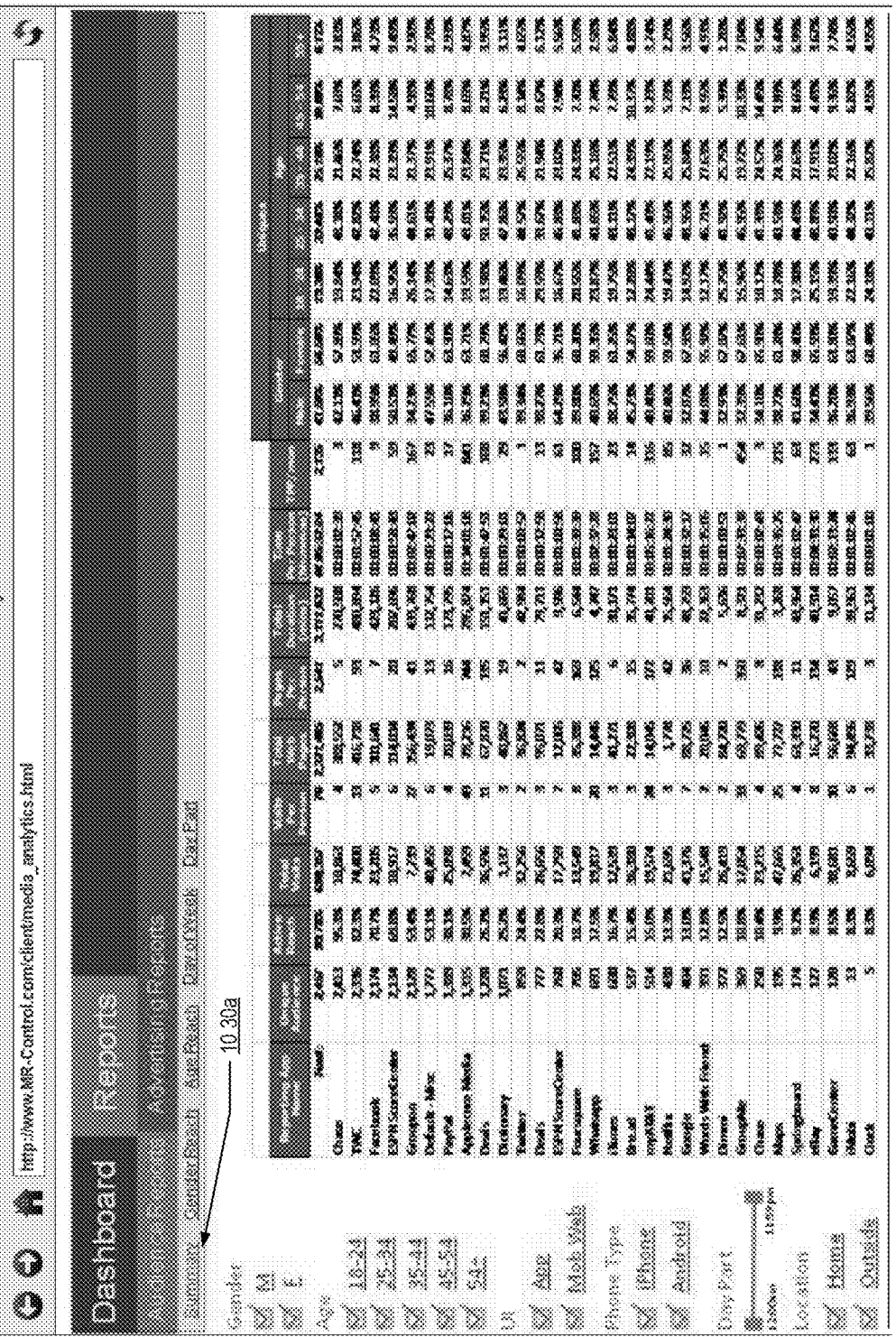

For another example, a report on number of sessions may include number of sessions by all users within the last calendar month, which may be tracked on a monthly trending basis to indicate how often an application/site was seen by all users. For another example, a report on number of new users may show the number of new users for the last calendar month using the application or mobile site. For another example, the median/mean session length may indicate the time spent on application/site. For another example, the geo graphic region of users may show a geographical distribution of users engaging or visiting the application/advertisement FIG. 10C provides an exemplary audience summary report 1015a. As shown in FIG. 10C, the user may select to view "summary" 1030a, for a data table showing: for each reporting application (e.g., Facebook, ESPN SportsCenter, etc.), statistics data for Unique Audience, Percent Active Reach, Time per person (minutes), TPP/Month, Number of visits, Number of pages viewed, Visits/person, Male/Female (for unique and non-unique users/visitors), Age groups (for unique and non-unique users/visitors). For example, the unique audience may be calculated as the total real number of users of an app/site without double counting users that have reused the site/app more than once in a month, and/or the like. The percent active reach of all smartphone users may be calculated as the percentage of users that checked a particular mobile website or application within the last calendar month, e.g., when there are 100 smartphone users, 88 checked Facebook within the last calendar month, active users equal 88%. The time per person (minutes) may be calculated as the amount of time spent during a day on a site/app by avg. active user, e.g., if there was 88 active users and they used a site/app for a total of 20 hours during the day, then the time per person is equal to 22.72 minutes (20/88=0.2272). The TPP/month may be calculated as the time per person per month that is spent on the site. e.g., if there are 70 users and in total and they spend 1000 hours on the site/app then the time per person per month would be 11.11 hours (1000/90). The number of visits may be calculated as the total number of times an app/site was visited during the last calendar month by all users. The number of pages viewed may be calculated as the total number pages viewed on an app/site during the last calendar month by all users. The visits/person may be calculated as the number of visits to app/site on a per active users basis. In one implementation, the above mentioned metrics may be assessed by male/female gender classification (for unique and non-unique users/visitors), age groups (for unique and non-unique users/visitors), e.g., age brackets may be 18-24, 25-34, 35-44, 45-54, 55+, etc.

Figure 10D:
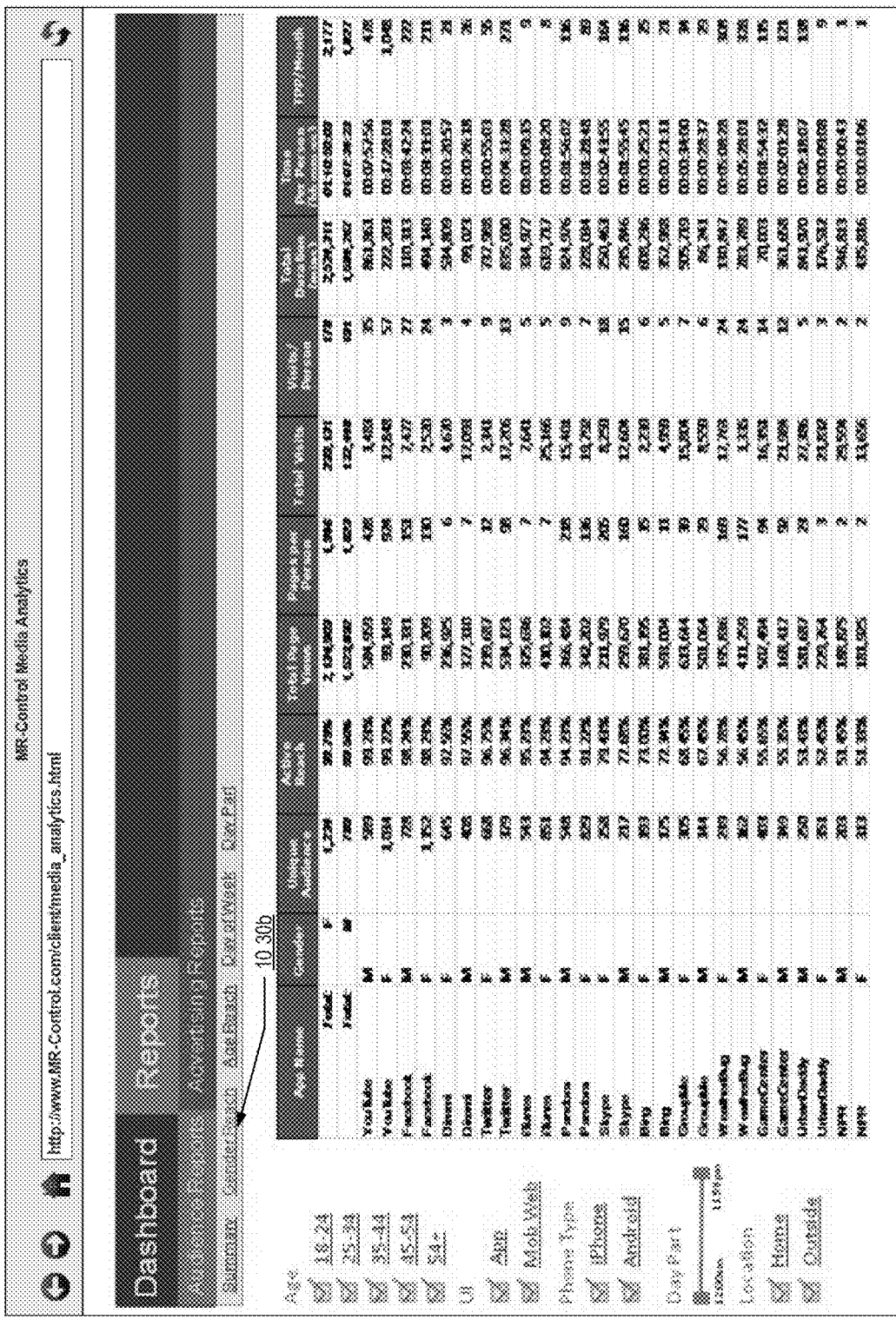
Figure 10E:
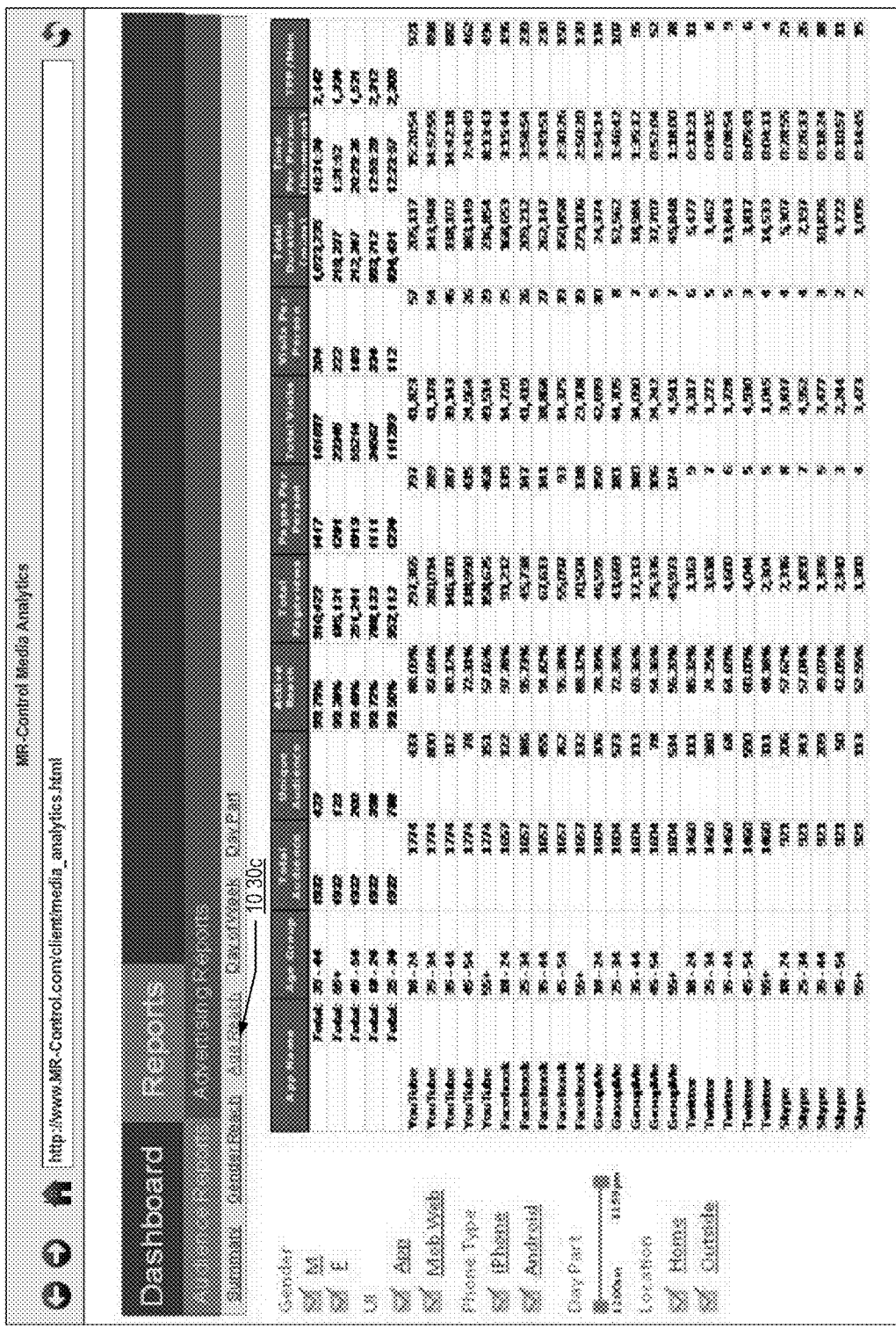

FIG. 10D provides an exemplary audience report per gender reach 1015b. As shown in FIG. 10C, the user may select to view "Gender Reach" 1030b, for a data table showing application report classified by gender, including unique audience active reach (%), total duration (in minutes), time per person, time per person for the month, total web page views, pages per person, total visits, visits per person, and/or the like. For example, the audience report by gender may include data for each app/site broken up by gender. For example, Facebook may provide male and female break of user base, about time men spend on the app, number of pages, etc.

Figure 10F:
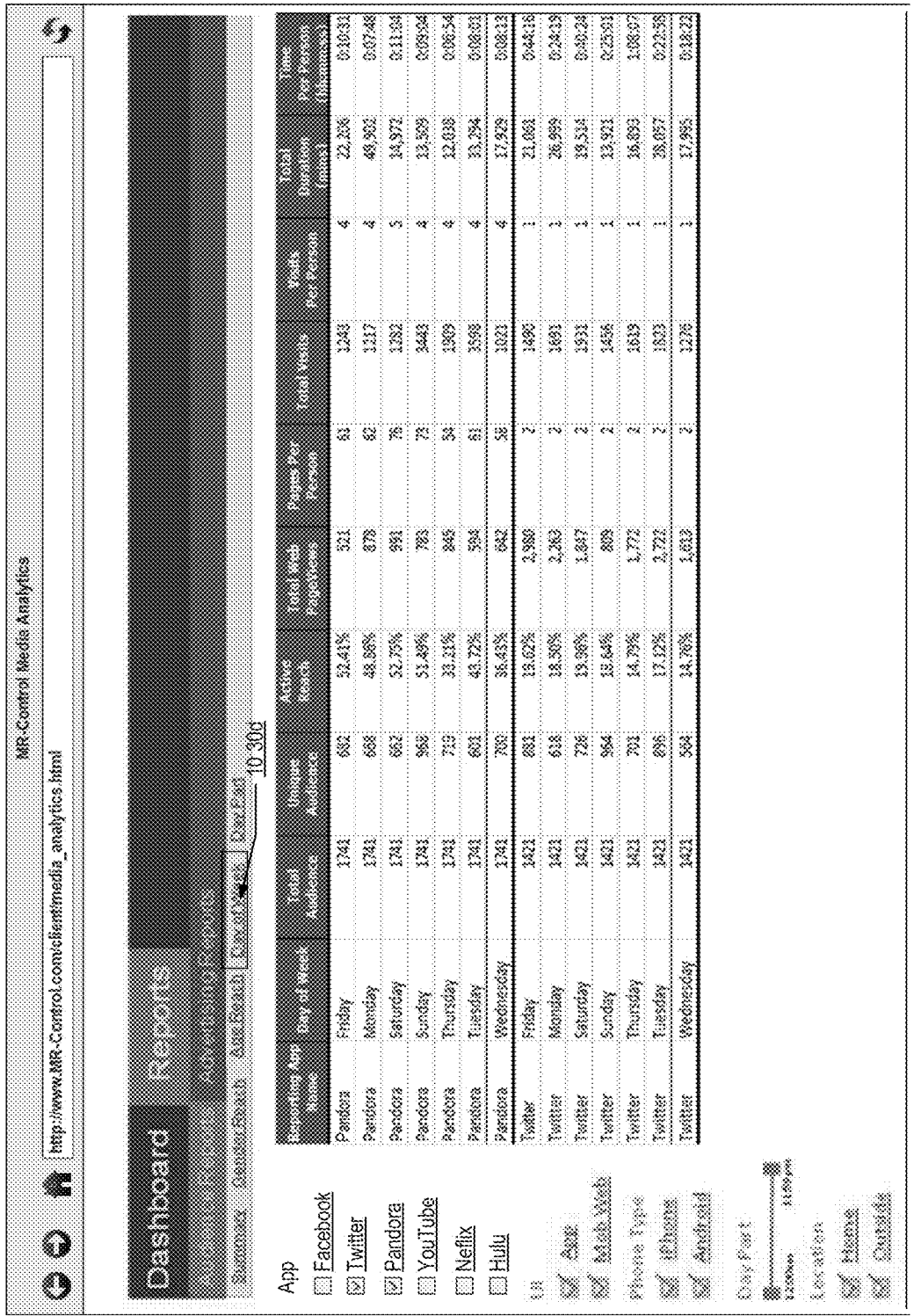

FIG. 10F provides an exemplary audience report per age reach 1015c. As shown in FIG. 10C, the user may select to view "Age Reach" 1030c, for a data table showing application report classified by age, including total audience, unique audience, active reach (%), total duration (in minutes), time per person, time per person over a month period, total page views, pages per person, total visits, visits per person, and/or the like broken up in different age groups.

Figure 10G:
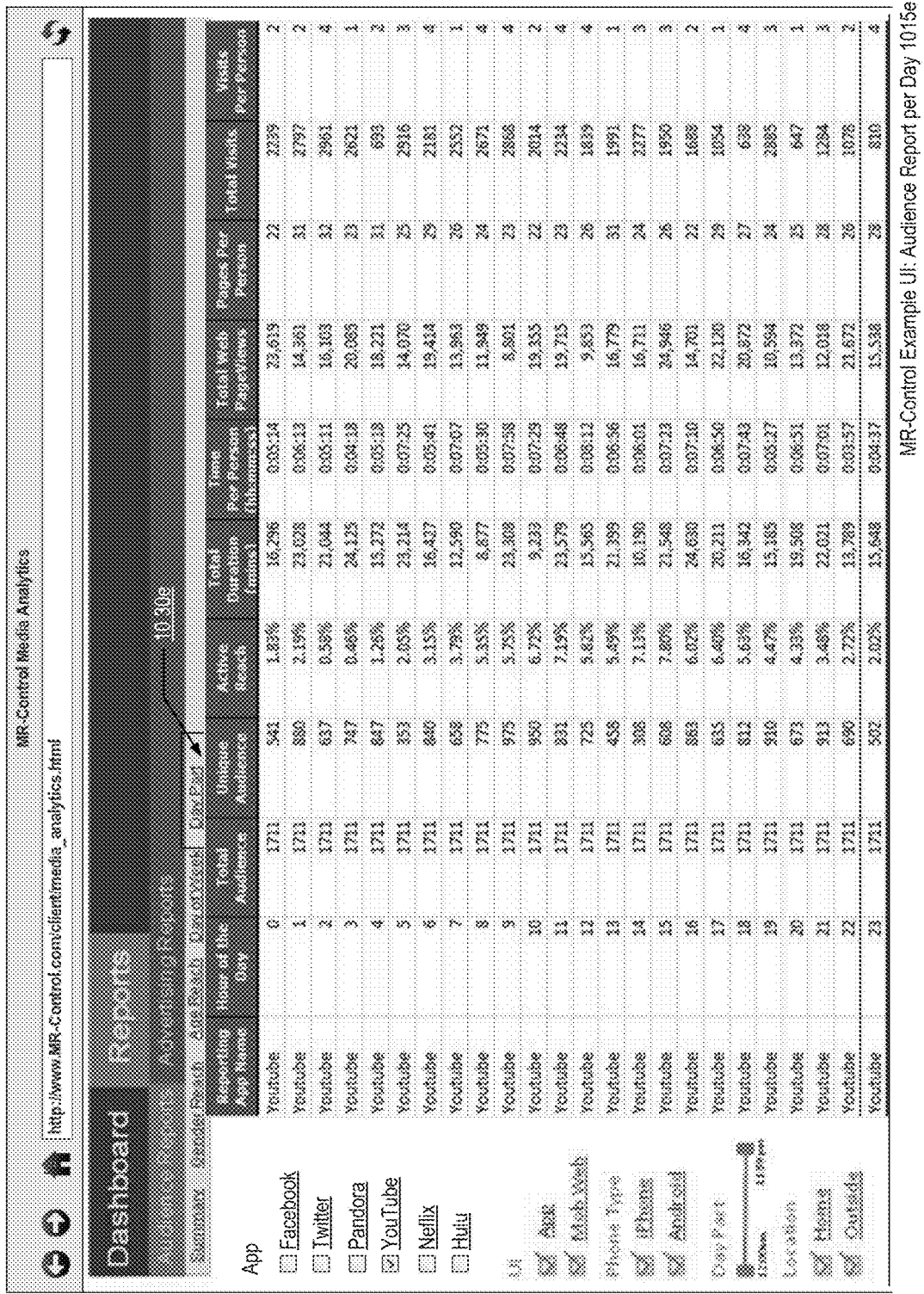

FIG. 10G provides an exemplary audience report per day 1015e. As shown in FIG. 10G, the user may select to view "Day Part" 1030e, for a data table showing application report classified by hours of a day. For example, for this report, for this report, data for each app/site may be broken up by the hour of the day. For example, as shown in FIG. 10G, the Youtube app usage data may be broken up by the hour of the day.

Figure 10H:
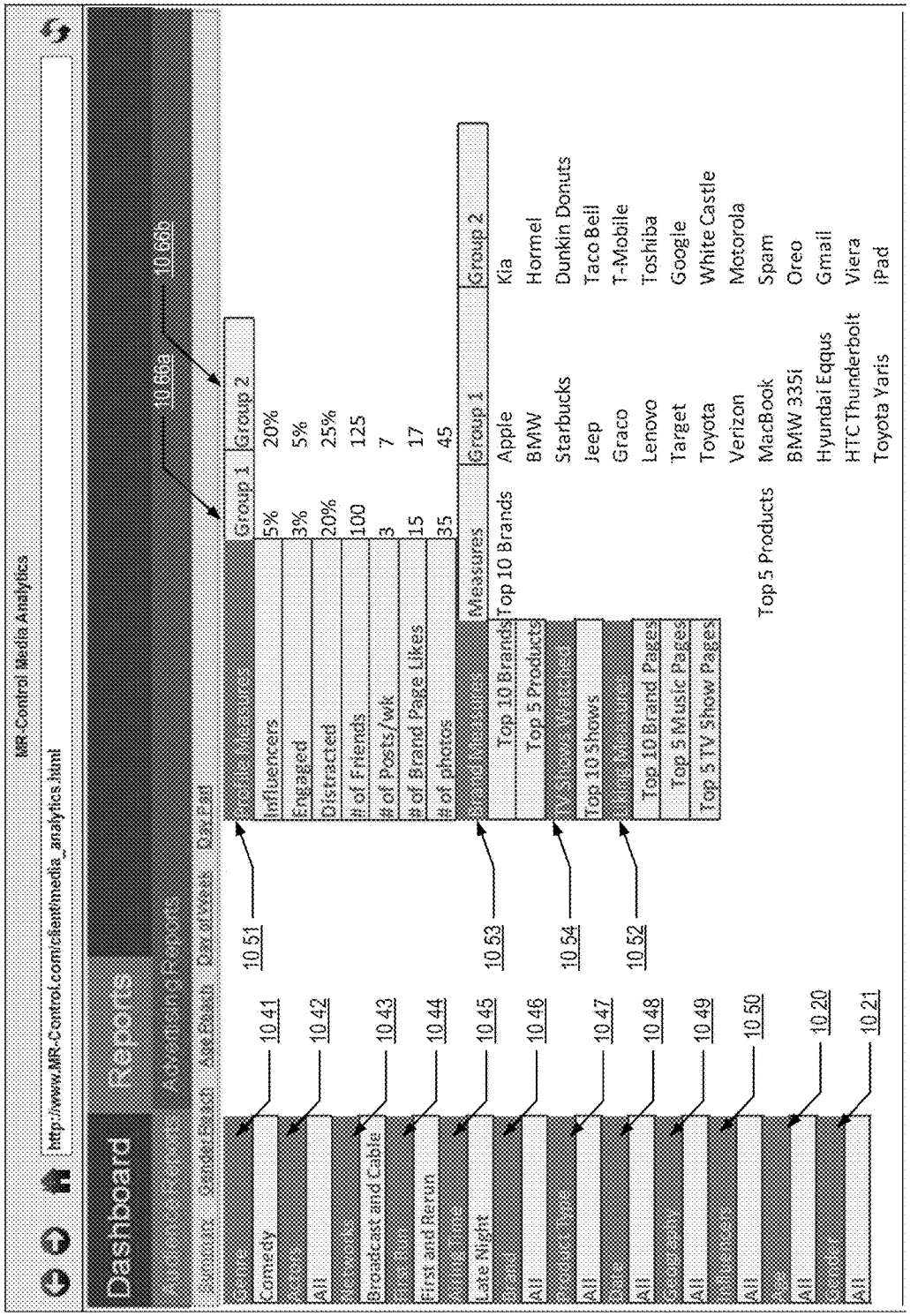

FIG. 10H provides an exemplary analytics report within an alternative implementation of the MR-Control. In one implementation, the MR-Control may collect social data from social media platforms of different social groups (e.g., 1066a, 1066b), e.g., the social groups determined by user configured parameters as shown in FIG. 10B, to determine a variety of measures of social TV watching status, such as, but not limited to profile measures 1051, liking measures 1052, brand measures 1053, TV shows watching measures 1054, and/or the like. In one implementation, the MR-Control may define a social group based on age ranges, gender, demographic information, geographical location, income level, educational level, and/or the like. In another implementation, the user may configure parameters for TV shows, brands/products, social groups, and/or the like, e.g., genre 1041, actors 1042, networks 1043, first run time 1044, airing time 1045, brand 1046, product type 1047, date 1048, geography 1049, influencer s 1050, age 1020, gender 1021, and/or the like.

For example, in one implementation, for a specified TV show (e.g., "Big Bang Theory" at "CBS"), the profile measure 1051 may provide social data metrics with regard to social groups, such as percentage of influencers in a social group (e.g., social users whose watching recommendations have been followed by other social users, etc.), percentage of users who engage in watching the show, percentage of users who is distracted from watching the show (e.g., via atmospherics analysis as illustrated in FIG. 2E), number of friends who have engaged in the TV watching, number of posts per week, a number of brand pages the social group has followed, number of photos the social group has posted, and/or the like. In further implementations, the MR-Control may analyze the social media content to provide liking measures 1052, such as the most positively commented 10 brand pages, music pages, TV show pages, and/or the like; brand measures 1053, such as the top 10 brands, top 5 products mentioned within a social group, and/or the like; the top TV shows watched 1054, and/or the like.

MR-Control Controller

FIG. 11 shows a block diagram illustrating embodiments of a MR-Control controller. In this embodiment, the MR-Control controller 1101 may serve to aggregate, process, store, search, serve, identify, instruct, generate, match, and/or facilitate interactions with a computer through social network and electronic commerce technologies, and/or other related data.

Typically, users, which may be people and/or other systems, may engage information technology systems (e.g., computers) to facilitate information processing. In turn, computers employ processors to process information; such processors 1103 may be referred to as central processing units (CPU). One form of processor is referred to as a microprocessor. CPUs use communicative circuits to carry and pass encoded (e.g., binary) signals acting as instructions to bring about various operations. These instructions may be operational and/or data instructions containing and/or referencing other instructions and data in various processor accessible and operable areas of memory 1129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MR-Control controller 1101 may be connected to and/or communicate with entities such as, but not limited to: one or more users from user input devices 1111; peripheral devices 1112; an optional cryptographic processor device 1128; and/or a communications network 1113.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The MR-Control controller 1101 may be based on computer systems that may comprise, but are not limited to, components such as: a computer systemization 1102 connected to memory 1129.

Computer Systemization

A computer systemization 1102 may comprise a clock 1130, central processing unit ("CPU(s)" and/or "processor(s)" (these terms are used interchangeably throughout the disclosure unless noted to the contrary)) 1103, a memory 1129 (e.g., a read only memory (ROM) 1106, a random access memory (RAM) 1105, etc.), and/or an interface bus 1107, and most frequently, although not necessarily, are all interconnected and/or communicating through a system bus 1104 on one or more (mother)board(s) 1102 having conductive and/or otherwise transportive circuit pathways through which instructions (e.g., binary encoded signals) may travel to effectuate communications, operations, storage, etc. The computer systemization may be connected to a power source 1186; e.g., optionally the power source may be internal. Optionally, a cryptographic processor 1126 and/or transceivers (e.g., ICs) 1174 may be connected to the system bus. In another embodiment, the cryptographic processor and/or transceivers may be connected as either internal and/or external peripheral devices 1112 via the interface bus I/O. In turn, the transceivers may be connected to antenna(s) 1175, thereby effectuating wireless transmission and reception of various communication and/or sensor protocols; for example the antenna(s) may connect to: a Texas Instruments WiLink WL1283 transceiver chip (e.g., providing 802.11n, Bluetooth 5.0, FM, global positioning system (GPS) (thereby allowing MR-Control controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that may increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves may incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1129 beyond the processor itself; internal memory may include, but is not limited to: fast registers, various levels of cache memory (e.g., level 1, 2, 5, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the MR-Control controller and beyond through various interfaces. Should processing requirements dictate a greater amount speed and/or capacity, distributed processors (e.g., Distributed MR-Control), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the MR-Control may be achieved by implementing a microcontroller such as CAST's R8051XC2 microcontroller; Intel's MCS 51 (i.e., 8051 microcontroller); and/or the like. Also, to implement certain features of the MR-Control, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MR-Control component collection (distributed or otherwise) and/or features may be implemented via the microprocessor and/or via embedded components; e.g., via ASIC, coprocessor, DSP, FPGA, and/or the like. Alternately, some implementations of the MR-Control may be implemented with embedded components that are configured and used to achieve a variety of features or signal processing.

Depending on the particular implementation, the embedded components may include software solutions, hardware solutions, and/or some combination of both hardware/software solutions. For example, MR-Control features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the MR-Control features. A hierarchy of programmable interconnects allow logic blocks to be interconnected as needed by the MR-Control system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MR-Control may be developed on regular FPGAs and then migrated into a fixed version that more resembles ASIC implementations. Alternate or coordinating implementations may migrate MR-Control controller features to a final ASIC instead of or in addition to FPGAs. Depending on the implementation all of the aforementioned embedded components and microprocessors may be considered the "CPU" and/or "processor" for the MR-Control.

Power Source

The power source 1186 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1186 is connected to at least one of the interconnected subsequent components of the MR-Control thereby providing an electric current to all subsequent components. In one example, the power source 1186 is connected to the system bus component 1104. In an alternative embodiment, an outside power source 1186 is provided through a connection across the I/O 1108 interface. For example, a USB and/or IEEE 1394 connection carries both data and power across the connection and is therefore a suitable source of power.

Interface Adapters

Interface bus(ses) 1107 may accept, connect, and/or communicate to a number of interface adapters, conventionally although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1109 may accept, communicate, and/or connect to a number of storage devices such as, but not limited to: storage devices 1114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1110 may accept, communicate, and/or connect to a communications network 1113. Through a communications network 1113, the MR-Control controller is accessible through remote clients 1133$b$ (e.g., computers with web browsers) by users 1133$a$. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed MR-Control), architectures may similarly be employed to pool, load balance, and/or otherwise increase the communicative bandwidth required by the MR-Control controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1110 may be used to engage with various communications network types 1113. For example, multiple network interfaces may be employed to allow for the communication over broadcast, multicast, and/or unicast networks.

Input Output interfaces (I/O) 1108 may accept, communicate, and/or connect to user input devices 1111, peripheral devices 1112, cryptographic processor devices 1128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a TV set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1111 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1112 may be connected and/or communicate to I/O and/or other facilities of the like such as network interfaces, storage interfaces, directly to the interface bus, system bus, the CPU, and/or the like. Peripheral devices may be external, internal and/or part of the MR-Control controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the MR-Control controller may be embodied as an embedded, dedicated, and/or monitor-less (i.e., headless) device, wherein access would be provided over a network interface connection.

Cryptographic units such as, but not limited to, microcontrollers, processors 1126, interfaces 1127, and/or devices 1128 may be attached, and/or communicate with the MR-Control controller. A MC68HC16 microcontroller, manufactured by Motorola Inc., may be used for and/or within cryptographic units. The MC68HC16 microcontroller utilizes a 16-bit multiply-and-accumulate instruction in the MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 53 MHz 6868; and/or the like.

Memory

Generally, any mechanization and/or embodiment allowing a processor to affect the storage and/or retrieval of information is regarded as memory 1129. However, memory is a fungible technology and resource, thus, any number of memory embodiments may be employed in lieu of or in concert with one another. It is to be understood that the MR-Control controller and/or a computer systemization may employ various forms of memory 1129. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1129 may include ROM 1106, RAM 1105, and a storage device 1114. A storage device 1114 may be any conventional computer system storage. Storage devices may include a drum; a (fixed and/or removable) magnetic disk drive; a magneto-optical drive; an optical drive (i.e., Blueray, CD ROM/ RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1129 may contain a collection of program and/or database components and/or data such as, but not limited to: operating system component(s) 1115 (operating system); information server component(s) 1116 (information server); user interface component(s) 1117 (user interface); Web browser component(s) 1118 (Web browser); database(s) 1119; mail server component(s) 1121; mail client component(s) 1122; cryptographic server component(s) 1120 (cryptographic server); the MR-Control component(s)

1135; and/or the like (i.e., collectively a component collection). These components may be stored and accessed from the storage devices and/or from storage devices accessible through an interface bus. Although non-conventional program components such as those in the component collection, typically, are stored in a local storage device 1114, they may also be loaded and/or stored in memory such as: peripheral devices, RAM, remote storage facilities through a communications network, ROM, various forms of memory, and/or the like.

Operating System

The operating system component 1115 is an executable program component facilitating the operation of the MR-Control controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 7; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the MR-Control controller to communicate with other entities through a communications network 1113. Various communication protocols may be used by the MR-Control controller as a subcarrier transport mechanism for interaction, such as, but not limited to: multicast, TCP/IP, UDP, unicast, and/or the like.

Information Server

An information server component 1116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MR-Control controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MR-Control database 1119, operating systems, other program components, user interfaces, Web browsers, and/or the like.

Access to the MR-Control database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MR-Control. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MR-Control as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MR-Control enabled nodes. The combined application may be nugatory on systems employing standard Web browsers.

Mail Server

A mail server component 1121 is a stored program component that is executed by a CPU 1103. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the MR-Control.

Access to the MR-Control mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1122 is a stored program component that is executed by a CPU 1103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1120 is a stored program component that is executed by a CPU 1103, cryptographic processor 1126, cryptographic processor interface 1127, cryptographic processor device 1128, and/or the like. Cryptographic processor interfaces may allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component may facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the MR-Control may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the MR-Control component to engage in secure transactions if so desired. The cryptographic component facilitates the secure accessing of resources on the MR-Control and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MR-Control Database

The MR-Control database component 1119 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the MR-Control database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MR-Control database is implemented as a data-structure, the use of the MR-Control database 1119 may be integrated into another component such as the MR-Control component 1135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1119 includes several tables 1119*a-l*. A user accounts table 1119*a* includes fields such as, but not limited to: a UserID, UserName, UserPassword, UserAddress, UserDeviceID, UserViewingHistory, UserRating, UserPreference, and/or the like. The User table may support and/or track multiple entity accounts on a MR-Control. A Real Time TV table 1119*b* includes fields such as, but not limited to: TVChannelID, TVChannelName, TVChannelLogo, TVChannelAirTime, TVChannelProgram, TVChannelAd and/or the like. A Media Program table 1119*c* includes fields such as, MediaID, MediaName, MediaLength, MediaSignature, MediaBrand, MediaTimeTag, MediaAd, MediaAdSponsor, MediaAirTime, MediaChannelID, and/or the like. A Survey Question table 1119*d* includes fields such as QuestionID, QuestionCategory, QuestionAdID, QuestionDescription, QuestionResponse, QuestionMediaID, QuestionMediaTimeTag, QuestionUserID, and/or the like. An Ad table 1119*e* includes fields such as, but not limited to: AdID, AdMerchant, AdFormat, AdProduct, AdText, AdTimeTag, AdMediaID, AdChannelID, AdAudioSignature, and/or the like. An Atmospherics table 1119*f* includes fields such as, but not limited to: AtmosID, AtmosType, AtmosTimestamp, AtmosUserID, AtmosDeviceID, AtmosPhotoID, AtmosGPS, AtmosMediaID, AtmosChannelID, and/or the like. A User Device table 1119*g* includes fields such as, but not limited to: DeviceID, DeviceType, DeviceHardwareID, DeviceMAC, DeviceAppInventory, and/or the like. A Reports table 1119*h* includes fields such as, but not limited to: ReportID, ReportTimePeriod, ReportMediaID, ReportChannelID, ReportAdID, ReportType, ReportUserRating, ReportAdEffect, and/or the like. A social content table 1119*i* includes fields such as, but not limited to: SocialID, SocialName, SocialUserID, SocialTokenID, SocialUserID, SocialSource, SocialContent, SocialTimeStamp, and/or the like. A Taxonomy table 1119*j* includes fields such as, but not limited to: TaxpID, TaxoName, TaxoProducType, TaxoKeyWords, TaxoTreeNode, TaxoLevel, TaxoLabels, and/or the like. A User Token table 1119*k* includes fields such as, but not limited to: TokenID, TokenUserID, TokenSocialID, TokenSocialSource, TokenNumber, TokenFile, and/or the like. An Analytics Weight Scores table 1119*l* includes fields such as, but not limited to: ScoreID, ScoreName, ScoreFactorAttribute, ScoreWeight, ScoreDescription, ScoreIndication, and/or the like.

In one embodiment, the MR-Control database may interact with other database systems. For example, employing a distributed database system, queries and data access by search MR-Control component may treat the combination of the MR-Control database, an integrated data security layer database as a single database entity.

In one embodiment, user programs may contain various user interface primitives, which may serve to update the MR-Control. Also, various accounts may require custom database tables depending upon the environments and the types of clients the MR-Control may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1119*a-l*. The MR-Control may be configured to keep track of various settings, inputs, and parameters via database controllers.

The MR-Control database may communicate to and/or with other components in a component collection, including itself, and/or facilities of the like. Most frequently, the MR-Control database communicates with the MR-Control component, other program components, and/or the like. The database may contain, retain, and provide information regarding other nodes and data.

The MR-Controls

The MR-Control component 1135 is a stored program component that is executed by a CPU. In one embodiment, the MR-Control component incorporates any and/or all combinations of the aspects of the MR-Control that was discussed in the previous figures. As such, the MR-Control affects accessing, obtaining and the provision of information, services, transactions, and/or the like across various communications networks.

The MR-Control transforms TV program schedule listing information and user channel selection via MR-Control components, such as real time TV 1042, ad survey synchronization 1043, atmospherics analysis 1044, audience statistics analysis 1045, social media connection 1046, media analytics 1047 and/or the like into TV audience viewing data and ad effects data.

The MR-Control component facilitates access of information between nodes may be developed by employing standard development tools and languages such as, but not limited to: Apache components, Assembly, ActiveX, binary executables, (ANSI) (Objective–) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the MR-Control server employs a cryptographic server to encrypt and decrypt communications. The MR-Control component may communicate to and/or with other components in a component collection, including itself, and/or facilities of the like. Most frequently, the MR-Control component communicates with the MR-Control database, operating systems, other program components, and/or the like. The MR-Control may contain, communicate, generate, obtain, and/or provide program component, system, user, and/or data communications, requests, and/or responses.

Distributed MR-Controls

The structure and/or operation of any of the MR-Control node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the MR-Control controller may depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration may depend upon the context, environment, and requirements of system deployment.

For example, in some implementations, the MR-Control controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
```

-continued

```
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments of the MR-Control may comprise the following:

1. A TV mobile control processor-implemented method, comprising:
   obtaining TV program schedule listing data;
   providing the obtained TV program schedule listing data to a general purpose user mobile device communicatively coupled to an infrared communication component;
   receiving a user media program selection message from the general purpose user mobile device,
      wherein the general purpose user mobile device transmits a TV remote channel selection indication to a TV set via the infrared communication component,
      wherein the user media program selection message and the TV remote channel selection indication comprise the same user selected channel;
   determining whether the received user media program selection message indicates a user watching event;
   determining a user watching time length associated with the user selected channel when the received user media program selection message is determined to indicate the user watching event; and
   generating and storing a user watching event log file including the user selected channel and the determined user watching time length.

2. The method of embodiment 1, further comprising:
   filtering the received user media program selection message when the received user media program selection message is determined not to indicate a user watching event.

3. The method of embodiment 1, wherein the general purpose user mobile device comprises any of a smartphone, a personal data assistant, a cellular phone, a laptop, and a tablet computer
4. The method of embodiment 1, wherein the TV program schedule listing data is transmitted via any of a cellar network, a 3G network, and a Wifi network.
5. The method of embodiment 1, wherein the general purpose user mobile device transmits a TV remote channel selection indication to a TV set-top box via the infrared plug-in component.
6. The method of embodiment 1, wherein the TV remote channel selection message comprises a non-live media program selection message.
7. The method of embodiment 1, wherein the non-live media program selection message comprises any of a DVD control message, a DVR control message and an on-demand media control message.
8. The method of embodiment 1, wherein the determining whether the received user media program selection message indicates a user watching event comprises:
calculating a time lapse between two consecutively received program selection messages; and
determining whether the time lapse is sufficiently long to indicate a user watching event.
9. The method of embodiment 1, wherein the determining a user watching time length comprises determining whether a time lapse between two consecutively received program selection messages exceeds a capping threshold.
10. The method of embodiment 1, wherein the determining a user watching time length comprises applying watching time caps based on any of TV on/off events, set-top box on/off events and heuristics.
11. The method of embodiment 1, further comprising feeding the user watching event log file for user viewing data record associated with the selected media program.
12. The method of embodiment 1, wherein the general purpose user mobile device is configured to automatically scan on a communication stack for a physical address of a TV set.
13. The method of embodiment 1, wherein the general purpose user mobile device receives user submitted TV parameters to scan for a TV set.
14. The method of embodiment 1, further comprising:
obtaining an atmospherics data artifact from the atmospherics data package.
15. The method of embodiment 1, further comprising:
extracting user instant activities information based on analysis of the atmospherics data artifact.
16. The method of embodiment 15, further comprising:
generating a user viewing status indication based on the user instant activities information; and
incorporating the user viewing status indication into viewer measurement data of the user selected channel
17. The method of embodiment 1, wherein the received TV program schedule listing data comprises a plurality of ad tags.
18. The method of embodiment 17, further comprising:
retrieving an ad tag associated with the user selected media program from the TV program schedule listing data.
19. The method of embodiment 18, further comprising:
extracting key terms from the ad tags based by parsing ad contents;
querying a survey question list based on the extracted key terms;
generating and sending a survey question from the query to the user mobile device; and
obtaining a user reaction to the survey question.
20. The method of embodiment 17, further comprising:
generating a social watching status message; and
populating the social watching status message to a social media platform.
21. A TV mobile control system, comprising:
a memory;
a processor disposed in communication with said memory, and configured to issue a plurality of processing instructions stored in the memory, wherein the processor issues instructions to:
obtain TV program schedule listing data;
provide the obtained TV program schedule listing data to a general purpose user mobile device communicatively coupled to an infrared communication component;
receive a user media program selection message from the general purpose user mobile device,
wherein the general purpose user mobile device transmits a TV remote channel selection indication to a TV set via the infrared communication component,
wherein the user media program selection message and the TV remote channel selection indication comprise the same user selected channel;
determine whether the received user media program selection message indicates a user watching event;
determine a user watching time length associated with the user selected channel when the received user media program selection message is determined to indicate the user watching event; and
generate and storing a user watching event log file including the user selected channel and the determined user watching time length.
22. The system of embodiment 21, wherein the processor further issues instructions to:
filter the received user media program selection message when the received user media program selection message is determined not to indicate a user watching event.
23. The system of embodiment 21, wherein the general purpose user mobile device comprises any of a smartphone, a personal data assistant, a cellular phone, a laptop, and a tablet computer
24. The system of embodiment 21, wherein the TV program schedule listing data is transmitted via any of a cellar network, a 3G network, and a Wifi network.
25. The system of embodiment 21, wherein the general purpose user mobile device transmits a TV remote channel selection indication to a TV set-top box via the infrared plug-in component.
26. The system of embodiment 21, wherein the TV remote channel selection message comprises a non-live media program selection message.
27. The system of embodiment 21, wherein the non-live media program selection message comprises any of a DVD control message, a DVR control message and an on-demand media control message.
28. The system of embodiment 21, wherein the determining whether the received user media program selection message indicates a user watching event comprises:
calculating a time lapse between two consecutively received program selection messages; and determining whether the time lapse is sufficiently long to indicate a user watching event.

29. The system of embodiment 21, wherein the determining a user watching time length comprises determining whether a time lapse between two consecutively received program selection messages exceeds a capping threshold.

30. The system of embodiment 21, wherein the determining a user watching time length comprises applying watching time caps based on any of TV on/off events, set-top box on/off events and heuristics.

31. The system of embodiment 21, wherein the processor issues instructions to feed the user watching event log file for user viewing data record associated with the selected media program.

32. The system of embodiment 21, wherein the general purpose user mobile device is configured to automatically scan on a communication stack for a physical address of a TV set.

33. The system of embodiment 21, wherein the general purpose user mobile device receives user submitted TV parameters to scan for a TV set.

34. The system of embodiment 21, wherein the processor further issues instructions to:
obtain an atmospherics data artifact from the atmospherics data package.

35. The system of embodiment 21, wherein the processor further issues instructions to:
extract user instant activities information based on analysis of the atmospherics data artifact.

36. The system of embodiment 25, wherein the processor further issues instructions to:
generate a user viewing status indication based on the user instant activities information; and
incorporate the user viewing status indication into viewer measurement data of the user selected channel 37. The system of embodiment 21, wherein the received TV program schedule listing data comprises a plurality of ad tags.

38. The system of embodiment 17, wherein the processor further issues instructions to:
retrieve an ad tag associated with the user selected media program from the TV program schedule listing data.

39. The system of embodiment 38, wherein the processor further issues instructions to:
extract key terms from the ad tags based by parsing ad contents;
query a survey question list based on the extracted key terms;
generate and sending a survey question from the query to the user mobile device; and
obtain a user reaction to the survey question.

40. The system of embodiment 37, wherein the processor further issues instructions to:
generate a social watching status message; and
populate the social watching status message to a social media platform.

41. A TV mobile control processor-readable storage medium storing processor-executable instructions to:
obtain TV program schedule listing data;
provide the obtained TV program schedule listing data to a general purpose user mobile device communicatively coupled to an infrared communication component;
receive a user media program selection message from the general purpose user mobile device,
wherein the general purpose user mobile device transmits a TV remote channel selection indication to a TV set via the infrared communication component,
wherein the user media program selection message and the TV remote channel selection indication comprise the same user selected channel;
determine whether the received user media program selection message indicates a user watching event;
determine a user watching time length associated with the user selected channel when the received user media program selection message is determined to indicate the user watching event; and
generate and storing a user watching event log file including the user selected channel and the determined user watching time length.

42. The medium of embodiment 41, wherein the processor further issues instructions to:
filter the received user media program selection message when the received user media program selection message is determined not to indicate a user watching event.

43. The medium of embodiment 41, wherein the general purpose user mobile device comprises any of a smartphone, a personal data assistant, a cellular phone, a laptop, and a tablet computer 44. The medium of embodiment 41, wherein the TV program schedule listing data is transmitted via any of a cellar network, a 3G network, and a Wifi network.

45. The medium of embodiment 41, wherein the general purpose user mobile device transmits a TV remote channel selection indication to a TV set-top box via the infrared plug-in component.

46. The medium of embodiment 41, wherein the TV remote channel selection message comprises a non-live media program selection message.

47. The medium of embodiment 41, wherein the non-live media program selection message comprises any of a DVD control message, a DVR control message and an on-demand media control message.

48. The medium of embodiment 41, wherein the determining whether the received user media program selection message indicates a user watching event comprises:
calculating a time lapse between two consecutively received program selection messages; and
determining whether the time lapse is sufficiently long to indicate a user watching event.

49. The medium of embodiment 41, wherein the determining a user watching time length comprises determining whether a time lapse between two consecutively received program selection messages exceeds a capping threshold.

50. The medium of embodiment 41, wherein the determining a user watching time length comprises applying watching time caps based on any of TV on/off events, set-top box on/off events and heuristics.

51. The medium of embodiment 41, further storing instructions to feed the user watching event log file for user viewing data record associated with the selected media program.

52. The medium of embodiment 41, wherein the general purpose user mobile device is configured to automatically scan on a communication stack for a physical address of a TV set.

53. The medium of embodiment 41, wherein the general purpose user mobile device receives user submitted TV parameters to scan for a TV set.
54. The medium of embodiment 41, further storing instructions to:
obtain an atmospherics data artifact from the atmospherics data package.
55. The medium of embodiment 41, further storing instructions to:
extract user instant activities information based on analysis of the atmospherics data artifact.
56. The medium of embodiment 55, further storing instructions to:
generate a user viewing status indication based on the user instant activities information; and
incorporate the user viewing status indication into viewer measurement data of the user selected channel
57. The medium of embodiment 41, wherein the received TV program schedule listing data comprises a plurality of ad tags.
58. The medium of embodiment 57, further storing instructions to:
retrieve an ad tag associated with the user selected media program from the TV program schedule listing data.
59. The medium of embodiment 58, further storing instructions to:
extract key terms from the ad tags based by parsing ad contents;
query a survey question list based on the extracted key terms;
generate and sending a survey question from the query to the user mobile device; and
obtain a user reaction to the survey question.
60. The medium of embodiment 57, further storing instructions to:
generate a social watching status message; and
populate the social watching status message to a social media platform.

Further embodiments of monitoring audience behavior of the MR-Control may comprise the following:

1. A TV audience monitoring processor-implemented method, comprising:
providing TV program schedule listing data to a user mobile device;
receiving a user channel selection from the user mobile device;
receiving, from the user mobile device, an atmospherics data package indicating user instant activity status;
obtaining an atmospherics data artifact from the atmospherics data package;
extracting user instant activities information based on analysis of the atmospherics data artifact;
generating a user viewing status indication based on the user instant activities information; and
incorporating the user viewing status indication into viewer measurement data of the user selected channel.
2. The method of embodiment 1, wherein the user mobile device comprises any of a smartphone, a personal data assistant, a cellular phone, a laptop, and a tablet computer.
3. The method of embodiment 1, wherein the TV program schedule listing data is transmitted via any of a cellar network, a 3G network, and a Wifi network.
4. The method of embodiment 1, wherein the same user channel selection is transmitted to a TV set via an infrared communication channel.
5. The method of embodiment 1, wherein the atmospherics data package is captured and aggregated by the user mobile device to monitor whether the user is watching the selected channel.
6. The method of embodiment 1, further comprising determining a type of the atmospherics data artifact.
7. The method of embodiment 1, wherein the atmospherics data artifact comprises an audio file.
8. The method of embodiment 7, further comprising: determining audio content based on audio analysis.
9. The method of embodiment 8, further comprising:
when the audio content includes human voice, performing voice recognition to determine whether a vocal source matches a character in a TV show scheduled on the user selected channel;
10. The method of embodiment 8, further comprising:
when the audio content includes human voice, extracting key terms from the human voice to determine whether the vocal content is related to a TV show scheduled on the user selected channel.
11. The method of 8, further comprising:
when the audio content includes ambient noise, determining an audience environment status based on the noise level.
12. The method of embodiment 8, further comprising:
when the audio content includes media music, determine whether the media music is related to a TV show scheduled on the user selected channel.
13. The method of embodiment 1, wherein the atmospherics data artifact comprises an image file.
14. The method of embodiment 1, further comprising: determining graphic content based on image analysis.
15. The method of embodiment 14, further comprising:
when the graphic content comprises audience presence, performing facial recognition to determine a number of presented audiences.
16. The method of embodiment 15, further comprising:
when the graphic content comprises a TV screen, determining whether the TV screen is related to a TV show scheduled on the user selected channel.
17. The method of embodiment 1, wherein the atmospherics data artifact comprises GPS information.
18. The method of embodiment 1, further comprising:
determining an address type of the GPS information; and
determining whether the user is viewing TV based on the address type.
19. The method of embodiment 1, wherein the atmospherics data artifact comprises a lighting sensing data file.
20. The method of embodiment 19, further comprising: determining whether audience environment is suitable for viewing based on the lighting sensing data.
21. The method of embodiment 1, wherein the atmospherics data artifact comprises a device application activity log file.
22. The method of embodiment 21, further comprising:
determining a device application activity type; and
determining whether the user is viewing TV based on the device application activity type.
23. The method of embodiment 1, wherein the generating a user viewing status indication is performed based on a threshold-based progressive procedure.
24. The method of embodiment 23, wherein the threshold-based progressive procedure comprises:
analyzing a first atmospherics data artifact;

determining a first user activity indication based on the analysis;
assigning a first weight score value to the first atmospherics data artifact;
determining whether the first weight score value exceeds a threshold;
if yes, determining the user is not watching the selected channel; and
if not, proceeding to analyzing a second atmospherics data artifact,
   determining a second weight score value for the second atmospherics data artifact,
   generating an atmospherics score by adding the first weight score value and the second score value, and
   determining whether the atmospherics score exceeds the threshold.
25. The method of embodiment 23, further comprising:
repeating analysis of atmospherics data artifacts when an accumulated atmospherics score does not exceed the threshold.
26. The method of embodiment 23, further comprising:
determining the user is not watching the selected channel and exit the threshold-based progressive procedure when the accumulated atmospherics score exceeds the threshold.
27. The method of embodiment 23, wherein the threshold-based progressive procedure analyzes atmospherics data artifacts based on complexity from low to high.
28. The method of embodiment 24, wherein the first atmospherics data artifact comprises any of: GPS information and device application activity status.
29. The method of embodiment 24, wherein the first and second weight score values are retrieved from the pre-stored data table.
30. The method of embodiment 24, further comprising:
when the threshold-based progressive procedure determines the user is not watching the selected channel,
   excluding the user from being a viewer of the user selected channel.
31. A TV audience monitoring system, comprising:
   means to provide TV program schedule listing data to a user mobile device;
   means to receive a user channel selection from the user mobile device;
   means to receive, from the user mobile device, an atmospherics data package indicating user instant activity status;
   means to obtain an atmospherics data artifact from the atmospherics data package;
   means to extract user instant activities information based on analysis of the atmospherics data artifact;
   means to generate a user viewing status indication based on the user instant activities information; and
   means to incorporate the user viewing status indication into viewer measurement data of the user selected channel.
32. The system of embodiment 31, wherein the user mobile device comprises any of a smartphone, a personal data assistant, a cellular phone, a laptop, and a tablet computer.
33. The system of embodiment 31, wherein the TV program schedule listing data is transmitted via any of a cellar network, a 3G network, and a Wifi network.
34. The system of embodiment 31, wherein the same user channel selection is transmitted to a TV set via an infrared communication channel.
35. The system of embodiment 31, wherein the atmospherics data package is captured and aggregated by the user mobile device to monitor whether the user is watching the selected channel.
36. The system of embodiment 31, further comprising determining a type of the atmospherics data artifact.
37. The system of embodiment 31, wherein the atmospherics data artifact comprises an audio file.
38. The system of embodiment 37, further comprising:
   means to determine audio content based on audio analysis.
39. The system of embodiment 38, further comprising:
   means to when the audio content includes human voice, perform voice recognition to determine whether a vocal source matches a character in a TV show scheduled on the user selected channel;
40. The system of embodiment 38, further comprising:
   means to when the audio content includes human voice, extract key terms from the human voice to determine whether the vocal content is related to a TV show scheduled on the user selected channel.
41. The system of 38, further comprising:
   means to when the audio content includes ambient noise, determine an audience environment status based on the noise level.
42. The system of embodiment 38, further comprising:
   means to when the audio content includes media music, determine whether the media music is related to a TV show scheduled on the user selected channel.
43. The system of embodiment 31, wherein the atmospherics data artifact comprises an image file.
44. The system of embodiment 31, further comprising:
means to determine graphic content based on image analysis.
45. The system of embodiment 34, further comprising:
means to when the graphic content comprises audience presence, perform facial recognition to determine a number of presented audiences.
46. The system of embodiment 45, further comprising:
means to when the graphic content comprises a TV screen, determine whether the TV screen is related to a TV show scheduled on the user selected channel.
47. The system of embodiment 31, wherein the atmospherics data artifact comprises GPS information.
48. The system of embodiment 31, further comprising:
means to determine an address type of the GPS information; and
means to determine whether the user is viewing TV based on the address type.
49. The system of embodiment 31, wherein the atmospherics data artifact comprises a lighting sensing data file.
50. The system of embodiment 49, further comprising:
means to determine whether audience environment is suitable for viewing based on the lighting sensing data.
51. The system of embodiment 31, wherein the atmospherics data artifact comprises a device application activity log file.
52. The system of embodiment 41, further comprising:
means to determine a device application activity type; and
means to determine whether the user is viewing TV based on the device application activity type.
53. The system of embodiment 31, wherein the generating a user viewing status indication is performed based on a threshold-based progressive procedure.

54. The system of embodiment 53, wherein the threshold-based progressive procedure comprises:
means to analyze a first atmospherics data artifact;
means to determine a first user activity indication based on the analysis;
means to assign a first weight score value to the first atmospherics data artifact;
means to determine whether the first weight score value exceeds a threshold;
if yes, means to determine the user is not watching the selected channel; and
if not, means to proceed to analyzing a second atmospherics data artifact,
  means to determine a second weight score value for the second atmospherics data artifact,
  means to generate an atmospherics score by adding the first weight score value and the second score value, and
  means to determine whether the atmospherics score exceeds the threshold.
55. The system of embodiment 53, further comprising:
means to repeat analysis of atmospherics data artifacts when an accumulated atmospherics score does not exceed the threshold.
56. The system of embodiment 53, further comprising:
means to determine the user is not watching the selected channel and exit the threshold-based progressive procedure when the accumulated atmospherics score exceeds the threshold.
57. The system of embodiment 53, wherein the threshold-based progressive procedure analyzes atmospherics data artifacts based on complexity from low to high.
58. The system of embodiment 54, wherein the first atmospherics data artifact comprises any of: GPS information and device application activity status.
59. The system of embodiment 54, wherein the first and second weight score values are retrieved from the pre-stored data table.
60. The system of embodiment 54, further comprising:
when the threshold-based progressive procedure determines the user is not watching the selected channel,
  means to exclude the user from being a viewer of the user selected channel.
61. A TV audience monitoring processor-readable non-transitory medium storing processor-executable instructions, said instructions issuable by a processor to:
provide TV program schedule listing data to a user mobile device;
receive a user channel selection from the user mobile device;
receive, from the user mobile device, an atmospherics data package indicating user instant activity status;
obtain an atmospherics data artifact from the atmospherics data package;
extract user instant activities information based on analysis of the atmospherics data artifact;
generate a user viewing status indication based on the user instant activities information; and
incorporate the user viewing status indication into viewer measurement data of the user selected channel.
62. The medium of embodiment 61, wherein the user mobile device comprises any of a smartphone, a personal data assistant, a cellular phone, a laptop, and a tablet computer.
63. The medium of embodiment 61, wherein the TV program schedule listing data is transmitted via any of a cellar network, a 3G network, and a Wifi network.
64. The medium of embodiment 61, wherein the same user channel selection is transmitted to a TV set via an infrared communication channel.
65. The medium of embodiment 61, wherein the atmospherics data package is captured and aggregated by the user mobile device to monitor whether the user is watching the selected channel.
66. The medium of embodiment 61, wherein the processor-executable instructions are further issuable by the processor to determining a type of the atmospherics data artifact.
67. The medium of embodiment 61, wherein the atmospherics data artifact comprises an audio file.
68. The medium of embodiment 67, wherein the processor-executable instructions are further issuable by the processor to:
determine audio content based on audio analysis.
69. The medium of embodiment 68, wherein the processor-executable instructions are further issuable by the processor to:
when the audio content includes human voice, perform voice recognition to determine whether a vocal source matches a character in a TV show scheduled on the user selected channel;
70. The medium of embodiment 68, wherein the processor-executable instructions are further issuable by the processor to:
when the audio content includes human voice, extract key terms from the human voice to determine whether the vocal content is related to a TV show scheduled on the user selected channel.
71. The medium of 68, wherein the processor-executable instructions are further issuable by the processor to:
when the audio content includes ambient noise, determine an audience environment status based on the noise level.
72. The medium of embodiment 68, wherein the processor-executable instructions are further issuable by the processor to:
when the audio content includes media music, determine whether the media music is related to a TV show scheduled on the user selected channel.
73. The medium of embodiment 61, wherein the atmospherics data artifact comprises an image file.
74. The medium of embodiment 61, wherein the processor-executable instructions are further issuable by the processor to:
determine graphic content based on image analysis.
75. The medium of embodiment 64, wherein the processor-executable instructions are further issuable by the processor to:
when the graphic content comprises audience presence, perform facial recognition to determine a number of presented audiences.
76. The medium of embodiment 75, wherein the processor-executable instructions are further issuable by the processor to:
when the graphic content comprises a TV screen, determine whether the TV screen is related to a TV show scheduled on the user selected channel.
77. The medium of embodiment 61, wherein the atmospherics data artifact comprises GPS information.

78. The medium of embodiment 61, wherein the processor-executable instructions are further issuable by the processor to:
determine an address type of the GPS information; and
determine whether the user is viewing TV based on the address type.
79. The medium of embodiment 61, wherein the atmospherics data artifact comprises a lighting sensing data file.
80. The medium of embodiment 79, wherein the processor-executable instructions are further issuable by the processor to: determine whether audience environment is suitable for viewing based on the lighting sensing data.
81. The medium of embodiment 61, wherein the atmospherics data artifact comprises a device application activity log file.
82. The medium of embodiment 71, wherein the processor-executable instructions are further issuable by the processor to:
determine a device application activity type; and
determine whether the user is viewing TV based on the device application activity type.
83. The medium of embodiment 61, wherein the generating a user viewing status indication is performed based on a threshold-based progressive procedure.
84. The medium of embodiment 83, wherein the threshold-based progressive procedure comprises:
analyze a first atmospherics data artifact;
determine a first user activity indication based on the analysis;
assign a first weight score value to the first atmospherics data artifact;
determine whether the first weight score value exceeds a threshold;
if yes, determine the user is not watching the selected channel; and
if not, proceed to analyzing a second atmospherics data artifact,
  determine a second weight score value for the second atmospherics data artifact,
  generate an atmospherics score by adding the first weight score value and the second score value, and
  determine whether the atmospherics score exceeds the threshold.
85. The medium of embodiment 83, wherein the processor-executable instructions are further issuable by the processor to:
repeat analysis of atmospherics data artifacts when an accumulated atmospherics score does not exceed the threshold.
86. The medium of embodiment 83, wherein the processor-executable instructions are further issuable by the processor to:
determine the user is not watching the selected channel and exit the threshold-based progressive procedure when the accumulated atmospherics score exceeds the threshold.
87. The medium of embodiment 83, wherein the threshold-based progressive procedure analyzes atmospherics data artifacts based on complexity from low to high.
88. The medium of embodiment 84, wherein the first atmospherics data artifact comprises any of: GPS information and device application activity status.
89. The medium of embodiment 84, wherein the first and second weight score values are retrieved from the pre-stored data table.
90. The medium of embodiment 84, wherein the processor-executable instructions are further issuable by the processor to:
when the threshold-based progressive procedure determines the user is not watching the selected channel,
  exclude the user from being a viewer of the user selected channel.

Further embodiments of capturing audience atmospherics data at a user mobile device may comprise the following:
1. A TV audience monitoring processor-implemented method, comprising:
instantiating a TV mobile control component at a general purpose user mobile device;
receiving TV program schedule listing data at the general purpose user mobile device via a communication channel;
obtaining a user selection of TV program via a user interface of the instantiated TV mobile control component;
transmitting a TV remote channel selection indication to a server via the communication channel;
capturing atmospherics data indicative of user activities status at the user mobile device;
generating an atmospherics data package comprising one or more atmospherics data artifact from the captured atmospherics data; and
transmitting the generated atmospherics data package to the server.
2. The method of embodiment 1, wherein the user mobile device comprises any of a smartphone, a personal data assistant, a cellular phone, a laptop, and a tablet computer.
3. The method of embodiment 1, wherein the communication network comprises any of a cellar network, a 3G network, and a Wifi network.
4. The method of embodiment 1, wherein the capturing atmospherics data is automatically performed by the TV mobile control component on a periodic basis.
5. The method of embodiment 1, wherein the capturing atmospherics data is triggered by a user.
6. The method of embodiment 1, wherein the capturing atmospherics data comprises snapping a photo by an image capturing component connected to the user mobile device.
7. The method of embodiment 1, wherein the capturing atmospherics data comprises obtaining a video clip by an image capturing component connected to the user mobile device.
8. The method of embodiment 1, wherein the capturing atmospherics data comprises recording an audio clip by the user mobile device.
9. The method of embodiment 1, wherein the capturing atmospherics data comprises obtaining GPS information of the user mobile device.
10. The method of embodiment 1, wherein the capturing atmospherics data comprises obtaining lighting sensing data by the user mobile device.
11. The method of embodiment 1, wherein the capturing atmospherics data comprises obtaining device application activity status on the user mobile device.
12. The method of embodiment 1, wherein the atmospherics data artifact comprises any of an image, a video clip, an audio clip, GPS information, device application data, and lighting data.

13. The method of embodiment 1, further comprising: prompting a request to a user to position the user mobile device so that an image capture component is focused on a TV screen.
14. The method of embodiment 6, wherein the snapped photo includes an image of audiences.
15. The method of embodiment 6, wherein the snapped photo includes a TV screen.
16. The method of embodiment 8, wherein the audio clip includes ambient noise of an environment.
17. The method of embodiment 8, wherein the audio clip includes recorded media sound.
18. The method of embodiment 8, wherein the audio clip includes human voices.
19. The method of embodiment 7, wherein the GPS information indicates whether a user is located with a TV set.
20. The method of embodiment 10, wherein the lighting data indicates whether amble light is provided to watch TV.
21. A TV audience monitoring apparatus, comprising:
a memory;
a processor disposed in communication with said memory, and configured to issue a plurality of processing instructions stored in the memory, wherein the processor issues instructions to:
instantiate a TV mobile control component at a general purpose user mobile device;
receive TV program schedule listing data at the general purpose user mobile device via a communication channel;
obtain a user selection of TV program via a user interface of the instantiated TV mobile control component;
transmit a TV remote channel selection indication to a server via the communication channel;
capture atmospherics data indicative of user activities status at the user mobile device;
generate an atmospherics data package comprising one or more atmospherics data artifact from the captured atmospherics data; and
transmit the generated atmospherics data package to the server.
22. The apparatus of embodiment 1, wherein the user mobile device comprises any of a smartphone, a personal data assistant, a cellular phone, a laptop, and a tablet computer.
23. The apparatus of embodiment 21, wherein the communication network comprises any of a cellar network, a 3G network, and a Wifi network.
24. The apparatus of embodiment 21, wherein the capturing atmospherics data is automatically performed by the TV mobile control component on a periodic basis.
25. The apparatus of embodiment 21, wherein the capturing atmospherics data is triggered by a user.
26. The apparatus of embodiment 21, wherein the capturing atmospherics data comprises snapping a photo by an image capturing component connected to the user mobile device.
27. The apparatus of embodiment 21, wherein the capturing atmospherics data comprises obtaining a video clip by an image capturing component connected to the user mobile device.
28. The apparatus of embodiment 21, wherein the capturing atmospherics data comprises recording an audio clip by the user mobile device.
29. The apparatus of embodiment 21, wherein the capturing atmospherics data comprises obtaining GPS information of the user mobile device.
30. The apparatus of embodiment 21, wherein the capturing atmospherics data comprises obtaining lighting sensing data by the user mobile device.
31. The apparatus of embodiment 21, wherein the capturing atmospherics data comprises obtaining device application activity status on the user mobile device.
32. The apparatus of embodiment 21, wherein the atmospherics data artifact comprises any of an image, a video clip, an audio clip, GPS information, device application data, and lighting data.
33. The apparatus of embodiment 21, wherein the processor further issues instructions to prompt a request to a user to position the user mobile device so that an image capture component is focused on a TV screen.
34. The apparatus of embodiment 26, wherein the snapped photo includes an image of audiences.
35. The apparatus of embodiment 26, wherein the snapped photo includes a TV screen.
36. The apparatus of embodiment 28, wherein the audio clip includes ambient noise of an environment.
37. The apparatus of embodiment 28, wherein the audio clip includes recorded media sound.
38. The apparatus of embodiment 28, wherein the audio clip includes human voices.
39. The apparatus of embodiment 29, wherein the GPS information indicates whether a user is located with a TV set.
40. The apparatus of embodiment 30, wherein the lighting data indicates whether amble light is provided to watch TV.
41. A TV audience monitoring processor-readable medium storing processor-executable instructions to:
instantiate a TV mobile control component at a general purpose user mobile device;
receive TV program schedule listing data at the general purpose user mobile device via a communication channel;
obtain a user selection of TV program via a user interface of the instantiated TV mobile control component;
transmit a TV remote channel selection indication to a server via the communication channel;
capture atmospherics data indicative of user activities status at the user mobile device;
generate an atmospherics data package comprising one or more atmospherics data artifact from the captured atmospherics data; and
transmit the generated atmospherics data package to the server.
42. The medium of embodiment 41, wherein the user mobile device comprises any of a smartphone, a personal data assistant, a cellular phone, a laptop, and a tablet computer.
43. The medium of embodiment 41, wherein the communication network comprises any of a cellar network, a 3G network, and a Wifi network.
44. The medium of embodiment 41, wherein the capturing atmospherics data is automatically performed by the TV mobile control component on a periodic basis.
45. The medium of embodiment 41, wherein the capturing atmospherics data is triggered by a user.
46. The medium of embodiment 41, wherein the capturing atmospherics data comprises snapping a photo by an image capturing component connected to the user mobile device.

47. The medium of embodiment 41, wherein the capturing atmospherics data comprises obtaining a video clip by an image capturing component connected to the user mobile device.
48. The medium of embodiment 41, wherein the capturing atmospherics data comprises recording an audio clip by the user mobile device.
49. The medium of embodiment 41, wherein the capturing atmospherics data comprises obtaining GPS information of the user mobile device.
50. The medium of embodiment 41, wherein the capturing atmospherics data comprises obtaining lighting sensing data by the user mobile device.
61. The medium of embodiment 41, wherein the capturing atmospherics data comprises obtaining device application activity status on the user mobile device.
62. The medium of embodiment 41, wherein the atmospherics data artifact comprises any of an image, a video clip, an audio clip, GPS information, device application data, and lighting data.
63. The medium of embodiment 41, further storing processor-executable instructions to prompt a request to a user to position the user mobile device so that an image capture component is focused on a TV screen.
64. The medium of embodiment 56, wherein the snapped photo includes an image of audiences.
65. The medium of embodiment 56, wherein the snapped photo includes a TV screen.
66. The medium of embodiment 58, wherein the audio clip includes ambient noise of an environment.
67. The medium of embodiment 58, wherein the audio clip includes recorded media sound.
68. The medium of embodiment 58, wherein the audio clip includes human voices.
69. The medium of embodiment 59, wherein the GPS information indicates whether a user is located with a TV set.
60. The medium of embodiment 50, wherein the lighting data indicates whether amble light is provided to watch TV.

Further embodiments of generating media content based survey questionnaires may comprise the following:
1. A media content based survey distribution and collection processor-implemented method, comprising:
providing the obtained TV program schedule listing data including a plurality of ad tags to a user mobile device,
receiving a user media program selection message from the user mobile device;
retrieving an ad tag associated with the user selected media program from the TV program schedule listing data;
extracting key terms from the ad tags based by parsing ad contents;
querying a survey question list based on the extracted key terms;
generating and sending a survey question from the query to the user mobile device; and
obtaining a user reaction to the survey question.
2. The method of embodiment 1, wherein the ad tag is related to an advertisement played during a commercial break associated with the user selected media program.
3. The method of embodiment 1, wherein the ad tag is related to an embedded ad placed in a scene of the user selected media program.
4. The method of embodiment 1, wherein the ad tag further comprises a timestamp of an ad, and information related to the advertised item.
5. The method of embodiment 1, further comprising:
determining a category of an advertised item based on the extracted key terms.
6. The method of embodiment 5, further comprising:
retrieving survey questions from the survey question list based on the determined category.
7. The method of embodiment 1, wherein the generated survey question is sent to the user mobile device shortly after a timestamp of the ad tag.
8. The method of embodiment 1, wherein the survey question is synchronized with the ad tag.
9. The method of embodiment 1, wherein the survey question comprises a multiple choice question.
10. The method of embodiment 1, wherein the survey question comprises a URL to a merchant shopping site.
11. The method of embodiment 1, wherein the user reaction to the survey question comprises a submission of answer to the survey question.
12. The method of embodiment 1, wherein the user reaction to the survey question comprises a click on a URL provided in the survey question.
13. The method of embodiment 1, wherein the survey question is generated based on ad tags in a user's recent viewing history.
14. The method of embodiment 1, further comprising providing incentive rewards to a user after receiving an answer to the survey question.
15. The method of embodiment 1, further comprising analyzing ad delivery and effects.
16. The method of embodiment 15, further comprising:
assigning a weighing score to the user reaction to the survey question.
17. The method of embodiment 16, wherein the weighing score is determined based on a type of the user reaction.
18. The method of embodiment 16, wherein the weighing score is determined based on a user's answer to the survey question.
19. The method of embodiment 15, further comprising:
aggregating weighing scores from a plurality of user reactions to determine ad effects.
20. The method of embodiment 15, further comprising:
periodically update the analysis by combining newly received user reactions to survey questions.
21. A media content based survey distribution and collection system, comprising:
means for providing the obtained TV program schedule listing data including a plurality of ad tags to a user mobile device,
means for receiving a user media program selection message from the user mobile device;
means for retrieving an ad tag associated with the user selected media program from the TV program schedule listing data;
means for extracting key terms from the ad tags based by parsing ad contents;
means for querying a survey question list based on the extracted key terms;
means for generating and sending a survey question from the query to the user mobile device; and
means for obtaining a user reaction to the survey question.
22. The system of embodiment 21, wherein the ad tag is related to an advertisement played during a commercial break associated with the user selected media program.
23. The system of embodiment 21, wherein the ad tag is related to an embedded ad placed in a scene of the user selected media program.

24. The system of embodiment 21, wherein the ad tag further comprises a timestamp of an ad, and information related to the advertised item.
25. The system of embodiment 21, further comprising: means for determining a category of an advertised item based on the extracted key terms.
26. The system of embodiment 5, further comprising: means for retrieving survey questions from the survey question list based on the determined category.
27. The system of embodiment 21, wherein the generated survey question is sent to the user mobile device shortly after a timestamp of the ad tag.
28. The system of embodiment 21, wherein the survey question is synchronized with the ad tag.
29. The system of embodiment 21, wherein the survey question comprises a multiple choice question.
30. The system of embodiment 21, wherein the survey question comprises a URL to a merchant shopping site.
31. The system of embodiment 21, wherein the user reaction to the survey question comprises a submission of answer to the survey question.
32. The system of embodiment 21, wherein the user reaction to the survey question comprises a click on a URL provided in the survey question.
33. The system of embodiment 21, wherein the survey question is generated based on ad tags in a user's recent viewing history.
34. The system of embodiment 21, further comprising means for providing incentive rewards to a user after receiving an answer to the survey question.
35. The system of embodiment 21, further comprising means for analyzing ad delivery and effects.
36. The system of embodiment 35, further comprising: means for assigning a weighing score to the user reaction to the survey question.
37. The system of embodiment 36, wherein the weighing score is determined based on a type of the user reaction.
38. The system of embodiment 36, wherein the weighing score is determined based on a user's answer to the survey question.
39. The system of embodiment 35, further comprising: means for aggregating weighing scores from a plurality of user reactions to determine ad effects.
40. The system of embodiment 35, further comprising: means for periodically updating the analysis by combining newly received user reactions to survey questions.
41. A media content based survey distribution and collection processor-readable non-transitory medium storing processor-executable instructions to:
provide the obtained TV program schedule listing data including a plurality of ad tags to a user mobile device,
receive a user media program selection message from the user mobile device;
retrieve an ad tag associated with the user selected media program from the TV program schedule listing data;
extract key terms from the ad tags based by parsing ad contents;
query a survey question list based on the extracted key terms;
generate and send a survey question from the query to the user mobile device; and
obtain a user reaction to the survey question.
42. The medium of embodiment 21, wherein the ad tag is related to an advertisement played during a commercial break associated with the user selected media program.
43. The medium of embodiment 21, wherein the ad tag is related to an embedded ad placed in a scene of the user selected media program.
44. The medium of embodiment 21, wherein the ad tag further comprises a timestamp of an ad, and information related to the advertised item.
45. The medium of embodiment 21, further comprising: means for determining a category of an advertised item based on the extracted key terms.
46. The medium of embodiment 45, further storing processor-executable instructions to retrieve survey questions from the survey question list based on the determined category.
47. The medium of embodiment 41, wherein the generated survey question is sent to the user mobile device shortly after a timestamp of the ad tag.
48. The medium of embodiment 41, wherein the survey question is synchronized with the ad tag.
49. The medium of embodiment 41, wherein the survey question comprises a multiple choice question.
50. The medium of embodiment 41, wherein the survey question comprises a URL to a merchant shopping site.
51. The medium of embodiment 41, wherein the user reaction to the survey question comprises a submission of answer to the survey question.
52. The medium of embodiment 41, wherein the user reaction to the survey question comprises a click on a URL provided in the survey question.
53. The medium of embodiment 41, wherein the survey question is generated based on ad tags in a user's recent viewing history.
54. The medium of embodiment 41, further storing processor-executable instructions to provide incentive rewards to a user after receiving an answer to the survey question.
55. The medium of embodiment 41, further storing processor-executable instructions to analyze ad delivery and effects.
56. The medium of embodiment 55, further storing processor-executable instructions to assign a weighing score to the user reaction to the survey question.
57. The medium of embodiment 56, wherein the weighing score is determined based on a type of the user reaction.
58. The medium of embodiment 56, wherein the weighing score is determined based on a user's answer to the survey question.
59. The medium of embodiment 55, further storing processor-executable instructions to aggregate weighing scores from a plurality of user reactions to determine ad effects.
60. The medium of embodiment 55, further storing processor-executable instructions to periodically update the analysis by combining newly received user reactions to survey questions.

Further embodiments of generating synchronized media content based product placement ads may comprise the following:

1. A media content based advertising processor-implemented method, comprising:
providing TV program schedule listing data including a plurality of ad tags to a user mobile device,
receiving a user media program selection message from the user mobile device;
retrieving an ad tag associated with the user selected media program from the TV program schedule listing data;

identifying an advertised item embedded in the media program based on the retrieved ad tag;
determining an available ad template associated with the retrieved ad tag;
generating an ad for the embedded advertised item based on the available ad template; and
providing the generated ad to the user mobile device based on a timestamp of the ad tag.

2. The method of embodiment 1, wherein the ad tag is related to an advertisement played during a commercial break associated with the user selected media program.

3. The method of embodiment 1, wherein the ad tag is related to an embedded ad placed in a scene of the user selected media program.

4. The method of embodiment 1, wherein the ad tag further comprises the timestamp of an ad, and information related to the advertised item.

5. The method of embodiment 1, wherein the available ad template comprises a static ad template.

6. The method of embodiment 5, further comprising populating information of the identified advertised item into the static ad template.

7. The method of embodiment 1, wherein the available ad template comprises an image captured from the media program, and said image comprises the identified advertised item.

8. The method of embodiment 7, further comprising generating an interactive ad using the available ad template.

9. The method of embodiment 7, wherein the image comprises an indicia box indicating the identified advertised item.

10. The method of embodiment 8, wherein the interactive ad comprises a rating of the identified advertised item.

11. The method of embodiment 8, wherein the interactive ad comprises an immediate purchasing option including a URL to a merchant shopping site.

12. The method of embodiment 1, wherein the interactive ad comprises an option for a user to enter a rating for the identified advertised item.

13. The method of embodiment 1, further comprising: providing options to a user to browse interactive ads.

14. The method of embodiment 13, wherein the options comprises: browsing interactive ads by any of: character, item category, season, episode.

15. The method of embodiment 1, further comprising:
receiving a user interaction with the generated ad; and
analyzing ad delivery and effects.

16. The method of embodiment 15, further comprising:
assigning a weighing score to the user interaction.

17. The method of embodiment 16, wherein the weighing score is determined based on a type of the user interaction.

18. The method of embodiment 16, wherein the user interaction comprises any of: entry of product rating, click to view more, and click to purchase.

19. The method of embodiment 15, further comprising:
aggregating weighing scores from a plurality of user reactions to determine ad effects.

20. The method of embodiment 15, further comprising:
periodically update the analysis by combining newly received user interactions.

21. A media content based advertising system, comprising:
means for providing TV program schedule listing data including a plurality of ad tags to a user mobile device,
means for receiving a user media program selection message from the user mobile device;
means for retrieving an ad tag associated with the user selected media program from the TV program schedule listing data;
means for identifying an advertised item embedded in the media program based on the retrieved ad tag;
means for determining an available ad template associated with the retrieved ad tag;
means for generating an ad for the embedded advertised item based on the available ad template; and
means for providing the generated ad to the user mobile device based on a timestamp of the ad tag.

22. The system of embodiment 21, wherein the ad tag is related to an advertisement played during a commercial break associated with the user selected media program.

23. The system of embodiment 21, wherein the ad tag is related to an embedded ad placed in a scene of the user selected media program.

24. The system of embodiment 21, wherein the ad tag further comprises the timestamp of an ad, and information related to the advertised item.

25. The system of embodiment 21, wherein the available ad template comprises a static ad template.

26. The system of embodiment 25, further comprising populating information of the identified advertised item into the static ad template.

27. The system of embodiment 21, wherein the available ad template comprises an image captured from the media program, and said image comprises the identified advertised item.

28. The system of embodiment 27, further comprising means for generating an interactive ad using the available ad template.

29. The system of embodiment 27, wherein the image comprises an indicia box indicating the identified advertised item.

30. The system of embodiment 28, wherein the interactive ad comprises a rating of the identified advertised item.

31. The system of embodiment 28, wherein the interactive ad comprises an immediate purchasing option including a URL to a merchant shopping site.

32. The system of embodiment 21, wherein the interactive ad comprises an option for a user to enter a rating for the identified advertised item.

33. The system of embodiment 21, further comprising:
providing options to a user to browse interactive ads.

34. The system of embodiment 33, wherein the options comprises: browsing interactive ads by any of: character, item category, season, episode.

35. The system of embodiment 21, further comprising:
receiving a user interaction with the generated ad; and
analyzing ad delivery and effects.

36. The system of embodiment 35, further comprising:
assigning a weighing score to the user interaction.

37. The system of embodiment 36, wherein the weighing score is determined based on a type of the user interaction.

38. The system of embodiment 36, wherein the user interaction comprises any of: entry of product rating, click to view more, and click to purchase.

39. The system of embodiment 35, further comprising:
means for aggregating weighing scores from a plurality of user reactions to determine ad effects.

40. The system of embodiment 35, further comprising:
means for periodically updating the analysis by combining newly received user interactions.

41. A media content based advertising processor-readable non-transitory medium storing processor-executable instructions to:
provide TV program schedule listing data including a plurality of ad tags to a user mobile device,
receive a user media program selection message from the user mobile device;
retrieve an ad tag associated with the user selected media program from the TV program schedule listing data;
identify an advertised item embedded in the media program based on the retrieved ad tag;
determine an available ad template associated with the retrieved ad tag;
generate an ad for the embedded advertised item based on the available ad template; and
provide the generated ad to the user mobile device based on a timestamp of the ad tag.

42. The medium of embodiment 41, wherein the ad tag is related to an advertisement played during a commercial break associated with the user selected media program.

43. The medium of embodiment 41, wherein the ad tag is related to an embedded ad placed in a scene of the user selected media program.

44. The medium of embodiment 41, wherein the ad tag further comprises the timestamp of an ad, and information related to the advertised item.

45. The medium of embodiment 41, wherein the available ad template comprises a static ad template.

46. The medium of embodiment 45, further storing instructions to populate information of the identified advertised item into the static ad template.

47. The medium of embodiment 41, wherein the available ad template comprises an image captured from the media program, and said image comprises the identified advertised item.

48. The medium of embodiment 47, further storing instructions to generate an interactive ad using the available ad template.

49. The medium of embodiment 47, wherein the image comprises an indicia box indicating the identified advertised item.

50. The medium of embodiment 48, wherein the interactive ad comprises a rating of the identified advertised item.

51. The medium of embodiment 48, wherein the interactive ad comprises an immediate purchasing option including a URL to a merchant shopping site.

52. The medium of embodiment 41, wherein the interactive ad comprises an option for a user to enter a rating for the identified advertised item.

53. The medium of embodiment 41, further storing instructions to provide options to a user to browse interactive ads.

54. The medium of embodiment 43, wherein the options comprises: browsing interactive ads by any of: character, item category, season, episode.

55. The medium of embodiment 41, further storing instructions to:
receive a user interaction with the generated ad; and
analyze ad delivery and effects.

56. The medium of embodiment 55, further storing instructions to:
assign a weighing score to the user interaction.

57. The medium of embodiment 56, wherein the weighing score is determined based on a type of the user interaction.

58. The medium of embodiment 57, wherein the user interaction comprises any of: entry of product rating, click to view more, and click to purchase.

59. The medium of embodiment 55, further comprising: aggregating weighing scores from a plurality of user reactions to determine ad effects.

60. The medium of embodiment 55, further comprising: periodically update the analysis by combining newly received user interactions.

Further embodiments of social content access may comprise the following:

1. A social media content access processor-implemented method, comprising:
identifying a request to access user social media content;
obtaining user authorization credentials to access user social media content;
sending an access request with the obtained user authorization credentials to a social media platform;
receiving social media content data from the social media platform;
determining a type of the received media content data;
tagging the received media content data based on the type according to a progressive taxonomy mechanism;
receive a social media analytics request for an item;
querying the tagged media content data based on key terms related to the item; and
determining impression heuristics for the item based on query results.

2. The method of embodiment 1, wherein the request to access social media content comprises a request received from a user to populate a social watching event status to a social media platform.

3. The method of embodiment 1, wherein the request to access social media content comprises a periodic social media content update.

4. The method of embodiment 1, wherein the request to access social media content is triggered by an obtained request for social media analytics.

5. The method of embodiment 1, wherein the obtaining user authorization credentials comprises:
prompting a user to provide social media login credentials.

6. The method of embodiment 1, wherein the obtaining user authorization credentials comprises: redirecting a user to a social media login page.

7. The method of embodiment 1, wherein the social media platform obtains a user application ID and user permission.

8. The method of embodiment 1, wherein the user authorization credentials comprise a user token received from the social media platform.

9. The method of embodiment 1, wherein the receiving social media content data from the social media platform is scheduled on a periodic basis.

10. The method of embodiment 1, wherein the receiving social media content data from the social media platform is performed on demand.

11. The method of embodiment 1, wherein the type of the received media content data comprises any of structured data and unstructured data.

12. The method of embodiment 11, wherein the structured data comprises any of a number of user social media connections and a user profile.

13. The method of embodiment 11, wherein the unstructured data comprises raw texts of social media comments.

14. The method of embodiment 11, wherein the tagging the received media content data comprises tagging unstructured data based on category of data content.
15. The method of embodiment 1, wherein progressive taxonomy mechanism comprises a set of pre-determined key terms.
16. The method of embodiment 15, further comprising:
querying the social media content based on a key term; and
tagging the social media content with the key term when the query finds such key term.
17. The method of embodiment 15, further comprising:
perform text analytics on the social media content.
18. The method of embodiment 1, wherein the social media analytics request comprises an impression request of the item.
19. The method of embodiment 1, further comprising: determining a key word for the item.
20. The method of embodiment 1, wherein the item comprises a TV show.
21. The method of embodiment 1, wherein the item comprises a brand name product.
22. The method of embodiment 19, further comprising: determining whether tags of unstructured data includes the key word.
23. The method of embodiment 1, wherein the determining impression heuristics comprises assigning a weight value to the social media content based on the progressive mechanism.
24. The method of embodiment 1, wherein the determining impression heuristics of the item based on query results comprises calculating an impression score.
25. The method of embodiment 1, wherein the impression heuristics is determined based on statistical analysis of social media content.
26. A social media content access processor-implemented system, comprising:
means for identifying a request to access user social media content;
means for obtaining user authorization credentials to access user social media content;
means for sending an access request with the obtained user authorization credentials to a social media platform;
means for receiving social media content data from the social media platform;
means for determining a type of the received media content data;
means for tagging the received media content data based on the type according to a progressive taxonomy mechanism;
means for receiving a social media analytics request for an item;
means for querying the tagged media content data based on key terms related to the item; and
means for determining impression heuristics for the item based on query results.
27. The system of embodiment 26, wherein the request to access social media content comprises a request received from a user to populate a social watching event status to a social media platform.
28. The system of embodiment 26, wherein the request to access social media content comprises a periodic social media content update.
29. The system of embodiment 26, wherein the request to access social media content is triggered by an obtained request for social media analytics.
30. The system of embodiment 26, wherein the obtaining user authorization credentials comprises:
prompting a user to provide social media login credentials.
31. The system of embodiment 26, wherein the obtaining user authorization credentials comprises: redirecting a user to a social media login page.
32. The system of embodiment 26, wherein the social media platform obtains a user application ID and user permission.
33. The system of embodiment 26, wherein the user authorization credentials comprise a user token received from the social media platform.
34. The system of embodiment 26, wherein the receiving social media content data from the social media platform is scheduled on a periodic basis.
35. The system of embodiment 26, wherein the receiving social media content data from the social media platform is performed on demand.
36. The system of embodiment 26, wherein the type of the received media content data comprises any of structured data and unstructured data.
37. The system of embodiment 36, wherein the structured data comprises any of a number of user social media connections and a user profile.
38. The system of embodiment 36, wherein the unstructured data comprises raw texts of social media comments.
39. The system of embodiment 36, wherein the tagging the received media content data comprises tagging unstructured data based on category of data content.
40. The system of embodiment 26, wherein progressive taxonomy mechanism comprises a set of pre-determined key terms.
41. The system of embodiment 26, further comprising:
means for querying the social media content based on a key term; and
means for tagging the social media content with the key term when the query finds such key term.
42. The system of embodiment 26, further comprising:
means for performing text analytics on the social media content.
43. The system of embodiment 26, wherein the social media analytics request comprises an impression request of the item.
44. The system of embodiment 26, further comprising: means for determining a key word for the item.
45. The system of embodiment 26, wherein the item comprises a TV show.
46. The system of embodiment 26, wherein the item comprises a brand name product.
47. The system of embodiment 26, further comprising: means for determining whether tags of unstructured data includes the key word.
48. The system of embodiment 26, wherein the determining impression heuristics comprises assigning a weight value to the social media content based on the progressive mechanism.
49. The system of embodiment 26, wherein the determining impression heuristics of the item based on query results comprises calculating an impression score.
50. The system of embodiment 26, wherein the impression heuristics is determined based on statistical analysis of social media content.
51. A social media content access processor-readable non-transitory medium storing processor-executable instructions to:

identify a request to access user social media content;
obtain user authorization credentials to access user social media content;
send an access request with the obtained user authorization credentials to a social media platform;
receive social media content data from the social media platform;
determine a type of the received media content data;
tag the received media content data based on the type according to a progressive taxonomy mechanism;
receive a social media analytics request for an item;
query the tagged media content data based on key terms related to the item; and
determine impression heuristics for the item based on query results.

52. The medium of embodiment 51, wherein the request to access social media content comprises a request received from a user to populate a social watching event status to a social media platform.

53. The medium of embodiment 51, wherein the request to access social media content comprises a periodic social media content update.

54. The medium of embodiment 51, wherein the request to access social media content is triggered by an obtained request for social media analytics.

55. The medium of embodiment 51, wherein the obtaining user authorization credentials comprises:
prompting a user to provide social media login credentials.

56. The medium of embodiment 51, wherein the obtaining user authorization credentials comprises: redirecting a user to a social media login page.

57. The medium of embodiment 51, wherein the social media platform obtains a user application ID and user permission.

58. The medium of embodiment 51, wherein the user authorization credentials comprise a user token received from the social media platform.

59. The medium of embodiment 51, wherein the receiving social media content data from the social media platform is scheduled on a periodic basis.

60. The medium of embodiment 51, wherein the receiving social media content data from the social media platform is performed on demand.

61. The medium of embodiment 51, wherein the type of the received media content data comprises any of structured data and unstructured data.

62. The medium of embodiment 61, wherein the structured data comprises any of a number of user social media connections and a user profile.

63. The medium of embodiment 61, wherein the unstructured data comprises raw texts of social media comments.

64. The medium of embodiment 61, wherein the tagging the received media content data comprises tagging unstructured data based on category of data content.

65. The medium of embodiment 51, wherein progressive taxonomy mechanism comprises a set of pre-determined key terms.

66. The medium of embodiment 65, further comprising:
querying the social media content based on a key term; and
tagging the social media content with the key term when the query finds such key term.

67. The medium of embodiment 65, further comprising:
perform text analytics on the social media content.

68. The medium of embodiment 51, wherein the social media analytics request comprises an impression request of the item.

69. The medium of embodiment 51, further comprising:
determining a key word for the item.

70. The medium of embodiment 51, wherein the item comprises a TV show.

71. The medium of embodiment 51, wherein the item comprises a brand name product.

72. The medium of embodiment 69, further comprising:
determining whether tags of unstructured data includes the key word.

73. The medium of embodiment 51, wherein the determining impression heuristics comprises assigning a weight value to the social media content based on the progressive mechanism.

74. The medium of embodiment 51, wherein the determining impression heuristics of the item based on query results comprises calculating an impression score.

75. The medium of embodiment 51, wherein the impression heuristics is determined based on statistical analysis of social media content.

Further embodiments of cross media channel analytics may comprise the following:

1. A media analytics processor-implemented method, comprising:
receiving a user impression media analytics request including an identified object;
obtaining media analytics parameters from a user interface;
obtaining user authorization credentials for accessing user media exposure data;
obtaining user media exposure data from a variety of data channels upon verification of the obtained user authorization credentials;
querying for user impression data related to the identified object from the obtained user media exposure data;
classifying the queried user impression data related to the identified object based on different classification measures; and
generating user impression reports for the identified object.

2. The method of embodiment 1, wherein the identified object comprises a TV show.

3. The method of embodiment 1, wherein the identified object comprises a brand name.

4. The method of embodiment 1, wherein the media analytics parameters comprise any of a TV network, a TV show genre, a TV show name.

5. The method of embodiment 1, wherein the media analytics parameters further comprise user gender, age group, user interface types, user phone type, day part time range and user location.

6. The method of embodiment 1, wherein the media analytics parameters further comprise types of social media platform.

7. The method of embodiment 1, wherein the obtaining user authorization credentials comprises recruiting social media users to share social content.

8. The method of embodiment 1, wherein the obtaining user authorization credentials further comprises prompting a user to provide social media login credentials.

9. The method of embodiment 1, wherein the obtaining user authorization credentials further comprises redirecting a user to a social media login page.

10. The method of embodiment 1, wherein the user media exposure data comprises any of user website visits, social media content and TV viewing data.
11. The method of embodiment 1, wherein the variety of data channels comprise a mobile meter.
12. The method of embodiment 1, wherein the variety of data channels comprise a mobile application instantiated on a user mobile device.
13. The method of embodiment 1, wherein the variety of data channels comprise social media.
14. The method of embodiment 1, wherein the variety of data channels comprise flash/HTTP cookies.
15. The method of embodiment 1, wherein the user media exposure data further comprises user responses to survey questions, GPS locations, user application usage, and mobile search behavior.
16. The method of embodiment 1, wherein the querying for user impression data comprises a progressive search based on the identified object related key terms.
17. The method of embodiment 1, wherein the classification measures comprise any of user gender, user age group, day of week, and day part time range.
18. The method of embodiment 1, wherein the user impression reports are classified by the classification measures.
19. The method of embodiment 1, wherein the user impression reports comprise application data statistics as to any of: number of total application sessions, media session length, number of total users.
20. The method of embodiment 1, wherein the user impression reports further comprise any of unique users, percent active reach, time per person, number of visits, number of pages viewed, visits/person, user gender, and age groups.
21. A media analytics system, comprising:
a memory;
a processor disposed in communication with said memory, and configured to issue a plurality of processing instructions stored in the memory, wherein the processor issues instructions to:
receive a user impression media analytics request including an identified object;
obtain media analytics parameters from a user interface;
obtain user authorization credentials for accessing user media exposure data;
obtain user media exposure data from a variety of data channels upon verification of the obtained user authorization credentials;
query for user impression data related to the identified object from the obtained user media exposure data;
classify the queried user impression data related to the identified object based on different classification measures; and
generate user impression reports for the identified object.
22. The system of embodiment 21, wherein the identified object comprises a TV show.
23. The system of embodiment 21, wherein the identified object comprises a brand name.
24. The system of embodiment 21, wherein the media analytics parameters comprise any of a TV network, a TV show genre, a TV show name.
25. The system of embodiment 21, wherein the media analytics parameters further comprise user gender, age group, user interface types, user phone type, day part time range and user location.
26. The system of embodiment 21, wherein the media analytics parameters further comprise types of social media platform.
27. The system of embodiment 21, wherein the obtaining user authorization credentials comprises recruiting social media users to share social content.
28. The system of embodiment 21, wherein the obtaining user authorization credentials further comprises prompting a user to provide social media login credentials.
29. The system of embodiment 21, wherein the obtaining user authorization credentials further comprises redirecting a user to a social media login page.
30. The system of embodiment 21, wherein the user media exposure data comprises any of user website visits, social media content and TV viewing data.
31. The system of embodiment 21, wherein the variety of data channels comprise a mobile meter.
32. The system of embodiment 21, wherein the variety of data channels comprise a mobile application instantiated on a user mobile device.
33. The system of embodiment 21, wherein the variety of data channels comprise social media.
34. The system of embodiment 21, wherein the variety of data channels comprise flash/HTTP cookies.
35. The system of embodiment 21, wherein the user media exposure data further comprises user responses to survey questions, GPS locations, user application usage, and mobile search behavior.
36. The system of embodiment 21, wherein the querying for user impression data comprises a progressive search based on the identified object related key terms.
37. The system of embodiment 21, wherein the classification measures comprise any of user gender, user age group, day of week, and day part time range.
38. The system of embodiment 21, wherein the user impression reports are classified by the classification measures.
39. The system of embodiment 21, wherein the user impression reports comprise application data statistics as to any of: number of total application sessions, media session length, number of total users.
40. The system of embodiment 21, wherein the user impression reports further comprise any of unique users, percent active reach, time per person, number of visits, number of pages viewed, visits/person, user gender, and age groups.
41. A media analytics processor-readable storage medium storing processor-executable instructions to:
receive a user impression media analytics request including an identified object;
obtain media analytics parameters from a user interface;
obtain user authorization credentials for accessing user media exposure data;
obtain user media exposure data from a variety of data channels upon verification of the obtained user authorization credentials;
query for user impression data related to the identified object from the obtained user media exposure data;
classify the queried user impression data related to the identified object based on different classification measures; and
generate user impression reports for the identified object.
42. The medium of embodiment 41, wherein the identified object comprises a TV show.
43. The medium of embodiment 41, wherein the identified object comprises a brand name.

44. The medium of embodiment 41, wherein the media analytics parameters comprise any of a TV network, a TV show genre, a TV show name.
45. The medium of embodiment 41, wherein the media analytics parameters further comprise user gender, age group, user interface types, user phone type, day part time range and user location.
46. The medium of embodiment 41, wherein the media analytics parameters further comprise types of social media platform.
47. The medium of embodiment 41, wherein the obtaining user authorization credentials comprises recruiting social media users to share social content.
48. The medium of embodiment 41, wherein the obtaining user authorization credentials further comprises prompting a user to provide social media login credentials.
49. The medium of embodiment 41, wherein the obtaining user authorization credentials further comprises redirecting a user to a social media login page.
50. The medium of embodiment 41, wherein the user media exposure data comprises any of user website visits, social media content and TV viewing data.
51. The medium of embodiment 41, wherein the variety of data channels comprise a mobile meter.
52. The medium of embodiment 41, wherein the variety of data channels comprise a mobile application instantiated on a user mobile device.
53. The medium of embodiment 41, wherein the variety of data channels comprise social media.
54. The medium of embodiment 41, wherein the variety of data channels comprise flash/HTTP cookies.
55. The medium of embodiment 41, wherein the user media exposure data further comprises user responses to survey questions, GPS locations, user application usage, and mobile search behavior.
56. The medium of embodiment 41, wherein the querying for user impression data comprises a progressive search based on the identified object related key terms.
57. The medium of embodiment 41, wherein the classification measures comprise any of user gender, user age group, day of week, and day part time range.
58. The medium of embodiment 41, wherein the user impression reports are classified by the classification measures.
59. The medium of embodiment 41, wherein the user impression reports comprise application data statistics as to any of: number of total application sessions, media session length, number of total users.
60. The medium of embodiment 41, wherein the user impression reports further comprise any of unique users, percent active reach, time per person, number of visits, number of pages viewed, visits/person, user gender, and age groups.

Further embodiments of mobile data tracking may comprise the following:

1. A mobile content tracking and analyzing processor-implemented method, comprising:
obtaining a user mobile device identifier;
monitoring data traffic coming in and out of the user mobile device based on the obtained user mobile device identifier via a mobile usage tracking entity;
parsing the monitored data traffic to determine a data content type of the data traffic;
determining user media content exposure information from the parsed monitored data traffic based on the data content type; and
generating user media content exposure statistics data.
2. The method of embodiment 1, wherein the user mobile device identifier comprises a hardware identifier.
3. The method of embodiment 1, wherein the user mobile device identifier comprises a physical address.
4. The method of embodiment 1, wherein the data traffic is obtained via a mobile application instantiated on the user mobile device.
5. The method of embodiment 1, wherein the monitoring data traffic is obtained via a mobile meter.
6. The method of embodiment 1, wherein the determine a data content type of the data traffic comprises extracting a data type filed value from a data event message.
7. The method of embodiment 1, wherein the data content type comprises any of:
a URL link, application information, media usage data, survey response data, and social data.
8. The method of embodiment 1, wherein the determining user media content exposure information comprises:
determining the monitored data traffic comprises a URL link; and
determining the URL link includes an advertisement.
9. The method of embodiment 8, wherein the determining user media content exposure information further comprises:
determining a classification of the advertisement;
obtaining identifying information of the advertisement; and
storing the identifying information with the user as advertisement exposure information.
10. The method of embodiment 1, wherein the determining user media content exposure information comprises:
determining the monitored data traffic comprises application information;
determining device application inventory; and
obtaining application group sharing information
11. The method of embodiment 10, wherein the application group sharing information comprises a list of social connections.
12. The method of embodiment 1, wherein the determining user media content exposure information comprises:
determining the monitored data traffic comprises media usage information; and
determining a media title.
13. The method of embodiment 1, wherein the determining user media content exposure information comprises:
determining the monitored data traffic comprises social content; and
processing the social content to extract user impression indication.
14. The method of embodiment 13, wherein the user impression indication is related to a product name.
15. The method of embodiment 1, wherein the data traffic is monitored at a proxy server.
16. The method of embodiment 1, wherein the monitored data traffic further comprises any of:
TV channel changing events, mobile advertising data, mobile application usage data, social media profile, social media comments, and website visits.

17. The method of embodiment 1, wherein the user media content exposure statistics data comprises any of user brand impression measures.
18. The method of embodiment 17, wherein the user brand impression measures comprises a list of top mentioned brands.
19. The method of embodiment 1, further comprising:
providing and generating individualized ad contents to the user mobile device based on the generated user media content exposure statistics data.
20. The method of embodiment 1, further comprising:
generating individualized survey questions to the user mobile device based on the generated user media content exposure statistics data.
21. A mobile content tracking and analyzing system, comprising:
a memory;
a processor disposed in communication with said memory, and configured to issue a plurality of processing instructions stored in the memory, wherein the processor issues instructions to:
obtain a user mobile device identifier;
monitor data traffic coming in and out of the user mobile device based on the obtained user mobile device identifier via a mobile usage tracking entity;
parse the monitored data traffic to determine a data content type of the data traffic;
determine user media content exposure information from the parsed monitored data traffic based on the data content type; and
generate user media content exposure statistics data.
22. The system of embodiment 21, wherein the user mobile device identifier comprises a hardware identifier.
23. The system of embodiment 21, wherein the user mobile device identifier comprises a physical address.
24. The system of embodiment 21, wherein the data traffic is obtained via a mobile application instantiated on the user mobile device.
25. The system of embodiment 21, wherein the monitoring data traffic is obtained via a mobile meter.
26. The system of embodiment 21, wherein the determine a data content type of the data traffic comprises extracting a data type filed value from a data event message.
27. The system of embodiment 21, wherein the data content type comprises any of:
a URL link, application information, media usage data, survey response data, and social data.
28. The system of embodiment 21, wherein the determining user media content exposure information comprises:
determining the monitored data traffic comprises a URL link; and
determining the URL link includes an advertisement.
29. The system of embodiment 28, wherein the determining user media content exposure information further comprises:
determining a classification of the advertisement;
obtaining identifying information of the advertisement; and
storing the identifying information with the user as advertisement exposure information.
30. The system of embodiment 21, wherein the determining user media content exposure information comprises:
determining the monitored data traffic comprises application information;
determining device application inventory; and
obtaining application group sharing information
31. The system of embodiment 30, wherein the application group sharing information comprises a list of social connections.
32. The system of embodiment 21, wherein the determining user media content exposure information comprises:
determining the monitored data traffic comprises media usage information; and
determining a media title.
33. The system of embodiment 21, wherein the determining user media content exposure information comprises:
determining the monitored data traffic comprises social content; and
processing the social content to extract user impression indication.
34. The system of embodiment 33, wherein the user impression indication is related to a product name.
35. The system of embodiment 21, wherein the data traffic is monitored at a proxy server.
36. The system of embodiment 21, wherein the monitored data traffic further comprises any of:
TV channel changing events, mobile advertising data, mobile application usage data, social media profile, social media comments, and website visits.
37. The system of embodiment 21, wherein the user media content exposure statistics data comprises any of user brand impression measures.
38. The system of embodiment 37, wherein the user brand impression measures comprises a list of top mentioned brands.
39. The system of embodiment 21, further comprising:
providing and generating individualized ad contents to the user mobile device based on the generated user media content exposure statistics data.
40. The system of embodiment 21, further comprising:
generating individualized survey questions to the user mobile device based on the generated user media content exposure statistics data.
41. A mobile content tracking and analyzing processor-implemented storage medium storing processor-executable instructions to:
obtain a user mobile device identifier;
monitor data traffic coming in and out of the user mobile device based on the obtained user mobile device identifier via a mobile usage tracking entity;
parse the monitored data traffic to determine a data content type of the data traffic;
determine user media content exposure information from the parsed monitored data traffic based on the data content type; and
generate user media content exposure statistics data.
42. The medium of embodiment 41, wherein the user mobile device identifier comprises a hardware identifier.
43. The medium of embodiment 41, wherein the user mobile device identifier comprises a physical address.
44. The medium of embodiment 41, wherein the data traffic is obtained via a mobile application instantiated on the user mobile device.
45. The medium of embodiment 41, wherein the monitoring data traffic is obtained via a mobile meter.

46. The medium of embodiment 41, wherein the determine a data content type of the data traffic comprises extracting a data type filed value from a data event message.

47. The medium of embodiment 41, wherein the data content type comprises any of:
a URL link, application information, media usage data, survey response data, and social data.

48. The medium of embodiment 41, wherein the determining user media content exposure information comprises:
determining the monitored data traffic comprises a URL link; and
determining the URL link includes an advertisement.

49. The medium of embodiment 28, wherein the determining user media content exposure information further comprises:
determining a classification of the advertisement;
obtaining identifying information of the advertisement; and
storing the identifying information with the user as advertisement exposure information.

50. The medium of embodiment 41, wherein the determining user media content exposure information comprises:
determining the monitored data traffic comprises application information;
determining device application inventory; and
obtaining application group sharing information 51. The medium of embodiment 30, wherein the application group sharing information comprises a list of social connections.

52. The medium of embodiment 41, wherein the determining user media content exposure information comprises:
determining the monitored data traffic comprises media usage information; and
determining a media title.

53. The medium of embodiment 41, wherein the determining user media content exposure information comprises:
determining the monitored data traffic comprises social content; and
processing the social content to extract user impression indication.

54. The medium of embodiment 33, wherein the user impression indication is related to a product name.

55. The medium of embodiment 41, wherein the data traffic is monitored at a proxy server.

56. The medium of embodiment 41, wherein the monitored data traffic further comprises any of:
TV channel changing events, mobile advertising data, mobile application usage data, social media profile, social media comments, and website visits.

57. The medium of embodiment 41, wherein the user media content exposure statistics data comprises any of user brand impression measures.

58. The medium of embodiment 57, wherein the user brand impression measures comprises a list of top mentioned brands.

59. The medium of embodiment 41, further comprising:
providing and generating individualized ad contents to the user mobile device based on the generated user media content exposure statistics data.

60. The medium of embodiment 41, further comprising:
generating individualized survey questions to the user mobile device based on the generated user media content exposure statistics data.

In order to address various issues and advance the art, the entirety of this application for MOBILE REMOTE MEDIA CONTROL PLATFORM METHODS (including the Cover Page, Title, Headings, Field, Background, Summary, Brief Description of the Drawings, Detailed Description, Embodiments, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It may be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to embodiment such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. It is to be understood that, depending on the particular needs and/or characteristics of a MR-Control individual and/or enterprise user, database configuration and/or relational model, data type, data transmission and/or network framework, syntax structure, and/or the like, various embodiments of the MR-Control, may be implemented that facilitates a great deal of flexibility and customization. While various embodiments and discussions of the MR-Control have been directed to social networks, however, it is to be understood that the embodiments described herein may be readily configured and/or customized for a wide variety of other applications and/or implementations.

What is claimed is:

1. A TV mobile control processor-implemented method, comprising:
    obtaining local TV program schedule listing data local to a user mobile device, wherein the user mobile device itself provides indication of its geographical locality and the user mobile device obtains local TV program schedule listing data automatically responsive to the indicated geographical locality;
    providing the obtained TV program schedule listing data to the user mobile device communicatively coupled to a wireless communication component
        receiving a user media program selection message from the user mobile device, wherein the user mobile device transmits a TV remote channel selection indication to a TV set via the wireless communication component,
        wherein the user media program selection message and the TV remote channel selection indication comprise the same user selected channel;
    receiving, from the user mobile device, audience monitoring atmospherics data including ambient multimedia recording captured by the user mobile device;
    analyzing the audience monitoring atmospherics data to identify audience watching environment background noise indicative of user's inattention to the selected user media program;
    determining whether the received user media program selection message indicates a user watching event based on the identified audience watching environment background noise;
    determining a user watching time length associated with the user selected channel when the received user media program selection message is determined to indicate the user watching event; and
    generating and storing a user watching event log file including the user selected channel and the determined user watching time length.

2. The method of claim 1, further comprising: filtering the received user media program selection message when the received user media program selection message is determined not to indicate a user watching event.

3. The method of claim 1, wherein the user mobile device comprises any of a smartphone, a personal data assistant, a cellular phone, a laptop, a tablet computer, and a standalone table unit.

4. The method of claim 1, wherein the TV program schedule listing data is transmitted via a wireless network.

5. The method of claim 1, wherein the user mobile device transmits a TV remote channel selection indication to a TV set-top box via the wireless communication component, wherein the wireless communication component comprises a plug-in component.

6. The method of claim 1, wherein the TV remote channel selection message comprises a non-live media program selection message.

7. The method of claim 1, wherein the non-live media program selection message comprises any of a DVD control message, a DVR control message and an on-demand media control message.

8. The method of claim 1, wherein the determining whether the received user media program selection message indicates a user watching event comprises:
    calculating a time lapse between two consecutively received program selection messages; and
    determining whether the time lapse is sufficiently long to indicate a user watching event.

9. The method of claim 1, wherein the determining a user watching time length comprises determining whether a time lapse between two consecutively received program selection messages exceeds a capping threshold.

10. The method of claim 1, wherein the determining a user watching time length comprises applying watching time caps based on any of TV on/off events, set-top box on/off events and heuristics.

11. The method of claim 1, further comprising feeding the user watching event log file for user viewing data record associated with the selected media program.

12. The method of claim 1, wherein the user mobile device is configured to operate any of the following: automatically scan on a communication stack for a physical address of a TV set; and connecting to a TV set based on user configured physical address.

13. The method of claim 1, wherein the user mobile device receives user submitted TV parameters to scan for a TV set.

14. The method of claim 1, further comprising:
    receiving an atmospherics data package from the user mobile device; and
    obtaining an atmospherics data artifact from the atmospherics data package.

15. The method of claim 14, further comprising: extracting user instant activities information based on analysis of the atmospherics data artifact.

16. The method of claim 15, further comprising:
    generating a user viewing status indication based on the user instant activities information; and
    incorporating the user viewing status indication into viewer measurement data of the user selected channel.

17. The method of claim 1, wherein the received TV program schedule listing data is received at a server and comprises a plurality of ad tags.

18. The method of claim 17, further comprising: retrieving an ad tag associated with the user selected media program from the TV program schedule listing data.

19. The method of claim 1, further comprising: retrieving an ad tag associated with the user selected media program from the TV program schedule listing data; and generating a product survey question based on the ad tag.

20. The method of claim 1, further comprising:
    receiving audience monitoring atmospherics data from the user mobile device; and
    determining audience watching status indicia from the received audience monitoring atmospherics data.

21. A TV mobile control processor-implemented method, comprising:
    obtaining local TV program schedule listing data at a remote server, wherein a user mobile device itself provides indication of its geographical locality and the remote server obtains local TV program schedule listing data automatically responsive to the indicated geographical locality;
    providing the obtained TV program schedule listing data to said user mobile device communicatively coupled to a wireless communication component, wherein the provided TV program schedule listing data is loaded into a TV mobile control component instantiated on the user mobile device;

receiving a user media program selection message from the user mobile device,
  wherein the user mobile device transmits a TV remote channel selection indication to a TV set via the wireless communication component,
  wherein the TV mobile control component instantiated on the user mobile device automatically generates and transmits a social media message indicating the user media program selection to a social media platform;

receiving, from the user mobile device, audience monitoring atmospherics data including ambient multimedia recording captured by the user mobile device;

analyzing the ambient multimedia recording to identify audience watching environment background noise indicative of user's inattention to the selected user media program;

determining the user is engaged in watching the user selected channel based on the identified audience watching environment background noise;

determining whether the received user media program selection message indicates a user watching event based on the analysis of the ambient multimedia recording;

determining a user watching time length associated with the user selected channel when the received user media program selection message is determined to indicate the user watching event;

generating and storing a user watching event log file including the user selected channel and the determined user watching time length,
  said user watching event log file indicating that the user has been engaged in watching the media program for the determined user watching time length; and generating an audience viewing data report associated with the media program aired on the user selected channel based on the stored user watching event log file.

* * * * *